(12) United States Patent  
Shem-Tov et al.

(10) Patent No.: US 11,857,497 B2  
(45) Date of Patent: Jan. 2, 2024

(54) FLUID TRANSFER STATION IN A ROBOTIC PHARMACEUTICAL PREPARATION SYSTEM

(71) Applicant: Equashield Medical Ltd, Migdal Tefen (IL)

(72) Inventors: Eric Shem-Tov, Ramat Hasharon (IL); Marino Kriheli, Savion (IL); Boaz Slav, Haifa (IL); Raanan Tavor, Yuvalim (IL); Gonen Daskal, Akersberga (SE)

(73) Assignee: EQUASHIELD MEDICAL LTD, Migdal Tefen (IL)

( * ) Notice: Subject to any disclaimer, the term of this patent is extended or adjusted under 35 U.S.C. 154(b) by 0 days.

(21) Appl. No.: 18/132,018

(22) Filed: Apr. 7, 2023

(65) Prior Publication Data

US 2023/0285238 A1 Sep. 14, 2023

Related U.S. Application Data

(63) Continuation of application No. 18/118,999, filed on Mar. 8, 2023.

(Continued)

(51) Int. Cl.
*A61J 1/20* (2006.01)
*B25J 13/08* (2006.01)

(Continued)

(52) U.S. Cl.
CPC ........... *A61J 1/2055* (2015.05); *A61J 1/1406* (2013.01); *B25J 13/08* (2013.01); *B65B 3/003* (2013.01); *A61J 2200/70* (2013.01)

(58) Field of Classification Search
CPC ....... B65B 3/003; A61J 1/2055; A61J 1/1406; A61J 2200/70; B25J 13/08

(Continued)

(56) References Cited

U.S. PATENT DOCUMENTS 4,187,890 A   2/1980 Stach et al.
4,564,054 A   1/1986 Gustavsson (Continued)

FOREIGN PATENT DOCUMENTS

CN   101403705 A   4/2009
CN   103622820 A   3/2014

(Continued)

OTHER PUBLICATIONS

WO 2016147178 A1—English Translation (Year: 2016).*

(Continued)

*Primary Examiner* — Timothy P. Kelly
*Assistant Examiner* — Christopher M Afful
(74) *Attorney, Agent, or Firm* — Workman Nydegger

(57) ABSTRACT

A robotic system and method are provided for transfer of fluid between a container accessible via a container-septum and a fluid transfer assembly accessible via a fluid transfer connector septum. The robotic system includes a controller and a manipulator controllable by the controller to manipulate at least one of the container and the fluid transfer assembly. The controller is configured to operate the manipulator to secure contact between the container-septum and the fluid transfer connector septum during at least a portion of the transfer of the fluid.

30 Claims, 64 Drawing Sheets

Related U.S. Application Data

(60) Provisional application No. 63/429,340, filed on Dec. 1, 2022, provisional application No. 63/382,014, filed on Nov. 2, 2022, provisional application No. 63/269,004, filed on Mar. 8, 2022.

(51) Int. Cl.
*A61J 1/14* (2023.01)
*B65B 3/00* (2006.01)

(58) Field of Classification Search
USPC .......................................................... 141/1
See application file for complete search history.

(56) References Cited

U.S. PATENT DOCUMENTS

| | | |
|---|---|---|
| 4,576,211 A | 3/1986 | Valentini et al. |
| 5,238,031 A | 8/1993 | Baeumer et al. |
| 5,341,854 A | 8/1994 | Zezulka et al. |
| 5,431,201 A | 7/1995 | Torchia et al. |
| 5,713,856 A | 2/1998 | Eggers et al. |
| 5,756,905 A | 5/1998 | Ueda |
| 5,884,457 A | 3/1999 | Ortiz et al. |
| 5,911,252 A | 6/1999 | Cassel |
| 5,934,885 A | 8/1999 | Farrell et al. |
| 5,968,014 A | 10/1999 | Neftel et al. |
| 6,360,794 B1 | 3/2002 | Turner |
| 6,604,903 B2 | 8/2003 | Osborne et al. |
| 6,616,771 B2 | 9/2003 | Osborne et al. |
| 6,948,522 B2 | 9/2005 | Newbrough et al. |
| 7,017,623 B2 | 3/2006 | Tribble et al. |
| 7,124,011 B2 | 10/2006 | Baxter et al. |
| 7,128,105 B2 | 10/2006 | Tribble et al. |
| 7,147,616 B2 | 12/2006 | Pedrazzi et al. |
| 7,213,760 B2 | 5/2007 | Mase et al. |
| 7,228,308 B2 | 6/2007 | Rollins |
| 7,270,158 B2 | 9/2007 | Py |
| 7,299,161 B2 | 11/2007 | Baxter et al. |
| 7,310,143 B2 | 12/2007 | Budd |
| 7,343,943 B2 | 3/2008 | Khan et al. |
| 7,481,978 B2 | 1/2009 | Li et al. |
| 7,499,581 B2 | 3/2009 | Tribble et al. |
| 7,588,167 B2 | 9/2009 | Hunter et al. |
| 7,607,018 B2 | 10/2009 | Baxter et al. |
| 7,610,115 B2 | 10/2009 | Rob et al. |
| 7,620,479 B2 | 11/2009 | Kircher et al. |
| 7,630,788 B1 | 12/2009 | Reese |
| 7,640,529 B2 | 12/2009 | Croke et al. |
| 7,670,326 B2 | 3/2010 | Shemesh |
| 7,698,156 B2 | 4/2010 | Martucci et al. |
| 7,712,385 B2 | 5/2010 | Bremer et al. |
| 7,719,420 B2 | 5/2010 | Christie et al. |
| 7,753,085 B2 | 7/2010 | Tribble et al. |
| 7,762,989 B2 | 7/2010 | Simpson |
| 7,765,089 B2 | 7/2010 | Baxter et al. |
| 7,781,744 B2 | 8/2010 | Bedeschi |
| 7,814,731 B2 | 10/2010 | Bender et al. |
| 7,835,819 B2 | 11/2010 | Duncan et al. |
| 7,900,658 B2 | 3/2011 | Osborne et al. |
| 7,913,720 B2 | 3/2011 | Tribble et al. |
| 7,927,313 B2 | 4/2011 | Stewart et al. |
| 7,931,859 B2 | 4/2011 | Mlodzinski et al. |
| 7,968,293 B2 | 6/2011 | Reipert et al. |
| 7,981,281 B2 | 7/2011 | Yu et al. |
| 8,001,961 B2 | 8/2011 | Rudzinski et al. |
| 8,024,913 B2 | 9/2011 | Khan et al. |
| 8,082,957 B2 | 12/2011 | Yuyama et al. |
| 8,099,929 B2 | 1/2012 | Kirby et al. |
| 8,122,923 B2 | 2/2012 | Kraus et al. |
| 8,140,351 B2 | 3/2012 | Tribble et al. |
| 8,151,835 B2 | 4/2012 | Khan et al. |
| 8,182,744 B2 | 5/2012 | Mlodzinski et al. |
| 8,196,614 B2 * | 6/2012 | Kriheli ............... B65D 51/002 141/330 |
| 8,201,592 B2 | 6/2012 | Van et al. |
| 8,209,941 B2 | 7/2012 | Osborne et al. |
| 8,225,824 B2 | 7/2012 | Eliuk et al. |
| 8,247,377 B2 | 8/2012 | Barnett et al. |
| 8,267,127 B2 | 9/2012 | Kriheli |
| 8,267,129 B2 | 9/2012 | Doherty et al. |
| 8,271,138 B2 | 9/2012 | Eliuk et al. |
| 8,276,623 B2 | 10/2012 | Van et al. |
| 8,287,724 B2 | 10/2012 | Slepicka et al. |
| 8,297,320 B2 | 10/2012 | Giribona et al. |
| 8,317,698 B2 | 11/2012 | Lowery |
| 8,361,023 B2 | 1/2013 | Bedingfield |
| 8,386,070 B2 | 2/2013 | Eliuk et al. |
| 8,404,492 B2 | 3/2013 | Baldassari et al. |
| 8,414,498 B2 | 4/2013 | Keren et al. |
| 8,449,495 B2 | 5/2013 | Hopping et al. |
| 8,453,548 B2 | 6/2013 | Jaynes |
| 8,469,939 B2 | 6/2013 | Fangrow, Jr. |
| 8,485,727 B2 | 7/2013 | Trouilly et al. |
| 8,499,919 B2 | 8/2013 | Giribona et al. |
| 8,512,309 B2 | 8/2013 | Shemesh et al. |
| 8,523,797 B2 | 9/2013 | Lowery et al. |
| 8,527,090 B2 | 9/2013 | Monto et al. |
| 8,529,490 B2 | 9/2013 | Wariar et al. |
| 8,539,989 B2 | 9/2013 | Giribona et al. |
| 8,546,096 B2 | 10/2013 | Dockal et al. |
| 8,575,101 B2 | 11/2013 | Schense et al. |
| 8,598,327 B2 | 12/2013 | Schaub et al. |
| 8,617,467 B2 | 12/2013 | Rodriguez et al. |
| 8,632,738 B2 | 1/2014 | Giribona et al. |
| 8,640,586 B2 | 2/2014 | Jaynes |
| 8,660,860 B2 | 2/2014 | Wehba et al. |
| 8,775,196 B2 | 7/2014 | Simpson et al. |
| 8,777,895 B2 | 7/2014 | Hsu et al. |
| 8,785,139 B2 | 7/2014 | Weber et al. |
| 8,794,276 B2 | 8/2014 | Giribona et al. |
| 8,798,284 B2 | 8/2014 | Cartwright et al. |
| 8,818,821 B2 | 8/2014 | Fioravanti |
| 8,821,471 B2 | 9/2014 | Bianco et al. |
| 8,829,047 B2 | 9/2014 | Gass et al. |
| 8,852,937 B2 | 10/2014 | Baxter et al. |
| 8,859,222 B2 | 10/2014 | Martis et al. |
| 8,865,070 B2 | 10/2014 | Giribona et al. |
| 8,869,663 B2 | 10/2014 | Greyshock et al. |
| 8,869,667 B2 | 10/2014 | Deutsch et al. |
| 8,876,790 B2 | 11/2014 | Rahimy et al. |
| 8,893,949 B2 | 11/2014 | Shelton et al. |
| 8,894,627 B2 | 11/2014 | Garfield et al. |
| 8,905,086 B2 | 12/2014 | Giribona et al. |
| 8,905,450 B2 | 12/2014 | Aguerre et al. |
| 8,920,356 B2 | 12/2014 | Shang et al. |
| 8,940,335 B2 | 1/2015 | Goessl |
| 8,962,912 B2 | 2/2015 | Sasgary et al. |
| 8,986,607 B2 | 3/2015 | Anderle et al. |
| 9,011,385 B2 | 4/2015 | Bianco et al. |
| 9,023,367 B2 | 5/2015 | Barrett et al. |
| 9,039,047 B2 | 5/2015 | Imai |
| 9,039,647 B2 | 5/2015 | Lannoy |
| 9,043,019 B2 | 5/2015 | Eliuk et al. |
| 9,053,218 B2 | 6/2015 | Osborne et al. |
| 9,084,743 B2 | 7/2015 | Teschner et al. |
| 9,103,358 B2 | 8/2015 | Killian et al. |
| 9,114,172 B2 | 8/2015 | Rhee et al. |
| 9,147,045 B2 | 9/2015 | Yu et al. |
| 9,149,570 B2 | 10/2015 | Yu et al. |
| 9,158,892 B2 | 10/2015 | Levy et al. |
| 9,173,816 B2 | 11/2015 | Reinhardt et al. |
| 9,216,831 B2 | 12/2015 | Zanelli et al. |
| 9,234,051 B2 | 1/2016 | Shaklee et al. |
| 9,248,208 B2 | 2/2016 | Li |
| 9,254,356 B2 | 2/2016 | Shah et al. |
| 9,259,768 B2 | 2/2016 | Aguerre et al. |
| 9,272,092 B2 | 3/2016 | Aguerre et al. |
| 9,283,146 B2 | 3/2016 | Aguerre et al. |
| 9,315,500 B2 | 4/2016 | Buehlmayer et al. |
| 9,315,560 B2 | 4/2016 | Mitterer et al. |
| 9,358,181 B2 | 6/2016 | Ariagno et al. |
| 9,365,315 B2 | 6/2016 | Kim et al. |
| 9,393,362 B2 | 7/2016 | Cozmi et al. |
| 9,399,002 B2 | 7/2016 | Bianco |

(56) References Cited

U.S. PATENT DOCUMENTS

| | | |
|---|---|---|
| 9,408,945 B2 | 8/2016 | Goessl et al. |
| 9,414,991 B2 | 8/2016 | Sanders et al. |
| 9,474,690 B2 | 10/2016 | Ranalletta et al. |
| 9,487,312 B2 | 11/2016 | Bianco et al. |
| 9,510,997 B2 | 12/2016 | Kriheli et al. |
| 9,516,760 B2 | 12/2016 | Bermel et al. |
| 9,545,025 B2 | 1/2017 | Bermel et al. |
| 9,555,189 B2 | 1/2017 | Reisinger et al. |
| 9,557,841 B2 | 1/2017 | Bermel et al. |
| 9,561,156 B2 | 2/2017 | Koike et al. |
| 9,579,255 B2 | 2/2017 | Eliuk et al. |
| 9,626,817 B2 | 4/2017 | Thompson et al. |
| 9,643,998 B2 | 5/2017 | Wauters et al. |
| 9,650,716 B2 | 5/2017 | Bermel et al. |
| 9,668,940 B2 | 6/2017 | Kaucky et al. |
| 9,697,334 B2 | 7/2017 | Yu et al. |
| 9,700,866 B2 | 7/2017 | Chaubal et al. |
| 9,750,663 B2 | 9/2017 | Harp et al. |
| 9,763,952 B2 | 9/2017 | Caravatti et al. |
| 9,795,535 B2 | 10/2017 | Aguerre et al. |
| 9,801,786 B2 | 10/2017 | Lev et al. |
| 9,804,586 B2 | 10/2017 | Fioravanti et al. |
| 9,827,164 B2 | 11/2017 | Lizari et al. |
| 9,833,541 B2 | 12/2017 | McCoy et al. |
| 9,845,168 B2 | 12/2017 | Ward et al. |
| 9,849,232 B2 | 12/2017 | Gray et al. |
| 9,849,432 B2 | 12/2017 | Fioravanti et al. |
| 9,873,761 B1 | 1/2018 | Das et al. |
| 9,877,895 B2 | 1/2018 | Garfield et al. |
| 9,883,987 B2 | 2/2018 | Lopez et al. |
| 9,888,774 B2 | 2/2018 | Biba et al. |
| 9,907,908 B2 | 3/2018 | Chen et al. |
| 9,931,105 B2 | 4/2018 | Mark et al. |
| 9,943,631 B2 | 4/2018 | White et al. |
| 9,949,979 B2 | 4/2018 | Cooke et al. |
| 9,976,801 B2 | 5/2018 | Paydar et al. |
| 9,978,139 B2 | 5/2018 | Kriheli et al. |
| 9,999,569 B2 | 6/2018 | Kriheli |
| 10,002,235 B2 | 6/2018 | Gray et al. |
| 10,025,909 B2 | 7/2018 | Gray et al. |
| 10,080,835 B2 | 9/2018 | Lizari et al. |
| 10,092,696 B2 | 10/2018 | Slepicka et al. |
| D833,032 S | 11/2018 | Molinuevo et al. |
| 10,117,986 B2 | 11/2018 | Childers |
| 10,139,423 B2 | 11/2018 | Brisebat et al. |
| 10,155,082 B2 | 12/2018 | Roger et al. |
| D837,983 S | 1/2019 | Fangrow |
| 10,181,186 B2 | 1/2019 | Kriheli et al. |
| 10,201,586 B2 | 2/2019 | Dockal et al. |
| 10,224,117 B2 | 3/2019 | Miller et al. |
| 10,232,022 B2 | 3/2019 | Schnecker et al. |
| 10,241,045 B2 | 3/2019 | Baxter et al. |
| 10,265,351 B2 | 4/2019 | Cune et al. |
| 10,265,454 B2 | 4/2019 | Rohde et al. |
| 10,279,124 B2 | 5/2019 | Eckert |
| 10,292,904 B2 | 5/2019 | Fangrow |
| 10,301,376 B2 | 5/2019 | Schiff et al. |
| 10,307,509 B2 | 6/2019 | Goessl et al. |
| 10,314,764 B2 | 6/2019 | Lopez et al. |
| 10,321,907 B2 | 6/2019 | Shelton et al. |
| 10,336,477 B2 | 7/2019 | Perazzo et al. |
| 10,346,591 B2 | 7/2019 | Gray et al. |
| 10,350,346 B2 | 7/2019 | Kerschbaumer et al. |
| 10,357,430 B2 | 7/2019 | Kriheli et al. |
| 10,388,102 B2 | 8/2019 | Wilson et al. |
| 10,398,627 B2 | 9/2019 | Kriheli |
| 10,399,726 B2 | 9/2019 | Hutchison et al. |
| 10,420,927 B2 | 9/2019 | Fangrow |
| 10,433,778 B2 | 10/2019 | Crane et al. |
| 10,460,546 B2 | 10/2019 | Foot et al. |
| 10,513,517 B2 | 12/2019 | Anderson et al. |
| 10,515,722 B2 | 12/2019 | Vahlberg |
| 10,525,059 B2 | 1/2020 | Khanna et al. |
| 10,543,941 B2 | 1/2020 | Lizari et al. |
| 10,546,101 B2 | 1/2020 | Krogh et al. |
| 10,556,062 B2 | 2/2020 | Simpson et al. |
| 10,561,780 B2 | 2/2020 | Childers et al. |
| 10,614,587 B2 | 4/2020 | Umanskiy et al. |
| 10,617,322 B2 | 4/2020 | Keren et al. |
| 10,617,603 B2 | 4/2020 | Bomgaars et al. |
| 10,632,243 B2 | 4/2020 | Rohde et al. |
| 10,632,246 B2 | 4/2020 | Bianco et al. |
| 10,640,741 B2 | 5/2020 | Kunas et al. |
| 10,654,608 B2 | 5/2020 | Lizari et al. |
| 10,667,808 B2 | 6/2020 | Baxter et al. |
| 10,675,223 B2 | 6/2020 | Wilson et al. |
| 10,688,021 B2 | 6/2020 | Tribble et al. |
| 10,722,635 B2 | 7/2020 | Los |
| 10,729,839 B2 | 8/2020 | Los |
| 10,758,599 B2 | 9/2020 | Matthiessen et al. |
| 10,758,879 B2 | 9/2020 | Dudar |
| 10,765,601 B2 | 9/2020 | Kriheli et al. |
| 10,788,154 B2 | 9/2020 | Dudar et al. |
| 10,800,816 B2 | 10/2020 | Dockal et al. |
| 10,806,667 B2 | 10/2020 | Denenburg et al. |
| 10,807,743 B2 | 10/2020 | Sisken et al. |
| 10,811,131 B2 | 10/2020 | Schneider et al. |
| 10,814,057 B2 | 10/2020 | Lo et al. |
| 10,839,952 B2 | 11/2020 | Cartright et al. |
| 10,843,824 B2 | 11/2020 | Stultz et al. |
| 10,850,873 B2 | 12/2020 | Procyshyn et al. |
| 10,881,583 B2 | 1/2021 | Kriheli |
| 10,888,318 B2 | 1/2021 | Parihar et al. |
| 10,888,496 B2 | 1/2021 | Garfield et al. |
| 10,894,317 B2 | 1/2021 | Garfield et al. |
| 10,898,641 B2 | 1/2021 | Day et al. |
| 10,926,987 B2 | 2/2021 | Lizari et al. |
| 10,927,267 B2 | 2/2021 | Zalich et al. |
| 10,945,921 B2 | 3/2021 | Denenburg |
| 10,952,965 B2 | 3/2021 | Rabinow et al. |
| 10,964,417 B2 | 3/2021 | Gassman et al. |
| 10,966,906 B2 | 4/2021 | Biehl et al. |
| 10,967,125 B2 | 4/2021 | Trovato et al. |
| 10,967,650 B2 | 4/2021 | Hoffman et al. |
| 10,971,257 B2 | 4/2021 | Weber |
| 10,973,968 B2 | 4/2021 | Rohde |
| 10,991,264 B2 | 4/2021 | Trovato et al. |
| 10,994,045 B2 | 5/2021 | Goessl et al. |
| 11,000,451 B2 | 5/2021 | Biehl et al. |
| 11,007,119 B2 | 5/2021 | Lopez et al. |
| 11,013,664 B2 | 5/2021 | Fangrow et al. |
| 11,013,666 B2 | 5/2021 | Biehl et al. |
| 11,013,861 B2 | 5/2021 | Wehba et al. |
| 11,014,695 B2 | 5/2021 | Hansen et al. |
| 11,020,458 B2 | 6/2021 | Turecek et al. |
| 11,020,459 B2 | 6/2021 | Pikal et al. |
| 11,020,519 B2 | 6/2021 | Childers et al. |
| 11,020,541 B2 | 6/2021 | Fangrow et al. |
| 11,021,275 B2 | 6/2021 | Bomgaars et al. |
| 11,026,864 B2 | 6/2021 | Kriheli et al. |
| 11,045,192 B2 | 6/2021 | Harris et al. |
| 11,045,596 B2 | 6/2021 | Szpara et al. |
| 11,075,012 B2 | 7/2021 | Schneider |
| 11,077,023 B2 | 8/2021 | Biehl et al. |
| 11,080,541 B2 | 8/2021 | Ranalletta et al. |
| 11,081,211 B2 | 8/2021 | Kuchimanchi et al. |
| 11,083,827 B2 | 8/2021 | Oppegard et al. |
| 11,090,479 B2 | 8/2021 | Biehl et al. |
| 11,097,938 B2 | 8/2021 | Doelman et al. |
| 11,107,574 B2 | 8/2021 | Padmani et al. |
| 11,110,213 B2 | 9/2021 | Jansson et al. |
| 11,129,773 B2 | 9/2021 | Fangrow |
| 11,135,344 B2 | 10/2021 | White et al. |
| 11,136,350 B2 | 10/2021 | Bruckschwaiger et al. |
| 11,141,179 B2 | 10/2021 | Seip et al. |
| 11,147,740 B2 | 10/2021 | Sanders et al. |
| 11,160,728 B2 | 11/2021 | Platenkamp et al. |
| 11,191,837 B2 | 12/2021 | Matthiessen et al. |
| 11,194,810 B2 | 12/2021 | Butler et al. |
| 11,197,916 B2 | 12/2021 | Schnecker et al. |
| 11,211,776 B2 | 12/2021 | Kuzniak et al. |
| 11,214,391 B2 | 1/2022 | White et al. |
| 11,235,094 B2 | 2/2022 | Childers et al. |
| 11,246,938 B2 | 2/2022 | Senderoff et al. |

(56) References Cited

U.S. PATENT DOCUMENTS

| | | |
|---|---|---|
| 11,250,957 B2 | 2/2022 | Tribble et al. |
| 11,260,153 B2 | 3/2022 | Tiwari et al. |
| 11,285,262 B2 | 3/2022 | Ambrosina et al. |
| 11,289,183 B2 | 3/2022 | Kohlbrecher |
| D948,044 S | 4/2022 | Fangrow |
| 11,291,752 B2 | 4/2022 | Childers et al. |
| 11,304,699 B2 | 4/2022 | Shelton et al. |
| 11,304,763 B2 | 4/2022 | Shelton et al. |
| 11,305,000 B2 | 4/2022 | Crowe et al. |
| 11,305,072 B2 | 4/2022 | Murray et al. |
| 11,311,658 B2 | 4/2022 | Yu et al. |
| 11,315,381 B2 | 4/2022 | Greyshock et al. |
| 11,324,506 B2 | 5/2022 | Beckman et al. |
| 11,334,035 B2 | 5/2022 | Subbloie et al. |
| 11,335,444 B2 | 5/2022 | Mccutchan et al. |
| 11,337,893 B2 | 5/2022 | Lizari et al. |
| 11,338,074 B2 | 5/2022 | Minkus |
| 11,343,105 B2 | 5/2022 | Ekdahl et al. |
| 11,344,475 B2 | 5/2022 | Asano et al. |
| 11,357,702 B2 | 6/2022 | Kriheli |
| 11,625,013 B2 | 4/2023 | Subbloie et al. |
| 2003/0208165 A1 | 11/2003 | Christensen et al. |
| 2004/0249498 A1 | 12/2004 | William et al. |
| 2005/0099625 A1 | 5/2005 | Budd |
| 2005/0188651 A1 | 9/2005 | Clusserath |
| 2006/0151714 A1 | 7/2006 | Thilly et al. |
| 2006/0258985 A1 | 11/2006 | Russell |
| 2006/0259195 A1 | 11/2006 | Eliuk et al. |
| 2007/0088315 A1 | 4/2007 | Haindl |
| 2008/0110131 A1 | 5/2008 | Kim |
| 2008/0114328 A1 | 5/2008 | Doherty et al. |
| 2008/0169043 A1 | 7/2008 | Osborne et al. |
| 2009/0069783 A1 | 3/2009 | Ellstrom et al. |
| 2009/0145509 A1 | 6/2009 | Baker et al. |
| 2009/0198208 A1 | 8/2009 | Stavsky et al. |
| 2009/0302795 A1 | 12/2009 | Nichols et al. |
| 2010/0057264 A1 | 3/2010 | Kircher et al. |
| 2011/0160896 A1 | 6/2011 | Kim |
| 2013/0066293 A1 | 3/2013 | Garfield et al. |
| 2014/0019153 A1 | 1/2014 | Matsui et al. |
| 2014/0025206 A1 | 1/2014 | Matsui et al. |
| 2014/0157731 A1 | 6/2014 | Perazzo et al. |
| 2014/0174596 A1 | 6/2014 | Lopez et al. |
| 2015/0251780 A1 | 9/2015 | Matsukuma et al. |
| 2015/0286799 A1 | 10/2015 | Padmani et al. |
| 2016/0210437 A1 | 7/2016 | Padmani et al. |
| 2016/0361495 A1 | 12/2016 | Day et al. |
| 2017/0027315 A1 | 2/2017 | Ranalletta et al. |
| 2017/0035655 A1 | 2/2017 | Kaucky et al. |
| 2017/0046502 A1 | 2/2017 | Weber |
| 2017/0096285 A1 | 4/2017 | Akdogan et al. |
| 2017/0129763 A1 | 5/2017 | Fangrow, Jr. |
| 2017/0312716 A1 | 11/2017 | Konrad et al. |
| 2019/0046410 A1 | 2/2019 | Shemesh |
| 2019/0290543 A1 | 9/2019 | Mckinnon et al. |
| 2019/0351138 A1 | 11/2019 | Bhandar et al. |
| 2021/0038475 A1 | 2/2021 | Kriheli et al. |
| 2021/0150699 A1 | 5/2021 | Kappeler et al. |
| 2021/0275397 A1 | 9/2021 | Kriheli et al. |
| 2022/0202648 A1 | 6/2022 | Berger et al. |
| 2022/0257470 A1 | 8/2022 | Kriheli et al. |
| 2023/0175505 A1 | 6/2023 | Peters et al. |

FOREIGN PATENT DOCUMENTS

| | | | |
|---|---|---|---|
| CN | 203730273 U | 7/2014 | |
| DE | 102021132217 A1 | 6/2023 | |
| EP | 2376002 A1 | 10/2011 | |
| JP | 2002-342483 A | 11/2002 | |
| JP | 2015-119750 A | 7/2015 | |
| JP | 6195037 B1 | 9/2017 | |
| WO | 2005/041846 A2 | 5/2005 | |
| WO | 2008018904 A2 | 2/2008 | |
| WO | 2008/055194 A2 | 5/2008 | |
| WO | 2009/090627 A1 | 7/2009 | |
| WO | 2014047657 A2 | 3/2014 | |
| WO | WO-2016147178 A1 * | 9/2016 | ............ A61J 1/1406 |
| WO | 2018/174710 A1 | 9/2018 | |

OTHER PUBLICATIONS

"Injector N35, Phaseal (BD)", Medisca, Product No. 7105, Feb. 23, 2015, pp. 2.

Butschli J., "How RIVA works at Greenville Hospital Systems", Machinery & Materials, Jun. 3, 2014, pp. 15.

Diorio et al., "Choosing an Automated Compounding Device", Dec. 2009, vol. 6, No. 12, pp. 8.

Link for "APOTECAchemo Doxorubicin Preparation" Retrieved from https://youtu.be/a0SZt32KsZc, Feb. 7, 2016, p. 1.

Link of "Equashield—Closed System Transfer Device", Retrieved from https://youtu.be/8mtLxJUexjw, Oct. 18, 2016, p. 1.

Yaniv et al., "Implementation of an I.V.-Compounding Robot in a Hospital-Based Cancer Center Pharmacy", Am J Health Syst Pharm., Nov. 15, 2013, vol. 70, No. 22, pp. 2030-2037.

Yaniv et al., "Robotic I.V. Medication Compounding: Recommendations from the International Community of Apotecachemo Users", Am J Health Syst Pharm., Jan. 1, 2017, vol. 74, No. 1, pp. e40-e46.

International Search Report from PCT Application No. PCT/IL2023/050233, dated Jun. 11, 2023.

\* cited by examiner

FLUID TRANSFER STATION IN A ROBOTIC PHARMACEUTICAL PREPARATION SYSTEM

CROSS-REFERENCE TO RELATED APPLICATIONS

This application is a continuation of U.S. patent application Ser. No. 18/118,999, filed Mar. 8, 2023, which claims the benefit of and priority to U.S. Provisional Patent Applications Ser. Nos. 63/269,004 filed on Mar. 8, 2022, 63/382,014 filed on Nov. 2, 2022, and 63/429,340 filed on Dec. 1, 2022, each of which are incorporated herein by reference in its entirety.

TECHNOLOGICAL FIELD

The present application relates generally to robotic pharmaceutical preparation systems and more particularly to fluid transfer stations within a robotic pharmaceutical preparation system.

BACKGROUND

There are known automatic or semi-automatic preparation systems for preparing drugs designated for administration to patients. These systems include fluid transfer stations for transfer of fluid between a syringe and a vial or between a syringe and an intravenous (IV) bag. In closed fluid transfer systems deployed for preparation of hazardous drugs, measures are taken to prevent hazardous drug leakage from the syringe, the vial or IV bag. Therefore, the syringe, vial and IV bag are each mounted to a connector (also referred to as an "adaptor" or "spike adaptor") comprising a septum so the transfer of the fluid is performed via a syringe-septum and a vial-septum or via the syringe-septum and an IV bag-septum. In the prior art these connectors comprise rings or casings to ensure alignment of the syringe-septum with the vial-septum or alignment of the syringe-septum with the IV bag-septum. These casings further comprise fixing (i.e. securing) means to fixedly couple the septa to each other, such as by screws or snaps or extensions which extend along sides of the septa.

SUMMARY

The disclosed subject matter generally relates to robotic pharmaceutical preparation systems and more particularly to fluid transfer stations within a robotic pharmaceutical preparation system. The robotic pharmaceutical preparation systems and the fluid transfer stations thereof are configured for performing the operations related to transfer of drugs between different fluid transfer apparatuses including containers, fluid transfer assemblies, connectors, conduits, pumps, syringes, vials, intravenous bags, adaptors, needles, etc. The robotic pharmaceutical preparation systems (or robotic systems) according to the disclosed subject matter include robotic stations, robotic arms, motors, control units (controllers), mechanisms to control the transfer of fluid, etc. It is to be understood herein that the examples described in this description (with reference to the drawings and otherwise) have been described with reference to only a few components of the fluid transfer apparatuses out of all which are encompassed by the scope of the present subject matter for the purposes of conciseness and clarity of the present description. Various examples analogous to those described herein with different components of the fluid transfer apparatuses and with different robotic stations, including different combinations of the components of the fluid transfer apparatuses and the robotic stations, should be considered within the scope of the present description.

For instance, the container is described herein with reference to a vial and/or an intravenous bag, and it is to be understood that the container can be any other container being a component of a fluid transfer apparatus with or without an adaptor or connector for establishing fluid communication of the container with other fluid transfer components. For example, the container can constitute a container assembly having the container along with a container connector (or adaptor) for establishing the fluid communication of the container with other components of the fluid transfer apparatus. For example, the container can be a vial along with a vial adaptor, or an intravenous bag along with a spike adaptor. The container can be accessible via a container septum which can be a septum of the container lid or can be a part of the connector. In some examples, the container can be a syringe, a fluid transfer pipe, conduit, etc.

Similarly, the fluid transfer assembly is described herein with reference to a syringe assembly including a syringe and a syringe connector, and it is to be understood that that the fluid transfer assembly can include analogous components for transfer of drugs. In some examples, the fluid transfer assembly can include a pumping mechanism and a fluid transfer pipe configured to be connected to the container for the transfer of drug. In some examples, the fluid transfer assembly can include a fluid transfer connector (or adaptor) for establishing fluid communication between a fluid transfer unit (a fluid transfer pipe, conduit, pump, syringe, etc.) and the container. In some examples, the fluid transfer assembly may not include the fluid transfer connector and the fluid transfer connecter can constitute a part of the robotic system operating the fluid transfer assembly. In some examples, the fluid transfer assembly can include a vial or an intravenous bag for transfer of fluid with other containers.

Further, in all of the examples described herein, the transfer of fluid is described being performed by a needle penetrating the container septum into the container. It is to be understood herein that in some examples the transfer of fluid can be performed without the needle penetrating through the container septum, or optionally not penetrating even though a septum of the fluid transfer connector (associated with the fluid transfer assembly). In some examples, the fluid transfer can be performed even without a needle and via a fluid transfer conduit by controlled pressure of the fluid. For instance, the fluid transfer conduit may or may not include a needle, and if the fluid transfer conduit includes a needle, the needle may penetrate both septa fully, or may penetrate one septum fully and the other one partially, or may penetrate one septum partially and not at all the other one, or may not penetrate any septum at all.

The robotic system according to the presently disclosed subject matter is configured to handle and operate the containers and fluid transfer assemblies according to all of the different examples thereof as noted above to perform the transfer of fluid. For instance, although in all of the examples described herein, the robotic system is described as having a manipulator configured to manipulate the fluid transfer assembly (more specifically a syringe assembly), it is to be understood herein that the robotic system (and the manipulator) is configured to handle and manipulate either or both of the container and the fluid transfer assembly according to all of the examples thereof as noted above. Also, although in all of the examples described herein, the manipulator is described as a robotic arm, it is to be understood herein that the manipulator can be a platform, a robotic station, or the like having holders to hold the fluid transfer apparatus components and move them relatively to each other and perform the transfer of fluid.

The following terms and their derivatives used throughout the application may be better understood in view of the explanations below:

A robotic system may comprise an automatic or partially automatic system comprising a manipulator controlled, at least partially by a controller unit (also referred to as controller or control unit).

A manipulator may comprise a robotic arm, a platform, a robotic station, or a combination thereof configured for manipulating the container and/or the fluid transfer assembly.

A controller or a controller unit may comprise a computer controller configured to perform operations in accordance with a set of instructions stored on a memory readable by the controller, which may be executed by a central processing unit (CPU), one or more processors, processor units, microprocessors, etc. In another embodiment the controller or controller unit includes one or more control circuits. In some examples, the control unit can include one or more mechanism controllers. The controller unit may comprise any means to control elements in the robotic pharmaceutical preparation system and may comprise at least any one of a controller, a synchronizing unit and a processer.

A robotic pharmaceutical preparation system comprises the robotic system operable for performing any activity related to preparation of drugs designated for administration to patients. It is noted that the term "robotic systems" used herein may include robotic pharmaceutical preparation systems.

The pharmaceutical preparation system may comprise any one or more of a dilution station, namely a reconstitution station where any type of a dilutant is added to a drug which is in solid and/or liquid form and/or any one or more of a filling station, namely a compounding station where an at least partially or fully prepared drug is transferred into a container.

The terms "pharmaceutical" and "drug" are used interchangeably.

A needle may comprise a cannula or any other device configured for penetrating a container and transferring fluid therethrough. The needle may include a bevel at a distal tip thereof or an opening at a side surface or any other configuration.

A septum may generally refer to a membrane configured to close access to a part of a device to which it belongs. Generally, a septum on a container or container connector (also referred to as container-septum) may seal the container. A septum on a fluid transfer assembly (also referred to as fluid transfer connector septum) may prevent or resist access to a fluid transfer conduit (for instance a needle according to the examples described herein with reference to the drawings). Typically, a septum is made of a resilient pierceable material. Such material may be a polymer with elastic properties like rubber.

A longitudinal axis Lx1 extends centrally along a length of a fluid transfer assembly (FIG. 3B) and defines an injection axis.

A central longitudinal axis Lx2 extends centrally along a length of a center of a container (vial) positioned at a container holding module (interchangeably used herein with a container holder) 208. During the fluid transfer, the axis Lx2 may align with axis Lx1, as shown in FIG. 3B.

A central longitudinal axis Lx3 extends centrally along a length of a center of a container (intravenous bag or IV bag) positioned at a container assembly holding module 214. During fluid transfer such as shown in FIG. 15A, the axis Lx3 may align with axis Lx1.

A vertical axis x1 is generally parallel to the longitudinal axis Lx1. Axial movement and axial displacement are generally performed parallel to the vertical axis x1 (FIG. 3A).

A horizontal axis x2 is orthogonal to the vertical axis x1 and generally extends parallel to a length of a table of the fluid transfer station (e.g. table 220 in FIG. 3A).

A transverse axis x3 is orthogonal to the vertical axis x1 and the horizontal axis x2 (FIG. 3A).

A rotation axis r1 is parallel to vertical axis x1 and rotation thereabout is shown by arrow r2 in FIG. 3A.

A front view generally refers to a view taken of a front plane spanning along the vertical axis x1 and the horizontal axis x2, such as the view shown in FIG. 3A. A side view generally refers to a view taken of a side plane spanning along the vertical axis x1 and the transverse axis x3, such as the view shown in FIG. 4B. The cross-sectional illustrations shown herein are mainly longitudinal cross-sectional illustrations.

There is provided in accordance with first aspect of the presently disclosed subject matter, for example a robotic system operable for transfer of fluid between a container accessible via a container-septum and a fluid transfer assembly accessible via a fluid transfer connector septum, the robotic system including a controller, and a manipulator controllable by the controller to manipulate at least one of the container and the fluid transfer syringe assembly, the controller being configured to operate the manipulator to secure contact between the container-septum and the fluid transfer connector septum during at least a portion of the transfer of the fluid.

In some examples, the container can constitute a container assembly including a container and a container connector, whereas in such examples, the container septum can constitute a part of the container connector. In some examples, the container connector can constitute a part of the robotic system. In some examples, the container septum constitutes a part of the container and there is no container connector.

In some examples, the fluid transfer assembly can include the fluid transfer connector. In some examples, the fluid transfer connector can constitute a part of the robotic system. In some examples, the fluid transfer assembly can include a fluid transfer unit. The fluid transfer unit can be a tube, pipe, container, etc. connected to a pumping mechanism operable to pump the fluid in and out of the fluid transfer unit. The fluid transfer unit in some examples can be a syringe operable by a syringe plunger or by a pumping mechanism. In the present description, the examples illustrated in the drawings and explained with respect thereto have been described with reference to the fluid transfer assembly as being a syringe assembly, i.e., including a syringe operable by a plunger, and the fluid transfer connector as being a syringe connector. For the sake of conciseness of the present description, all other examples of the fluid transfer assembly (tubing sets, tubes, pipes, pumping mechanisms, etc.) and the operation of the robotic system therewith have not been described in detail, and should be considered as encompassed by the scope of the present description.

It is to be understood herein that securing contact between the container-septum and the syringe-septum (the fluid transfer connector septum) may comprise at least one or more of the following: (i) pressing the container-septum and the syringe-septum to a degree that at least one of the container-septum and the syringe-septum are caused to elastically deform; (ii) pressing the container-septum and the syringe-septum by at least a predetermined compression threshold force and then maintaining or increasing that force during the transfer of the fluid. The deformation of at least one of the septa is intended to mean that upon securing the contact between the septa, the total distance between the non-contacting surfaces of the septa is smaller than a sum of heights of the septa. For instance, the container septum includes a first surface facing the syringe septum, an opposite second surface, and a lateral surface extending therebetween defining a height of the container septum between the first and second surfaces. Similarly, the syringe septum includes a first surface facing the container septum, an opposite second surface, and a lateral surface extending therebetween defining a height of the syringe septum between the first and second surfaces. When the first surface of the container septum and the first surface of the syringe septum are brought in contact with each other and the contact is secured by the manipulator, the distance between the second surface of the container septum and the second surface of the syringe septum is smaller than the sum of heights of the two septa. In other words, the lateral surfaces of at least one septum bulge radially outwardly.

The force of pressing between the two septa amounting to securing the contact therebetween is at least enough to prevent liquid leakage through the contact point in between the septa even without any element radially surrounding the contact point. In other words, securing the contact is intended to mean that even if there is no element (locks, snaps, connection elements, etc.) of any of the connectors, container, or the robotic system for maintaining the contact between the septa as leakproof by surrounding the contact radially, the septa are pressed onto each other with at least the force to maintain the contact therebetween safe and leakproof. The magnitude of the force that is minimum required, i.e., at least enough, to prevent the septa from disconnecting from each other or allowing leakage of the fluid through the contact is maintained by the manipulator during the transfer of fluid. In some non-limiting examples, the minimum force required to secure the contact can be at least in the range of 5-100 Newtons, subranges and variables thereof and/or in some non-limiting examples, at least in the range of 25-100 Newtons, subranges and variables thereof, in some non-limiting examples, the force can be in the range 10-50 of Newtons, subranges and variables thereof, in some non-limiting examples, the force can be in the range of 25-75 Newtons, subranges and variables thereof, in some non-limiting examples, the force can be in the range of 30-50 Newtons, subranges and variables thereof, in some non-limiting examples, the force can be in the range of 30-40 Newtons, subranges and variables thereof.

It is to be understood herein that securing the contact between the septum is intended to mean significantly more than merely bringing the septa in contact with each other and/or holding the septa in contact with the help of external elements like snaps, locks, connection elements, or the like.

In some examples, the controller is further configured for controlling the manipulator to: bring the container-septum and the fluid transfer connector septum into contact; and perform said securing of the contact between the container-septum and the fluid transfer connector septum by pressing at least one of the container-septum and the fluid transfer connector septum onto the other one of the container-septum and the fluid transfer connector septum during at least a portion of the transfer of fluid.

In some examples, the manipulator includes a pressing mechanism configured to ensure a predetermined compression threshold between the container-septum and the fluid transfer connector septum is reached before initiation of the transfer of fluid, said reaching of the predetermined compression threshold being associated with said securing the contact.

In some examples, the pressing mechanism is further configured to ensure that the predetermined compression threshold between the container-septum and the fluid transfer connector septum is maintained during at least a portion of the transfer of fluid.

In some examples, the controller is configured for operating the manipulator to: align the fluid transfer connector septum of the fluid transfer assembly and the container-septum of the container, bring the fluid transfer connector septum and the container-septum in contact with each other; press at least one of the fluid transfer connector septum and the container-septum against the other one of the fluid transfer connector septum and the container-septum to perform said securing of the contact therebetween, and/or execute at least partial penetration of at least one of the fluid transfer connector septum and the container-septum by a fluid transfer conduit associated with a fluid transfer connector of the fluid transfer assembly for enabling the transfer of the fluid, wherein the pressing mechanism is configured to ensure that the predetermined compression threshold between the container-septum and the fluid transfer connector septum is reached before said at least partial penetration. In some examples, the fluid transfer conduit can comprise a needle.

In some examples, the manipulator comprises a gripping arm configured for gripping a gripping portion of at least one of the fluid transfer assembly and the container. In some examples, the gripping arm is configured for holding the at least one of the fluid transfer assembly and the container at least partially along a vertical axis. In some examples, the gripping arm is configured to be controllably movable to allow grabbing the fluid transfer assembly from a fluid transfer assembly recirculating conveyor configured to store one or more fluid transfer assemblies and/or to allow grabbing the container from a container recirculating conveyor configured to store one or more containers. In some examples, the gripping arm is configured to be controllably movable relative to a container holder configured to hold the container, and the gripping arm is configured to align the fluid transfer connector septum and the container-septum and bring the fluid transfer connector septum in contact with the container-septum when the gripping arm holds said fluid transfer assembly.

In some examples, the manipulator includes an engaging arm configured to engage the fluid transfer assembly at an engaging portion when the gripping arm grips the fluid transfer assembly, said engaging arm being configured to be axially movable relative to said gripping arm. In some examples, the engaging arm and the gripping arm are coupled so that the engaging arm and the gripping arm are operable to be controllably displaced either axially together or axially relatively to each other.

In some examples, the engaging arm is configured to engage a sleeve of a fluid transfer connector of the fluid transfer assembly, the sleeve being fixedly coupled relative to the fluid transfer connector septum and the gripping arm is configured to grip a body member of the fluid transfer connector being fixedly coupled relative to a fluid transfer conduit of the fluid transfer connector, the controller being configured to cause relative movement between the gripping arm and the engaging arm to cause the fluid transfer conduit and the fluid transfer connector septum to at least partially move towards each other upon the predetermined compression threshold between the container-septum and the fluid transfer connector septum is reached.

In some examples, the manipulator is configured to resist relative movement between the gripping arm and the engaging arm when an axial force below a predetermined pressing threshold is applied to cause said relative movement, said predetermined pressing threshold being associated with the predetermined compression threshold.

In some examples, the engaging arm and gripping arm are coupled via a resisting member opposing the relative movement of the gripping arm and the engaging arm towards each other. In some examples, the resisting member can include a spring configured to be selectively compressed by the movement of the engaging arm and the gripping arm towards each other. In some examples, the resisting member can include a stretchable member configured to be selectively stretched by the movement of the engaging arm and the gripping arm towards each other. In some examples, the resisting member can include a deformable member configured to be selectively deformed by the movement of the engaging arm and the gripping arm towards each other. In some examples, the resisting member can include a spring, a band, a telescopic arrangement, a linear drive arrangement, etc.

In some examples, the resisting member is configured to cause the engaging arm and the gripping arm to move away from each other after said transfer of fluid is complete. In some examples, the engaging arm is configured to abut on a radial stop at the engaging portion when the fluid transfer connector septum contacts the container septum, and the manipulator is configured to cause a relative movement between the gripping arm and the engaging arm only after the predetermined pressing threshold force is applied, thereby pressing the fluid transfer connector septum to the container-septum for the contact therebetween to reach the predetermined compression threshold before the fluid transfer conduit and the fluid transfer connector septum at least partially moves towards each other.

In some examples, the robotic system further includes a container holding module or a container holder configured to hold the container along a container longitudinal axis.

In some examples, the container holder includes a vial holder configured to support at least one vial and/or an intravenous bag holder configured to support at least one intravenous bag.

In some examples, the manipulator is configured to move towards the container holder. In some examples, the container holder is configured to move towards the manipulator.

In some examples, the controller is further configured to rotate the gripping arm and the engaging arm together around a rotation axis. In some examples, the controller is configured for controlling the engaging arm and the gripping arm such that: the gripping arm grips a body member of the fluid transfer connector being fixedly coupled relative to a fluid transfer conduit of a fluid transfer connector, aligns the fluid transfer assembly with the container, and brings the fluid transfer connector septum in contact with the container-septum; the engaging arm engages a sleeve of the fluid transfer connector of the fluid transfer assembly, the sleeve being fixedly coupled relative to the fluid transfer connector septum, presses the fluid transfer connector septum against the container-septum to perform said securing of the contact therebetween; and/or the gripping arm causes a collapsible movement of the body member and the sleeve towards each other, which executes at least partial movement of the fluid transfer conduit and the fluid transfer connector septum towards each other for facilitating the transfer of the fluid.

In some examples, the gripping arm is further configured to apply a radial force on an external wall of the fluid transfer assembly and the controller is configured for controlling the gripping arm to selectively apply the radial force so as to press upon a fluid transfer connector actuator of the fluid transfer assembly.

In some examples, the fluid transfer assembly comprises a syringe, the robotic system further comprising a plunger arm configured to operate a plunger of the syringe and wherein the controller is configured for controlling said plunger arm to: grip a plunger flange portion of the plunger; and axially displace the plunger flange for transferring the fluid between the syringe and the container.

In some examples, the controller is configured for controlling the engaging arm and the gripping arm so that: following the transfer of the fluid, the gripping arm moves the body member away from the sleeve, and the engaging arm and the gripping arm are distanced from the container for disconnecting the septa.

In some examples, the controller is configured to operate the gripping arm after fluid transfer to move the body member away from the sleeve.

In some examples, the controller is configured for operating the gripping arm after the body member is moved away from the sleeve to stop applying the radial force. In some examples, the controller is configured for operating the gripping arm to perform the following operations either simultaneously or successively to grip the body member, align the fluid transfer assembly with the container and bring the fluid transfer connector septum in contact with the container-septum, and to selectively apply the radial force so as to press upon the fluid transfer connector actuator of the fluid transfer assembly.

In some examples, the controller is configured for controlling the engaging arm and the gripping arm such that any one of the engaging arm and the gripping arm grips the fluid transfer assembly, aligns the fluid transfer assembly with the container and brings the fluid transfer connector septum in contact with the container-septum; and any one of the engaging arm and the gripping arm presses the fluid transfer connector septum against the container-septum to secure contact therebetween.

In some examples, the engaging arm and the gripping arm are arranged to contact the fluid transfer assembly at the fluid transfer connector. In some examples, the engaging arm is formed with a pressing surface configured for being pressed onto a radial stop of the fluid transfer assembly to secure the contact between the container-septum and the fluid transfer connector septum. In some examples, the pressing surface of the engaging arm includes an arcuate portion dimensioned to surround the fluid transfer assembly and to form a radial gap with an external wall of the fluid transfer assembly.

In some examples, the pressing surface of the engaging arm is configured to mate with the outer surface of the fluid transfer assembly such that there is no radial gap between the external wall of the fluid transfer assembly and the pressing surface.

In some examples, the gripping arm includes at least one projecting element configured to apply a radial force on an external wall of the fluid transfer assembly when the fluid transfer assembly is manipulated by the robotic system.

In some examples, the projecting element of the gripping arm includes a plate formed with an arcuate groove.

In some examples, the gripping arm includes two oppositely facing plates including a first pair and a second pair of projecting elements configured for accessing a first pair and a second pair of openings on the external wall of the fluid transfer assembly.

In some examples, the two oppositely facing plates are configured to be spaced apart from each other for forming a gap therebetween. In some examples, the pressing mechanism is further configured to ensure that the predetermined compression threshold between the container-septum and the fluid transfer connector septum is maintained after the transfer of fluid is complete at least until the fluid transfer conduit is moved away from the fluid transfer connector septum. In some examples, the robotic system comprises the fluid transfer connector according to any of the examples thereof described herein.

There is provided in accordance with an example, a method being performed by the robotic system of a first aspect. The method includes a process for transferring fluid between a container accessible via a container-septum and a fluid transfer assembly accessible via a fluid transfer connector septum. the method, by operation of a robotic system, comprises: bringing the container-septum of the container into contact with the fluid transfer connector septum of the fluid transfer assembly; pressing at least one of the container-septum and fluid transfer connector septum onto the other one of the container-septum and fluid transfer connector septum for securing the contact therebetween; transferring fluid through the container-septum and the fluid transfer connector septum; and maintaining the secured contact between the container-septum and the fluid transfer connector septum during at least a portion of the transfer of the fluid.

There is provided in accordance with a second aspect of the presently disclosed subject matter, a robotic system operable for transfer of fluid between a container accessible via a container-septum and a fluid transfer assembly, the fluid transfer assembly accessible via a fluid transfer connector having a body member and a sleeve including a fluid transfer connector septum, the sleeve and the body member being configured to move relative to each other upon activation of a locking mechanism, the robotic system comprising: a controller; and a manipulator controllable by the controller and configured to manipulate the fluid transfer assembly, the manipulator being configured to both grip the fluid transfer assembly and activate the locking mechanism, the controller being configured to operate the manipulator to move the sleeve and the body member relative to each other upon activating the locking mechanism and to transfer fluid between the fluid transfer assembly and the container.

In some examples, the robotic system according to the second aspect can be configured to perform some or all the operations related to securing the contact between the fluid transfer connector septum and the container septum as described above for the robotic system according to the first aspect, and can include some or all the components related thereto. In some examples, the robotic system according to the second aspect can be configured to perform some or all the operations related to the locking mechanism and relative movement of the engaging arm and the gripping arm (or the sleeve and the body member) as described above for the robotic system according to the first aspect, and can include some or all the components related thereto.

Furthermore, the robotic system according to the second aspect can include some or all the features related to the manipulator, gripping arm, engaging arm, and resisting member as described for the robotic system according to the first aspect.

In some examples, the robotic system comprises the fluid transfer connector according to any of the examples thereof described herein.

There is provided in accordance with an example, a method being performed by the robotic system of the second aspect. The method includes a process for transferring fluid between a container accessible via a container-septum and a fluid transfer assembly accessible via a fluid transfer connector, the method, by operation of a robotic system, comprising: controlling a manipulator of the robotic system to grip the fluid transfer assembly and activate a locking mechanism associated with establishment of fluid communication between the fluid transfer assembly and the container; operating the manipulator to move a sleeve and a body member of the fluid transfer connector relative to each other upon activating the locking mechanism for establishing said fluid communication; and transferring fluid between the fluid transfer assembly and the container.

There is provided in accordance with a third aspect of the presently disclosed subject matter, a robotic system operable for transfer of fluid between a container accessible via a container-septum and a fluid transfer assembly accessible via a fluid transfer connector having a body member and a sleeve including a fluid transfer connector septum, the sleeve and the body member being configured to move relative to each other, the system comprising: a container holder configured for supporting the container and to be positioned at least partially coaxially with the fluid transfer assembly; an engaging arm configured for engaging one of the body member and the sleeve; and a gripping arm configured for gripping the other one of the body member and the sleeve, said gripping arm and said engaging arm being movable relative to each other.

In some examples, the engaging arm and the gripping arm are mechanically coupled to a primary driving assembly, configured to simultaneously move the engaging arm and the gripping arm together while bringing at least one of the gripping arm and the engaging arm to an outer surface of the fluid transfer assembly for pressing thereon.

In some examples, the engaging arm is connected to the gripping arm via a secondary driving assembly, configured to cause said relative movement between the gripping arm and the engaging arm.

In some examples, the robotic system according to the third aspect can be configured to perform some or all the operations related to securing the contact between the fluid transfer connector septum and the container septum as described above for the robotic system according to the first and second aspect, and can include some or all the components related thereto. In some examples, the robotic system according to the third aspect can be configured to perform some or all the operations related to the locking mechanism and relative movement of the engaging arm and the gripping arm (or the sleeve and the body member) as described above for the robotic system according to the first and second aspect, and can include some or all the components related thereto.

Furthermore, the robotic system according to the third aspect can include some or all the features related to the manipulator, gripping arm, engaging arm, and resisting member as described for the robotic system according to the first and second aspect.

In some examples, the robotic system comprises the fluid transfer connector according to any of the examples thereof described herein.

There is provided in accordance with an example, a method being performed by the robotic system of the third aspect. The method includes a process for transferring fluid between a container accessible via a container-septum and a fluid transfer assembly accessible via a fluid transfer connector, the method, by operation of a robotic system, comprising: operating an engaging arm of the robotic system for engaging a sleeve of the fluid transfer connector; operating a gripping arm of the robotic system for gripping a body member of the fluid transfer connector; moving at least one of the engaging arm and the gripping arm towards the other one for establishing fluid communication between the fluid transfer assembly and the container; and performing said transfer of fluid between the fluid transfer assembly and the container.

There is provided in accordance with a fourth aspect of the presently disclosed subject matter, a robotic system operable for transfer of fluid at least partially along an injection axis between a container accessible via a container-septum and a fluid transfer assembly accessible via a fluid transfer connector, the robotic system comprising: a controller; and a manipulator controllable by the controller, the manipulator comprising: a gripping arm configured for gripping a gripping portion of the fluid transfer assembly; and an engaging arm configured to engage the fluid transfer assembly at an engaging portion, at least one said engaging arm and gripping arm being displaceable with respect to the other one of said engaging arm and the gripping arm along the injection axis, said engaging arm and gripping arm being configured to be displaced together during at least a portion of a movement of the manipulator.

In some examples, the robotic system according to the fourth aspect can be configured to perform some or all the operations related to securing the contact between the fluid transfer connector septum and the container septum as described above for the robotic system according to the first, second, and third aspect, and can include some or all the components related thereto. In some examples, the robotic system according to the fourth aspect can be configured to perform some or all the operations related to the locking mechanism and relative movement of the engaging arm and the gripping arm (or the sleeve and the body member) as described above for the robotic system according to the first, second, and third aspect, and can include some or all the components related thereto.

Furthermore, the robotic system according to the fourth aspect can include some or all the features related to the manipulator, gripping arm, engaging arm, and resisting member as described for the robotic system according to the first, second, and third aspect.

In some examples, the robotic system comprises the fluid transfer connector according to any of the examples thereof described herein.

There is provided in accordance with an example, a method being performed by the robotic system of the fourth aspect. The method includes a process for transferring fluid at least partially along an injection axis between a container accessible via a container-septum and a fluid transfer assembly accessible via a fluid transfer connector, the method, by operation of a robotic system, comprising: operating an engaging arm of a manipulator of the robotic system for engaging an engaging portion of the fluid transfer assembly; operating a gripping arm of the manipulator for gripping a gripping portion of the fluid transfer assembly; moving the engaging arm and the gripping arm together to along the fluid transfer assembly with the container; moving at least one of the engaging arm and the gripping arm towards the other one of the engaging arm and the gripping arm along the injection axis for establishing fluid communication between the fluid transfer assembly and the container; and performing said transfer of fluid between the fluid transfer assembly and the container.

There is provided in accordance with a fifth aspect of the presently disclosed subject matter, a robotic system operable for transfer of fluid between a container accessible via a container-septum and a fluid transfer assembly accessible via a fluid transfer connector configured for establishing fluid communication between the container and the fluid transfer assembly for said transfer of fluid, said fluid transfer connector comprising a body member and a sleeve displaceable relative to each other between an extended position, which is a normal position, and a collapsed position, at which the fluid transfer connector establishes said fluid communication, said fluid transfer connector comprising a fluid transfer connector septum positioned at the sleeve, the robotic system comprising: a controller; a manipulator controllable by the controller to manipulate at least one of the container and the fluid transfer assembly to bring the fluid transfer connector septum and the container-septum into contact with each other and to selectively displace the fluid transfer connector into its collapsed position from the extended position; and a contact securing mechanism configured for preventing the manipulator from displacing the fluid transfer connector into its collapsed position from the extended position until a predetermined compression threshold between the container-septum and the fluid transfer connector septum is reached.

In some examples, the manipulator is configured to push at least one of the fluid transfer connector septum and the container-septum against the other one of the fluid transfer connector septum and the container-septum by a compression force with a variable magnitude.

In some examples, the contact securing mechanism is configured for preventing the manipulator from displacing the fluid transfer connector into its collapsed position from the extended position at least until the compression force is less than the predetermined compression threshold.

In some examples, the contact securing mechanism is configured for allowing the manipulator to displace the fluid transfer connector into its collapsed position from the extended position at least when the compression force is equal to or more than the predetermined compression threshold.

In some examples, the contact securing mechanism is configured for allowing the manipulator to displace the fluid transfer connector into its collapsed position following detection of an event indicative that the compression force is equal to or more than the predetermined compression threshold.

In some examples, the contact securing mechanism comprises a mechanical element.

In some examples, the contact securing mechanism comprises a resisting member configured to resist the manipulator displacing the fluid transfer connector into its collapsed position.

In some examples, the manipulator comprises an engaging arm configured for engaging the sleeve and a gripping arm configured to grip the body member, said engaging arm and gripping arm being configured to move relative to each other to displace the fluid transfer connector between the extend and collapsed position, wherein the engaging arm and the gripping arm are coupled to each other via the resisting member.

In some examples, the engaging arm and the gripping arm are configured to move towards each other to displace the fluid transfer connector into the collapsed position upon commencement of deformation of the resisting member. In some examples, the resisting member is configured to prevent said deformation until a minimum threshold force is applied thereon. In some examples, the event comprises commencement of said deformation.

In some examples, the robotic system further comprises a sensor configured to detect said commencement of deformation and to generate a signal indicative thereof. In some examples, the resisting member is configured to cause the manipulator to displace the fluid transfer connector into its extended position after completion of said transfer of fluid.

In some examples, the robotic system according to the fifth aspect can be configured to perform some or all the operations related to securing the contact between the fluid transfer connector septum and the container septum as described above for the robotic system according to the first, second, third and fourth aspect, and can include some or all the components related thereto. In some examples, the robotic system according to the fifth aspect can be configured to perform some or all the operations related to the locking mechanism and relative movement of the engaging arm and the gripping arm (or the sleeve and the body member) as described above for the robotic system according to the first, second, third, and fourth aspect, and can include some or all the components related thereto.

Furthermore, the robotic system according to the fifth aspect can include some or all the features related to the manipulator, gripping arm, engaging arm, sensor, and resisting member as described for the robotic system according to the first, second, third, and fourth aspect.

In some examples, the robotic system comprises the fluid transfer connector according to any of the examples thereof described herein.

In some examples, the robotic system according to the aspects described above can include some or all the features related to the contact securing mechanism as described for the robotic system according to the fifth aspect.

There is provided in accordance with an example, a method being performed by the robotic system of the fifth aspect. The method includes a process for transferring fluid between a container accessible via a container-septum and a fluid transfer assembly accessible via a fluid transfer connector comprising a fluid transfer connector septum, the method, by operation of a robotic system, comprising: operating a manipulator of the robotic system for manipulating at least one of the container and the fluid transfer assembly to bring the fluid transfer connector septum and the container-septum into contact with each other; operating the manipulator for manipulating the fluid transfer assembly to press the fluid transfer connector septum onto the container-septum at least until a predetermined compression threshold between the container-septum and the fluid transfer connector septum is reached; operating the manipulator to displace, after the predetermined compression threshold is reached, the fluid transfer connector into its collapsed position, at which fluid communication between the container and the fluid transfer assembly is established, from its extended position, which is a normal position; performing said transfer of fluid between the fluid transfer assembly and the container.

There is provided in accordance with a sixth aspect of the presently disclosed subject matter, a robotic system operable for transfer of fluid between a container accessible via a container-septum and a fluid transfer assembly accessible via a fluid transfer connector, the robotic system comprising: a controller; a manipulator operable by the controller to manipulate at least one of the container and the fluid transfer assembly for establishing fluid communication therebetween; a sensor configured to monitor the operation of the manipulator and transmit a signal indicative of said monitoring.

In some examples, the manipulator comprises: a gripping arm configured for gripping a gripping portion of the fluid transfer connector; and an engaging arm configured for engaging an engaging portion of the fluid transfer connector, said engaging arm and gripping arm being configured to move relative to each other for selectively establishing said fluid communication, wherein the sensor is configured to monitor said relative movement of the engaging arm and the gripping arm. In some examples, the sensor is configured to monitor a relative position of at least one of the engaging arm and the gripping arm with respect to the other one of at least one of the engaging arm and the gripping arm.

In some examples, the engaging arm is coupled to the gripping arm via a resisting member configured for resisting said relative movement between the engaging arm and the gripping arm towards each other. In some examples, the sensor is configured to monitor said resisting member. In some examples, the resisting member is configured to deform upon said relative movement between the engaging arm and the gripping arm. In some examples, the sensor is configured to monitor said deformation of the resisting member. In some examples, the resisting member is configured to prevent commencement of said deformation at least until a force equal to or greater than a predetermined threshold is applied thereon. In some examples, the sensor is configured to monitor said force.

In some examples, the robotic system further comprises a motor configured to move the manipulator for performing said operation of the manipulator, said motor being configured to consume variable power for moving said manipulator, wherein the sensor is configured to monitor said power consumption.

In some examples, the robotic system according to the sixth aspect can be configured to perform some or all the operations related to securing the contact between the fluid transfer connector septum and the container septum as described above for the robotic system according to the aspects described above, and can include some or all the components related thereto. In some examples, the robotic system according to the sixth aspect can be configured to perform some or all the operations related to the locking mechanism and relative movement of the engaging arm and the gripping arm (or the sleeve and the body member) as described above for the robotic system according to the aspects described above, and can include some or all the components related thereto.

Furthermore, the robotic system according to the sixth aspect can include some or all the features related to the manipulator, gripping arm, engaging arm, sensor, contact securing mechanism, and resisting member as described for the robotic system according to the aspects described above.

In some examples, the robotic system comprises the fluid transfer connector according to any of the examples thereof described herein.

In some examples, the robotic system according to the aspects described above can include some or all the features related to the sensors as described for the robotic system according to the sixth aspect.

There is provided in accordance with an example, a method being performed by the robotic system of the sixth aspect. The method includes a process for transferring fluid between a container accessible via a container-septum and a fluid transfer assembly accessible via a fluid transfer connector, the method, by operation of a robotic system, comprising: controlling a manipulator of the robotic system to manipulate at least one of the container and the fluid transfer assembly for establishing fluid communication therebetween; monitoring by a sensor of the robotic system the operation of the manipulator; and transmitting by the sensor a signal indicative of said monitoring.

There is provided in accordance with a seventh aspect of the presently disclosed subject matter, a robotic system operable for transfer of fluid between a container accessible via a container-septum and a fluid transfer assembly accessible via a fluid transfer connector, the robotic system comprising: a manipulator configured to manipulate at least one of the container and the fluid transfer assembly for establishing fluid communication therebetween; a motor configured to move the manipulator for establishing said fluid communication, said motor being configured to consume variable power for moving said manipulator; and a controller configured for monitoring said power consumption and controlling the motor based at least thereon.

In some examples, the motor comprises a motor shaft operable to cause the movement of the manipulator and an encoder operable to detect a position of the motor shaft, wherein the controller is configured for controlling the motor based on a combination of said power consumption and the position of the motor shaft.

In some examples, the controller is configured for predetermining at least one of an upper and lower range of power consumption, and to generate an alert upon detection of a deviation of the power consumption from the predetermined range. In some examples, the power consumption is measurable by a magnitude of current applied to the motor.

In some examples, the robotic system according to the seventh aspect can be configured to perform some or all the operations related to securing the contact between the fluid transfer connector septum and the container septum as described above for the robotic system according to the aspects described above, and can include some or all the components related thereto. In some examples, the robotic system according to the seventh aspect can be configured to perform some or all the operations related to the locking mechanism and relative movement of the engaging arm and the gripping arm (or the sleeve and the body member) as described above for the robotic system according to the aspects described above, and can include some or all the components related thereto.

Furthermore, the robotic system according to the seventh aspect can include some or all the features related to the manipulator, gripping arm, engaging arm, sensor, contact securing mechanism, and resisting member as described for the robotic system according to the aspects described above.

In some examples, the robotic system comprises the fluid transfer connector according to any of the examples thereof described herein.

In some examples, the robotic system according to the aspects described above can include some or all the features related to controlling the motor moving the manipulator based on power consumption by the motor as described for the robotic system according to the seventh aspect.

There is provided in accordance with an example, a method being performed by the robotic system of the seventh aspect. The method includes a process for transferring fluid between a container accessible via a container-septum and a fluid transfer assembly accessible via a fluid transfer connector, the method, by operation of a robotic system, comprising: controlling a manipulator of the robotic system to manipulate at least one of the container and the fluid transfer assembly for establishing fluid communication therebetween; operating a motor of the robotic system to move the manipulator for establishing said fluid communication, wherein said operating the motor comprises consuming variable power; monitoring by a controller of the robotic system said power consumption; and controlling the motor based at least on said monitoring.

There is provided in accordance with an eighth aspect of the presently disclosed subject matter, a robotic system operable for transfer of fluid between a container accessible via a container-septum and a fluid transfer assembly accessible via a fluid transfer connector configured for establishing fluid communication between the container and the fluid transfer assembly for said transfer of fluid, said fluid transfer connector comprising a body member and a sleeve displaceable relative to each other between an extended position, which is a normal position, and a collapsed position, at which the fluid transfer connector establishes said fluid communication, said fluid transfer connector comprising a fluid transfer connector septum positioned at a distal end of the sleeve and a fluid transfer conduit extending from a proximal end of the body member towards the fluid transfer connector septum, the robotic system comprising: a controller; and a manipulator controllable by the controller to: apply a variable positioning force to manipulate the fluid transfer assembly through a positioning stage, during which the manipulator positions the fluid transfer assembly and/or the container to bring the fluid transfer connector septum and the container septum in contact with each other; and apply a variable penetration force to manipulate the fluid transfer assembly and/or the container through a penetration stage, during which at least a tip of the fluid transfer conduit penetrates at least partially through at least one of the container-septum and the fluid transfer connector septum, wherein a minimum value of the variable penetration force is greater than a maximum value of the variable positioning force.

In some examples, the manipulator is further controllable by the controller to apply a variable collapsing force to manipulate the fluid transfer assembly through a collapsing stage, during which the sleeve and the body member are displaced relative to each other to reduce a distance between the fluid transfer connector septum and the body member, wherein the manipulator is further controllable by the controller to increase the variable collapsing force continuously at least during a portion of the collapsing stage.

In some examples, the manipulator is further controllable by the controller to increase the variable collapsing force continuously at least during a portion of the collapsing stage prior to commencement of the penetration stage.

In some examples, the manipulator is further controllable by the controller to apply a variable securing force to manipulate at least one of the fluid transfer assembly and the container through a contact securing stage, during which the manipulator secures the contact between the fluid transfer connector septum and the container septum.

There is provided in accordance with a ninth aspect of the presently disclosed subject matter, a robotic system operable for transfer of fluid between a container accessible via a container-septum and a fluid transfer assembly accessible via a fluid transfer connector configured for establishing fluid communication between the container and the fluid transfer assembly for said transfer of fluid, said fluid transfer connector comprising a body member and a sleeve displaceable relative to each other between an extended position, which is a normal position, and a collapsed position, at which the fluid transfer connector establishes said fluid communication, said fluid transfer connector comprising a fluid transfer connector septum positioned at a distal end of the sleeve and a fluid transfer conduit extending from a proximal end of the body member towards the fluid transfer connector septum, the robotic system comprising: a controller; and a manipulator controllable by the controller to apply a variable collapsing force to manipulate the fluid transfer assembly through a collapsing stage, during which the sleeve and the body member are displaced relative to each other to reduce a distance between the fluid transfer connector septum and the body member, wherein the manipulator is further controllable by the controller to increase the variable collapsing force continuously at least during a portion of the collapsing stage.

In some examples, the manipulator is further controllable by the controller to apply a variable penetration force to manipulate the fluid transfer assembly and/or the container through a penetration stage, during which the at least a tip of the fluid transfer conduit penetrates at least partially through at least one of the container-septum and the fluid transfer connector septum.

In some examples, the manipulator is further controllable by the controller to apply a variable positioning force to manipulate the fluid transfer assembly through a positioning stage, during which the manipulator positions the fluid transfer assembly and/or the container to bring the fluid transfer connector septum and the container septum in contact with each other.

In some examples, the manipulator is further controllable by the controller to apply a variable securing force to manipulate at least one of the fluid transfer assembly and the container through a contact securing stage, during which the manipulator secures the contact between the fluid transfer connector septum and the container septum.

There is provided in accordance with a tenth aspect of the presently disclosed subject matter, a robotic system operable for transfer of fluid between a container accessible via a container-septum and a fluid transfer assembly accessible via a fluid transfer connector configured for establishing fluid communication between the container and the fluid transfer assembly for said transfer of fluid, said fluid transfer connector comprising a body member and a sleeve displaceable relative to each other between an extended position, which is a normal position, and a collapsed position, at which the fluid transfer connector establishes said fluid communication, said fluid transfer connector comprising a fluid transfer connector septum positioned at a distal end of the sleeve and a fluid transfer conduit extending from a proximal end of the body member towards the fluid transfer connector septum, the robotic system comprising: a controller; and a manipulator controllable by the controller to: apply a variable securing force to manipulate at least one of the fluid transfer assembly and the container through a contact securing stage, during which the manipulator secures the contact between the fluid transfer connector septum and the container septum; and apply a variable collapsing force to manipulate the fluid transfer assembly through a collapsing stage, during which the sleeve and the body member are displaced relative to each other to reduce a distance between the fluid transfer connector septum and the body member, wherein an initial value of the variable collapsing force is greater than an initial value of the variable securing force.

In some examples, the manipulator is further controllable by the controller to apply a variable penetration force to manipulate the fluid transfer assembly and/or the container through a penetration stage, during which at least a tip of the fluid transfer conduit penetrates at least partially through at least one of the container-septum and the fluid transfer connector septum.

In some examples, the manipulator is further controllable by the controller to apply a variable positioning force to manipulate the fluid transfer assembly through a positioning stage, during which the manipulator positions the fluid transfer assembly and/or the container to bring the fluid transfer connector septum and the container septum in contact with each other.

There is provided in accordance with an eleventh aspect of the presently disclosed subject matter, a robotic system operable for transfer of fluid between a container accessible via a container-septum and a fluid transfer assembly accessible via a fluid transfer connector configured for establishing fluid communication between the container and the fluid transfer assembly for said transfer of fluid, said fluid transfer connector comprising a body member and a sleeve displaceable relative to each other between an extended position, which is a normal position, and a collapsed position, at which the fluid transfer connector establishes said fluid communication, said fluid transfer connector comprising a fluid transfer connector septum positioned at a distal end of the sleeve and a fluid transfer conduit extending from a proximal end of the body member towards the fluid transfer connector septum, the robotic system comprising: a controller; and a manipulator controllable by the controller to: apply a variable positioning force to manipulate the fluid transfer assembly through a positioning stage, during which the manipulator positions the fluid transfer assembly and/or the container to bring the fluid transfer connector septum and the container septum in contact with each other; and apply a variable collapsing force to manipulate the fluid transfer assembly through a collapsing stage, during which the sleeve and the body member are displaced relative to each other to reduce a distance between the fluid transfer connector septum and the body member, wherein an initial value of the variable collapsing force is greater than a maximum value of the variable positioning force.

In some examples, the manipulator is further controllable by the controller to apply a variable penetration force to manipulate the fluid transfer assembly and/or the container through a penetration stage, during which at least a tip of the fluid transfer conduit penetrates at least partially through at least one of the container-septum and the fluid transfer connector septum.

In some examples, the manipulator is further controllable by the controller to apply a variable securing force to manipulate at least one of the fluid transfer assembly and the container through a contact securing stage, during which the manipulator secures the contact between the fluid transfer connector septum and the container septum.

All of the robotic systems according to the eighth, ninth, tenth, and eleventh aspects, include at least some of the following features:

the positioning stage commences with initiation of the manipulator moving the fluid transfer assembly and/or the container and ends with the manipulator bringing the fluid transfer connector septum and the container septum in contact with each other, the contact securing stage commences with the manipulator bringing the fluid transfer connector septum and the container septum in contact with each other and ends with completion of the transfer of fluid, the collapsing stage commences with commencement of relative movement of the sleeve and the body member towards each other and ends with the fluid transfer connector displacing into its collapsed position, the penetration stage commences with initiation of penetration of the tip of the fluid transfer conduit at least partially through at least one of the container-septum and the fluid transfer connector septum and ends with the fluid transfer connector displacing into its collapsed position, the contact securing stage at least partially overlaps with the collapsing stage, the contact securing stage at least partially overlaps with the penetration stage, the collapsing stage at least partially overlaps with the penetration stage, a minimum value of the variable penetration force is greater than a maximum value of the variable positioning force, the variable collapsing force increases continuously at least during a portion of the collapsing stage, the variable collapsing force increases continuously at least during a portion of the collapsing stage prior to commencement of the penetration stage, an initial value of the variable collapsing force is greater than the maximum value of the variable positioning force, the variable securing force increases at least prior to the commencement of the collapsing stage, an initial value of the variable collapsing force is greater than an initial value of the variable securing force, the variable collapsing force increases continuously at least during a majority of the collapsing stage, an initial value of the variable penetration force is greater than an initial value of the variable collapsing force, and a minimum value of the variable collapsing force is greater than a maximum value of the variable positioning force.

There is provided in accordance with various examples, methods being performed by the robotic system of the eighth, ninth, tenth, and eleventh aspects.

In some examples, the robotic systems according to the eighth, ninth, tenth, and eleventh aspects can be configured to perform some or all the operations related to securing the contact between the fluid transfer connector septum and the container septum as described above for the robotic system according to the aspects described above, and can include some or all the components related thereto. In some examples, the robotic systems according to the eighth, ninth, tenth, and eleventh aspects can be configured to perform some or all the operations related to the locking mechanism and relative movement of the engaging arm and the gripping arm (or the sleeve and the body member) as described above for the robotic system according to the aspects described above, and can include some or all the components related thereto.

Furthermore, the robotic systems according to the eighth, ninth, tenth, and eleventh aspects can include some or all the features related to the manipulator, gripping arm, engaging arm, sensor, contact securing mechanism, and resisting member as described for the robotic system according to the aspects described above.

In some examples, the robotic systems according to the eighth, ninth, tenth, and eleventh aspects comprise the fluid transfer connector according to any of the examples thereof described herein.

In some examples, the robotic system according to the first to seventh aspects described above can include some or all the features of the robotic systems according to the eighth, ninth, tenth, and eleventh aspects.

There is provided in accordance with a twelfth aspect of the presently disclosed subject matter, a robotic system operable for transfer of fluid between a container and a fluid transfer assembly, the robotic system comprising: a controller; and a manipulator controllable by the controller, the manipulator comprising: a gripping arm configured for gripping a gripping portion of the fluid transfer assembly; and a supporting arm configured for supporting a supporting portion of the fluid transfer assembly at least prior to the gripping arm gripping the gripping portion.

In some examples, the robotic system is operable for transfer of fluid at least partially along an injection axis, and the supporting arm is configured to be stationary with respect to the injection axis.

In some examples, the gripping arm is configured to be displaceable with respect to the supporting arm, and the supporting arm is configured to be stationary with respect to the gripping arm.

In some examples, the manipulator further comprises a plunger arm configured to engage a plunger flange portion of a fluid transfer unit of the fluid transfer assembly.

In some examples, the manipulator further comprises an engaging arm configured to engage an engaging portion of the fluid transfer assembly.

In some examples, the engaging arm is configured to be displaceable with respect to the supporting arm and the supporting arm is configured to be stationary with respect to the engaging arm.

In some examples, the manipulator comprises a body and the supporting arm comprises a projection projecting from the body.

In some examples, the robotic system according to the first to eleventh aspects described above can include some or all the features of the robotic systems according to the twelfth aspect.

In some examples, the robotic system according to the twelfth aspect can include some or all the features of the robotic systems according to the first to eleventh aspects described above.

There is provided in accordance with a thirteenth aspect of the presently disclosed subject matter, a robotic system operable for transfer of fluid between a container and a fluid transfer assembly comprising a plunger flange portion, the robotic system comprising: a controller; and a manipulator controllable by the controller, the manipulator comprising a plunger support including at least a first plunger holding element and a second plunger holding element, the first plunger holding element being configured for accommodating a first plunger flange portion sized with a first flange dimension and the second plunger holding element being configured for accommodating a second plunger flange portion sized with a second dimension, different from the first, flange dimension.

In some examples, the first plunger holding element comprises a first recess configured to receive therein the first plunger flange portion, said first recess being formed with a first receiving space having a first recess dimension corresponding to the first flange dimension, and the second plunger holding element comprises a second recess configured to receive therein the second plunger flange portion, said second recess being formed with a second receiving space having a second recess dimension corresponding to the second flange dimension and different from the first recess dimension.

In some examples, the plunger support further includes a third plunger holding element configured for accommodating a third plunger flange portion sized with a third flange dimension different from the first and the second flange dimensions, the third plunger holding element comprising a third recess configured to receive therein the third plunger flange portion, said third recess being formed with a third receiving space having a third recess dimension corresponding to the third flange dimension and different from the first and second recess dimensions.

In some examples, the robotic system according to the first to twelfth aspects described above can include some or all the features of the robotic systems according to the thirteenth aspect.

In some examples, the robotic system according to the thirteenth aspect can include some or all the features of the robotic systems according to the first to twelfth aspects described above.

There is provided in accordance with a fourteenth aspect of the presently disclosed subject matter, a fluid transfer connector, comprising: a body member couplable to a fluid transfer unit at a unit coupling portion, the body member being shaped to define a body lumen; a fluid transfer conduit extending axially from the unit coupling portion into the body lumen, the fluid transfer conduit being configured to establish fluid communication with the fluid transfer unit when the fluid transfer unit is coupled to the unit coupling portion; a sleeve arranged coaxially relative to the body member; a fluid transfer connector septum mounted at a distal end of the sleeve, the sleeve and the body member being configured to move relative to each other between an extended position and a collapsed position; and a locking mechanism configured for switching between a locked state and an unlocked state for selectively enabling and preventing the relative movement of the sleeve and the body member, wherein the locking mechanism is configured to enable the relative movement between the sleeve and the body member from the extended position to the collapsed position upon activation of an actuator accessible through an external wall of the fluid transfer connector.

In some examples, the actuator is actuatable by application of a radial force thereon.

In some examples, the actuator comprises an internal portion, disposed at least partially within one of the sleeve and the body member, and an actuation portion which is accessible via an opening formed on the other one of the sleeve and the body member, and wherein application of a radial force on the actuation portion induces actuation of the locking mechanism at least from the locked state to the unlocked state for facilitating the movement of the body member with respect to the sleeve at least from the extended position to the collapsed position.

In some examples, the external wall of the syringe connector comprises a protective surface configured to prevent manual access to the actuator.

In some examples, the protective surface comprises one or more protection elements surrounding the opening.

In some examples, a fluid transfer connector inner surface is configured for axial, slidable movement of the actuator therealong for facilitating the movement between the extended position and the collapsed position.

In some examples, the actuator is configured: to be pressable by a radial force, thereby switching from the locked state to the unlocked state at the extended position; and for subsequent slidable axial movement along the inner surface for transitioning from the extended position to the collapsed position.

In some examples, the fluid transfer connector septum comprises a throughgoing bore extending from a septum proximal surface to a septum distal surface and dimensioned for receiving the fluid transfer conduit.

In some examples, the fluid transfer connector septum is formed as a monolith.

In some examples, the external wall of the fluid transfer connector comprises a peripheral wall of the sleeve and terminates at a distal edge of the peripheral wall, said peripheral wall distal edge being axially spaced away from a mounting portion of the sleeve forming a gap therebetween, said sleeve mounting portion configured for mounting the fluid transfer connector septum thereon.

In some examples, the peripheral wall is connected to the mounting portion via one or more beams.

In some examples, the fluid transfer connector has a longitudinal axis and the one or more beams comprise two oppositely facing beams such that the septum mounting portion extends along a plane perpendicular to the longitudinal axis in between the two oppositely facing beams.

There is provided in accordance with a fifteenth aspect of the presently disclosed subject matter, a fluid transfer connector, comprising: a body member couplable to a fluid transfer unit at a unit coupling portion, the body member being shaped to define a body lumen; a fluid transfer conduit extending axially from the unit coupling portion into the body lumen, the fluid transfer unit being configured to establish fluid communication with the fluid transfer unit when the fluid transfer unit is coupled to the unit coupling portion; a sleeve arranged coaxially relative to the body member; a fluid transfer connector septum mounted at a distal end of the sleeve, the sleeve and the body member being configured to move relative to each other between an extended position and a collapsed position; and a locking mechanism configured for switching between a locked state and an unlocked state for selectively enabling and preventing the relative movement of the sleeve and the body member, wherein the locking mechanism is configured to enable the relative movement between the sleeve and the body member from the extended position to the collapsed position upon activation of an actuator, wherein said actuator is actuatable irrespective of an axial force applied onto the fluid transfer connector septum.

In some examples, the actuator is actuatable irrespective of the axial force applied onto the fluid transfer connector septum by a container septum.

In some examples, the fluid transfer connector in accordance with the fifteenth aspect can include some or all of the features of the fluid transfer connector according to the fourteenth aspect.

In some examples, the fluid transfer connector in accordance with the fourteenth aspect can include some or all of the features of the fluid transfer connector according to the fifteenth aspect.

There is provided in accordance with a sixteenth aspect of the presently disclosed subject matter, a fluid transfer connector, comprising: a body member couplable to a fluid transfer unit at a unit coupling portion, the body member being shaped to define a body lumen comprising a longitudinal axis of the fluid transfer connector; a fluid transfer conduit extending axially from the unit coupling portion into the body lumen, the fluid transfer unit being configured to establish fluid communication with the fluid transfer unit when the fluid transfer unit is coupled to the unit coupling portion; a sleeve arranged coaxially relative to the body member and comprising a fluid transfer connector septum mounted at a distal end of the sleeve, the sleeve and the body member being configured to move relative to each other between an extended position and a collapsed position; and a locking mechanism configured for switching between a locked state and an unlocked state for selectively enabling and preventing the relative movement of the sleeve and the body member, wherein the locking mechanism in its locked state is configured to prevent the relative movement between the sleeve and the body member from the extended position to the collapsed position by an axial force applied on at least one of the body member and the sleeve in a direction parallel to the longitudinal axis.

In some examples, the locking mechanism is configured to switch from the locked state to the unlocked state upon application of a radial force applied thereon in a direction perpendicular to the longitudinal axis, and to enable in its unlocked state the relative movement of the sleeve and the body member.

In some examples, the locking mechanism comprises an actuator configured to prevent the locking mechanism from switching into its unlocked state from the locked state in response to said axial force.

In some examples, the actuator is configured to switch the locking mechanism from the locked state into the unlocked state in response to said radial force being applied thereon.

In some examples, the actuator comprises a lockable member and one of the sleeve and the body member comprises a locking member configured to selectively engage the lockable member in the locked state of the locking mechanism, said lockable member being configured to prevent its release from the locking member by said axial force.

In some examples, the lockable member configured to release from the locking member in response to said radial force.

In some examples, the fluid transfer connector in accordance with a sixteenth aspect can include some or all of the features of the fluid transfer connector according to the fourteenth and fifteenth aspects.

In some examples, the fluid transfer connector in accordance with the fourteenth and fifteenth aspects can include some or all of the features of the fluid transfer connector according to the sixteenth aspect.

There is provided in accordance with a seventeenth aspect of the presently disclosed subject matter, a fluid transfer connector, comprising: a body member couplable to a fluid transfer unit at a unit coupling portion, the body member being shaped to define a body lumen; a fluid transfer conduit extending axially from the unit coupling portion into the body lumen, the fluid transfer conduit being configured to establish fluid communication with the fluid transfer unit when the fluid transfer unit is coupled to the unit coupling portion; a sleeve arranged coaxially relative to the body member; a fluid transfer connector septum mounted at a distal end of the sleeve, the sleeve and the body member being configured to move relative to each other between an extended position in which the fluid transfer connector septum is at an extended distance from the unit coupling portion and an intermediate position in which the fluid transfer connector septum is at an intermediate distance, smaller than the extended distance, from the unit coupling portion, smaller than the second distance, from the unit coupling portion; and a locking mechanism configured for switching between a locked state and an unlocked state for selectively enabling and preventing the relative movement of the sleeve and the body member at the extended position and the intermediate position.

In some examples, the sleeve and the body member are configured to move relative to each other between at least one of the extended position and the intermediate position and a collapsed position in which the fluid transfer connector septum is at a collapsed distance, smaller than the intermediate distance, from the unit coupling portion.

In some examples, the sleeve and the body member are configured to move axially relative to each other to transition from at least one of the extended position and the intermediate position to the collapsed position.

In some examples, the locking mechanism is configured for selectively enabling the movement of the sleeve relative to the body member from at least one of the extended position and the intermediate position upon activation of an actuator accessible through an external wall of the fluid transfer connector.

In some examples, the actuator is actuatable by application of a radial force thereon.

In some examples, the actuator comprises an internal portion, disposed at least partially within one of the sleeve and the body member, and an actuation portion which is accessible via an opening formed on the other one of the sleeve and the body member, and wherein application of a radial force on the actuation portion induces actuation of the locking mechanism at least from the locked state to the unlocked state for facilitating the movement of the body member with respect to the sleeve from at least one of the extended position and the intermediate position.

In some examples, an external wall of the syringe connector comprises a protective surface configured to prevent manual access to the actuator.

In some examples, the protective surface comprises one or more protection elements surrounding the opening.

In some examples, a fluid transfer connector inner surface is configured for axial, slidable movement of the actuator therealong for facilitating the movement between the extended position and the collapsed position.

In some examples, the actuator is configured: to be pressable by a radial force, thereby switching from the locked state to the unlocked state at, at least one of the extended position and the intermediate position; and for subsequent slidable axial movement along the inner surface for transitioning between the extended position and the intermediate position.

In some examples, the fluid transfer connector septum comprises a thoroughgoing bore extending from a septum proximal surface to a septum distal surface and dimensioned for receiving the fluid transfer conduit.

In some examples, the fluid transfer connector septum is formed as a monolith.

In some examples, the external wall of the fluid transfer connector comprises a peripheral wall of the sleeve and terminates at a distal edge of the peripheral wall, said peripheral wall distal edge being axially spaced away from a mounting portion of the sleeve forming a gap therebetween, said sleeve mounting portion configured for mounting the fluid transfer connector septum thereon.

In some examples, the peripheral wall is connected to the mounting portion via one or more beams.

In some examples, the fluid transfer connector has a longitudinal axis and the one or more beams comprise two oppositely facing beams such that the septum mounting portion extends along a plane perpendicular to the longitudinal axis in between the two oppositely facing beams.

In some examples, the locking mechanism is configured to prevent manual access to the actuator In some examples, the fluid transfer connector in accordance with the seventeenth aspect can include some or all of the features of the fluid transfer connector according to the fourteenth to sixteenth aspects.

In some examples, the fluid transfer connector in accordance with fourteenth to sixteenth aspects can include some or all of the features of the fluid transfer connector according to the seventeenth aspect.

There is provided in accordance with an eighteenth aspect of the presently disclosed subject matter a fluid transfer connector comprising: a body member couplable to a fluid transfer unit at a unit coupling portion, the body member being shaped to define a body lumen; a fluid transfer conduit extending axially from the unit coupling portion into the body lumen, the fluid transfer conduit being configured to establish fluid communication with the fluid transfer unit when the fluid transfer unit is connected to the unit coupling portion; a sleeve arranged coaxially relative to the body member; a fluid transfer connector septum mounted at a distal end of the sleeve; the sleeve and the body member being configured to move relative to each other between an intermediate position in which the fluid transfer connector septum is at an intermediate distance from the unit coupling portion and a collapsed position in which the fluid transfer connector septum is at a collapsed distance, smaller than the intermediate distance, from the unit coupling portion; and a locking mechanism configured for switching between a locked state and an unlocked state for selectively enabling and preventing the relative movement of the sleeve and the body member at the intermediate state, said locking mechanism being configured to selectively enable the relative movement of the sleeve and the body member upon activation of an actuator, at least to transition from the intermediate position to the collapsed position.

In some examples, the sleeve and the body member are configured to move relative to each other between at least one of the intermediate position and the collapsed position and an extended position in which the fluid transfer connector septum is at an extended distance, greater than the intermediate distance, from the unit coupling portion.

In some examples, the fluid transfer connector in accordance with the eighteenth aspect can include some or all of the features of the fluid transfer connector according to the fourteenth to seventeenth aspects.

In some examples, the fluid transfer connector in accordance with the fourteenth to seventeenth aspects can include some or all of the features of the fluid transfer connector according to the eighteenth aspect.

There is provided in accordance with a nineteenth aspect of the presently disclosed subject matter a fluid transfer connector comprising: a sleeve having a sleeve distal end; and a fluid transfer connector septum mounted at the sleeve distal end and having a septum protruding portion axially protruding from the sleeve, said septum protruding portion being formed in a terraced-like shape.

In some examples, the septum protruding portion comprises a septum proximal portion having a first peripheral wall comprising a first circumference and a septum distal portion having a second peripheral wall comprising a second circumference, said second circumference being smaller than the first circumference.

In some examples, the second peripheral wall is inclined such that the second circumference recedes towards the septum distal surface.

In some examples, the sleeve is shaped to define a sleeve lumen, wherein the fluid transfer connector septum comprises a septum subsurface portion housed inside the sleeve lumen.

In some examples, the connector has a longitudinal axis and the septum subsurface portion comprises a recess formed to receive a protrusion medially extending from the sleeve towards the longitudinal axis.

In some examples, the septum protruding portion has a length extending axially from the distal end of the sleeve to a septum distal surface, said length being at least 20 millimeters.

In some examples, the septum protruding portion has a length extending axially from the distal end of the sleeve to a septum distal surface, said length being at least 30 millimeters.

In some examples, the septum protruding portion has a length extending axially from the distal end of the sleeve to a septum distal surface, said length being in the range of at least 15-30 millimeters.

In some examples, the fluid transfer connector in accordance with the nineteenth aspect can include some or all of the features of the fluid transfer connector according to the fourteenth to eighteenth aspects.

In some examples, the fluid transfer connector in accordance with the fourteenth to eighteenth aspects can include some or all of the features of the fluid transfer connector according to the nineteenth aspect.

There is provided in accordance with a twentieth aspect of the presently disclosed subject matter a fluid transfer connector extending between a connector proximal end and a connector distal end and configured to be connected to a fluid transfer unit at the connector proximal end, the fluid transfer connector comprising: a connector body extending from the connector proximal end; and a septum extending from the connector body and having a septum protruding portion protruding from the connector body towards the connector distal end, said septum protruding portion being formed in a terraced-like shape.

In some examples, the septum protruding portion comprises a septum proximal portion having a first peripheral wall with a first circumference and a septum distal portion having a second peripheral wall with a second circumference, said second circumference being smaller than the first circumference.

In some examples, the second peripheral wall is inclined such that the second circumference recedes towards the connector distal end.

In some examples, the septum comprises a septum subsurface portion housed inside the connector body.

In some examples, the fluid transfer connector in accordance with a twentieth aspect can include some or all of the features of the fluid transfer connector according to the fourteenth to nineteenth aspects.

In some examples, the fluid transfer connector in accordance with the fourteenth to nineteenth aspects can include some or all of the features of the fluid transfer connector according to the twentieth aspect.

There is provided in accordance with a twenty first aspect of the presently disclosed subject matter a robotic system operable for transfer of fluid between a container and a fluid transfer assembly accessible via a fluid transfer unit and a fluid transfer connector, said fluid transfer connector being configured to facilitate connection of the fluid transfer assembly with the container for said transfer of fluid, the robotic system comprising: a controller; and a manipulator controllable by the controller to hold and manipulate the fluid transfer assembly, said manipulator being configured to hold the fluid transfer assembly at the fluid transfer connector.

In some examples, the manipulator comprises a gripping arm having at least one gripper element configured to grip a gripping portion of the fluid transfer connector.

In some examples, the manipulator comprises an engaging arm configured to engage an engaging portion of the fluid transfer connector.

In some examples, the manipulator is configured to manipulate the fluid transfer assembly while maintaining the fluid transfer unit free of hold by the manipulator.

In some examples, the manipulator is configured to manipulate the fluid transfer assembly while holding the fluid transfer assembly at a portion distant from the fluid transfer unit.

In some examples, the manipulator is configured to manipulate the fluid transfer assembly to secure a contact between a fluid transfer connector septum of the fluid transfer connector and a container septum of the container while holding the fluid transfer assembly at the fluid transfer connector.

In some examples, the robotic system further comprises a fluid transfer connector according to any one of the fourteenth to twentieth aspects.

In some examples, the robotic system in accordance with twenty first aspect can include some or all of the features of the robotic system according to the first to thirteenth aspects.

In some examples, the robotic system according to the first to thirteenth aspects can include some or all of the features of the robotic system according to the twenty first aspect.

There is provided in accordance with an example, a method being performed by the robotic system of the twenty first aspect. The method includes a process for transferring fluid between a container accessible via a container-septum and a fluid transfer assembly accessible via a fluid transfer connector, the method comprising operating a robotic system for controlling a manipulator of the robotic system for controlling a manipulator of the robotic system to hold the fluid transfer connector and manipulate the fluid transfer assembly for performing said transfer of fluid.

There is provided in accordance with a twenty second aspect of the presently disclosed subject matter a robotic system operable for transfer of fluid between a fluid transfer assembly and a first container and the fluid transfer assembly and a second container, the robotic system comprising: a first container holder configured for holding the first container and a second container holder configured for holding the second container, the first container holder being spaced apart by an arcuate path from the second container holder; a controller; and a rotatable manipulator, rotatable about its rotation axis and comprising a gripping arm configured to grip the fluid transfer assembly, said controller being configured to rotate the rotatable manipulator for moving the gripping arm, while gripping the fluid transfer assembly, between a first position and a second position along the arcuate path, the first position being aligned with the first container holder and the second position being aligned with the second container holder.

In some examples, the gripping arm is moved from the first position to the second position only along the arcuate path.

In some examples, the gripping arm is moved from the first position to the second position along the arcuate path in a single and continuous motion.

In some examples, the first container holder is configured to hold the first container at a first distance from the rotation axis taken in a first direction perpendicular thereto, and the second container holder is configured to hold the second container at a second distance from the rotation axis taken in a second direction perpendicular thereto, said first distance being equal to said second distance.

In some examples, the first and second directions define an arcuate path angle therebetween, which corresponds to an arc length of the arcuate path between the first and the second positions.

In some examples, the manipulator is configured to move at least a part of the fluid transfer assembly along a direction parallel to the rotation axis when the fluid transfer assembly is at, at least one of the first and second positions.

In some examples, the manipulator is configured to establish a first fluid communication between the fluid transfer assembly and the first container, when the first container is held by the first container holder, and a second fluid communication between the fluid transfer assembly and the second container, when the second container is held by the second container holder.

In some examples, each of the first and second container is accessible via a respective container-septum, said fluid transfer assembly comprises a gripping portion and a fluid transfer conduit configured to transfer fluid through the container-septum.

In some examples, the first and second containers comprise any one of a vial and an IV bag.

In some examples, the rotation axis is a longitudinal axis of the manipulator.

In some examples, the robotic system further comprises a fluid transfer connector according to any one of the fourteenth to twentieth aspects.

In some examples, the robotic system in accordance with a twenty second aspect can include some or all of the features of the robotic system according to the first to thirteenth and twenty first aspects.

In some examples, the robotic system according to the first to thirteenth and twenty first aspects can include some or all of the features of the robotic system according to the twenty second aspect.

There is provided in accordance with an example, a method being performed by the robotic system of the twenty second aspect.

There is provided in accordance with a twenty third aspect of the presently disclosed subject matter a robotic system operable for transfer of fluid between a container and a fluid transfer assembly which comprises: a syringe having a plunger flange and a fluid transfer conduit extending at least partially along an injection axis, for transferring the fluid upon displacement of the plunger flange, the robotic system comprising: a controller; and a manipulator controllable by the controller, the manipulator comprising: a plunger arm configured to engage the plunger flange; a gripping arm configured for gripping a gripping portion of the fluid transfer assembly, said plunger arm being displaceable with respect to the gripping arm along the injection axis and being configured to be displaced together with the gripping arm during at least a portion of a movement of the manipulator.

In some examples, the controller is configured for operating the manipulator to: move the gripping arm to align the fluid transfer assembly with the container, and move the plunger arm along the injection axis to displace the plunger flange for transferring of the fluid between the container and the syringe.

In some examples, the manipulator is constructed to mechanically couple the plunger arm with the gripping arm.

In some examples, the manipulator, including the plunger arm and the gripping arm, is formed as a monolithic structure.

In some examples, the controller is configured for controlling said plunger arm so that: the plunger arm grips the plunger flange; and the plunger arm axially displaces the plunger flange for transferring the fluid between the syringe and the container.

In some examples, the manipulator has a central longitudinal axis and the injection axis is positioned away from the central longitudinal axis.

In some examples, the robotic system further comprises a fluid transfer connector according to any one of the fourteenth to twentieth aspects.

In some examples, the robotic system in accordance with a twenty third aspect can include some or all of the features of the robotic system according to the first to thirteenth, twenty first and twenty second aspects.

In some examples, the robotic system according to the first to thirteenth, twenty first and twenty second aspects can include some or all of the features of the robotic system according to the twenty third aspect.

There is provided in accordance with an example, a method being performed by the robotic system of the twenty third aspect.

EMBODIMENTS

A more specific description is provided in the Detailed Description whilst the following are non-limiting examples of different embodiments of the presently disclosed subject matter.

1. A robotic system operable for transfer of fluid between a container accessible via a container-septum and a fluid transfer assembly accessible via a fluid transfer connector septum, the robotic system comprising:
   a controller; and
   a manipulator controllable by the controller and configured to manipulate at least one of the container and the fluid transfer assembly,
   the controller being configured to operate the manipulator to secure contact between the container-septum and the fluid transfer connector septum during at least a portion of the transfer of the fluid.

2. The robotic system according to embodiment 1, wherein the controller is further configured to control the manipulator to:
   bring the container-septum and the fluid transfer connector septum into contact; and
   perform said securing of the contact between the container-septum and the fluid transfer connector septum by pressing at least one of the container-septum and the fluid transfer connector septum onto the other one of the container-septum and the fluid transfer connector septum during at least a portion of the transfer of fluid.

3. The robotic system according to embodiment 1 or 2, wherein the manipulator comprises a pressing mechanism configured to ensure a predetermined compression threshold between the container-septum and the fluid transfer connector septum is reached before initiation of the transfer of fluid, said reaching of the predetermined compression threshold being associated with said securing the contact.

4. The robotic system according to embodiment 3, wherein the pressing mechanism is further configured to ensure that the predetermined compression threshold between the container-septum and the fluid transfer connector septum is maintained during at least a portion of the transfer of fluid.

5. The robotic system according to embodiment 3 or 4, wherein the controller is configured to operate the manipulator to:
   align the fluid transfer connector septum of the fluid transfer assembly and the container-septum of the container;
   bring the fluid transfer connector septum and the container-septum in contact with each other;
   press at least one of the fluid transfer connector septum and the container-septum against the other one of the fluid transfer connector septum and the container-septum to perform said securing of the contact therebetween; and/or execute at least partial penetration of at least one of the fluid transfer connector septum and the container-septum by a fluid transfer conduit associated with a fluid transfer connector of the fluid transfer assembly to enable the transfer of the fluid, wherein the pressing mechanism is configured to ensure that the predetermined compression threshold between the container-septum and the fluid transfer connector septum is reached before said at least partial penetration.

6. The robotic system according to any one of the preceding embodiments, wherein the manipulator comprises a gripping arm configured to grip a gripping portion of at least one of the fluid transfer assembly and the container.

7. The robotic system according to embodiment 6, wherein the gripping arm is configured to hold said at least one of the fluid transfer assembly and the container at least partially along a vertical axis.

8. The robotic system according to embodiment 6 or 7, wherein the gripping arm is configured to be controllably movable to allow grabbing of the fluid transfer assembly from a fluid transfer assembly recirculating conveyor configured to store one or more fluid transfer assemblies and/or to allow grabbing of the container from a container recirculating conveyor configured to store one or more containers.

9. The robotic system according to any one of embodiments 6 to 8, wherein the gripping arm is configured to be controllably movable relative to a container holder configured to hold the container, and the gripping arm is configured to align the fluid transfer connector septum and the container-septum and bring the fluid transfer connector septum in contact with the container-septum when the gripping arm holds said fluid transfer assembly.

10. The robotic system according to any one of embodiments 6 to 9, wherein the manipulator comprises an engaging arm configured to engage the fluid transfer assembly at an engaging portion when the gripping arm grips the fluid transfer assembly, said engaging arm being configured to be axially movable relative to said gripping arm.

11. The robotic system according to embodiment 10, wherein the engaging arm and the gripping arm are coupled such that the engaging arm and the gripping arm are operable to be controllably displaced either axially together or axially relatively to each other.

12. The robotic system according to any one of embodiments 10 and 11, when dependent on embodiment 3 or 4, wherein the engaging arm is configured to engage a sleeve of a fluid transfer connector of the fluid transfer assembly, the sleeve being fixedly coupled relative to the fluid transfer connector septum and the gripping arm is configured to grip a body member of the fluid transfer connector being fixedly coupled relative to a fluid transfer conduit of the fluid transfer connector, the controller being configured to cause relative movement between the gripping arm and the engaging arm to cause the fluid transfer conduit and the fluid transfer connector septum to at least partially move towards each other upon the predetermined compression threshold between the container-septum and the fluid transfer connector septum is reached.

13. The robotic system according to embodiment 12, wherein the manipulator is configured to resist relative movement between the gripping arm and the engaging arm when an axial force below a predetermined pressing threshold is applied to cause said relative movement, said predetermined pressing threshold being associated with the predetermined compression threshold.

14. The robotic system according to embodiment 13, wherein the engaging arm and gripping arm are coupled via a resisting member opposing the relative movement of the gripping arm and the engaging arm towards each other.

15. The robotic system according to embodiment 14, wherein the resisting member is configured to cause the engaging arm and the gripping arm to move away from each other after said transfer of fluid is complete.

16. The robotic system according to any one of embodiments 12 to 15, wherein the engaging arm is configured to abut on a radial stop at the engaging portion when the fluid transfer connector septum contacts the container septum, and the manipulator is configured to cause a relative movement between the gripping arm and the engaging arm only after the predetermined pressing threshold force is applied, thereby pressing the fluid transfer connector septum to the container-septum for the contact therebetween to reach the predetermined compression threshold before the fluid transfer conduit and the fluid transfer connector septum at least partially moves towards each other.

17. The robotic system according to any one of the preceding embodiments, further comprising a container holder configured to hold the container along a container longitudinal axis.

18. The robotic system according to embodiment 17, wherein the container holder comprises a vial holder configured to support at least one vial and/or an intravenous bag holder configured to support at least one intravenous bag.

19. The robotic system according to any one of embodiments 17 and 18, wherein the manipulator is configured to move towards the container holder.

20. The robotic system according to any one of embodiments 17 to 19, wherein the container holder is configured to move towards the manipulator.

21. The robotic system according to any one of embodiments 10 to 20, wherein the controller is further configured to rotate the gripping arm and the engaging arm together around a rotation axis.

22. The robotic system according to any one of embodiments 10 to 21, wherein the controller is configured to control the engaging arm and the gripping arm such that:
the gripping arm grips a body member of the fluid transfer connector being fixedly coupled relative to a fluid transfer conduit of a fluid transfer connector, aligns the fluid transfer assembly with the container, and brings the fluid transfer connector septum in contact with the container-septum;
the engaging arm engages a sleeve of the fluid transfer connector of the fluid transfer assembly, the sleeve being fixedly coupled relative to the fluid transfer connector septum, presses the fluid transfer connector septum against the container-septum to perform said securing of the contact therebetween; and/or
the gripping arm causes a collapsible movement of the body member and the sleeve towards each other, which executes at least partial movement of the fluid transfer conduit and the fluid transfer connector septum towards each other for facilitating the transfer of the fluid.

23. The robotic system according to embodiment 22, wherein the gripping arm is further configured to apply a radial force on an external wall of the fluid transfer assembly and the controller is configured to control the gripping arm to selectively apply said radial force to press upon a fluid transfer connector actuator of the fluid transfer assembly.

24. The robotic system according to any one of the preceding embodiments, wherein the fluid transfer assembly comprises a syringe, the robotic system further comprising a plunger arm configured to operate a plunger of the syringe and wherein the controller is configured to control said plunger arm to:
grip a plunger flange portion of the plunger; and
axially displace the plunger flange for transferring the fluid between the syringe and the container.

25. The robotic system according to embodiment 22, wherein the controller is configured to control the engaging arm and the gripping arm such that:
following the transfer of the fluid, the gripping arm moves the body member away from the sleeve; and
the engaging arm and the gripping arm are distanced from the container for disconnecting the fluid transfer connector septum from the container-septum.

26. The robotic system according to embodiment 25, wherein the controller is configured to operate the gripping arm after fluid transfer to move the body member away from the sleeve.

27. The robotic system according to embodiment 26 as dependent on embodiment 23, wherein the controller is configured to operate the gripping arm after the body member is moved away from the sleeve to stop applying said radial force.

28. The robotic system according to embodiment 27, wherein the controller is configured to operate the gripping arm to perform the following operations either simultaneously or successively:
to grip the body member, align the fluid transfer assembly with the container and bring the fluid transfer connector septum in contact with the container-septum; and
to selectively apply said radial force so as to press upon the fluid transfer connector actuator of the fluid transfer assembly.

29. The robotic system according to any one of embodiments 10 to 28, wherein the controller is configured to control the engaging arm and the gripping arm such that:
any one of the engaging arm and the gripping arm grips the fluid transfer assembly, aligns the fluid transfer assembly with the container and brings the fluid transfer connector septum in contact with the container-septum; and any one of the engaging arm and the gripping arm presses the fluid transfer connector septum against the container-septum to secure contact therebetween.

30. The robotic system according to any one of embodiments 10 to 29, wherein the engaging arm and the gripping arm are arranged to contact the fluid transfer assembly at the fluid transfer connector.

31. The robotic system according to any one of embodiments 10 to 30, wherein the engaging arm is formed with a pressing surface configured to being pressed onto a radial stop of the fluid transfer assembly to perform said securing of the contact between the container-septum and the fluid transfer connector septum.

32. The robotic system according to embodiment 31, wherein the pressing surface of the engaging arm comprises an arcuate portion dimensioned to surround the fluid transfer assembly and to form a radial gap with an external wall of the fluid transfer assembly.

33. The robotic system according to embodiment 31, wherein the pressing surface of the engaging arm is configured to mate with the outer surface of the fluid transfer assembly such that there is no radial gap between an external wall of the fluid transfer assembly and the pressing surface.

34. The robotic system according to any one of embodiments 10 to 33, wherein the gripping arm comprises at least one projecting element configured to apply a radial force on an external wall of the fluid transfer assembly when the fluid transfer assembly is manipulated by the robotic system.

35. The robotic system according to embodiment 34, wherein the projecting element of the gripping arm comprises a plate formed with an arcuate groove.

36. The robotic system according to any one of embodiments 34 and 35, wherein the gripping arm comprises two oppositely facing plates comprising a first pair and a second pair of projecting elements configured to access a first pair and a second pair of openings on the external wall of the fluid transfer assembly.

37. The robotic system according to embodiment 36, wherein the two oppositely facing plates are configured to be spaced apart from each other for forming a gap therebetween.

38. The robotic system according to embodiment 12 and embodiment 13-37, when dependent on embodiment 12, wherein the pressing mechanism is further configured to ensure that the predetermined compression threshold between the container-septum and the fluid transfer connector septum is maintained after the transfer of fluid is complete at least until the fluid transfer conduit is moved away from the fluid transfer connector septum.

39. The robotic system according to any one of embodiments 1 to 38, further comprising a fluid transfer connector extending between a connector proximal end configured to be connected to a fluid transfer unit of the fluid transfer assembly and a connector distal end comprising the fluid transfer connector septum, said fluid transfer connector being configured to establish fluid communication between the fluid transfer unit and the container for said transfer of fluid.

40. The robotic system according to embodiment 39, wherein the fluid transfer connector comprises:
a connector body extending from the connector proximal end towards a body distal end; and
said fluid transfer connector septum comprising a septum protruding portion extending from the body distal end towards the connector distal end.

41. The robotic system according to embodiment 40, said fluid transfer connector septum comprising a septum proximal end positioned towards the connector body and a septum distal end constituting the connector distal end.

42. The robotic system according to any one of embodiments 39 to 41, wherein the fluid transfer connector comprises a body member and a sleeve displaceable relative to each other between an extended position, which is a normal position, and a collapsed position, at which the fluid transfer connector establishes said fluid communication.

43. The robotic system according to embodiment 42, wherein the manipulator is configured to displace the fluid transfer connector into the collapsed position after securing the contact between the fluid transfer connector septum and the container septum.

44. The robotic system according to embodiment 42 or 43, when dependent on embodiment 3, wherein the manipulator is configured to displace the fluid transfer connector into the collapsed position after the predetermined compression threshold is reached thereby securing the contact between the fluid transfer connector septum and the container septum.

45. The robotic system according to any one of embodiments 42 to 44, wherein the fluid transfer connector comprises a locking mechanism configured to be displaced between a locked state at which the locking mechanism prevents displacement of the fluid transfer connector into its collapsed position and an unlocked state at which the locking mechanism allows displacement of the fluid transfer connector into its collapsed position.

46. The robotic system according to embodiment 45, wherein the manipulator is configured to displace the locking mechanism into its unlocked state after securing the contact between the fluid transfer connector septum and the container septum.

47. A method for transferring fluid between a container accessible via a container-septum and a fluid transfer assembly accessible via a fluid transfer connector septum, the method, by operation of a robotic system, comprising:
bringing the container-septum of the container into contact with the fluid transfer connector septum of the fluid transfer assembly;
pressing at least one of the container-septum and fluid transfer connector septum onto the other one of the container-septum and fluid transfer connector septum and securing the contact therebetween;
transferring fluid through the container-septum and the fluid transfer connector septum; and
maintaining the secured contact between the container-septum and the fluid transfer connector septum during at least a portion of the transfer of the fluid.

48. The method according to embodiment 47, wherein said securing the contact between the container-septum and the fluid transfer connector septum comprises pressing at least one of the container-septum and fluid transfer connector septum onto the other one of the container-septum and fluid transfer connector septum at least until a predetermined compression threshold between the container-septum and the fluid transfer connector syringe-septum is reached.

49. The method according to any one of embodiments 47 and 48, further comprising operating by a controller a manipulator of the robotic system for:
engaging the manipulator with a portion of at least one of the container and the syringe assembly; and
coaxially positioning the container-septum and the fluid transfer connector septum.

50. The method according to embodiment 49, wherein pressing at least one of the container-septum and fluid transfer connector septum onto the other one of the container-septum and fluid transfer connector septum comprises moving a fluid transfer conduit associated with the fluid transfer assembly and the fluid transfer connector septum at least partially towards each other.

51. The method according to any one of embodiments 47 to 50, wherein pressing at least one of the container-septum and fluid transfer connector septum onto the other one of the container-septum and fluid transfer connector septum comprises advancing the manipulator towards the container.

52. The method according to any one of embodiments 47 to 51, wherein pressing at least one of the container-septum and fluid transfer connector septum onto the other one of the container-septum and fluid transfer connector septum comprises advancing the container towards the manipulator.

53. The method according to any one of embodiments 47 to 52, wherein securing the contact between the container-septum and the fluid transfer connector septum comprises making the contact a tightly sealed contact.

54. The method according to any one of embodiments 47 to 53, further comprising operating by a controller a manipulator of the robotic system for engaging an engaging arm of the manipulator at a portion of the fluid transfer assembly away from the fluid transfer connector septum.

55. The method according to any one of embodiments 47 to 54, further comprising:
providing a fluid transfer connector including:
a body member, and
a sleeve arranged coaxially with the body member, said sleeve and body member being movable relative to each other, the fluid transfer connector septum being mounted at a distal end of the sleeve;
providing a gripping arm configured to grip at least a portion of the fluid transfer assembly;
controlling the gripping arm for coaxially positioning the gripping arm, while gripping fluid transfer assembly, at a predetermined axial distance from the container; and
advancing the gripping arm towards the container for causing a collapsible relative movement of the body member and the sleeve towards each other.

56. A robotic system operable for transfer of fluid between a container accessible via a container-septum and a fluid transfer assembly, the fluid transfer assembly accessible via a fluid transfer connector having a body member and a sleeve including a fluid transfer connector septum, the sleeve and the body member being configured to move relative to each other upon activation of a locking mechanism, the robotic system comprising:
a controller; and
a manipulator controllable by the controller and configured to manipulate the fluid transfer assembly, the manipulator being configured to both grip the fluid transfer assembly and activate the locking mechanism, the controller being configured to operate the manipulator to move the sleeve and the body member relative to each other upon activating the locking mechanism and to transfer fluid between the fluid transfer assembly and the container.

57. The robotic system according to embodiment 56, wherein the controller is configured to operate the manipulator to bring the fluid transfer connector septum and the container-septum into contact with each other.

58. The robotic system according to embodiment 57, wherein the controller is configured to operate the manipulator to secure the contact between the container-septum and the fluid transfer connector septum during at least a portion of the transfer of the fluid.

59. The robotic system according to any one of embodiments 56 to 58, wherein the manipulator is configured to activate the locking mechanism by activating an actuator accessible through an external wall of the fluid transfer connector.

60. The robotic system according to any one of embodiments 56 to 59, wherein the manipulator comprises a gripping arm configured to grip a gripping portion of the fluid transfer assembly.

61. The robotic system according to embodiment 60, wherein the gripping arm is configured to hold said fluid transfer assembly at least partially along a vertical axis.

62. The robotic system according to any one of embodiments 56 to 61, wherein the manipulator is configured to be controllably movable to allow grabbing of the fluid transfer assembly from a fluid transfer assembly recirculating conveyor configured to store one or more fluid transfer assemblies.

63. The robotic system according to any one of embodiments 56 to 62, wherein the manipulator arm is configured to be controllably movable relative to a container holder configured to hold the container such that the manipulator is configured to align the fluid transfer connector septum and the container-septum and bring the fluid transfer connector septum in contact with the container-septum.

64. The robotic system according to embodiment 60 or any one of embodiments 61 to 63, when dependent on embodiment 60, wherein the manipulator comprises an engaging arm configured to engage the fluid transfer assembly at an engaging portion, said engaging arm being configured to be axially movable relative to said gripping arm.

65. The robotic system according to embodiment 64, wherein the engaging arm and the gripping arm are coupled such that the engaging arm and the gripping arm are operable to be controllably displaced either axially together or axially relatively to each other.

66. The robotic system according to any one of embodiments 64 and 65, the controller unit being configured to cause relative movement between the gripping arm gripping the body member and the engaging arm engaging the sleeve to move a fluid transfer conduit associated with the body member at least partially towards the fluid transfer connector septum when a predetermined compression threshold between the container-septum and the fluid transfer connector septum is reached.

67. The robotic system according to any one of embodiments 64 to 66, wherein the manipulator is configured to resist relative movement between the gripping arm and the engaging arm when an axial force below a predetermined pressing threshold is applied to cause said relative movement.

68. The robotic system according to any one of embodiments 64 to 67, wherein the engaging arm and gripping arm are coupled via a resisting member that opposes the relative movement between the gripping arm and engaging arm towards each other.

69. The robotic system according to embodiment 68, wherein the resisting member is configured to cause the engaging arm and the gripping arm to move away from each other after said transfer of fluid is complete.

70. The robotic system according to any one of embodiments 64 to 69, wherein the engaging arm is configured to abut on a radial stop at the sleeve when the fluid transfer connector septum contacts the container septum, and the manipulator is configured to cause a relative movement between the gripping arm and the engaging arm, occurs only after a predetermined pressing threshold force is applied, thereby pressing the fluid transfer connector septum to the container-septum for the contact therebetween to reach a predetermined compression threshold before a fluid transfer conduit associated with the body member and the fluid transfer connector septum at least partially move towards each other.

71. The robotic system according to any one of embodiments 64 to 70, further comprising a container holder configured to hold the container along a container longitudinal axis.

72. The robotic system according to embodiment 71, wherein the container holder comprises a vial holder configured to support at least one vial and/or an intravenous bag holder configured to support at least one intravenous bag.

73. The robotic system according to any one of embodiments 70 and 72, wherein the manipulator is configured to move towards the container holder.

74. The robotic system according to any one of embodiments 70 to 73, wherein the container holder is configured to move towards the manipulator.

75. The robotic system according to any one of embodiments 64 to 74, wherein the controller is further configured to rotate the gripping arm and the engaging arm together around a rotation axis.

76. The robotic system according to any one of embodiments 64 to 75, wherein the controller is configured to control the engaging arm and the gripping arm such that:
the gripping arm grips the body member, aligns the fluid transfer assembly with the container and brings the fluid transfer connector septum in contact with the container-septum;
the engaging arm engages the sleeve and presses the fluid transfer connector septum against the container-septum to secure contact therebetween; and/or
the gripping arm causes a collapsible movement of the body member and the sleeve towards each other, which executes at least partial movement of a fluid transfer conduit associated with the body member and the fluid transfer connector septum towards each other for facilitating the transfer of the fluid.

77. The robotic system according to embodiment 76, wherein the gripping arm is further configured to apply a radial force on an external wall of the fluid transfer assembly and the controller is configured to control the gripping arm to selectively apply said radial force so as to press upon a fluid transfer connector actuator of the fluid transfer assembly.

78. The robotic system according to any one of embodiments 64 to 77, wherein the fluid transfer assembly comprises a syringe,
wherein the robotic system further comprises a plunger arm configured to operate a plunger of the syringe, and
wherein the controller is configured to control said plunger arm to:
grip a plunger flange portion of the plunger; and
axially displace the plunger flange for transferring the fluid between the syringe and the container.

79. The robotic system according to any one of embodiments 64 to 78, wherein the controller is configured to control the engaging arm and the gripping arm such that:
the gripping arm moves the body member away from the sleeve following the transfer of the fluid; and
the engaging arm and the gripping arm are distanced from the container for disconnecting the fluid transfer connector septum from the container-septum.

80. The robotic system according to embodiment 79, wherein the controller is configured to operate the gripping arm after fluid transfer to move the body member away from the sleeve.

81. The robotic system according to embodiment 80 when dependent on embodiment 77, wherein the controller is configured to operate the gripping arm after the body member is moved away from the sleeve to stop applying said radial force.

82. The robotic system according to embodiment 81, wherein the controller is configured to operate the gripping arm to perform the following operations either simultaneously or successively:
to grip the body member, align the fluid transfer assembly with the container and bring the fluid transfer connector septum in contact with the container-septum; and
to selectively apply said radial force so as to press upon the fluid transfer connector actuator of the fluid transfer assembly.

83. The robotic system according to any one of embodiments 64 to 82, wherein the controller is configured to control the engaging arm and the gripping arm such that:
any one of the engaging arm and the gripping arm grips the body member, aligns the fluid transfer assembly with the container and brings the fluid transfer connector septum in contact with the container-septum;
any one of the engaging arm and the gripping arm presses the fluid transfer connector septum against the container-septum to secure contact therebetween; and/or
any one of the engaging arm and the gripping arm causes the relative movement between the body member and the sleeve.

84. The robotic system according to any one of embodiments 64 to 83, wherein the engaging arm and the gripping arm are arranged to contact the fluid transfer assembly at the fluid transfer connector.

85. The robotic system according to any one of embodiments 64 to 84, wherein the engaging arm is formed with a pressing surface configured to being pressed onto a radial stop of the fluid transfer assembly to perform securing the contact between the container-septum and the fluid transfer connector septum.

86. The robotic system according to embodiment 85, wherein the pressing surface of the engaging arm comprises an arcuate portion dimensioned to surround the fluid transfer assembly and to form a radial gap with an external wall of the fluid transfer assembly.

87. The robotic system according to embodiment 86, wherein the pressing surface of the engaging arm is configured to mate with the outer surface of the fluid transfer assembly such that there is no radial gap between the external wall of the fluid transfer assembly and the pressing surface.

88. The robotic system according to any one of embodiments 64 to 87, wherein the gripping arm comprises at least one projecting element configured to apply a radial force on an external wall of the fluid transfer assembly when the fluid transfer assembly is manipulated by the robotic system.

89. The robotic system according to embodiment 88, wherein the projecting element of the gripping arm comprises a plate formed with an arcuate groove.

90. The robotic system according to embodiment 89, wherein the gripping arm comprises two oppositely facing plates comprising a first pair and second pair of projecting elements configured to access a first pair and a second pair of openings on the external wall of the fluid transfer assembly.

91. The robotic system according to embodiment 90, wherein the two oppositely facing plates are configured to be spaced apart from each other for forming a gap therebetween.

92. The robotic system according to any one of embodiments 56 to 91, further comprising a fluid transfer connector comprising:
   a body member couplable to a fluid transfer unit of the fluid transfer assembly at a unit coupling portion;
   a sleeve arranged coaxially relative to the body member;
   a fluid transfer connector septum mounted at a distal end of the sleeve, the sleeve and the body member being configured to move relative to each other between an extended position which is a normal position and a collapsed position at which the fluid transfer connector is configured to establish fluid communication between the fluid transfer unit and the container for said transfer of fluid; and
   a locking mechanism configured to switch between a locked state and an unlocked state to selectively enable and prevent a relative movement of the sleeve and the body member, wherein the locking mechanism is configured to enable the relative movement between the sleeve and the body member from the extended position to the collapsed position upon activation of an actuator accessible through an external wall of the fluid transfer connector.

93. The robotic system according to embodiment 92, wherein the manipulator is configured to grip the fluid transfer assembly and to switch the locking mechanism from the locked state to the unlocked state.

94. The robotic system according to embodiment 93, wherein the manipulator is configured to secure a contact between the container septum and the fluid transfer connector septum, said manipulator being further configured to switch the locking mechanism into the unlocked state and to displace the fluid transfer connector into the collapsed position after securing the contact between the fluid transfer connector septum and the container septum.

95. A method for transferring fluid between a container accessible via a container-septum and a fluid transfer assembly accessible via a fluid transfer connector, the method, by operation of a robotic system, comprising:
   controlling a manipulator of the robotic system to grip the fluid transfer assembly and activate a locking mechanism associated with establishment of fluid communication between the fluid transfer assembly and the container;
   operating the manipulator to move a sleeve and a body member of the fluid transfer connector relative to each other upon activating the locking mechanism to establish said fluid communication; and
   transferring fluid between the fluid transfer assembly and the container.

96. The method according to embodiment 95, wherein controlling the manipulator to activate the locking mechanism comprises activating an actuator of the locking mechanism.

97. The method according to any one of embodiments 95 and 96, further comprising operating the robotic system to control the manipulator to secure a contact between the container septum and a fluid transfer connector septum of the fluid transfer connector.

98. The method according to embodiment 97, wherein controlling the manipulator to activate the locking mechanism comprises activating the locking mechanism after said securing the contact between the container septum and the fluid transfer connector septum.

99. A robotic system operable for transfer of fluid between a container accessible via a container-septum and a fluid transfer assembly accessible via a fluid transfer connector having a body member and a sleeve including a fluid transfer connector septum, the sleeve and the body member being configured to move relative to each other, the system comprising:
   a container holder configured to support the container and to be positioned at least partially coaxially with the fluid transfer assembly;
   an engaging arm configured to engage one of the body member and the sleeve; and
   a gripping arm configured to grip the other one of the body member and the sleeve, said gripping arm and said engaging arm being movable relative to each other.

100. The robotic system according to embodiment 99, wherein the engaging arm and the gripping arm are mechanically coupled to a primary driving assembly, configured to simultaneously move the engaging arm and the gripping arm together while bringing at least one of the gripping arm and the engaging arm to an outer surface of the fluid transfer assembly for pressing thereon.

101. The robotic system according to any one of embodiments 99 and 100, wherein the engaging arm is connected to the gripping arm via a secondary driving assembly, configured to cause said relative movement between the gripping arm and the engaging arm.

102. The robotic system according to any one of embodiments 99 to 101, wherein at least one of the gripping arm and the engaging arm comprises a pressing surface configured to axially press upon a radial stop formed on an outer surface of the fluid transfer assembly to secure the fluid transfer connector septum contact with the container-septum.

103. The robotic system according to embodiment 102, wherein the pressing surface is positioned at a gap from an external wall of the fluid transfer assembly.

104. The robotic system according to any one of embodiments 99 to 103, wherein the gripping arm is formed with an arcuate portion configured to grip an outer surface of the fluid transfer assembly and formed with at least one prong, configured to access an actuator disposed in the fluid transfer assembly and operable to selectively prevent and facilitate the relative movement between the body member and the sleeve.

105. The robotic system according to any one of embodiments 99 to 104, wherein the engaging arm is coupled to the gripping arm via a resisting member configured to apply an axial force on the engaging arm for causing the engaging arm to press upon an outer surface of the fluid transfer assembly.

106. The robotic system according to embodiment 105, wherein the resisting member is configured to resist the relative movement of the engaging arm and the gripping arm towards each other.

107. The robotic system according to embodiment 106, wherein the resisting member is configured to displace the gripping arm and the engaging arm away from each other upon completion of said transfer of fluid.

108. The robotic system according to any one of embodiments 99 to 107, wherein the gripping arm and engaging arm constitute part of a manipulator.

109. The robotic system according to any one of embodiments 99 to 108, further comprising a fluid transfer connector having a body member and a sleeve including a fluid transfer connector septum, the sleeve and the body member being configured to move relative to each other, wherein the engaging arm is configured to engage the sleeve and the gripping arm is configured to grip the body member.

110. The robotic system according to embodiment 109, wherein the sleeve comprises a radial stop protruding radially from the sleeve, said radial stop comprising a stop first surface facing the body member and an opposite stop second surface, wherein the engaging arm is configured to engage the stop first surface.

111. A method for transferring fluid between a container accessible via a container-septum and a fluid transfer assembly accessible via a fluid transfer connector, the method, by operation of a robotic system, comprising:
   operating an engaging arm of the robotic system to engage a sleeve of the fluid transfer connector;
   operating a gripping arm of the robotic system to grip a body member of the fluid transfer connector;
   moving at least one of the engaging arm and the gripping arm towards the other one of the engaging arm and the gripping arm for establishing fluid communication between the fluid transfer assembly and the container; and
   performing said transfer of fluid between the fluid transfer assembly and the container.

112. The method according to embodiment 111, further comprising moving at least one of the engaging arm and the gripping arm away from the other one of the engaging arm and the gripping arm after completion of said transfer of fluid.

113. A robotic system operable for transfer of fluid at least partially along an injection axis between a container accessible via a container-septum and a fluid transfer assembly accessible via a fluid transfer connector, the robotic system comprising:
   a controller; and
   a manipulator controllable by the controller, the manipulator comprising:
     a gripping arm configured to grip a gripping portion of the fluid transfer assembly; and
     an engaging arm configured to engage the fluid transfer assembly at an engaging portion, at least one of said engaging arm and said gripping arm being displaceable with respect to the other one of said engaging arm and said gripping arm along the injection axis, said engaging arm and said gripping arm being configured to be displaced together during at least a portion of a movement of the manipulator.

114. The robotic system according to embodiment 113, wherein the controller is configured to operate the gripping arm to bring a fluid transfer connector septum of the fluid transfer connector in contact with the container-septum, and operating the engaging arm for securing contact between the container-septum and the fluid transfer connector septum during at least a portion of the transfer of the fluid.

115. The robotic system according to any one of embodiments 113 and 114, wherein the manipulator is constructed to mechanically couple the engaging arm with the gripping arm.

116. The robotic system according to any one of embodiments 113 to 115, wherein the manipulator, including the engaging arm and the gripping arm, is formed as a monolithic structure.

117. The robotic system according to any one of embodiments 113 to 116, wherein the manipulator has a central longitudinal axis and the injection axis is positioned away from the central longitudinal axis.

118. The robotic system according to any one of embodiments 113 to 117, wherein the engaging arm is coupled to the gripping arm via a resisting member configured to resist the relative movement of the engaging arm and the gripping arm towards each other.

119. The robotic system according to embodiment 118, wherein the resisting member is configured to displace the gripping arm and the engaging arm away from each other upon completion of said transfer of fluid.

120. The robotic system according to any one of embodiments 113 to 119, further comprising a fluid transfer connector having a body member and a sleeve including a fluid transfer connector septum, the sleeve and the body member being configured to move relative to each other, wherein the engaging arm is configured to engage the sleeve and the gripping arm is configured to grip the body member.

121. The robotic system according to embodiment 120, wherein the sleeve comprises a radial stop protruding radially from the sleeve, said radial stop comprising a stop first surface facing the body member and an opposite stop second surface, wherein the engaging arm is configured to engage the stop first surface.

122. A method for transferring fluid at least partially along an injection axis between a container accessible via a container-septum and a fluid transfer assembly accessible via a fluid transfer connector, the method, by operation of a robotic system, comprising:
   operating an engaging arm of a manipulator of the robotic system to engage an engaging portion of the fluid transfer assembly;
   operating a gripping arm of the manipulator to grip a gripping portion of the fluid transfer assembly;
   moving the engaging arm and the gripping arm together along the fluid transfer assembly with the container;
   moving at least one of the engaging arm and the gripping arm towards the other one of the engaging arm and the gripping arm along the injection axis for establishing fluid communication between the fluid transfer assembly and the container; and
   performing said transfer of fluid between the fluid transfer assembly and the container.

123. The method according to embodiment 122, further comprising moving at least one of the engaging arm and the gripping arm away from the other one of the engaging arm and the gripping arm after completion of said transfer of fluid.

124. A robotic system operable for transfer of fluid between a container accessible via a container-septum and a fluid transfer assembly accessible via a fluid transfer connector configured to establish fluid communication between the container and the fluid transfer assembly for said transfer of fluid, said fluid transfer connector comprising a body member and a sleeve displaceable relative to each other between an extended position, which is a normal position, and a collapsed position, at which the fluid transfer connector establishes said fluid communication, said fluid transfer connector comprising a fluid transfer connector septum positioned at the sleeve, the robotic system comprising:
   a controller;
   a manipulator controllable by the controller and configured to manipulate at least one of the container and the fluid transfer assembly to bring the fluid transfer connector septum and the container-septum into contact with each other and to selectively displace the fluid transfer connector into its collapsed position from the extended position; and a contact securing mechanism configured to prevent the manipulator from displacing the fluid transfer connector into its collapsed position from the extended position until a predetermined compression threshold between the container-septum and the fluid transfer connector septum is reached.

125. The robotic system according to embodiment 124, wherein the manipulator is configured to push at least one of the fluid transfer connector septum and the container-septum against the other one of the fluid transfer connector septum and the container-septum by a compression force with a variable magnitude.

126. The robotic system according to embodiment 125, wherein the contact securing mechanism is configured to prevent the manipulator from displacing the fluid transfer connector into its collapsed position from the extended position at least until the compression force is less than the predetermined compression threshold.

127. The robotic system according to embodiment 125 or 126, wherein the contact securing mechanism is configured to allow the manipulator to displace the fluid transfer connector into its collapsed position from the extended position at least when the compression force is equal to or more than the predetermined compression threshold.

128. The robotic system according to any one of embodiments 125 to 127, wherein the contact securing mechanism is configured to allow the manipulator to displace the fluid transfer connector into its collapsed position following detection of an event indicative that the compression force is equal to or more than the predetermined compression threshold.

129. The robotic system according to any one of embodiments 124 to 128 wherein the contact securing mechanism comprises a mechanical element.

130. The robotic system according to any one of embodiments 124 to 129, wherein the contact securing mechanism comprises a resisting member configured to resist the manipulator displacing the fluid transfer connector into its collapsed position.

131. The robotic system according to embodiment 130, wherein the manipulator comprises an engaging arm configured to engage the sleeve and a gripping arm configured to grip the body member, said engaging arm and gripping arm being configured to move relative to each other to displace the fluid transfer connector between the extend and collapsed position, wherein the engaging arm and the gripping arm are coupled to each other via the resisting member.

132. The robotic system according to embodiment 131, wherein the engaging arm and the gripping arm are configured to move towards each other to displace the fluid transfer connector into the collapsed position upon commencement of deformation of the resisting member.

133. The robotic system according to embodiment 132, wherein the resisting member is configured to prevent said deformation until a minimum threshold force is applied thereon.

134. The robotic system according to any one of embodiments 132 and 133, when dependent on embodiment 128, wherein the event comprises commencement of said deformation.

135. The robotic system according to according to any one of embodiments 132 to 134, further comprising a sensor configured to detect said commencement of deformation and to generate a signal indicative thereof.

136. The robotic system according to any one of embodiments 130 to 135, wherein the resisting member is configured to cause the manipulator to displace the fluid transfer connector into its extended position after completion of said transfer of fluid.

137. The robotic system according to any one of embodiments 124 to 136, further comprising a fluid transfer connector configured to establish fluid communication between the container and the fluid transfer assembly, said fluid transfer connector having a body member and a sleeve including a fluid transfer connector septum, the sleeve and the body member being displaceable relative to each other between an extended position, which is a normal position, and a collapsed position, at which the fluid transfer connector establishes said fluid communication.

138. A method for transferring fluid between a container accessible via a container-septum and a fluid transfer assembly accessible via a fluid transfer connector comprising a fluid transfer connector septum, the method, by operation of a robotic system, comprising:
 operating a manipulator of the robotic system for manipulating at least one of the container and the fluid transfer assembly to bring the fluid transfer connector septum and the container-septum into contact with each other;
 operating the manipulator for manipulating the fluid transfer assembly to press the fluid transfer connector septum onto the container-septum at least until a predetermined compression threshold between the container-septum and the fluid transfer connector septum is reached;
 operating the manipulator to displace, after the predetermined compression threshold is reached, the fluid transfer connector into its collapsed position, at which fluid communication between the container and the fluid transfer assembly is established, from its extended position, which is a normal position;
 performing said transfer of fluid between the fluid transfer assembly and the container.

139. The method according to embodiment 138, further comprising operating a contact securing mechanism to prevent the manipulator from displacing the fluid transfer connector into its collapsed position from the extended position at least until the predetermined compression threshold is reached.

140. A robotic system operable for transfer of fluid between a container accessible via a container-septum and a fluid transfer assembly accessible via a fluid transfer connector, the robotic system comprising:
 a controller;
 a manipulator operable by the controller and configured to manipulate at least one of the container and the fluid transfer assembly for establishing fluid communication therebetween;
 a sensor configured to monitor the operation of the manipulator and transmit a signal indicative of said monitoring.

141. The robotic system according to embodiment 140, wherein the manipulator comprises:
 a gripping arm configured to grip a gripping portion of the fluid transfer connector; and
 an engaging arm configured to engage an engaging portion of the fluid transfer connector, said engaging arm and said gripping arm being configured to move relative to each other for selectively establishing said fluid communication, wherein the sensor is configured to monitor said relative movement of said engaging arm and said gripping arm.

142. The robotic system according to embodiment 140, wherein the sensor is configured to monitor a relative position of at least one of the engaging arm and the gripping arm with respect to the other one of at least one of the engaging arm and the gripping arm.

143. The robotic system according to any one of embodiments 141 and 142, wherein the engaging arm is coupled to the gripping arm via a resisting member configured to resist said relative movement between the engaging arm and the gripping arm towards each other.

144. The robotic system according to embodiment 143, wherein the sensor is configured to monitor said resisting member.

145. The robotic system according to any one of embodiments 143 and 144, wherein the resisting member is configured to deform upon said relative movement between the engaging arm and the gripping arm.

146. The robotic system according to embodiment 145, wherein the sensor is configured to monitor said deformation of the resisting member.

147. The robotic system according to any one of embodiments 145 and 146, wherein the resisting member is configured to prevent commencement of said deformation at least until a force equal to or greater than a predetermined threshold is applied thereon.

148. The robotic system according to embodiment 147, wherein the sensor is configured to monitor said force.

149. The robotic system according to any one of embodiments 140 to 148, further comprising a motor configured to move the manipulator for performing said operation of the manipulator, said motor being configured to consume variable power for moving said manipulator, wherein the sensor is configured to monitor said power consumption.

150. The robotic system according to any one of embodiments 140 to 149, further comprising a fluid transfer connector configured to establish said fluid communication between the container and the fluid transfer assembly, said fluid transfer connector comprising a body member and a sleeve displaceable relative to each other between an extended position, which is a normal position, and a collapsed position, at which the fluid transfer connector establishes said fluid communication, wherein said manipulator is configured to displace the fluid transfer connector between its extended position and collapsed position.

151. The robotic system according to embodiment 150, wherein the fluid transfer connector comprises a fluid transfer conduit associated with the body member and a fluid transfer connector septum associated with the sleeve, said fluid transfer connector being configured to establish said fluid communication between the container and the fluid transfer assembly upon a fluid communication portion of the fluid transfer conduit is positioned at a reference location, wherein the controller is configured to receive said signal indicative of said monitoring and determine at least based thereupon whether or not the fluid communication portion is positioned at the reference location.

152. The robotic system according to embodiment 151, when dependent on embodiment 142, wherein the body member comprises the gripping portion and the sleeve comprises the engaging portion, wherein the controller is configured to make said determination based on the relative position of at least one of the engaging arm and the gripping arm with respect to the other one of at least one of the engaging arm and the gripping arm.

153. The robotic system according to embodiment 151, when dependent on embodiment 146, wherein the body member comprises the gripping portion and the sleeve comprises the engaging portion, wherein the controller is configured to make said determination based on the deformation of the resisting member.

154. The robotic system according to embodiment 151, when dependent on embodiment 148, wherein the body member comprises the gripping portion and the sleeve comprises the engaging portion, wherein the controller is configured to make said determination based on said monitoring of said force.

155. The robotic system according to embodiment 151, when dependent on embodiment 149, wherein the body member comprises the gripping portion and the sleeve comprises the engaging portion, wherein the controller is configured to make said determination based on said monitoring of said power consumption.

156. A method for transferring fluid between a container accessible via a container-septum and a fluid transfer assembly accessible via a fluid transfer connector, the method, by operation of a robotic system, comprising:
  controlling a manipulator of the robotic system to manipulate at least one of the container and the fluid transfer assembly for establishing fluid communication therebetween;
  monitoring by a sensor of the robotic system the operation of the manipulator; and
  transmitting by the sensor a signal indicative of said monitoring.

157. The method according to embodiment 156, further comprising:
  gripping by a gripping arm of the manipulator a gripping portion of the fluid transfer assembly;
  engaging by an engaging arm of the manipulator an engaging portion of the fluid transfer assembly;
  moving the engaging arm and the gripping arm relative to each other for selectively establishing said fluid communication;
  monitoring by the sensor said relative movement of the engaging arm and the gripping arm.

158. The method according to embodiment 157, wherein monitoring said relative movement of the engaging arm and the gripping arm comprises monitoring a relative position of at least one of the engaging arm and the gripping arm with respect to the other one of the engaging arm and the gripping arm.

159. The method according to any one of embodiments 157 and 158, wherein monitoring said relative movement of the engaging arm and the gripping arm comprises monitoring a resisting member of the robotic system configured to resist said relative movement between the engaging arm and the gripping arm towards each other.

160. The method according to embodiment 159, wherein monitoring the resisting member comprises monitoring a deformation of the resisting member.

161. The method according to any one of embodiments 159 and 160, wherein monitoring the resisting member comprises monitoring a force being applied on the resisting member.

162. The method according to any one of embodiments 156 to 161, wherein monitoring the operation of the manipulator comprises monitoring power consumption by a motor configured to move the manipulator for performing said operation.

163. The method according to any one of embodiments 156 to 162, wherein monitoring the operation of the manipulator comprises monitoring a relative movement between a sleeve and a body member of a fluid transfer connector of the robotic system and determining at least based on said monitoring whether or not a fluid communication portion of a fluid transfer conduit associated with the fluid transfer connector is positioned at the reference location associated with establishment of said fluid communication.

164. A robotic system operable for transfer of fluid between a container accessible via a container-septum and a fluid transfer assembly accessible via a fluid transfer connector, the robotic system comprising:
- a manipulator configured to manipulate at least one of the container and the fluid transfer assembly for establishing fluid communication therebetween;
- a motor configured to move the manipulator for establishing said fluid communication, said motor being configured to consume variable power for moving said manipulator; and
- a controller configured to monitor said power consumption and controlling the motor based at least thereon.

165. The robotic system according to embodiment 164, wherein the motor comprises a motor shaft operable to cause the movement of the manipulator and an encoder operable to detect a position of the motor shaft, wherein the controller is configured to control the motor based on a combination of said power consumption and the position of the motor shaft.

166. The robotic system according to any one of embodiments 164 and 165, wherein the controller is configured to predetermine at least one of an upper and lower range of power consumption, and to generate an alert upon detection of a deviation of the power consumption from the predetermined range.

167. The robotic system according to any one of embodiments 164 to 166, wherein the power consumption is measurable by a magnitude of current applied to the motor.

168. The robotic system according to any one of embodiments 164 to 167, further comprising a fluid transfer connector configured to establish said fluid communication between the container and the fluid transfer assembly, said fluid transfer connector comprising a body member and a sleeve displaceable relative to each other between an extended position, which is a normal position, and a collapsed position, at which the fluid transfer connector establishes said fluid communication, wherein said manipulator is configured to displace the fluid transfer connector between its extended position and collapsed position.

169. The robotic system according to embodiment 168, wherein the fluid transfer connector comprises a fluid transfer conduit associated with the body member and a fluid transfer connector septum associated with the sleeve, said fluid transfer connector being configured to establish said fluid communication between the container and the fluid transfer assembly upon a fluid communication portion of the fluid transfer conduit is positioned at a reference location, wherein the controller is configured to monitor a position of the fluid communication portion and to control the motor based at least thereon.

170. A method for transferring fluid between a container accessible via a container-septum and a fluid transfer assembly accessible via a fluid transfer connector, the method, by operation of a robotic system, comprising:
- controlling a manipulator of the robotic system to manipulate at least one of the container and the fluid transfer assembly for establishing fluid communication therebetween;
- operating a motor of the robotic system to move the manipulator for establishing said fluid communication, wherein said operating the motor comprises consuming variable power;
- monitoring by a controller of the robotic system said power consumption; and
- controlling the motor based at least on said monitoring.

171. The method according to embodiment 170, further comprising:
- operating a motor shaft of the motor to cause the movement of the manipulator; and
- detecting by an encoder of the motor a position of the motor shaft;
- wherein said controlling the motor based at least on said monitoring comprises controlling the motor based on a combination of said power consumption and the position of the motor shaft.

172. The robotic system according to any one of embodiments 170 and 171, wherein monitoring said power consumption comprises predetermining at least one of an upper and lower range of power consumption, and the method further comprises generating an alert upon detection of a deviation of the power consumption from the predetermined range.

173. A robotic system operable for transfer of fluid between a container accessible via a container-septum and a fluid transfer assembly accessible via a fluid transfer connector configured to establish fluid communication between the container and the fluid transfer assembly for said transfer of fluid, said fluid transfer connector comprising a body member and a sleeve displaceable relative to each other between an extended position, which is a normal position, and a collapsed position, at which the fluid transfer connector establishes said fluid communication, said fluid transfer connector comprising a fluid transfer connector septum positioned at a distal end of the sleeve and a fluid transfer conduit extending from a proximal end of the body member towards the fluid transfer connector septum, the robotic system comprising:
- a controller; and
- a manipulator controllable by the controller, the manipulator being configured to:
- apply a variable positioning force to manipulate the fluid transfer assembly through a positioning stage, during which the manipulator positions the fluid transfer assembly and/or the container to bring the fluid transfer connector septum and the container septum in contact with each other; and
- apply a variable penetration force to manipulate the fluid transfer assembly and/or the container through a penetration stage, during which at least a tip of the fluid transfer conduit penetrates at least partially through at least one of the container-septum and the fluid transfer connector septum, wherein a minimum value of the variable penetration force is greater than a maximum value of the variable positioning force.

174. The robotic system according to embodiment 173, wherein the positioning stage commences with initiation of the manipulator moving the fluid transfer assembly and/or the container and ends with the manipulator bringing the fluid transfer connector septum and the container septum in contact with each other, and the penetration stage commences with initiation of penetration of the tip of the fluid transfer conduit at least partially through at least one of the container-septum and the fluid transfer connector septum and ends with the fluid transfer connector displacing into its collapsed position.

175. The robotic system according to any one of embodiments 173 and 174, wherein the manipulator is further controllable by the controller to apply a variable collapsing force to manipulate the fluid transfer assembly through a collapsing stage, during which the sleeve and the body member are displaced relative to each other to reduce a distance between the fluid transfer connector septum and the body member, wherein the manipulator is further controllable by the controller to increase the variable collapsing force continuously during at least a portion of the collapsing stage.

176. The robotic system according to embodiment 175, wherein the collapsing stage commences with commencement of relative movement of the sleeve and the body member towards each other and ends with the fluid transfer connector displacing into its collapsed position.

177. The robotic system according to embodiment 176, when dependent on embodiment 174, wherein the collapsing stage at least partially overlaps with the penetration stage.

178. The robotic system according to embodiment 177, wherein the manipulator is further controllable by the controller to increase the variable collapsing force continuously during at least a portion of the collapsing stage prior to commencement of the penetration stage.

179. The robotic system according to any one of embodiments 175 to 178, wherein an initial value of the variable collapsing force is greater than the maximum value of the variable positioning force.

180. The robotic system according to any one of embodiments 173 to 179, wherein the manipulator is further controllable by the controller to apply a variable securing force to manipulate at least one of the fluid transfer assembly and the container through a contact securing stage, during which the manipulator secures the contact between the fluid transfer connector septum and the container septum.

181. The robotic system according to embodiment 180, wherein the contact securing stage commences with the manipulator bringing the fluid transfer connector septum and the container septum in contact with each other and ends with completion of the transfer of fluid.

182. The robotic system according to embodiment 181, when dependent on embodiment 174, wherein the contact securing stage at least partially overlaps with the penetration stage.

183. The robotic system according to any one of embodiments 181 and 182, when dependent on embodiment 176, wherein the contact securing stage at least partially overlaps with the collapsing stage.

184. The robotic system according to embodiment 183, wherein the manipulator is further controllable by the controller to increase the variable securing force at least prior to the commencement of the collapsing stage.

185. The robotic system according to any one of embodiments 183 and 184, wherein an initial value of the variable collapsing force is greater than an initial value of the variable securing force.

186. The robotic system according to any one of embodiments 173 to 185, further comprising the fluid transfer connector.

187. A method for transferring fluid between a container accessible via a container-septum and a fluid transfer assembly accessible via a fluid transfer connector configured to establish fluid communication between the container and the fluid transfer assembly for said transfer of fluid, said fluid transfer connector comprising a body member and a sleeve displaceable relative to each other between an extended position, which is a normal position, and a collapsed position, at which the fluid transfer connector establishes said fluid communication, said fluid transfer connector comprising a fluid transfer connector septum positioned at a distal end of the sleeve and a fluid transfer conduit extending from a proximal end of the body member towards the fluid transfer connector septum, the method, by operation of a robotic system, comprising:
 operating the robotic system to control a manipulator of the robotic system, including
 applying a variable positioning force to manipulate the fluid transfer assembly through a positioning stage, during which the manipulator positions the fluid transfer assembly and/or the container to bring the fluid transfer connector septum and the container septum in contact with each other; and
 applying a variable penetration force to manipulate the fluid transfer assembly and/or the container through a penetration stage, during which at least a tip of the fluid transfer conduit penetrates at least partially through at least one of the container-septum and the fluid transfer connector septum, wherein a minimum value of the variable penetration force is greater than a maximum value of the variable positioning force.

188. The method according to embodiment 187, wherein the positioning stage commences with initiation of the manipulator moving the fluid transfer assembly and/or the container and ends with the manipulator bringing the fluid transfer connector septum and the container septum in contact with each other, and the penetration stage commences with initiation of penetration of the tip of the fluid transfer conduit at least partially through at least one of the container-septum and the fluid transfer connector septum and ends with the fluid transfer connector displacing into its collapsed position.

189. The method according to any one of embodiments 187 and 189, wherein the method further comprises controlling the manipulator for applying a variable collapsing force to manipulate the fluid transfer assembly through a collapsing stage, during which the sleeve and the body member are displaced relative to each other to reduce a distance between the fluid transfer connector septum and the body member, wherein the method further comprises increasing the variable collapsing force continuously at least during a portion of the collapsing stage.

190. The method according to embodiment 189, wherein the collapsing stage commences with commencement of relative movement of the sleeve and the body member towards each other and ends with the fluid transfer connector displacing into its collapsed position.

191. The method according to embodiment 190, when dependent on embodiment 188, wherein the collapsing stage at least partially overlaps with the penetration stage.

192. The method according to embodiment 191, wherein the method further comprises increasing the variable collapsing force continuously during at least a portion of the collapsing stage prior to commencement of the penetration stage.

193. The method according to any one of embodiments 189 to 192, wherein an initial value of the variable collapsing force is greater than the maximum value of the variable positioning force.

194. The method according to any one of embodiments 187 to 193, wherein the method further comprises controlling the manipulator for applying a variable securing force to manipulate at least one of the fluid transfer assembly and the container through a contact securing stage, during which the manipulator secures the contact between the fluid transfer connector septum and the container septum.

195. The method according to embodiment 194, wherein the contact securing stage commences with the manipulator bringing the fluid transfer connector septum and the container septum in contact with each other and ends with completion of the transfer of fluid.

196. The method according to embodiment 195, when dependent on embodiment 188, wherein the contact securing stage at least partially overlaps with the penetration stage.

197. The method according to any one of embodiments 195 and 196, when dependent on embodiment 190, wherein the contact securing stage at least partially overlaps with the collapsing stage.

198. The method according to embodiment 197, wherein the method further comprises increasing the variable securing force at least prior to the commencement of the collapsing stage.

199. The method according to any one of embodiments 197 and 198, wherein an initial value of the variable collapsing force is greater than an initial value of the variable securing force.

200. A robotic system operable for transfer of fluid between a container accessible via a container-septum and a fluid transfer assembly accessible via a fluid transfer connector configured to establish fluid communication between the container and the fluid transfer assembly for said transfer of fluid, said fluid transfer connector comprising a body member and a sleeve displaceable relative to each other between an extended position, which is a normal position, and a collapsed position, at which the fluid transfer connector establishes said fluid communication, said fluid transfer connector comprising a fluid transfer connector septum positioned at a distal end of the sleeve, the robotic system comprising:
 a controller; and
 a manipulator controllable by the controller, the manipulator being configured to apply a variable collapsing force to manipulate the fluid transfer assembly through a collapsing stage, during which the sleeve and the body member are displaced relative to each other to reduce a distance between the fluid transfer connector septum and the body member,
 wherein the manipulator is further controllable by the controller and configured to increase the variable collapsing force continuously during at least a portion of the collapsing stage.

201. The robotic system according to embodiment 200, wherein the manipulator is further controllable by the controller and configured to increase the variable collapsing force continuously during at least a majority of the collapsing stage.

202. The robotic system according to any one of embodiments 200 and 201, wherein the collapsing stage commences with commencement of relative movement of the sleeve and the body member towards each other and ends with the fluid transfer connector displacing into its collapsed position.

203. The robotic system according to any one of embodiments 200 to 202, wherein the manipulator is further controllable by the controller and configured to apply a variable penetration force to manipulate the fluid transfer assembly and/or the container through a penetration stage, during which at least a tip of the fluid transfer conduit penetrates at least partially through at least one of the container-septum and the fluid transfer connector septum.

204. The robotic system according to embodiment 203, wherein the penetration stage commences with initiation of penetration of the tip of the fluid transfer conduit at least partially through at least one of the container-septum and the fluid transfer connector septum and ends with the fluid transfer connector displacing into its collapsed position.

205. The robotic system according to embodiment 204, wherein the collapsing stage at least partially overlaps with the penetration stage.

206. The robotic system according to embodiment 205, wherein the manipulator is further controllable by the controller and configured to increase the variable collapsing force at least prior to the commencement of the penetration stage.

207. The robotic system according to any one of embodiments 203 to 206, wherein an initial value of the variable penetration force is greater than an initial value of the variable collapsing force.

208. The robotic system according to any one of embodiments 200 to 207, wherein the manipulator is further controllable by the controller and configured to apply a variable positioning force to manipulate the fluid transfer assembly through a positioning stage, during which the manipulator positions the fluid transfer assembly and/or the container to bring the fluid transfer connector septum and the container septum in contact with each other.

209. The robotic system according to embodiment 208, wherein the positioning stage commences with initiation of the manipulator moving the fluid transfer assembly and/or the container and ends with the manipulator bringing the fluid transfer connector septum and the container septum in contact with each other.

210. The robotic system according to any one of embodiments 208 and 209, wherein a minimum value of the variable collapsing force is greater than a maximum value of the variable positioning force.

211. The robotic system according to any one of embodiments 208 to 210, when dependent on embodiment 203, wherein a minimum value of the variable penetration force is greater than a maximum value of the variable positioning force.

212. The robotic system according to any one of embodiments 200 to 211, wherein the manipulator is further controllable by the controller and configured to apply a variable securing force to manipulate at least one of the fluid transfer assembly and the container through a contact securing stage, during which the manipulator secures the contact between the fluid transfer connector septum and the container septum.

213. The robotic system according to embodiment 212, wherein the contact securing stage commences with the manipulator bringing the fluid transfer connector septum and the container septum in contact with each other and ends with completion of the transfer of fluid.

214. The robotic system according to any one of embodiments 212 and 213, wherein the contact securing stage at least partially overlaps with the collapsing stage.

215. The robotic system according to embodiment 214, wherein the manipulator is further controllable by the controller and configured to increase the variable securing force at least prior to the commencement of the collapsing stage.

216. The robotic system according to any one of embodiments 214 and 215, wherein an initial value of the variable collapsing force is greater than an initial value of the variable securing force.

217. The robotic system according to any one of embodiments 200 to 216, further comprising the fluid transfer connector.

218. A method for transferring fluid between a container accessible via a container-septum and a fluid transfer assembly accessible via a fluid transfer connector configured to establish fluid communication between the container and the fluid transfer assembly for said transfer of fluid, said fluid transfer connector comprising a body member and a sleeve displaceable relative to each other between an extended position, which is a normal position, and a collapsed position, at which the fluid transfer connector establishes said fluid communication, said fluid transfer connector comprising a fluid transfer connector septum positioned at a distal end of the sleeve and a fluid transfer conduit extending from a proximal end of the body member towards the fluid transfer connector septum, the method, by operation of a robotic system, comprising:

operating the robotic system to control a manipulator of the robotic system, including:

applying a variable collapsing force to manipulate the fluid transfer assembly through a collapsing stage, during which the sleeve and the body member are displaced relative to each other to reduce a distance between the fluid transfer connector septum and the body member; and increasing the variable collapsing force continuously during at least a portion of the collapsing stage.

219. The method according to embodiment 218, wherein the method comprises increasing the variable collapsing force continuously during least a majority of the collapsing stage.

220. The method according to any one of embodiments 218 and 219, wherein the collapsing stage commences with commencement of relative movement of the sleeve and the body member towards each other and ends with the fluid transfer connector displacing into its collapsed position.

221. The method according to any one of embodiments 218 to 220, wherein the method further comprises applying a variable penetration force to manipulate the fluid transfer assembly and/or the container through a penetration stage, during which at least a tip of the fluid transfer conduit penetrates at least partially through at least one of the container-septum and the fluid transfer connector septum.

222. The method according to embodiment 221, wherein the penetration stage commences with initiation of penetration of the tip of the fluid transfer conduit at least partially through at least one of the container-septum and the fluid transfer connector septum and ends with the fluid transfer connector displacing into its collapsed position.

223. The method according to embodiment 222, wherein the collapsing stage at least partially overlaps with the penetration stage.

224. The method according to embodiment 223, wherein the method further comprises increasing the variable collapsing force at least prior to the commencement of the penetration stage.

225. The method according to any one of embodiments 221 to 224, wherein an initial value of the variable penetration force is greater than an initial value of the variable collapsing force.

226. The method according to any one of embodiments 218 to 225, wherein the method further comprises applying a variable positioning force to manipulate the fluid transfer assembly through a positioning stage, during which the manipulator positions the fluid transfer assembly and/or the container to bring the fluid transfer connector septum and the container septum in contact with each other.

227. The method according to embodiment 226, wherein the positioning stage commences with initiation of the manipulator moving the fluid transfer assembly and/or the container and ends with the manipulator bringing the fluid transfer connector septum and the container septum in contact with each other.

228. The method according to any one of embodiments 226 and 227, wherein a minimum value of the variable collapsing force is greater than a maximum value of the variable positioning force.

229. The method according to any one of embodiments 226 to 228, when dependent on embodiment 221, wherein a minimum value of the variable penetration force is greater than a maximum value of the variable positioning force.

230. The method according to any one of embodiments 218 to 229, wherein the method further comprises applying a variable securing force to manipulate at least one of the fluid transfer assembly and the container through a contact securing stage, during which the manipulator secures the contact between the fluid transfer connector septum and the container septum.

231. The method according to embodiment 230, wherein the contact securing stage commences with the manipulator bringing the fluid transfer connector septum and the container septum in contact with each other and ends with completion of the transfer of fluid.

232. The method according to any one of embodiments 230 and 231, wherein the contact securing stage at least partially overlaps with the collapsing stage.

233. The method according to embodiment 232, wherein the method comprises increasing the variable securing force at least prior to the commencement of the collapsing stage.

234. The method according to any one of embodiments 232 and 233, wherein an initial value of the variable collapsing force is greater than an initial value of the variable securing force.

235. A robotic system operable for transfer of fluid between a container accessible via a container-septum and a fluid transfer assembly accessible via a fluid transfer connector configured to establish fluid communication between the container and the fluid transfer assembly for said transfer of fluid, said fluid transfer connector comprising a body member and a sleeve displaceable relative to each other between an extended position, which is a normal position, and a collapsed position, at which the fluid transfer connector establishes said fluid communication, said fluid transfer connector comprising a fluid transfer connector septum positioned at a distal end of the sleeve, the robotic system comprising:

a controller; and a manipulator controllable by the controller and configured to:

apply a variable securing force to manipulate at least one of the fluid transfer assembly and the container through a contact securing stage, during which the manipulator secures the contact between the fluid transfer connector septum and the container septum; and apply a variable collapsing force to manipulate the fluid transfer assembly through a collapsing stage, during which the sleeve and the body member are displaced relative to each other to reduce a distance between the fluid transfer connector septum and the body member, wherein an initial value of the variable collapsing force is greater than an initial value of the variable securing force.

236. The robotic system according to embodiment 235, wherein the contact securing stage commences with the manipulator bringing the fluid transfer connector septum and the container septum in contact with each other and ends with completion of the transfer of fluid, and the collapsing stage commences with commencement of relative movement of the sleeve and the body member towards each other and ends with the fluid transfer connector displacing into its collapsed position.

237. The robotic system according to embodiment 236, wherein the contact securing stage at least partially overlaps with the collapsing stage.

238. The robotic system according to embodiment 237, wherein the manipulator is further controllable by the controller and configured to increase the variable securing force at least prior to the commencement of the collapsing stage.

239. The robotic system according to any one of embodiments 235 to 238, wherein the manipulator is further controllable by the controller and configured to apply a variable positioning force to manipulate the fluid transfer assembly through a positioning stage, during which the manipulator positions the fluid transfer assembly and/or the container to bring the fluid transfer connector septum and the container septum in contact with each other.

240. The robotic system according to embodiment 239, wherein the positioning stage commences with initiation of the manipulator moving the fluid transfer assembly and/or the container and ends with the manipulator bringing the fluid transfer connector septum and the container septum in contact with each other.

241. The robotic system according to any one of embodiments 239 and 240, wherein a minimum value of the variable collapsing force is greater than a maximum value of the variable positioning force.

242. The robotic system according to any one of embodiments 235 to 241, wherein the manipulator is further controllable by the controller and configured to apply a variable penetration force to manipulate the fluid transfer assembly and/or the container through a penetration stage, during which at least a tip of the fluid transfer conduit penetrates at least partially through at least one of the container-septum and the fluid transfer connector septum.

243. The robotic system according to embodiment 242, wherein the penetration stage commences with initiation of penetration of the tip of the fluid transfer conduit at least partially through at least one of the container-septum and the fluid transfer connector septum and ends with the fluid transfer connector displacing into its collapsed position.

244. The robotic system according to embodiment 243, wherein the collapsing stage at least partially overlaps with the penetration stage.

245. The robotic system according to any one of embodiments 243 and 244, wherein the contact securing stage at least partially overlaps with the penetration stage.

246. The robotic system according to embodiment 245, wherein the manipulator is further controllable by the controller and configured to increase the variable collapsing force at least prior to the commencement of the penetration stage.

247. The robotic system according to any one of embodiments 242 to 246, wherein an initial value of the variable penetration force is greater than an initial value of the variable collapsing force.

248. The robotic system according to any one of embodiments 235 to 247, further comprising the fluid transfer connector.

249. A method for transferring fluid between a container accessible via a container-septum and a fluid transfer assembly accessible via a fluid transfer connector configured to establish fluid communication between the container and the fluid transfer assembly for said transfer of fluid, said fluid transfer connector comprising a body member and a sleeve displaceable relative to each other between an extended position, which is a normal position, and a collapsed position, at which the fluid transfer connector establishes said fluid communication, said fluid transfer connector comprising a fluid transfer connector septum positioned at a distal end of the sleeve and a fluid transfer conduit extending from a proximal end of the body member towards the fluid transfer connector septum, the method, by operation of a robotic system, comprising:

operating a robotic system to control a manipulator of the robotic system, including:

applying a variable securing force to manipulate at least one of the fluid transfer assembly and the container through a contact securing stage, during which the manipulator secures the contact between the fluid transfer connector septum and the container septum; and applying a variable collapsing force to manipulate the fluid transfer assembly through a collapsing stage, during which the sleeve and the body member are displaced relative to each other to reduce a distance between the fluid transfer connector septum and the body member, wherein an initial value of the variable collapsing force is greater than an initial value of the variable securing force.

250. The method according to embodiment 249, wherein the contact securing stage commences with the manipulator bringing the fluid transfer connector septum and the container septum in contact with each other and ends with completion of the transfer of fluid, and the collapsing stage commences with commencement of relative movement of the sleeve and the body member towards each other and ends with the fluid transfer connector displacing into its collapsed position.

251. The method according to embodiment 250, wherein the contact securing stage at least partially overlaps with the collapsing stage.

252. The robotic system according to embodiment 251, wherein the method further comprises increasing the variable securing force at least prior to the commencement of the collapsing stage.

253. The method according to any one of embodiments 249 to 252, wherein the method further comprises applying a variable positioning force to manipulate the fluid transfer assembly through a positioning stage, during which the manipulator positions the fluid transfer assembly and/or the container to bring the fluid transfer connector septum and the container septum in contact with each other.

254. The method according to embodiment 253, wherein the positioning stage commences with initiation of the manipulator moving the fluid transfer assembly and/or the container and ends with the manipulator bringing the fluid transfer connector septum and the container septum in contact with each other.

255. The method according to any one of embodiments 253 and 254, wherein a minimum value of the variable collapsing force is greater than a maximum value of the variable positioning force.

256. The method according to any one of embodiments 249 to 255, wherein the method further comprises applying a variable penetration force to manipulate the fluid transfer assembly and/or the container through a penetration stage, during which at least a tip of the fluid transfer conduit penetrates at least partially through at least one of the container-septum and the fluid transfer connector septum.

257. The method according to embodiment 256, wherein the penetration stage commences with initiation of penetration of the tip of the fluid transfer conduit at least partially through at least one of the container-septum and the fluid transfer connector septum and ends with the fluid transfer connector displacing into its collapsed position.

258. The method according to embodiment 257, wherein the collapsing stage at least partially overlaps with the penetration stage.

259. The method according to any one of embodiments 257 and 258, wherein the contact securing stage at least partially overlaps with the penetration stage.

260. The method according to embodiment 259, wherein the method further comprises increasing the variable collapsing force at least prior to the commencement of the penetration stage.

261. The method according to any one of embodiments 256 to 260, wherein an initial value of the variable penetration force is greater than an initial value of the variable collapsing force.

262. A robotic system operable for transfer of fluid between a container accessible via a container-septum and a fluid transfer assembly accessible via a fluid transfer connector configured to establish fluid communication between the container and the fluid transfer assembly for said transfer of fluid, said fluid transfer connector comprising a body member and a sleeve displaceable relative to each other between an extended position, which is a normal position, and a collapsed position, at which the fluid transfer connector establishes said fluid communication, said fluid transfer connector comprising a fluid transfer connector septum positioned at a distal end of the sleeve, the robotic system comprising:
  a controller; and
  a manipulator controllable by the controller and configured to:
    apply a variable positioning force to manipulate the fluid transfer assembly through a positioning stage, during which the manipulator positions the fluid transfer assembly and/or the container to bring the fluid transfer connector septum and the container septum in contact with each other; and
    apply a variable collapsing force to manipulate the fluid transfer assembly through a collapsing stage, during which the sleeve and the body member are displaced relative to each other to reduce a distance between the fluid transfer connector septum and the body member, wherein an initial value of the variable collapsing force is greater than a maximum value of the variable positioning force.

263. The robotic system according to embodiment 262, wherein the positioning stage commences with initiation of the manipulator moving the fluid transfer assembly and/or the container and ends with the manipulator bringing the fluid transfer connector septum and the container septum in contact with each other, and the collapsing stage commences with commencement of relative movement of the sleeve and the body member towards each other and ends with the fluid transfer connector displacing into its collapsed position.

264. The robotic system according to embodiment 263, wherein a minimum value of the variable collapsing force is greater than a maximum value of the variable positioning force.

265. The robotic system according to any one of embodiments 262 to 264, wherein the manipulator is further controllable by the controller and configured to apply a variable securing force to manipulate at least one of the fluid transfer assembly and the container through a contact securing stage, during which the manipulator secures the contact between the fluid transfer connector septum and the container septum.

266. The robotic system according to embodiment 265, wherein the contact securing stage commences with the manipulator bringing the fluid transfer connector septum and the container septum in contact with each other and ends with completion of the transfer of fluid.

267. The robotic system according to any one of embodiments 265 and 266, wherein the contact securing stage at least partially overlaps with the collapsing stage.

268. The robotic system according to embodiment 267, wherein the manipulator is further controllable by the controller and configured to increase the variable securing force at least prior to the commencement of the collapsing stage.

269. The robotic system according to any one of embodiments 267 and 268, wherein an initial value of the variable collapsing force is greater than an initial value of the variable securing force.

270. The robotic system according to any one of embodiments 262 to 269, wherein the manipulator is further controllable by the controller and configured to apply a variable penetration force to manipulate the fluid transfer assembly and/or the container through a penetration stage, during which at least a tip of the fluid transfer conduit penetrates at least partially through at least one of the container-septum and the fluid transfer connector septum.

271. The robotic system according to embodiment 270, wherein the penetration stage commences with initiation of penetration of the tip of the fluid transfer conduit at least partially through at least one of the container-septum and the fluid transfer connector septum and ends with the fluid transfer connector displacing into its collapsed position.

272. The robotic system according to embodiment 271, wherein the collapsing stage at least partially overlaps with the penetration stage.

273. The robotic system according to embodiment 272, wherein the manipulator is further controllable by the controller and configured to increase the variable collapsing force at least prior to the commencement of the penetration stage.

274. The robotic system according to any one of embodiments 270 to 273, wherein an initial value of the variable penetration force is greater than an initial value of the variable collapsing force.

275. The robotic system according to any one of embodiments 270 to 274, wherein a minimum value of the variable penetration force is greater than a maximum value of the variable positioning force.

276. The robotic system according to any one of embodiments 262 to 275, further comprising the fluid transfer connector.

277. A method for transferring fluid between a container accessible via a container-septum and a fluid transfer assembly accessible via a fluid transfer connector configured to establish fluid communication between the container and the fluid transfer assembly for said transfer of fluid, said fluid transfer connector comprising a body member and a sleeve displaceable relative to each other between an extended position, which is a normal position, and a collapsed position, at which the fluid transfer connector establishes said fluid communication, said fluid transfer connector comprising a fluid transfer connector septum positioned at a distal end of the sleeve and a fluid transfer conduit extending from a proximal end of the body member towards the fluid transfer connector septum, the method, by operation of a robotic system, comprising:
  operating a robotic system to control a manipulator of the robotic system, including:

applying a variable positioning force to manipulate the fluid transfer assembly through a positioning stage, during which the manipulator positions the fluid transfer assembly and/or the container to bring the fluid transfer connector septum and the container septum in contact with each other; and applying a variable collapsing force to manipulate the fluid transfer assembly through a collapsing stage, during which the sleeve and the body member are displaced relative to each other to reduce a distance between the fluid transfer connector septum and the body member, wherein an initial value of the variable collapsing force is greater than a maximum value of the variable positioning force.

278. The robotic system according to embodiment 277, wherein the positioning stage commences with initiation of the manipulator moving the fluid transfer assembly and/or the container and ends with the manipulator bringing the fluid transfer connector septum and the container septum in contact with each other, and the collapsing stage commences with commencement of relative movement of the sleeve and the body member towards each other and ends with the fluid transfer connector displacing into its collapsed position.

279. The robotic system according to embodiment 278, wherein a minimum value of the variable collapsing force is greater than a maximum value of the variable positioning force.

280. The robotic system according to any one of embodiments 277 to 279, wherein the method further comprises applying a variable securing force to manipulate at least one of the fluid transfer assembly and the container through a contact securing stage, during which the manipulator secures the contact between the fluid transfer connector septum and the container septum.

281. The robotic system according to embodiment 280, wherein the contact securing stage commences with the manipulator bringing the fluid transfer connector septum and the container septum in contact with each other and ends with completion of the transfer of fluid.

282. The robotic system according to any one of embodiments 280 and 281, wherein the contact securing stage at least partially overlaps with the collapsing stage.

283. The robotic system according to embodiment 282, wherein the method further comprises increasing the variable securing force at least prior to the commencement of the collapsing stage.

284. The robotic system according to any one of embodiments 282 and 283, wherein an initial value of the variable collapsing force is greater than an initial value of the variable securing force.

285. The robotic system according to any one of embodiments 282 to 284, wherein the method further comprises applying a variable penetration force to manipulate the fluid transfer assembly and/or the container through a penetration stage, during which at least a tip of the fluid transfer conduit penetrates at least partially through at least one of the container-septum and the fluid transfer connector septum.

286. The robotic system according to embodiment 285, wherein the penetration stage commences with initiation of penetration of the tip of the fluid transfer conduit at least partially through at least one of the container-septum and the fluid transfer connector septum and ends with the fluid transfer connector displacing into its collapsed position.

287. The robotic system according to embodiment 286, wherein the collapsing stage at least partially overlaps with the penetration stage.

288. The robotic system according to embodiment 287, wherein the method further comprises increasing the variable collapsing force at least prior to the commencement of the penetration stage.

289. The robotic system according to any one of embodiments 285 to 288, wherein an initial value of the variable penetration force is greater than an initial value of the variable collapsing force.

290. The robotic system according to any one of embodiments 285 to 289, wherein a minimum value of the variable penetration force is greater than a maximum value of the variable positioning force.

291. A robotic system operable for transfer of fluid between a container and a fluid transfer assembly, the robotic system comprising:
  a controller; and
  a manipulator controllable by the controller, the manipulator comprising:
    a gripping arm configured to grip a gripping portion of the fluid transfer assembly; and
    a supporting arm configured to support a supporting portion of the fluid transfer assembly at least prior to the gripping arm gripping the gripping portion.

292. The robotic system according to embodiment 291, wherein the robotic system is operable for transfer of fluid at least partially along an injection axis, and the supporting arm is configured to be stationary with respect to the injection axis.

293. The robotic system according to embodiment 291 or 292, wherein the gripping arm is configured to be displaceable with respect to the supporting arm, and the supporting arm is configured to be stationary with respect to the gripping arm.

294. The robotic system according to any one of embodiments 291 to 293, wherein the manipulator further comprises a plunger arm configured to engage a plunger flange portion of a fluid transfer unit of the fluid transfer assembly.

295. The robotic system according to any one of embodiments 291 to 294, wherein the manipulator further comprises an engaging arm configured to engage an engaging portion of the fluid transfer assembly.

296. The robotic system according to embodiment 295, wherein the engaging arm is configured to be displaceable with respect to the supporting arm and the supporting arm is configured to be stationary with respect to the engaging arm.

297. The robotic system according to any one of embodiments 291 to 296, wherein the manipulator comprises a body and the supporting arm comprises a projection projecting from the body.

298. A robotic system operable for transfer of fluid between a container and a fluid transfer assembly comprising a plunger flange portion, the robotic system comprising:
  a controller; and
  a manipulator controllable by the controller, the manipulator comprising a plunger support including at least a first plunger holding element and a second plunger holding element, the first plunger holding element being configured to accommodate a first plunger flange portion sized with a first flange dimension and the second plunger holding element being configured to accommodate a second plunger flange portion sized with a second flange dimension, different from the first flange dimension.

299. The robotic system according to embodiment 298, wherein the first plunger holding element comprises a first recess configured to receive therein the first plunger flange portion, said first recess being formed with a first receiving space having a first recess dimension corresponding to the first flange dimension, and the second plunger holding element comprises a second recess configured to receive therein the second plunger flange portion, said second recess being formed with a second receiving space having a second recess dimension corresponding to the second flange dimension and different from the first recess dimension.

300. The robotic system according to embodiment 298 or 299, wherein the plunger support further includes a third plunger holding element configured to accommodate a third plunger flange portion sized with a third flange dimension different from the first and the second flange dimensions, the third plunger holding element comprising a third recess configured to receive therein the third plunger flange portion, said third recess being formed with a third receiving space having a third recess dimension corresponding to the third flange dimension and different from the first and second recess dimensions.

301. A fluid transfer connector, comprising:
- a body member couplable to a fluid transfer unit at a unit coupling portion, the body member being shaped to define a body lumen;
- a fluid transfer conduit extending axially from the unit coupling portion into the body lumen, the fluid transfer conduit being configured to establish fluid communication with the fluid transfer unit when the fluid transfer unit is coupled to the unit coupling portion;
- a sleeve arranged coaxially relative to the body member;
- a fluid transfer connector septum mounted at a distal end of the sleeve,
- the sleeve and the body member being configured to move relative to each other between an extended position and a collapsed position; and
- a locking mechanism configured to switch between a locked state and an unlocked state for selectively enabling and preventing the relative movement of the sleeve and the body member, wherein the locking mechanism is configured to enable the relative movement between the sleeve and the body member from the extended position to the collapsed position upon activation of an actuator accessible through an external wall of the fluid transfer connector.

302. The fluid transfer connector according to embodiment 301, wherein the actuator is actuatable by application of a radial force thereon.

303. The fluid transfer connector according to any one of embodiments 301 and 302, wherein the actuator comprises an internal portion, disposed at least partially within one of the sleeve and the body member, and an actuation portion which is accessible via an opening formed on the other one of the sleeve and the body member, and
wherein application of a radial force on the actuation portion induces actuation of the locking mechanism at least from the locked state to the unlocked state for facilitating the movement of the body member with respect to the sleeve at least from the extended position to the collapsed position.

304. The fluid transfer connector according to any one of embodiments 301 to 303, wherein the external wall of the syringe connector comprises a protective surface configured to prevent manual access to the actuator.

305. The fluid transfer connector according to embodiment 304 when dependent on embodiment 303, wherein the protective surface comprises one or more protection elements surrounding the opening.

306. The fluid transfer connector according to any one of embodiments 301 to 305, wherein a fluid transfer connector inner surface is configured for axial, slidable movement of the actuator therealong for facilitating the movement between the extended position and the collapsed position.

307. The fluid transfer connector according to embodiment 306, wherein the actuator is configured:
- to be pressable by a radial force, thereby switching from the locked state to the unlocked state at the extended position; and
- for subsequent slidable axial movement along the inner surface for transitioning from the extended position to the collapsed position.

308. The fluid transfer connector according to any one of embodiments 301 to 307, wherein the fluid transfer connector septum comprises a throughgoing bore extending from a septum proximal surface to a septum distal surface and dimensioned for receiving the fluid transfer conduit.

309. The fluid transfer connector according to any one of embodiments 301 to 308, wherein the fluid transfer connector septum is formed as a monolith.

310. The fluid transfer connector according to any one of embodiments 301 to 309, wherein the external wall of the fluid transfer connector comprises a peripheral wall of the sleeve and terminates at a distal edge of the peripheral wall, said peripheral wall distal edge being axially spaced away from a mounting portion of the sleeve forming a gap therebetween, said sleeve mounting portion configured to mount the fluid transfer connector septum thereon.

311. The fluid transfer connector according to embodiment 310, wherein the peripheral wall is connected to the mounting portion via one or more beams.

312. The fluid transfer connector according to embodiment 311, wherein the fluid transfer connector has a longitudinal axis and the one or more beams comprise two oppositely facing beams such that the septum mounting portion extends along a plane perpendicular to the longitudinal axis in between the two oppositely facing beams.

313. A fluid transfer connector, comprising:
- a body member couplable to a fluid transfer unit at a unit coupling portion, the body member being shaped to define a body lumen;
- a fluid transfer conduit extending axially from the unit coupling portion into the body lumen, the fluid transfer unit being configured to establish fluid communication with the fluid transfer unit when the fluid transfer unit is coupled to the unit coupling portion;
- a sleeve arranged coaxially relative to the body member;
- a fluid transfer connector septum mounted at a distal end of the sleeve,
- the sleeve and the body member being configured to move relative to each other between an extended position and a collapsed position; and
- a locking mechanism configured to switch between a locked state and an unlocked state for selectively enabling and preventing the relative movement of the sleeve and the body member, wherein the locking mechanism is configured to enable the relative movement between the sleeve and the body member from the extended position to the collapsed position upon activation of an actuator, wherein said actuator is actuatable irrespective of an axial force applied onto the fluid transfer connector septum.

314. The fluid transfer connector according to embodiment 313, wherein said actuator is actuatable irrespective of the axial force applied onto the fluid transfer connector septum by a container septum.

315. The fluid transfer connector according to any one of embodiments 313 and 314, wherein said actuator is accessible through an external wall of the syringe connector.

316. The fluid transfer connector according to embodiment 315, wherein the actuator is actuatable by application of a radial force thereon.

317. The fluid transfer connector according to any one of embodiments 315 and 316, wherein the actuator comprises an internal portion, disposed at least partially within one of the sleeve and the body member, and an actuation portion which is accessible via an opening formed on the other one of the sleeve and the body member, and wherein application of a radial force on the actuation portion induces actuation of the locking mechanism at least from the locked state to the unlocked state for facilitating the movement of the body member with respect to the sleeve at least from the extended position to the collapsed position.

318. The fluid transfer connector according to any one of embodiments 313 to 317, wherein an external wall of the syringe connector comprises a protective surface configured to prevent manual access to the actuator.

319. The fluid transfer connector according to embodiment 318, wherein the protective surface comprises one or more protection elements surrounding the opening.

320. The fluid transfer connector according to embodiment 319, wherein a fluid transfer connector inner surface is configured for axial, slidable movement of the actuator therealong for facilitating the movement between the extended position and the collapsed position.

321. The fluid transfer connector according to embodiment 320, wherein actuator is configured:
   to be pressable by a radial force, thereby switching from the locked state to the unlocked state at the extended position; and
   for subsequent slidable axial movement along the inner surface for transitioning from the extended position to the collapsed position.

322. The fluid transfer connector according to any one of embodiments 313 to 321, wherein the fluid transfer connector septum comprises a throughgoing bore extending from a septum proximal surface to a septum distal surface and dimensioned for receiving the fluid transfer conduit.

323. The fluid transfer connector according to any one of embodiments 313 to 322, wherein the fluid transfer connector septum is formed as a monolith.

324. The fluid transfer connector according to any one of embodiments 313 to 323, wherein the external wall of the fluid transfer connector comprises a peripheral wall of the sleeve and terminates at a distal edge of the peripheral wall, said peripheral wall distal edge being axially spaced away from a mounting portion of the sleeve forming a gap therebetween, said sleeve mounting portion configured to mount the fluid transfer connector septum thereon.

325. The fluid transfer connector according to embodiment 324, wherein the peripheral wall is connected to the mounting portion via one or more beams.

326. The fluid transfer connector according to embodiment 325, wherein the fluid transfer connector has a longitudinal axis and the one or more beams comprise two oppositely facing beams such that the septum mounting portion extends along a plane perpendicular to the longitudinal axis in between the two oppositely facing beams.

327. The fluid transfer connector according to any one of embodiments 315 to 326, wherein the locking mechanism is configured to prevent manual access to the actuator.

328. A fluid transfer connector, comprising:
   a body member couplable to a fluid transfer unit at a unit coupling portion, the body member being shaped to define a body lumen comprising a longitudinal axis of the fluid transfer connector;
   a fluid transfer conduit extending axially from the unit coupling portion into the body lumen, the fluid transfer unit being configured to establish fluid communication with the fluid transfer unit when the fluid transfer unit is coupled to the unit coupling portion;
   a sleeve arranged coaxially relative to the body member and comprising a fluid transfer connector septum mounted at a distal end of the sleeve, the sleeve and the body member being configured to move relative to each other between an extended position and a collapsed position; and
   a locking mechanism configured to switch between a locked state and an unlocked state for selectively enabling and preventing the relative movement of the sleeve and the body member, wherein the locking mechanism in its locked state is configured to prevent the relative movement between the sleeve and the body member from the extended position to the collapsed position by an axial force applied on at least one of the body member and the sleeve in a direction parallel to the longitudinal axis.

329. The fluid transfer connector according to embodiment 328, wherein the locking mechanism is configured to switch from the locked state to the unlocked state upon application of a radial force applied thereon in a direction perpendicular to the longitudinal axis, and to enable in its unlocked state the relative movement of the sleeve and the body member.

330. The fluid transfer connector according to embodiment 328 or 329, wherein the locking mechanism comprises an actuator configured to prevent the locking mechanism from switching into its unlocked state from the locked state in response to said axial force.

331. The fluid transfer connector according to embodiment 330, when dependent on embodiment 329, wherein the actuator is configured to switch the locking mechanism from the locked state into the unlocked state in response to said radial force being applied thereon.

332. The fluid transfer connector according to embodiment 330 or 331, wherein the actuator comprises a lockable member and one of the sleeve and the body member comprises a locking member configured to selectively engage the lockable member in the locked state of the locking mechanism, said lockable member being configured to prevent its release from the locking member by said axial force.

333. The fluid transfer connector according to embodiment 332, when dependent on embodiment 329, wherein the lockable member is configured to be released from the locking member in response to said radial force.

334. A fluid transfer connector, comprising:
   a body member couplable to a fluid transfer unit at a unit coupling portion, the body member being shaped to define a body lumen;
   a fluid transfer conduit extending axially from the unit coupling portion into the body lumen, the fluid transfer conduit being configured to establish fluid communication with the fluid transfer unit when the fluid transfer unit is coupled to the unit coupling portion;
   a sleeve arranged coaxially relative to the body member;
   a fluid transfer connector septum mounted at a distal end of the sleeve, the sleeve and the body member being configured to move relative to each other between an extended position in which the fluid transfer connector septum is at an extended distance from the unit coupling portion and an intermediate position in which the fluid transfer connector septum is at an intermediate distance, smaller than the extended distance, from the unit coupling portion, smaller than the second distance, from the unit coupling portion; and a locking mechanism configured to switch between a locked state and an unlocked state to selectively enable and prevent a relative movement of the sleeve and the body member at the extended position and the intermediate position.

335. The fluid transfer connector according to embodiment 334, wherein the sleeve and the body member are configured to move relative to each other between at least one of the extended position and the intermediate position and a collapsed position in which the fluid transfer connector septum is at a collapsed distance, smaller than the intermediate distance, from the unit coupling portion.

336. The fluid transfer connector according to embodiment 335, wherein the sleeve and the body member are configured to move axially relative to each other to transition from at least one of the extended position and the intermediate position to the collapsed position.

337. The fluid transfer connector according to any one of embodiments 334 to 336, the locking mechanism is configured to selectively enable the movement of the sleeve relative to the body member from at least one of the extended position and the intermediate position upon activation of an actuator accessible through an external wall of the fluid transfer connector.

338. The fluid transfer connector according to embodiment 337, wherein the actuator is actuatable by application of a radial force thereon.

339. The fluid transfer connector according to any one of embodiments 337 and 338, wherein the actuator comprises an internal portion, disposed at least partially within one of the sleeve and the body member, and an actuation portion which is accessible via an opening formed on the other one of the sleeve and the body member, and wherein application of a radial force on the actuation portion induces actuation of the locking mechanism at least from the locked state to the unlocked state for facilitating the movement of the body member with respect to the sleeve from at least one of the extended position and the intermediate position.

340. The fluid transfer connector according to embodiment 339, wherein an external wall of the syringe connector comprises a protective surface configured to prevent manual access to the actuator.

341. The fluid transfer connector according to embodiment 340, wherein the protective surface comprises one or more protection elements surrounding the opening.

342. The fluid transfer connector according to embodiment 341, wherein a fluid transfer connector inner surface is configured for axial, slidable movement of the actuator therealong to facilitate the movement between the extended position and the collapsed position.

343. The fluid transfer connector according to embodiment 342, wherein the actuator is configured:

to be pressable by a radial force, thereby switching from the locked state to the unlocked state at, at least one of the extended position and the intermediate position; and for subsequent slidable axial movement along the inner surface for transitioning between the extended position and the intermediate position.

344. The fluid transfer connector according to any one of embodiments 337 to 343, wherein the fluid transfer connector septum comprises a thoroughgoing bore extending from a septum proximal surface to a septum distal surface and dimensioned for receiving the fluid transfer conduit.

345. The fluid transfer connector according to any one of embodiments 337 to 344, wherein the fluid transfer connector septum is formed as a monolith.

346. The fluid transfer connector according to any one of embodiments 337 to 345, wherein the external wall of the fluid transfer connector comprises a peripheral wall of the sleeve and terminates at a distal edge of the peripheral wall, said peripheral wall distal edge being axially spaced away from a mounting portion of the sleeve forming a gap therebetween, said sleeve mounting portion configured to mount the fluid transfer connector septum thereon.

347. The fluid transfer connector according to embodiment 346, wherein the peripheral wall is connected to the mounting portion via one or more beams.

348. The fluid transfer connector according to embodiment 347, wherein the fluid transfer connector has a longitudinal axis and the one or more beams comprise two oppositely facing beams such that the septum mounting portion extends along a plane perpendicular to the longitudinal axis in between the two oppositely facing beams.

349. The fluid transfer connector according to any one of embodiments 337 to 348, wherein the locking mechanism is configured to prevent manual access to the actuator.

350. A fluid transfer connector comprising:

a body member couplable to a fluid transfer unit at a unit coupling portion, the body member being shaped to define a body lumen;

a fluid transfer conduit extending axially from the unit coupling portion into the body lumen, the fluid transfer conduit being configured to establish fluid communication with the fluid transfer unit when the fluid transfer unit is connected to the unit coupling portion;

a sleeve arranged coaxially relative to the body member;

a fluid transfer connector septum mounted at a distal end of the sleeve;

the sleeve and the body member being configured to move relative to each other between an intermediate position in which the fluid transfer connector septum is at an intermediate distance from the unit coupling portion and a collapsed position in which the fluid transfer connector septum is at a collapsed distance, smaller than the intermediate distance, from the unit coupling portion; and a locking mechanism configured to switch between a locked state and an unlocked state to selectively enable and prevent a relative movement of the sleeve and the body member at the intermediate state, said locking mechanism being configured to selectively enable the relative movement of the sleeve and the body member upon activation of an actuator, at least to transition from the intermediate position to the collapsed position.

351. The fluid transfer connector according to embodiment 350, wherein the sleeve and the body member are configured to move relative to each other between at least one of the intermediate position and the collapsed position and an extended position in which the fluid transfer connector septum is at an extended distance, greater than the intermediate distance, from the unit coupling portion.

352. The fluid transfer connector according to any one of embodiments 350 and 351, wherein the locking mechanism comprises the actuator and said actuator includes an actuation portion accessible through an external wall of the fluid transfer connector.

353. The fluid transfer connector according to embodiment 352, wherein the actuator is actuatable by application of a radial force thereon.

354. The fluid transfer connector according to any one of embodiments 350 to 353, wherein the actuator comprises an internal portion, disposed at least partially within one of the sleeve and the body member, and an actuation portion which is accessible via an opening formed on the other one of the sleeve and the body member, and wherein application of a radial force on the actuation portion induces actuation of the locking mechanism at least from the locked state to the unlocked state for facilitating the movement of the body member with respect to the sleeve at least from the intermediate position to the collapsed position.

355. The fluid transfer connector according to embodiment 354, wherein an external wall of the syringe connector comprises a protective surface configured to prevent manual access to the actuator.

356. The fluid transfer connector according to embodiment 355, wherein the protective surface comprises one or more protection elements surrounding the opening.

357. The fluid transfer connector according to embodiment 356, wherein a fluid transfer connector inner surface is configured for axial, slidable movement of the actuator therealong for facilitating the movement between the extended position and the collapsed position.

358. The fluid transfer connector according to embodiment 357, wherein the protruding portion is configured:
to be pressable by a radial force, thereby switching from the locked state to the unlocked state at the intermediate position; and
for subsequent slidable axial movement along the inner surface for transitioning between the intermediate position and the collapsed position.

359. The fluid transfer connector according to any one of embodiments 350 to 358, wherein the fluid transfer connector septum comprises a thoroughgoing bore extending from a septum proximal surface to a septum distal surface and dimensioned for receiving the fluid transfer conduit.

360. The fluid transfer connector according to any one of embodiments 350 to 359, wherein the fluid transfer connector septum is formed as a monolith.

361. The fluid transfer connector according to any one of embodiments 350 to 360, wherein the external wall of the fluid transfer connector comprises a peripheral wall of the sleeve and terminates at a distal edge of the peripheral wall, said peripheral wall distal edge being axially spaced away from a mounting portion of the sleeve forming a gap therebetween, said sleeve mounting portion configured to mount the fluid transfer connector septum thereon.

362. The fluid transfer connector according to embodiment 361, wherein the peripheral wall is connected to the mounting portion via one or more beams.

363. The fluid transfer connector according to embodiment 362, wherein the fluid transfer connector has a longitudinal axis and the one or more beams comprise two oppositely facing beams such that the septum mounting portion extends along a plane perpendicular to the longitudinal axis in between the two oppositely facing beams.

364. The fluid transfer connector according to any one of embodiments 350 to 363, wherein the locking mechanism is configured to prevent manual access to the actuator.

365. The fluid transfer connector according to embodiment 351 or any one of embodiments 352 to 364 when dependent on embodiment 351, wherein the locking mechanism is configured to selectively enable the movement of the sleeve relative to the body member upon activation of the actuator, to transition from any one or more of:
the extended position to the intermediate position;
the intermediate position to the collapsed position; and
the collapsed position back to the intermediate position or the extended position.

366. A fluid transfer connector comprising:
a sleeve having a sleeve distal end; and
a fluid transfer connector septum mounted at the sleeve distal end and having a septum protruding portion axially protruding from the sleeve, said septum protruding portion being formed in a terraced-like shape.

367. The fluid transfer connector according to embodiment 366, wherein the septum protruding portion comprises a septum proximal portion having a first peripheral wall comprising a first circumference and a septum distal portion having a second peripheral wall comprising a second circumference, said second circumference being smaller than the first circumference.

368. The fluid transfer connector according to embodiment 367, wherein the second peripheral wall is inclined such that the second circumference recedes towards the septum distal surface.

369. The fluid transfer connector according to any one of embodiments 366 to 368, said sleeve being shaped to define a sleeve lumen, wherein the fluid transfer connector septum comprises a septum subsurface portion housed inside the sleeve lumen.

370. The fluid transfer connector according to embodiment 369, wherein the fluid transfer connector has a longitudinal axis and the septum subsurface portion comprises a recess formed to receive a protrusion medially extending from the sleeve towards the longitudinal axis.

371. The fluid transfer connector according to any one of embodiments 366 to 370, wherein the septum protruding portion has a length extending axially from the distal end of the sleeve to a septum distal surface, said length being at least 20 millimeters.

372. The fluid transfer connector according to any one of embodiments 366 to 371, wherein the septum protruding portion has a length extending axially from the distal end of the sleeve to a septum distal surface, said length being at least 30 millimeters.

373. The fluid transfer connector according to any one of embodiments 366 to 372, wherein the septum protruding portion has a length extending axially from the distal end of the sleeve to a septum distal surface, said length being in the range of at least 15-30 millimeters.

374. A fluid transfer connector extending between a connector proximal end and a connector distal end and configured to be connected to a fluid transfer unit at the connector proximal end, the fluid transfer connector comprising:
a connector body extending from the connector proximal end; and
a septum extending from the connector body and having a septum protruding portion protruding from the connector body towards the connector distal end, said septum protruding portion being formed in a terraced-like shape.

375. The fluid transfer connector according to embodiment 374, wherein the septum protruding portion comprises a septum proximal portion having a first peripheral wall with a first circumference and a septum distal portion having a second peripheral wall with a second circumference, said second circumference being smaller than the first circumference.

376. The fluid transfer connector according to embodiment 375, wherein the second peripheral wall is inclined such that the second circumference recedes towards the connector distal end.

377. The fluid transfer connector according to any one of embodiments 374 to 376, wherein the septum comprises a septum subsurface portion housed inside the connector body.

378. A robotic system operable for transfer of fluid between a container and a fluid transfer assembly accessible via a fluid transfer unit and a fluid transfer connector, said fluid transfer connector being configured to facilitate connection of the fluid transfer assembly with the container for said transfer of fluid, the robotic system comprising:
 a controller; and
 a manipulator controllable by the controller and configured to hold and manipulate the fluid transfer assembly, said manipulator being configured to hold the fluid transfer assembly at the fluid transfer connector.

379. The robotic system according to embodiment 378, wherein the manipulator comprises a gripping arm having at least one gripper element configured to grip a gripping portion of the fluid transfer connector.

380. The robotic system according to embodiment 378 or 379, wherein the manipulator comprises an engaging arm configured to engage an engaging portion of the fluid transfer connector.

381. The robotic system according to any one of embodiments 378 to 380, wherein the manipulator is configured to manipulate the fluid transfer assembly while maintaining the fluid transfer unit free of hold by the manipulator.

382. The robotic system according to any one of embodiments 378 to 381, wherein the manipulator is configured to manipulate the fluid transfer assembly while holding the fluid transfer assembly at a portion distant from the fluid transfer unit.

383. The robotic system according to any one of embodiments 378 to 382, wherein the manipulator is configured to manipulate the fluid transfer assembly to secure a contact between a fluid transfer connector septum and a container septum of the container while holding the fluid transfer assembly at the fluid transfer connector.

384. The robotic system according to any one of embodiments 378 to 383, further comprising a fluid transfer connector configured to connect to a fluid transfer unit of the fluid transfer assembly and to facilitate connection of the fluid transfer unit with the container for said transfer of fluid.

385. The robotic system according to embodiment 384, when dependent on embodiment 379, wherein the fluid transfer connector comprises a gripping portion configured to be gripped by the gripping arm of the manipulator.

386. The robotic system according to embodiment 385, wherein the gripping portion comprises at least one grip-able element configured to be gripped by the gripper element of the gripping arm.

387. The robotic system according to embodiment 386, wherein the at least one grip-able element comprises a protrusion and the gripper element comprises a corresponding recess configured to receive therein at least partially said protrusion.

388. The robotic system according to embodiment 386, wherein the gripper element comprises a protrusion and the grip-able element comprises a corresponding recess configured to receive therein at least partially said protrusion.

389. The robotic system according to any one of embodiments 384 to 388, wherein the fluid transfer connector comprises a fluid transfer connector septum, and the manipulator is configured to secure a contact between the fluid transfer connector septum and a container septum of the container.

390. A method for transferring fluid between a container accessible via a container-septum and a fluid transfer assembly accessible via a fluid transfer connector, the method, by operation of a robotic system, comprising operating the robotic system by controlling a manipulator of the robotic system to hold the fluid transfer connector and manipulate the fluid transfer assembly for performing said transfer of fluid.

391. A robotic system operable for transfer of fluid between a fluid transfer assembly and a first container and the fluid transfer assembly and a second container, the robotic system comprising:
 a first container holder configured to hold the first container and a second container holder configured to hold the second container, the first container holder being spaced apart by an arcuate path from the second container holder;
 a controller; and
 a rotatable manipulator, rotatable about its rotation axis and comprising a gripping arm configured to grip the fluid transfer assembly, said controller being configured to rotate the rotatable manipulator for moving the gripping arm, while gripping the fluid transfer assembly, between a first position and a second position along the arcuate path, the first position being aligned with the first container holder and the second position being aligned with the second container holder.

392. The robotic system according to embodiment 391, wherein the gripping arm is moved from the first position to the second position only along the arcuate path.

393. The robotic system according to embodiment 391 or 392, wherein the gripping arm is moved from the first position to the second position along the arcuate path in a single and continuous motion.

394. The robotic system according to any one of embodiments 391 to 393, wherein the first container holder is configured to hold the first container at a first distance from the rotation axis taken in a first direction perpendicular thereto, and the second container holder is configured to hold the second container at a second distance from the rotation axis taken in a second direction perpendicular thereto, said first distance being equal to said second distance.

395. The robotic system according to embodiment 394, wherein the first and second directions define an arcuate path angle therebetween, which corresponds to an arc length of the arcuate path between the first and the second positions.

396. The robotic system according to any one of embodiments 391 to 395, wherein the manipulator is configured to move at least a part of the fluid transfer assembly along a direction parallel to the rotation axis when the fluid transfer assembly is at, at least one of the first and second positions.

397. The robotic system according to any one of embodiments 391 to 396, wherein the manipulator is configured to establish a first fluid communication between the fluid transfer assembly and the first container, when the first container is held by the first container holder, and a second fluid communication between the fluid transfer assembly and the second container, when the second container is held by the second container holder.

398. The robotic system according to any one of embodiments 391 to 397, wherein each of the first and second container is accessible via a respective container-septum, said fluid transfer assembly comprises a gripping portion and a fluid transfer conduit configured to transfer fluid through the container-septum.

399. The robotic system according to any one of embodiments 391 to 398, wherein the first and second containers comprise any one of a vial and an IV bag.

400. The robotic system according to any one of embodiments 391 to 399, wherein the rotation axis is a longitudinal axis of the manipulator.

401. A robotic system operable for transfer of fluid between a container and a fluid transfer assembly which comprises: a syringe having a plunger flange and a fluid transfer conduit extending at least partially along an injection axis, for transferring the fluid upon displacement of the plunger flange, the robotic system comprising:
   a controller; and
   a manipulator controllable by the controller, the manipulator comprising:
      a plunger arm configured to engage the plunger flange; and
      a gripping arm configured to grip a gripping portion of the fluid transfer assembly, said plunger arm being displaceable with respect to the gripping arm along the injection axis and being configured to be displaced together with the gripping arm during at least a portion of a movement of the manipulator.

402. The robotic system according to embodiment 401, wherein the controller is configured to operate the manipulator to:
   move the gripping arm to align the fluid transfer assembly with the container, and
   move the plunger arm along the injection axis to displace the plunger flange for transferring of the fluid between the container and the syringe.

403. The robotic system according to embodiment 401 or 402, wherein the manipulator is constructed to mechanically couple the plunger arm with the gripping arm.

404. The robotic system according to any one of embodiments 401 to 403 wherein the manipulator, including the plunger arm and the gripping arm, is formed as a monolithic structure.

405. The robotic system according to any one of embodiments 401 to 404, wherein the controller is configured to control said plunger arm such that:
   the plunger arm grips the plunger flange; and
   the plunger arm axially displaces the plunger flange for transferring the fluid between the syringe and the container.

406. The robotic system according to any one of embodiments 401 to 405, wherein the manipulator has a central longitudinal axis and the injection axis is positioned away from the central longitudinal axis.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Figure 1A:
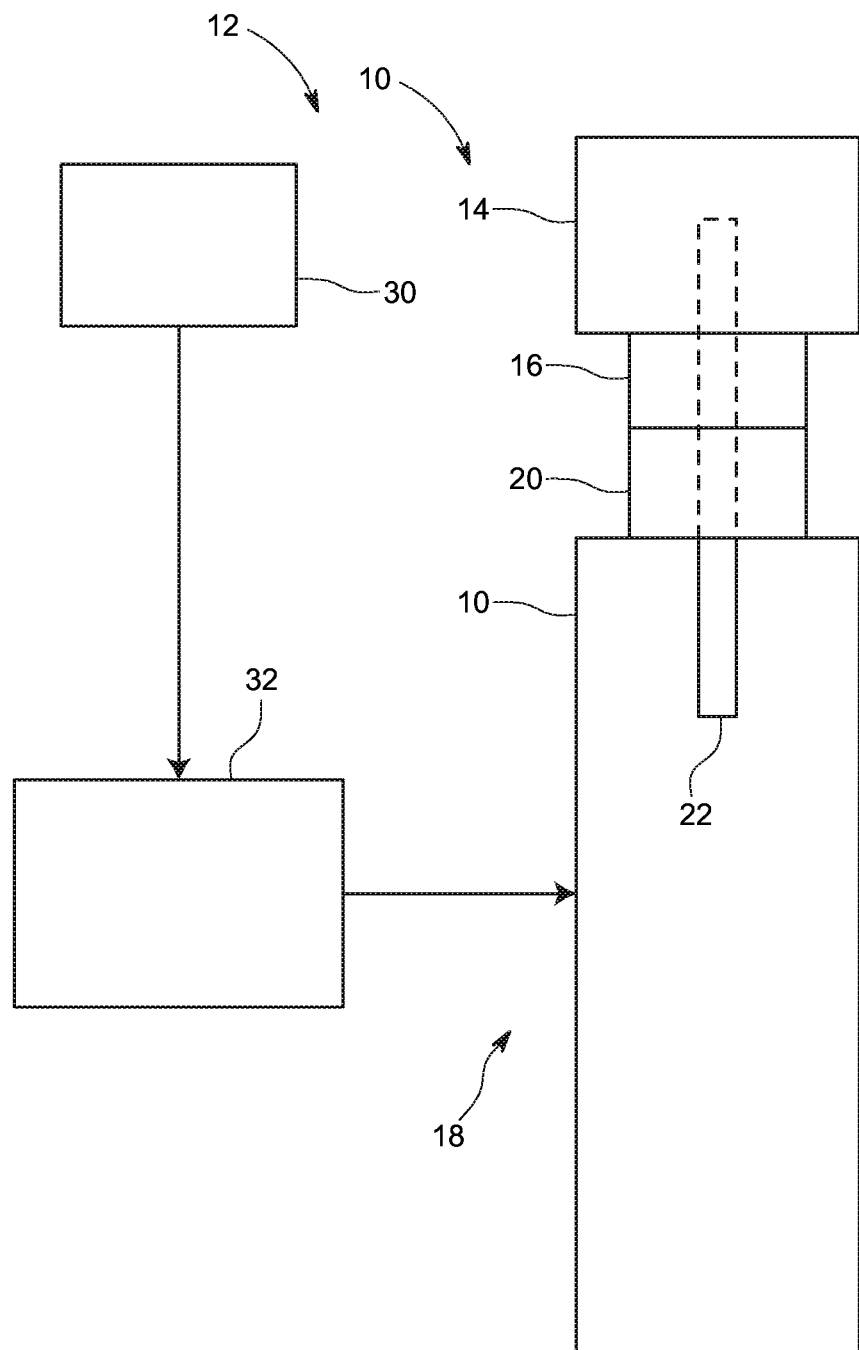
FIG. 1A is a block diagram illustration of a fluid transfer station within a robotic pharmaceutical preparation system according to an example of the presently disclosed subject matter.

The robotic pharmaceutical preparation systems and the fluid transfer stations described herein below with reference to the drawings are configured for performing the operations related to transfer of drugs between different fluid transfer apparatuses including containers, fluid transfer assemblies, connectors, conduits, pumps, syringes, vials, intravenous bags, adaptors, needles, etc. It is to be understood herein that the examples described in this description (with reference to the drawings and otherwise) have been described with reference to only a few components of the fluid transfer apparatuses out of all which are encompassed by the scope of the present subject matter for the purposes of conciseness and clarity of the present description. Various examples analogous to those described herein with different components of the fluid transfer apparatuses and with different robotic stations, including different combinations of the components of the fluid transfer apparatuses and the robotic stations, should be considered within the scope of the present description.

For instance, the container is described herein with reference to a vial and/or an intravenous bag, and it is to be understood that the container can be any other container being a component of a fluid transfer apparatus with or without an adaptor or connector for establishing fluid communication of the container with other fluid transfer components. For example, the container can constitute a container assembly having the container along with a container connector (or adaptor) for establishing the fluid communication of the container with other components of the fluid transfer apparatus. For example, the container can be a vial along with a vial adaptor, or an intravenous bag along with a spike adaptor. The container can be accessible via a container septum which can be a septum of the container lid or can be a part of the connector. In some examples, the container can be a syringe, a fluid transfer pipe, conduit, etc.

Similarly, the fluid transfer assembly is described herein with reference to a syringe assembly including a syringe and a syringe connector, and it is to be understood that that the fluid transfer assembly can include analogous components for transfer of drugs. In some examples, the fluid transfer assembly can include a pumping mechanism and a fluid transfer pipe configured to be connected to the container for the transfer of drug. In some examples, the fluid transfer assembly can include a fluid transfer connector (or adaptor) for establishing fluid communication between a fluid transfer unit (e.g. a fluid transfer pipe, conduit, pump, syringe, etc.) and the container. In some examples, the fluid transfer assembly may not include the fluid transfer connector and the fluid transfer connecter can constitute a part of the robotic system operating the fluid transfer assembly. In some examples, the fluid transfer assembly can include a vial or an intravenous bag for transfer of fluid with another container.

Further, in all of the examples described herein, the transfer of fluid is described being performed by a needle penetrating the container septum into the container. It is to be understood herein that in some examples the transfer of fluid can be performed without the needle penetrating through the container septum, namely by needleless fluid transfer, or optionally not penetrating even though a septum of the fluid transfer connector (associated with the fluid transfer assembly). In some examples, the fluid transfer can be performed even without a needle and via a fluid transfer conduit by controlled pressure of the fluid. For instance, the fluid transfer conduit may or may not include a needle, and if the fluid transfer conduit includes a needle, the needle may penetrate both septa fully, or may penetrate one septum fully and the other one partially, or may penetrate one septum partially and not at all the other one, or may not penetrate any septum at all.

The robotic system according to the presently disclosed subject matter is configured to handle and operate the containers and fluid transfer assemblies according to all of the different examples thereof as noted above to perform the transfer of fluid. For instance, although in all of the examples described herein, the robotic system is described as having a manipulator configured to manipulate the fluid transfer assembly (more specifically a syringe assembly), it is to be understood herein that the robotic system (and the manipulator) is configured to handle and manipulate either or both of the container and the fluid transfer assembly according to all of the examples thereof as noted above. Also, although in all of the examples described herein, the manipulator is described as a robotic arm, it is to be understood herein that the manipulator can be a platform, a robotic station, or the like having holders to hold the fluid transfer apparatus components and move them relatively to each other and perform the transfer of fluid.

Reference is now made to the drawings to explain in detail a specific example of the robotic system and components thereof. The detailed explanation of the specific example below is for purposes of illustration, and all the examples of the components of the fluid transfer apparatus is to be considered well within the scope of the present description.

FIG. 1A is a block diagram illustration of a fluid transfer station 10 within a robotic pharmaceutical preparation system 12. A robotic system may comprise an automatic or partially automatic system comprising a manipulator controlled, at least partially by a controller unit and may further comprise one or more driving assemblies for facilitating the movement of the manipulator, as will be further described. The pharmaceutical preparation system 12 comprises a robotic system operable for performing any activity related to preparation of drugs designated for administration to patients.

The fluid transfer station 10 is operable for transfer of fluid between a container 14 and a syringe assembly 18. In the illustrated example, the fluid transfer assembly is the syringe assembly 18. In some examples, the fluid transfer assembly can be a pipe or tubing set associated with a pump.

Figure 1B:
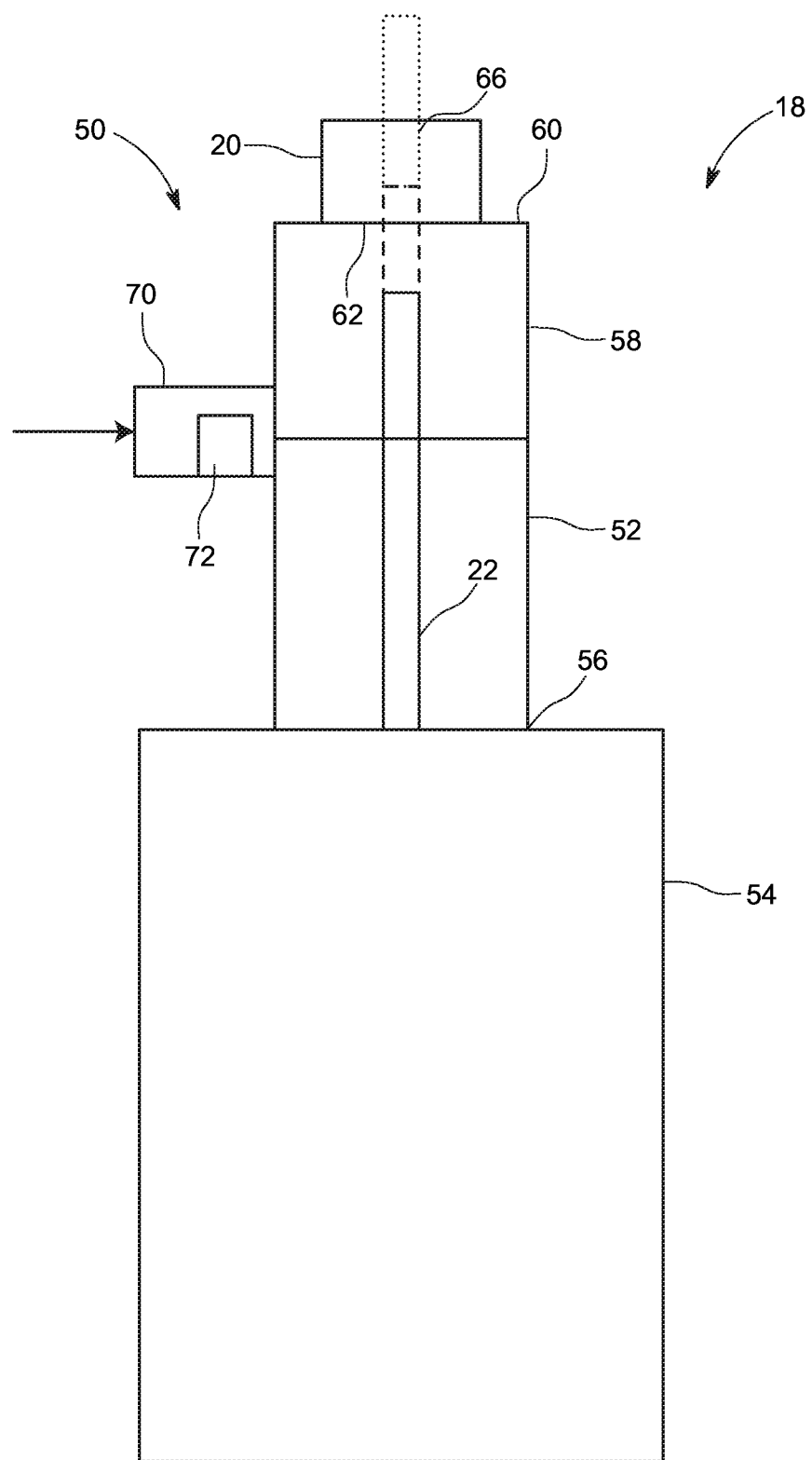
FIG. 1B is a block diagram illustration of some elements of a syringe connector configured to be deployed with a syringe used for transferring a fluid in the robotic pharmaceutical preparation system, according to an example of the presently disclosed subject matter.

The container 14 is configured to be accessible via a container-septum 16. In the embodiment of FIGS. 1A and 1B, the fluid transfer assembly is shown as syringe assembly 18. The syringe assembly 18 comprises a syringe-septum 20 which is displaceable relative to a needle 22. In other words, the syringe-septum 20 on the fluid transfer assembly 18 (also referred to as a fluid transfer connector septum 20) may prevent or resist access to a fluid transfer conduit, in this embodiment, the needle 22. The needle 22 is operable to extend into the container 14 via the syringe-septum 20 and the container-septum 16 for transfer of the fluid therethrough between the container 14 and the syringe assembly 18. In some examples, the syringe septum can constitute a part of the fluid transfer connector which constitutes a part of the robotic system and not the fluid transfer assembly. In some examples, the transfer of fluid can take place without the needle by fluid pressure though a slit formed in the septa. In some examples, the needle can be configured to extend any or both of the septa partially and not fully.

The container 14 may comprise any receptacle configured to contain a fluid therein, such a vial and an intravenous (IV) bag described hereinbelow or other types of containers, such as in a non-limiting example, pumps, e.g. dispensing pumps, elastomer pumps, infusion pumps, infusion containers, bottles, IV containers, IV bottles and/or closed or open system IV bottles.

The fluid typically comprises a drug, a diluent, saline solution or water or any other fluid used for drug compounding, or reconstituting. The drugs may be provided in powder or liquid phase.

The robotic pharmaceutical preparation system 12 comprises a controller unit 30 operable to control a manipulator 32. The manipulator 32 is operative to manipulate the syringe assembly 18 at least to secure contact between the container-septum 16 and the syringe-septum 20 such as by pressing the syringe-septum 20 against the container-septum 16. The contact is secured at least during the transfer of the fluid via the needle 22, while the needle 22 extends through the container-septum 16 and the syringe-septum 20 into the container 14 (the extended state of the needle is shown in dashed lines). In some examples, the manipulator can be configured to manipulate the container in alternative or in addition to the syringe assembly.

The container-septum 16 and the syringe-septum 20 may be formed of a resilient material which may be defined as a material capable of being elastically deformed and substantially rebound to its original shape following deformation thereof. The resilient container-septum 16 and the syringe-septum 20 are configured for being reversibly pierceable by the needle 22 and reconstituting to their original form also after being repeatedly pierced by the needle 22, so as to prevent microbial ingress into the syringe assembly 18 and the container 14 and/or to prevent cross contamination thereof. Furthermore, the contact between the container-septum 16 and the syringe-septum 20 is a sealed contact so as to prevent microbial ingress into the syringe assembly 18 and the container 14 and/or to prevent and cross contamination thereof. Also, the securing of the syringe-septum and container-septum via a robotic system may decrease formation of droplets at an interface of the syringe-septum and container-septum. It is noted that the container-septum 16 and the syringe-septum 20 may be configured to temporarily deform and expand radially upon being in tight sealed contact therebetween.

The container-septum 16 and the syringe-septum 20 may be formed of the same or different material.

In other terms, in accordance with some examples of the present subject matter, the robotic system 12 is operable for transferring fluid between the container 14 accessible via the container-septum 16 and the syringe assembly 18 comprising the syringe-septum 20. The syringe-septum 20 is displaceable relative to the needle 22 to allow the needle 22 to extend through the syringe-septum 20 and the container-septum 16. The robotic system 12 is operable for bringing the container-septum 16 into contact with the syringe-septum 20, and for extending the needle 22 through the container-septum 16 and the syringe-septum 20, for transferring fluid via the needle 22 while the needle 22 extends through the container-septum 16 and the syringe-septum 20. The robotic system 12 is operable for securing contact between the container-septum 16 and the syringe-septum 20 at least during the transfer of the fluid via the needle 22 while the needle 22 extends through the container-septum 16 and the syringe-septum 20, wherein securing contact between the container-septum 16 and the syringe-septum 20 is performed by the robotic system 12 pressing the container-septum 16 and syringe-septum 20 onto each other with a minimum force amounting to a compression threshold.

In some examples, securing contact between the container-septum 16 and the syringe-septum 20 is performed by the robotic system 12 pressing the container-septum 16 and syringe-septum 20 onto each other additionally during needle extension through the container-septum 16 and the syringe-septum 20 and during needle withdrawal therefrom.

Extending the needle 22 through the container-septum 16 and the syringe-septum 20 may follow reducing a predetermined axial distance between the syringe assembly 18 and the container 14, which causes the advancement of the needle 22 towards the container 14 and thereafter the aforementioned extension of the needle 22. Reducing the predetermined axial distance may be performed by advancing the syringe assembly 18 towards the container 14. Alternatively, reducing the predetermined axial distance may be performed by advancing the container 14 towards the syringe assembly 18. Additionally, in some examples, reducing the predetermined axial distance may be performed by advancing both the container 14 and the syringe assembly 18 towards each other.

The robotic system 12 may be operable for transferring fluid between the container 14 and the syringe assembly 18. In some examples, the robotic system comprises the manipulator 32 controlled by the controller unit 30. Bringing the container-septum 16 into contact with the syringe-septum 20 comprises engaging the manipulator 32 with a portion of the syringe assembly 18 (e.g. by gripping the syringe assembly) and coaxially positioning the syringe assembly 18 with the container-septum 16 at the abovementioned predetermined axial distance from the container 14.

The robotic pharmaceutical preparation system 12 may be deployed for preparation of any type of drug, including a hazardous drug which is prepared in closed systems, as well as non-hazardous drugs.

In some examples, the container-septum 16 may comprise an auxiliary septum added to a conventional container. The auxiliary septum may generally be mounted to the container via a housing such as a container connector. For example, the vial may comprise a vial adaptor comprising an auxiliary adaptor-septum.

In some examples, the container-septum 16 may comprise the conventional septum of a commercially available container, such as the preexisting rubber closure of a vial or a preexisting medicine port of an IV bag. Preexisting container-septum 16, and particularly preexisting IV bag medicine ports (500 in FIG. 12A), are available at various diameters and lengths. As described hereinabove, in conventional robotic or non-robotic pharmaceutical preparation systems the container-septum is housed in a designated manufactured container connector (also referred to as an "adaptor") designed to fit a port of a predefined dimension (e.g. diameter and/or length). Accordingly, use of a variety of IV bags or vials formed with differently dimensioned ports or connected to different adaptors (for example from different manufacturers) is precluded in such pharmaceutical preparation systems. Furthermore, the preexisting medicine port of the IV bag may be manufactured to protrude from various locations on the IV bag, such as from its edge or from its center (e.g. a "bellybutton" IV bag). Therefore, it is difficult to mount a container connector onto the preexisting IV bag medicine port.

In accordance with the present application, the contact between syringe-septum 20 and the container-septum 16 is established and secured by the manipulator 32 which is configured to align and maintain the secure contact while being positioned away from both the syringe-septum 20 and the container-septum 16. The manipulator 32 is operable to apply a sufficient magnitude of force to maintain the secure contact, without requiring auxiliary fixing (i.e. securing) means, which would limit the drug transferring to a predefined, particular port dimension. Accordingly, the robotic pharmaceutical preparation system of the present application facilitates transferring drugs while utilizing containers of a wide variety of dimensions, without being limited to a predefined container dimension or port dimension.

Additionally, eliminating the IV bag connector (and/or vial connector) reduces reliance on auxiliary parts which may malfunction thereby preventing proper fluid transfer.

In some examples, the contact between syringe-septum 20 and the container-septum 16 is secured at least mainly due to application of an axial force by the manipulator 32 on the syringe assembly 18 and/or the container. The manipulator 32 may be configured to engage the syringe assembly 18 or the container 14 at any engaging portion thereof, preferably excluding the syringe-septum 20 and the container-septum 16. The manipulator 32 may be configured to press the syringe-septum 20 against the container-septum 16 by indirectly applying an axial force on the syringe-septum 20, such as by applying the axial force on the engaging portion which is spaced apart (e.g. axially) from the syringe-septum 20 and the container-septum 16.

In some examples, the syringe assembly 18 may comprise a syringe connector. The syringe septum 20 may be mounted on the syringe connector. The syringe-connector may comprise any suitable configuration. An exemplary syringe-connector is described in reference to FIG. 1B.

FIG. 1B is a block diagram illustration of some elements of a syringe connector 50, which may constitute a part of the syringe assembly 18 or the robotic system. The syringe connector 50 comprises a body member 52 shaped to define a body lumen. The body member 52 is couplable to a syringe 54 (which in the illustrated example is a fluid transfer unit) at a syringe coupling portion 56. A sleeve 58 is arranged coaxially relative to the body member 52 and the syringe septum 20 is mounted at a distal end 60 of the sleeve 58. The needle 22 extends axially from the syringe coupling portion 56 into the body lumen and is configured to establish fluid communication with the syringe 54 when the syringe 54 is coupled to the syringe coupling portion 56.

The sleeve 58 and the body member 52 are configured to move relative to each other between at least one of the following positions: (i) an extended position in which a needle tip is proximal to a septum proximal surface 62 (shown in solid lines), (ii) an intermediate position in which the needle tip is enclosed inside the syringe-septum 20 (shown in dashed lines), and (iii) a collapsed position in which the needle tip protrudes beyond a septum distal surface 66 (shown in dotted lines).

In some examples, transitioning from any one of the extended position and the intermediate position to the collapsed position and from the collapsed position to the intermediate position may be performed by the sleeve 58 configured to move only axially relative to the body member 52. In some examples, transitioning from any one of the extended position and the intermediate position to the collapsed position and from the collapsed position to the intermediate position may be performed by the sleeve 58 configured to rotate about the longitudinal axis Lx1 (3B) and/or move axially relative to the body member 52.

In some examples, the syringe connector may not contain the needle, or the needle may not penetrate any of the septa at all, and the fluid transfer can be performed by virtue of fluid pressure though a slit formed in the septa. In such examples as well, the fluid communication between the syringe assembly and the container is established when the syringe connector displaces into its collapsed position and the extended position is the normal position of the syringe connector. In some examples, the extended position is for the purposes of sterilization during manufacturing and/or testing, and following the sterilization, the syringe connector can be brought into its intermediate position. In such examples, the syringe connector is used in the robotic system starting from its intermediate position (and the extended position is obviated), which is then the normal position. In the extended state, the syringe septum is at an extended distance from a proximal portion of the syringe connector at which the syringe is coupled. In the intermediate state, the syringe septum is at an intermediate distance, smaller than the extended distance, from the proximal portion of the syringe connector at which the syringe is coupled. In the collapsed state, the syringe septum is at a collapsed distance, smaller than the intermediate distance, from the proximal portion of the syringe connector at which the syringe is coupled.

The syringe connector 50 may comprise a locking mechanism 70 configured to lock the sleeve 58 into the body member 52 at one or more of the extended position and the intermediate position (or the collapsed position or any other position). The locking mechanism is configured to selectively enable and prevent the movement of the sleeve 58 relative to the body member 52 from the extended position upon activation of an actuator 72. In some examples, the actuator 72 is actuatable irrespective of the syringe connector 50 being connected to any auxiliary septum. The auxiliary septum may comprise the container-septum 16 or a septum unengaged with a container 14, such as a stand-alone septum or a septum engaged with another component, such as a septum engaged with an adaptor or connector.

Accordingly, there is provided a syringe connector 50 operable to be positioned in at least one of the abovementioned extended, intermediate or collapsed positions. The syringe connector 50 comprises the locking mechanism 70 activated by the actuator 72 for locking the syringe connector 50 in the extended or intermediate position and for facilitating the transitioning to another position.

It is noted that in known syringe connectors controlling the position of the needle 22 with respect to the syringe-septum is not trivial for various reasons, such as due to imprecise tolerances of the syringe connector. In contrast, the locking mechanism 70 described herein facilitates substantially precise control of the position of the needle tip with respect the syringe septum 20, so as to be positioned in any one of the following positions: proximal to the septum proximal surface 62 in the extended position; enclosed inside the syringe-septum 20 in the intermediate position and protruding beyond the septum distal surface 66 in the collapsed position.

The syringe connector 50 may be deployed in conventional robotic systems and/or in the robotic pharmaceutical preparation system 12 of the present application.

It is noted that the robotic pharmaceutical preparation system 12 of the present application may utilize the syringe connector 50 described herein or any other type of syringe connector.

In some examples, a syringe connector may comprise the mutually collapsible portions, such as the sleeve 58 and the body member 52 yet may not include the locking mechanism 70. The robotic pharmaceutical preparation system 12 may be operable for fluid transfer utilizing such a syringe connector lacking the locking mechanism 70.

In another example, a syringe connector may comprise a locking mechanism 70 being configured to be actuated at any stage of the fluid transfer operation. In the operational steps described in reference to FIGS. 6A-15C, the actuation of the locking mechanism 70 is described to be performed at an initial first operational step, described in reference to FIGS. 6A-C. It is appreciated that the robotic pharmaceutical preparation system 12 may be configured to actuate the locking mechanism 70 at any stage, such as any time prior to extension of the needle 22 into the container 14, for example.

The syringe connector 50 may be configured in any suitable manner. One exemplary configuration is described in reference to FIGS. 2A-H.

As seen in FIGS. 2A-H, a syringe connector 50 comprises the sleeve 58 arranged coaxially relative to the body member 52 and comprising the syringe-septum 20 mounted at the distal end 60 of the sleeve 58. The body member 52 is shaped to define a body lumen and is couplable to syringe 54 (1B) at the syringe coupling portion 56. The needle 22 extends axially from the syringe coupling portion 56 into the body lumen.

Figure 2A:
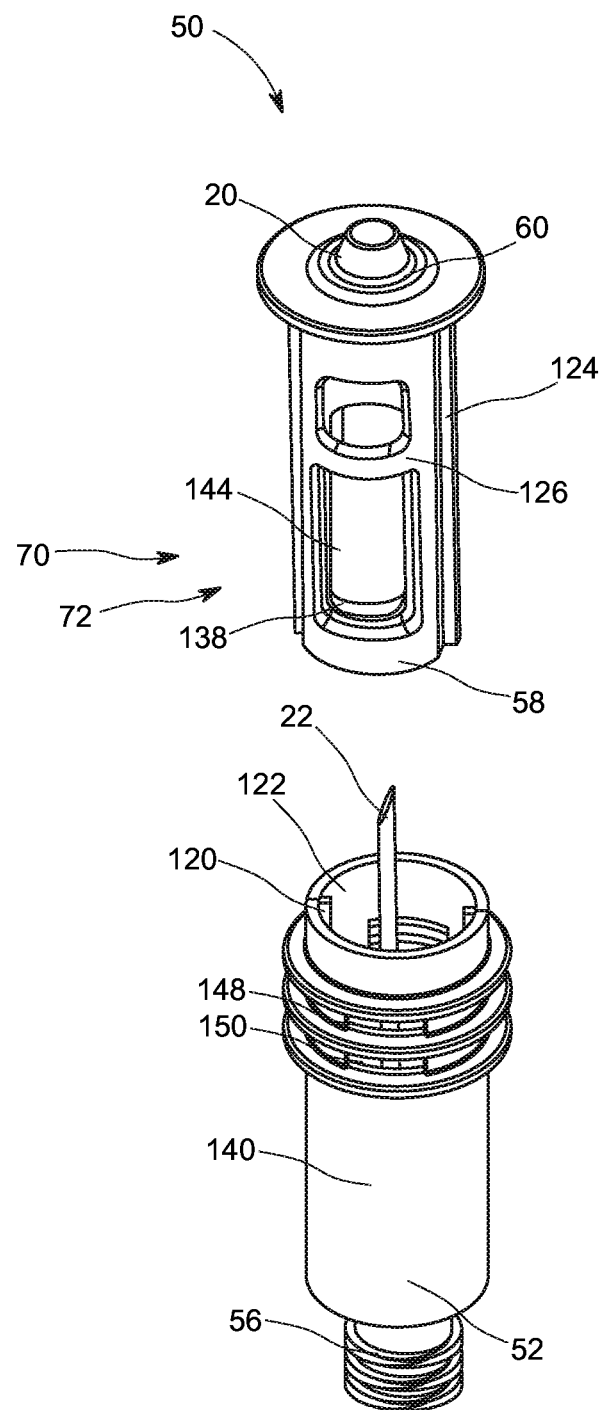
FIGS. 2A-F are illustrations of a syringe connector configured to be deployed with a syringe used for transferring a fluid in the robotic pharmaceutical preparation system, shown at an extended position at a front view, in a partially disassembled state (2A), in an assembled state (2B), a cross-sectional illustration of FIG. 2B (2C); and a side view in a partially disassembled state (2D), in an assembled state (2E) and a cross-sectional illustration of FIG. 2E (2F), according to an example of the presently disclosed subject matter.
Figure 2B:
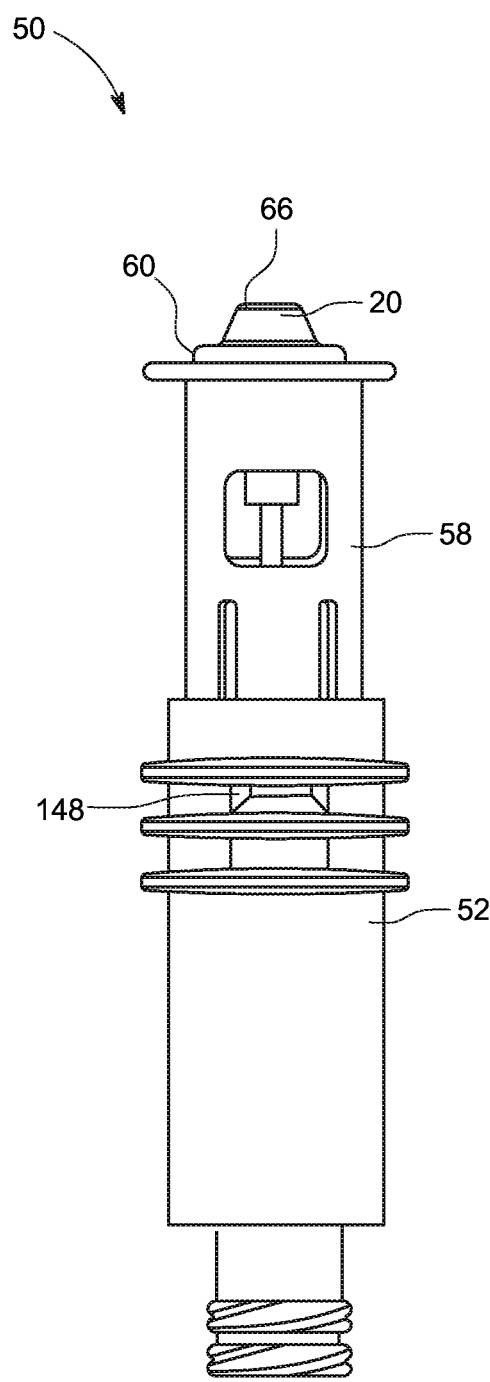
Figure 2C:
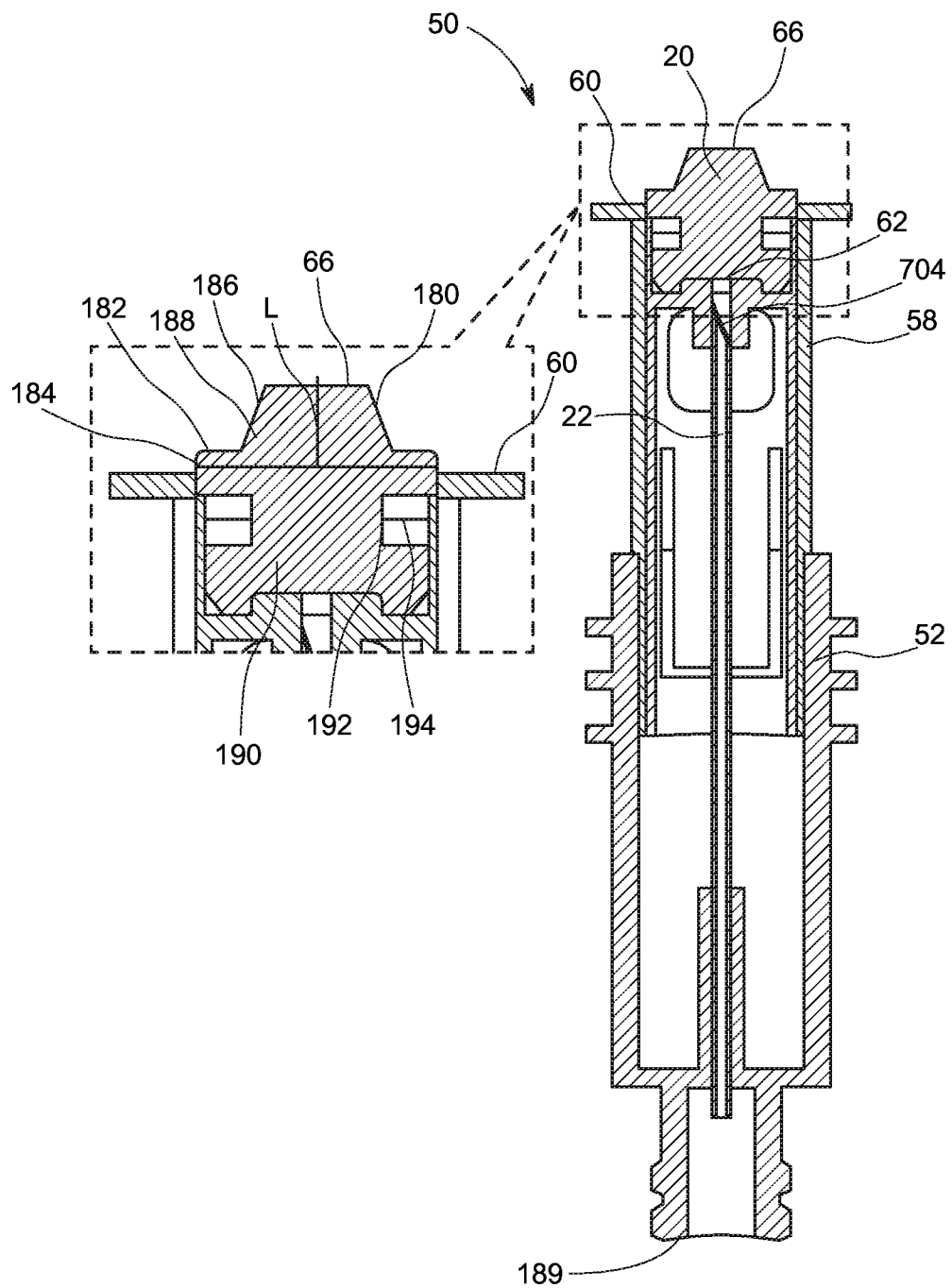
Figure 2D:
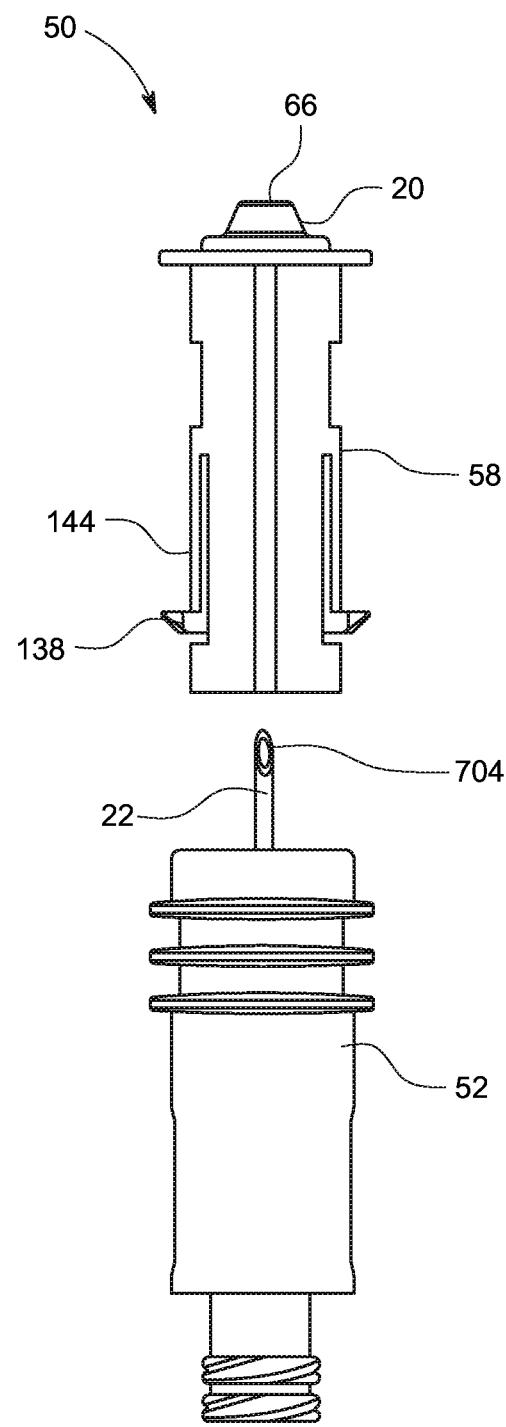
Figure 2E:
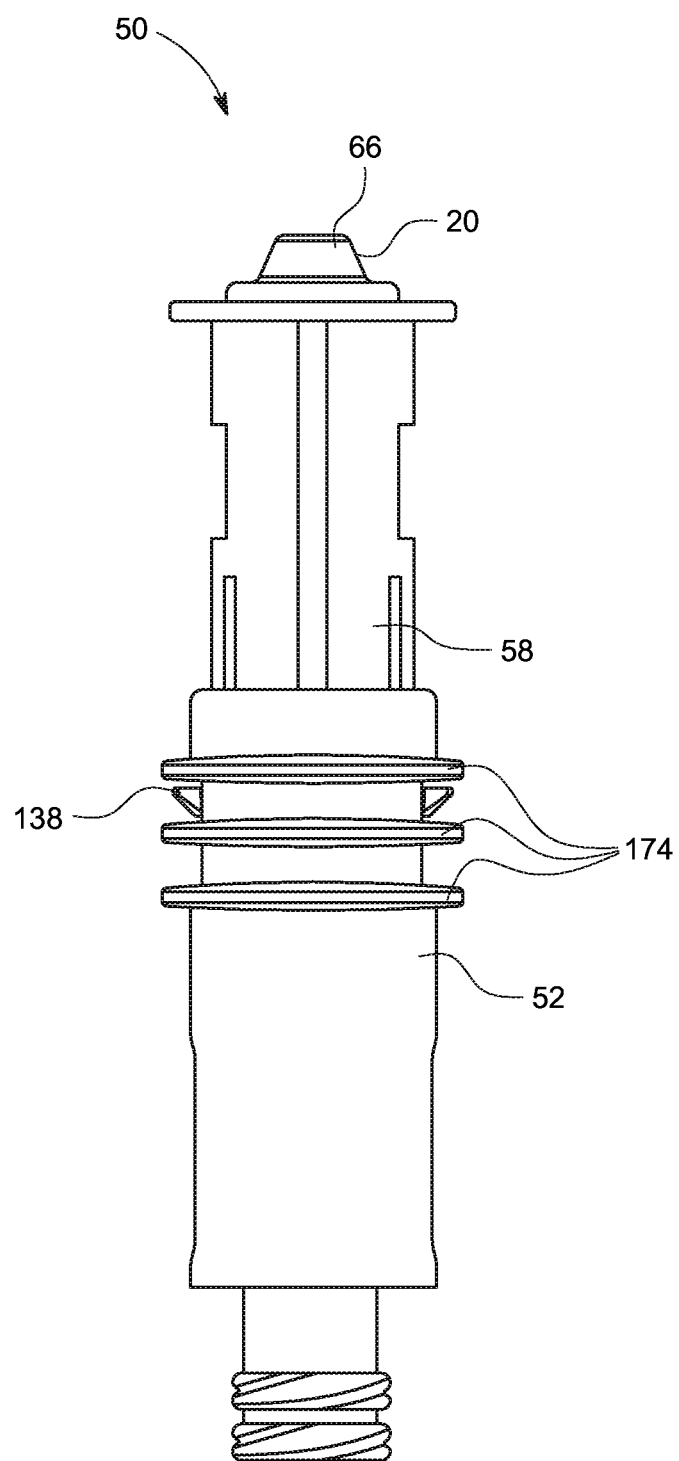
Figure 2F:
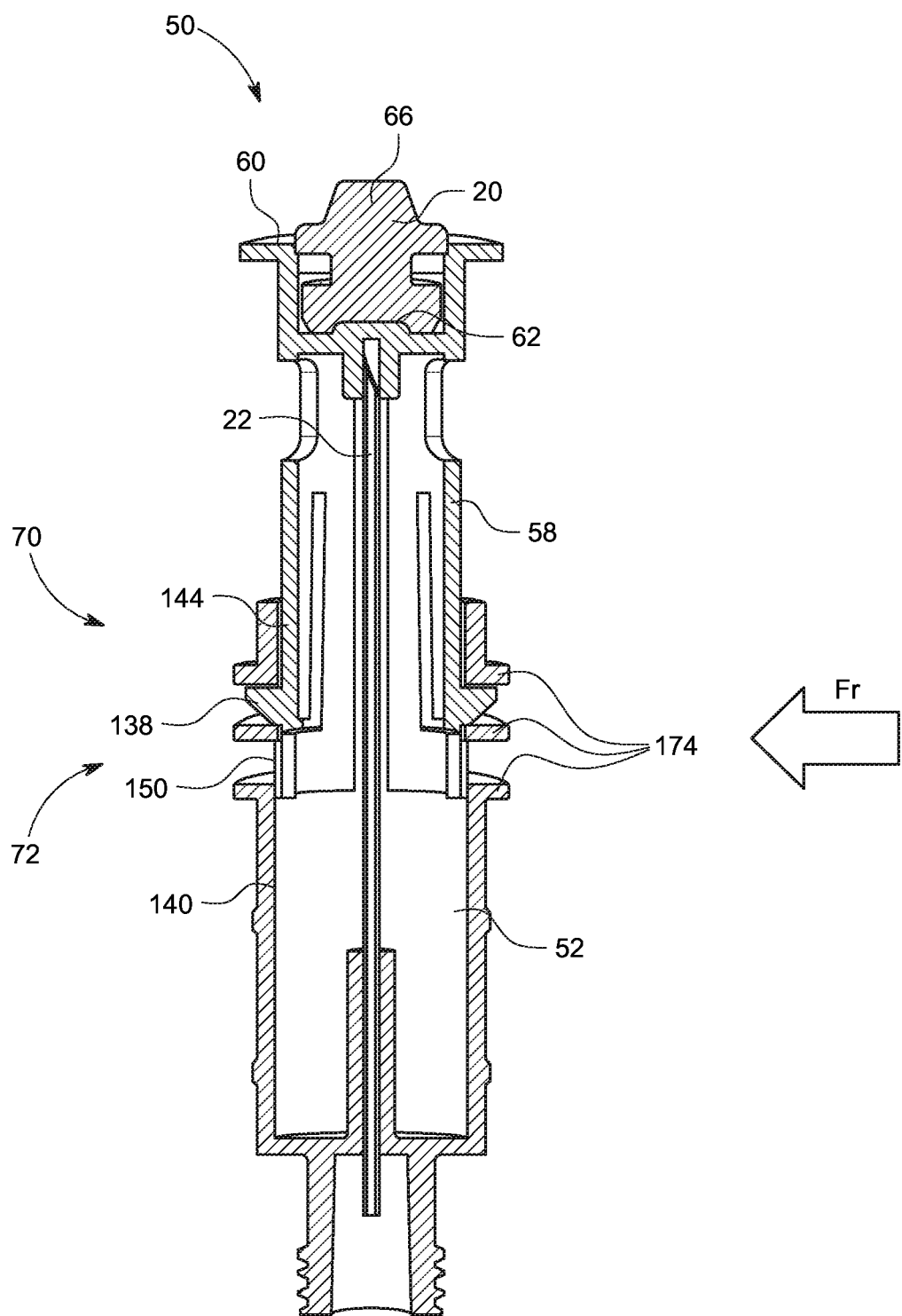
Figure 2G:
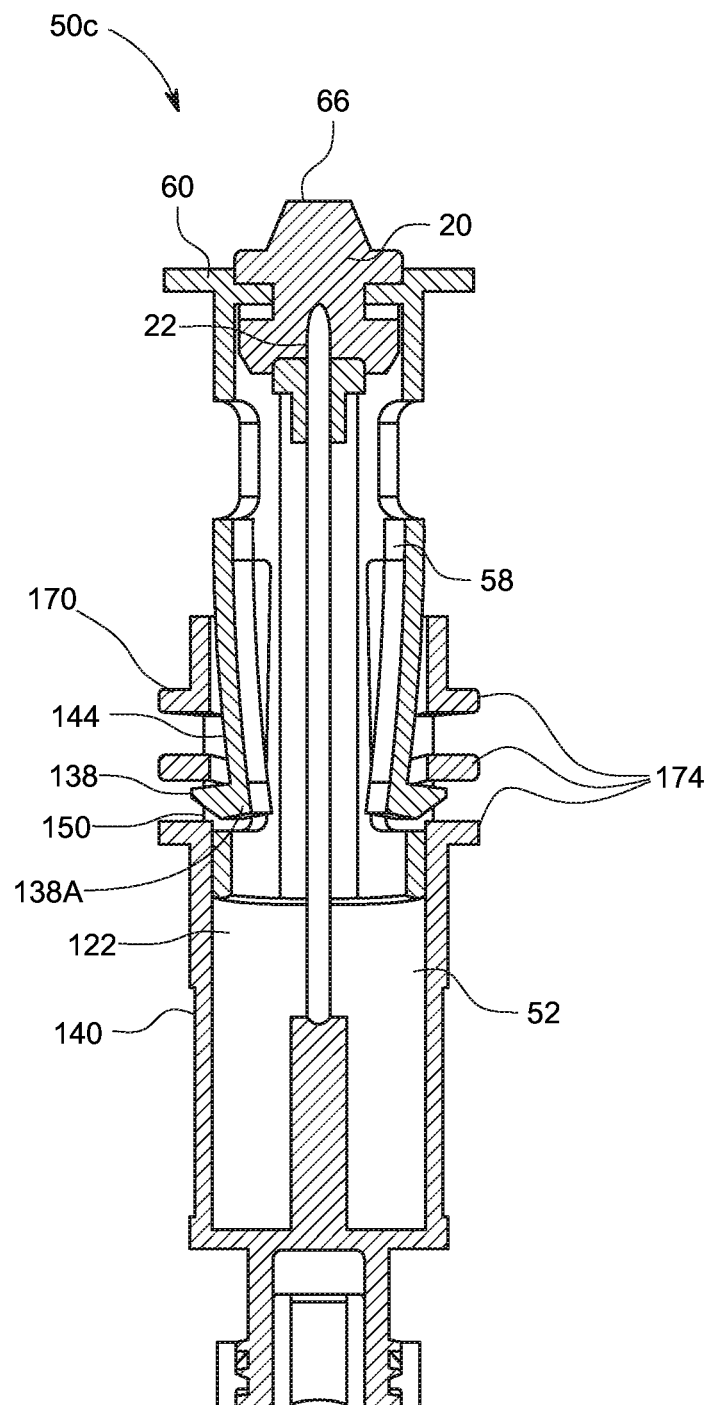
FIG. 2G is a side view, cross-sectional illustration of the syringe connector shown at an intermediate position.
Figure 2H:
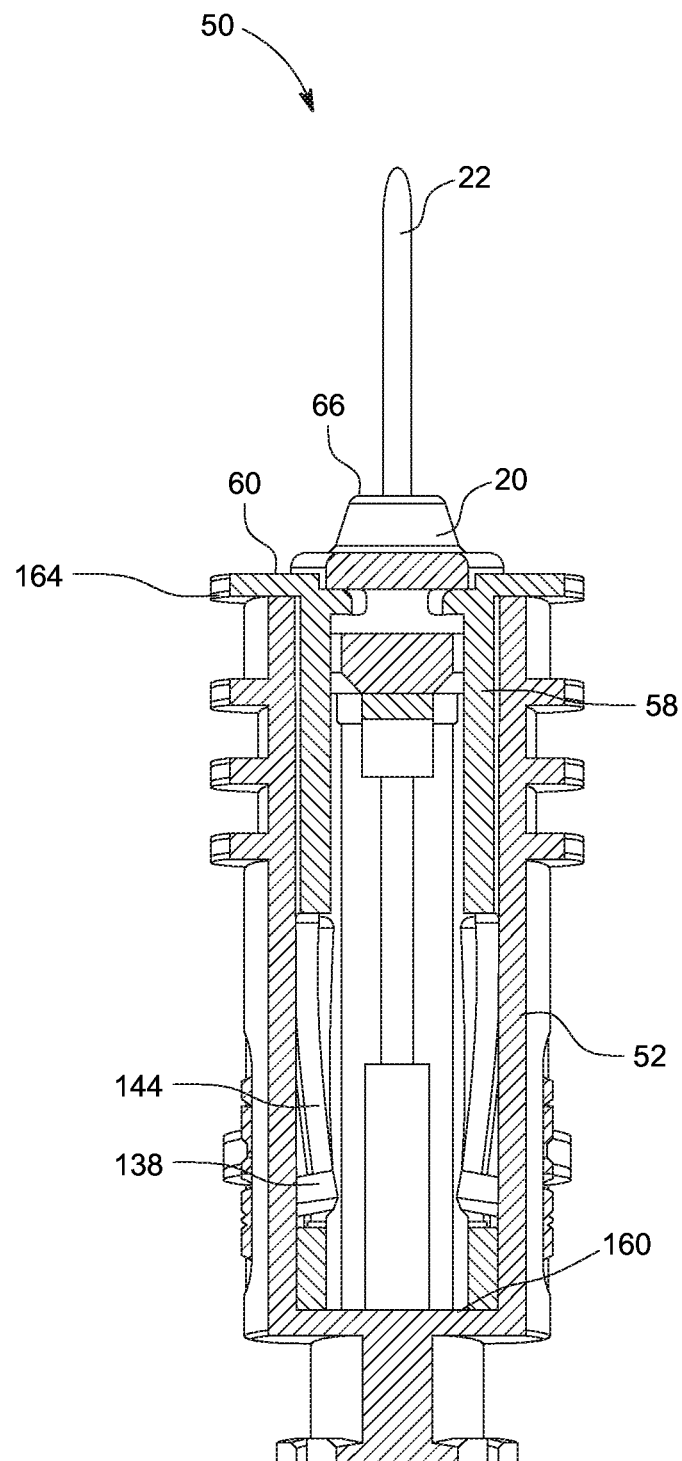
FIG. 2H is a side view, cross-sectional illustration of the syringe connector shown at a collapsed position.

The sleeve 58 and the body member 52 are configured to move relative to each other between an extended position as shown in FIG. 2C, in which a needle tip is proximal to the septum proximal surface 62, and a collapsed position in which the needle tip protrudes beyond the septum distal surface 66, as shown in FIG. 2H. The sleeve 58 may be insertable into the body member 52 along rails 120 (2A) formed on an inner surface 122 of the body member 52. Rails 120 are configured to slide along corresponding grooves 124 formed on an outer surface 126 of the sleeve 58.

It is appreciated that the body member 52 and the sleeve 58 may comprise any suitable means for being collapsible relative to each other.

Figure 17A:
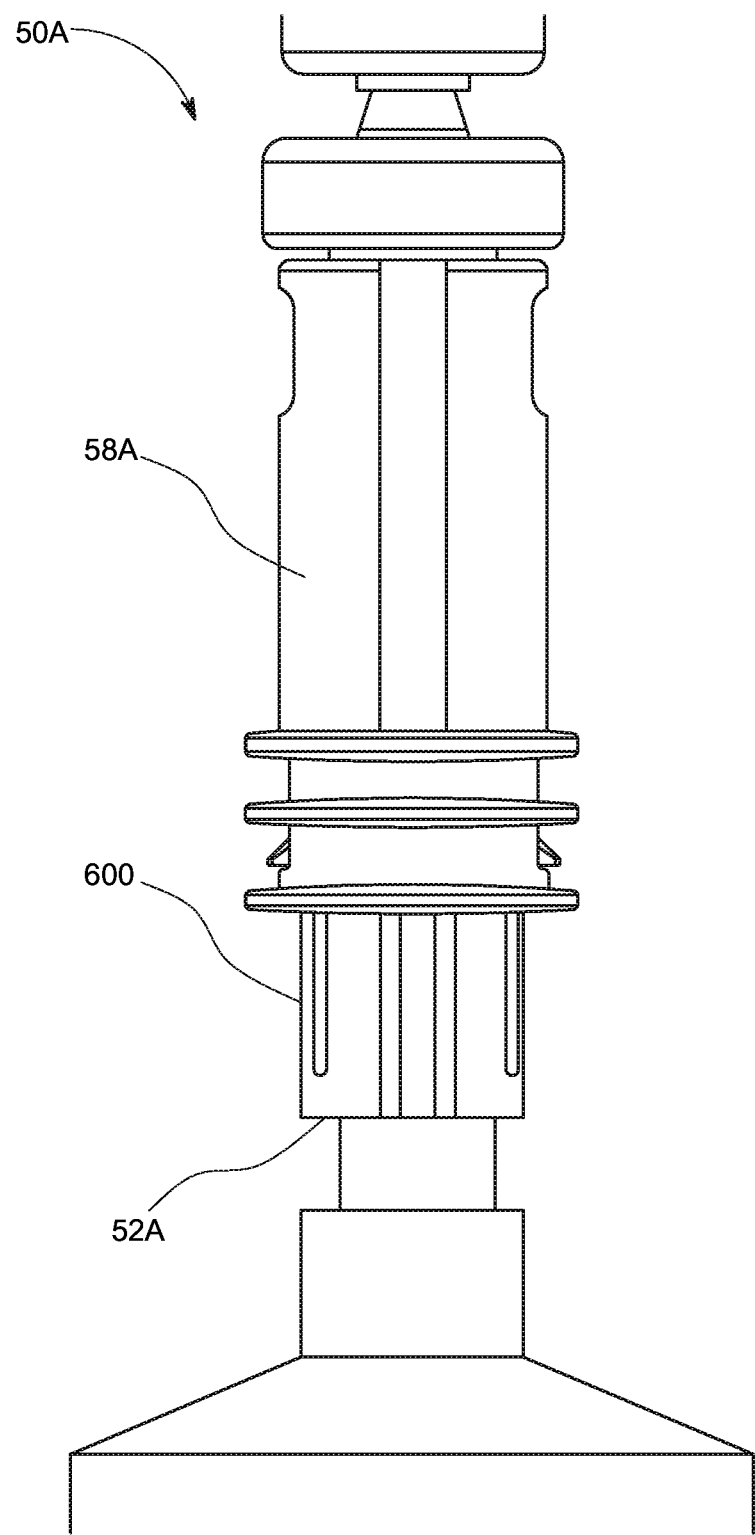
FIGS. 17A and 17B are a side view, pictorial illustration of a syringe connector configured to be deployed with a syringe used for transferring the fluid in the robotic pharmaceutical preparation system of FIGS. 16A-E (17A), and a cross-sectional illustration of FIG. 17A (17B)
Figure 17B:
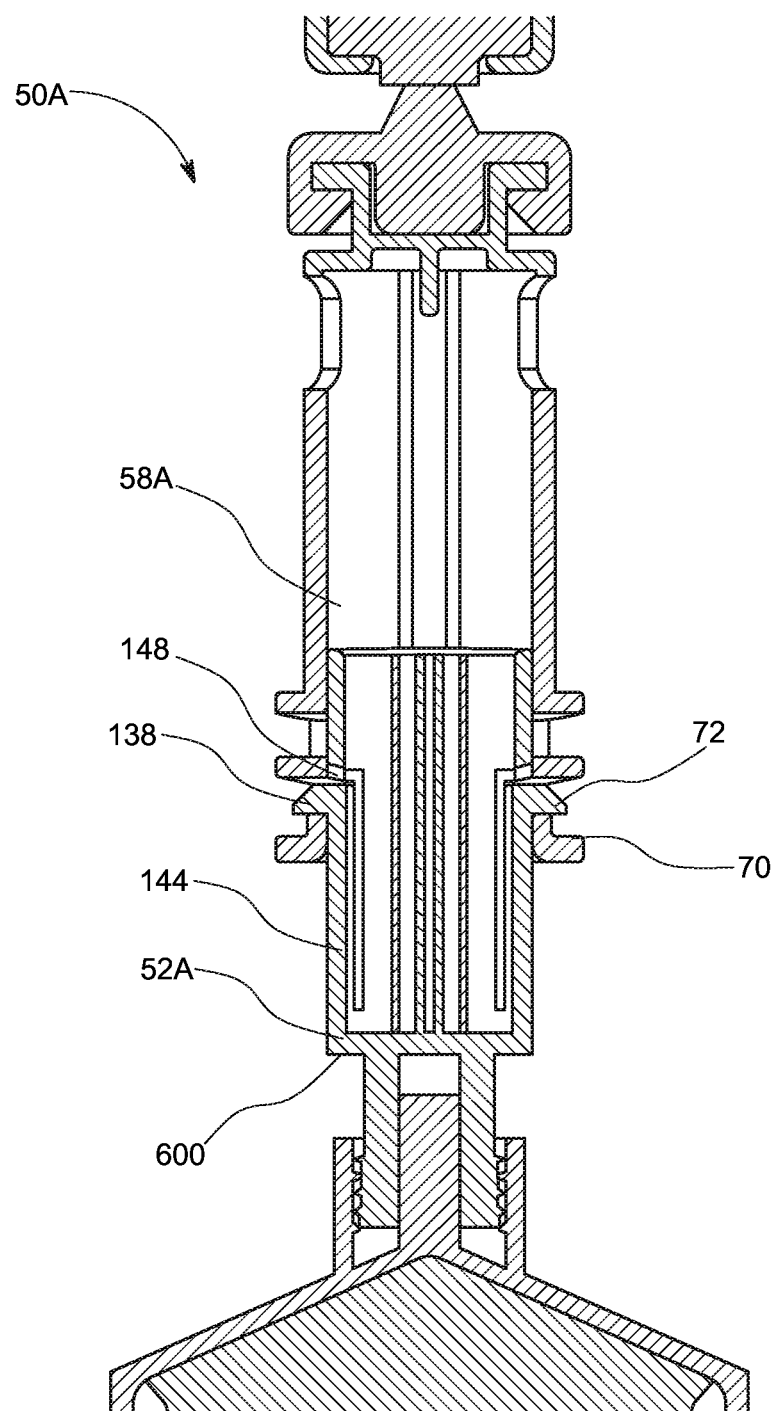

It is further appreciated that the body member 52 may be insertable into the sleeve 58, as shown in FIGS. 17A and 17B.

The syringe connector 50 comprises the locking mechanism 70 configured for selectively enabling and preventing the movement of the sleeve 58 relative to the body member 52 from the extended position upon activation of the actuator 72. The actuator 72 may be formed in any suitable manner and may include a protruding portion 138 accessible on an external wall 140 of the syringe connector 50, such that it is actuatable by application of a force, such as a radial or lateral force Fr (2F) (and in some examples and/or an axial force) on the protruding portion 138. The radial or lateral force Fr may comprise a gripping force, a lateral force, a linear bidirectional (squeeze) force, a bilinear force, a bilateral force and/or a counterbalance force. The actuator 72 comprises an internal portion 144 (2D) disposed within the sleeve 58. The protruding portion 138 laterally protrudes via at least one opening 148 (2B) formed on the body member 52. Application of the radial (and/or axial force) Fr upon the protruding portion 138 induces actuation (namely activation) of the locking mechanism 70 from the locked state to the unlocked state and facilitates the slidable axial movement of the body member 52 with respect to the sleeve 58 for transitioning from the extended position to the intermediate position and/or to the collapsed position.

In an alternative example, the internal portion 144 is disposed within the body member 52 and the protruding portion 138 laterally protrudes via at least one opening 148 formed on the sleeve 58, as shown in FIG. 17B.

In some examples, the locking mechanism can be configured to enable the relative movement of the sleeve and the body member irrespective of any axial force being applied onto the syringe septum in a direction parallel to the longitudinal axis Lx1 (3B) of the syringe connector. For instance, the locking mechanism can enable the relative movement between the sleeve and the body member even when there is no force applied on the syringe septum in a direction parallel to the longitudinal axis of the syringe connector.

In some examples, the locking mechanism in its locked state is configured to prevent the relative movement between the sleeve and the body member from the extended position to the collapsed position and/or from the intermediate position, i.e. normal position, to the collapsed position, due to an axial force applied on at least one of the body member and the sleeve, or on the syringe septum in a direction parallel to the longitudinal axis. For instance, the flat surface 138A (2G) at the bottom of the protruding portion 138 prevents the relative movement between the sleeve and the body member irrespective of an axial force applied on at least one of the body member and the sleeve, or on the syringe septum in a direction parallel to the longitudinal axis, at least until the locking mechanism is displaced into its unlocked state. In such an example, the protrusion 138 constitutes a lockable member and the opening 148 constitutes a locking member locking the lockable member, and the locking mechanism is not allowed to displace into unlocked state in response to an axial force.

Back to FIGS. 2A-H, the actuator 72 comprises a pair of internal portions 144 configured as flexible extensions formed at opposite sides of the sleeve 58. Each of the flexible extensions 144 comprise the protruding portion 138 configured as a tab for forming a snap connection with a pair of corresponding openings 148. The pair of corresponding openings 148 are formed at opposite sides of the body member 52 and are arranged to be aligned with the tabs so as to allow the tabs 138 to laterally protrude from a corresponding opening 148 in the locked state.

A second pair of openings 150 (2F) may be provided along the syringe connector 50 and may be disposed at any suitable location, such as axially collinear relative to the first pair of openings 148.

Absent application of the force Fr on the tabs 138 and when aligned with either corresponding first pair of openings 148 or with corresponding second pair of openings 150, the flexible extension 144 are configured to radially extend thereout, thereby causing the tabs 138 to laterally protrude from the corresponding pairs of opening 148 or 150, and position the syringe connector 50 in a locked state.

FIGS. 2A-F show the sleeve 58 and the body member 52 positioned at an extended position. The tabs 138 protrude from the first pair of openings 148 at a locked state. This extended position may be deployed for allowing sterilization of the needle including its needle tip, which is positioned proximal to the septum proximal surface 62. Sterilization gases penetrating the syringe connector 50 are thereby allowed to sterilize the needle 22 along with the needle tip. Sterilization is typically performed prior to positioning the syringe connector 50 in the fluid transfer station 10, as will be further described in reference to a first operational stage shown in FIGS. 6A-C.

By application of the force Fr (2F) upon the tabs 138, the tabs 138 are medially pushed through first openings 148 towards the longitudinal axis Lx1 (3B) and are positioned within the inner surface 122 of the body member 52 so as to transition from the locked state to the unlocked state. At the unlocked state the body member 52 may slidably axially move with respect to the sleeve 58 for transitioning from the extended position to the intermediate position shown in FIG. 2G and/or to the collapsed position shown in FIG. 2H.

FIG. 2G shows the sleeve 58 and the body member 52 positioned at the intermediate position. The tabs 138 are positioned to protrude from the second pair of openings 150 at a locked state. The needle tip or opening is positioned to be enclosed within the syringe-septum 20 for preventing the protrusion of the needle tip beyond the syringe-septum 20. This intermediate position may be deployed to prevent contamination of the needle tip and microbial ingress through the needle tip into the syringe 54 and to prevent inadvertently injuring an operator upon removal of the syringe assembly 18 from the container 14. Additionally, enclosing the needle tip or opening within the syringe-septum 20 seals the needle tip or opening from droplets.

The external wall 140 of the syringe connector 50 may, in some examples, comprise a protective surface 170 configured to prevent manual access to the actuator 138, namely the tabs 138. This is to prevent inadvertent pressing of the tabs which may cause undesired protrusion of the needle tip beyond the syringe-septum 20, such as when the syringe assembly 18 is transported by a human operator. The protective surface 170 may comprise a pair of peripheral protrusions 174 surrounding the opening. As seen in FIGS. 2A-H, three peripheral protrusions 174 are disposed to surround the first pair of openings 148 and the second pair of openings 150, through one peripheral protrusion 174 may be provided or many peripheral protrusions 174 may be provided.

As seen in FIG. 2H, at the collapsed position the sleeve 58 is inserted within the body member 52 and is confined within the body member 52 at its proximal end by a base surface 160 of the body member 52. At its distal end 60 the sleeve 58 is formed with a radial stop 164. The radial stop 164 may comprise any suitable configuration such as a rim radially protruding from the outer surface 126 (2A) of the sleeve 58. In the collapsed position the distal end of the body member 52 abuts with the radial stop 164 and the needle tip protrudes beyond the septum distal surface 66. This collapsed position may be deployed for executing the needle penetration into the container 14 for enabling the transfer of the fluid, as will be further described in reference to an operational stage shown in FIGS. 9A-C.

The syringe connector 50 may be configured to be irreversibly movable from the extended position, such that following commencement of the transfer of the fluid, the syringe connector 50 is configured for returning from the collapsed position, shown in FIG. 2H, to the intermediate position in which the needle opening is enclosed inside the syringe-septum 20, as shown in FIG. 2G. In some examples the syringe connector does not resume its extended position, rather remains within the intermediate position once removed from a container holder, or what could be considered a container holder, to be shifted to another container holder or to be removed from the fluid transfer station 10. The syringe connector 50 is positioned at the intermediate position, for example, to prevent contamination of the needle tip and microbial ingress through the needle tip into the syringe 54 and to prevent inadvertently injuring an operator upon removal of the syringe assembly 18 from the container 14.

As seen in FIGS. 2A-H, the syringe-septum 20 is mounted at the distal end 60 of the sleeve 58 which is shaped with a lumen. The syringe-septum 20 comprises a septum protruding portion 180 (shown in the insert in FIG. 2C) which axially protrudes from the sleeve 58 from its distal end 60. The syringe-septum protruding portion 180 may be shaped in any suitable form, such as a terraced-like shape. The septum protruding portion 180 comprises a sleeve-proximal portion 182 having a first peripheral wall 184 comprising a first circumference. The septum protruding portion 180 comprises a sleeve-distal portion 186 having a second peripheral wall 188 comprising a second circumference. The second circumference is smaller than the first circumference. In some examples, the second peripheral wall 188 is inclined such that the second circumference recedes towards the septum distal surface 66.

In some embodiments, the syringe connector 50 extends between a connector proximal end 189 and a connector distal end, also constituting sleeve distal end 60 (FIG. 2C) and is configured to be connected to the syringe 54 at the connector proximal end 189. The syringe connector 50 comprises a connector structure, which is some embodiment comprises the connector body member 52 extending from the connector proximal end 189 and the sleeve 58. The syringe-septum 20 extends from the connector structure, (e.g. from the sleeve 58), and has the syringe-septum protruding portion 180, protruding therefrom towards the connector distal end 60. The syringe-septum protruding portion 180 is formed in a terraced-like shape.

It is noted that in some alternative examples, the septum protruding portion 180 may comprise a cylindrical shape where the first and second circumferences may be identical. It is further noted that in some examples, the septum protruding portion 180 may be shaped such that the first circumference is smaller than the second circumference.

The syringe-septum protruding portion 180 has a length L extending axially from the distal end 60 of the sleeve 58 to the septum distal surface 66. In some examples, the length L is at least 20 millimeters or more. In some examples, the length L is at least 30 millimeters or more. In some examples, the length L is in the range of at least 15-30 millimeters, subranges and variants thereof. The length L may be dimensioned to be relatively long, at least longer than conventional syringe-septa so as to facilitate contacting the container-septum 16, such as a difficult to access, pre-existing medicine port of an IV bag.

The syringe-septum 20 may comprise a syringe-septum subsurface portion 190, which extends from the distal end 60 of the sleeve 58 towards the syringe 54. In the example of FIGS. 2A-H, the syringe-septum 20 is shown to be housed inside the sleeve lumen.

Additional examples of the syringe connector 50 and syringe-septum 20 will be further described with reference to FIGS. 17A-19C.

In accordance with some embodiments, it is to be understood herein and as can be seen in the drawings, there is no portion of the container (or container connector) or the syringe connector or the robotic system that surrounds the contact point of the two septa, radially or in any way to secure the contact therebetween. Thus, the securing of the contact (at the contact point of the two septa) being performed by the act of pressing by the robotic system becomes even more significant in view thereof.

FIGS. 3A-15C illustrate an example of the fluid transfer station 10. FIGS. 3A-5B illustrate the fluid transfer station 10 and components thereof. FIGS. 6A-15C illustrate operational stages of transferring fluid in between the syringe assembly 18 and the container 14 in the fluid transfer station 10. It is appreciated that components described herein are by way of example and the fluid transfer station 10 may comprise alternative components. Furthermore, the fluid transfer station 10 is shown to be deployed with the syringe connector 50 of FIGS. 2A-H, it being appreciated that the fluid transfer station 10 may be deployed with any other type of syringe connector known in the art or described herein. Furthermore, it is appreciated that the syringe assembly 18 is provided by way of example and any fluid transfer assembly may deployed.

FIGS. 3A-E illustrate an example of the fluid transfer station 10 of the robotic pharmaceutical preparation system 12 operable for transferring fluid from the syringe assembly 18 to the container 14.

Figure 3A:
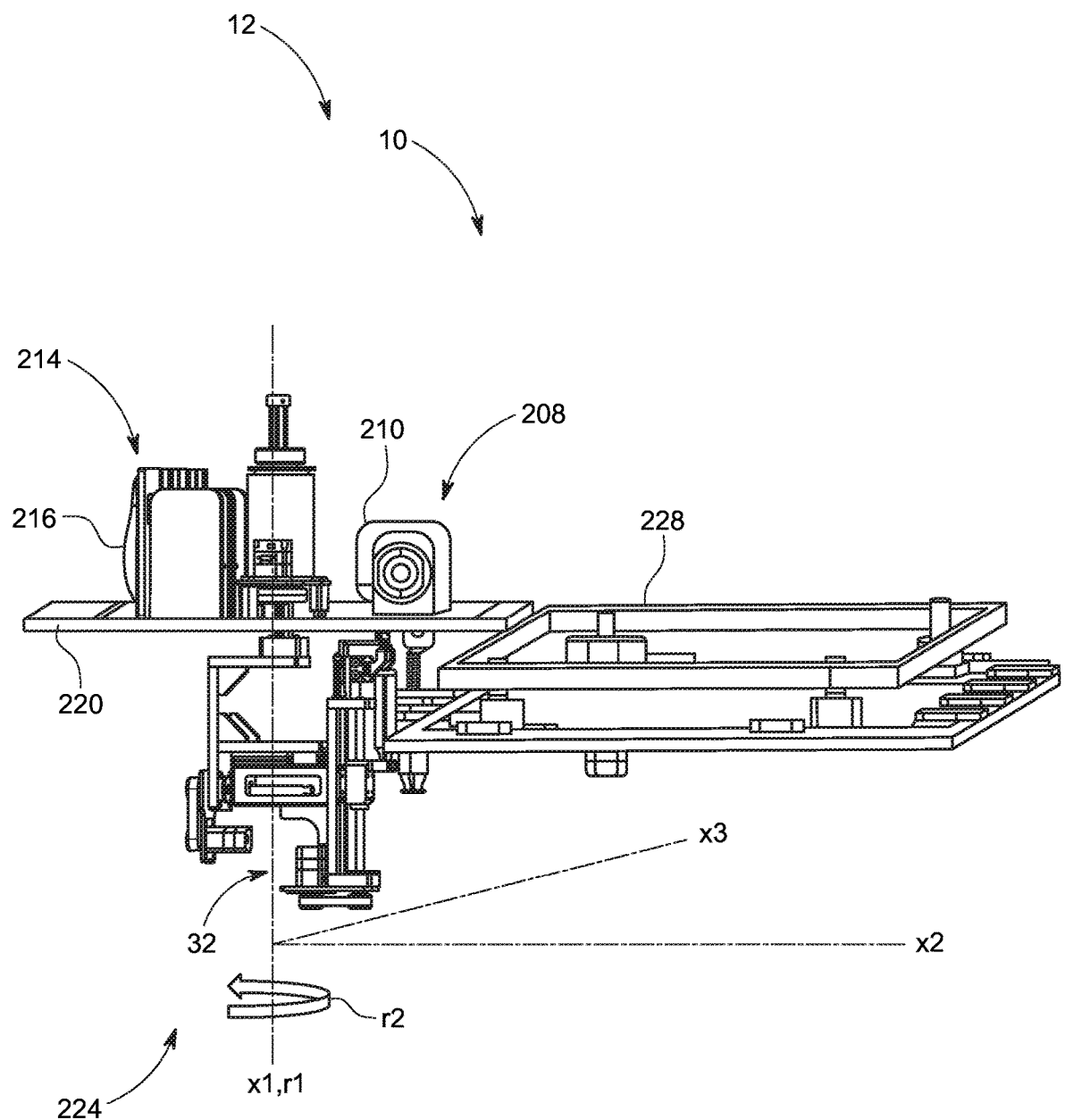
FIG. 3A is a front view, pictorial illustration of a fluid transfer station of a robotic pharmaceutical preparation system, constructed and operative according to an example of the presently disclosed subject matter.

As seen in FIGS. 3A, fluid transfer station 10 comprises a container holding module (or container holder), such as a vial assembly holding module 208 configured for supporting at least one vial assembly 210 (3B) and a spaced apart intravenous (IV) bag holding module 214 configured for supporting at least one IV bag 216 thereon. Vial assembly holding module 208 and IV bag holding module 214 are mounted on a recessed table 220 configured for facilitating fluid communication with a syringe manipulator module 224. The syringe manipulator module 224 may comprise, be comprises or constitute the manipulator 32. In a non-limiting example, the fluid transfer may be from the vial assembly 210 to the syringe assembly 18 (3B) and from the syringe assembly 18 to the IV bag 216. The fluid may comprise a pharmaceutical, saline solution, water or any other suitable fluid.

It is noted that the vial assembly 210 may comprise a vial or a vial coupled to a vial-adaptor. The container-septum 16 (1A) of the vial assembly 210 may comprise the septum of the vial or a septum disposed in the vial-adaptor.

The syringe manipulator module 224 is disposed in proximity to a carousel conveyor 228 configured for conveying a train of syringes (not shown) which are selected by the syringe manipulator module 224 for performing the transfer of the fluid in between a selected syringe assembly 18 to a container 14.

The syringe manipulator module 224 comprises the manipulator 32 configured with at least one arm operable to contact a portion of the syringe assembly 18 and move the syringe assembly 18 along any one or more of the vertical axis x1, the horizontal axis x2 transverse axis x3, and/or about the rotation axis r1.

Any one of the arms is displaced by a driving assembly comprising a driving actuator. The driving actuator is configured for actuating the movement of the arm and may comprise in a non-limiting example any one of a motor, a servo motor, a hydraulic motor, a pneumatic motor, an electric motor, a magnetic motor, a mechanical actuator such as a spring, a piston and a combination thereof.

The driving actuator actualizes the displacement of the one or more arms by at least one motion transmission member such as a shaft, a guiderail, a belt, a pulley, a gear and a combination thereof or any other suitable motion transmission member.

The manipulator 32 may be formed as a manipulator assembly comprising one or more arms for moving the syringe assembly 18 and securing contact between the syringe-septum 20 and the container-septum 16. In the exemplary manipulator 32 described in reference to FIGS. 3A-19C the manipulator comprises a gripping arm 234, an engaging arm 238 and a plunger arm 244. It is appreciated that the manipulator may comprise a single arm or more, two arms or more and three arms or more.

In some examples the manipulator 32 including any one or more of the engaging arm 238, the gripping arm 234 and the plunger arm 244, is formed as a monolithic structure. The plunger arm 244 may be displaceable with respect to the gripping arm 234 along the injection axis Lx1 (FIG. 3B) and is configured to be displaced together with the gripping arm 234 during movement of the manipulator 32. The engaging arm 238 may be displaceable with respect to the gripping arm 234 along the injection axis Lx1 and is configured to be displaced together with the gripping arm 234 during movement of the manipulator 32.

Additionally or alternatively, the manipulator 32 is constructed to mechanically couple any one or more of the engaging arm 238 with the gripping arm 234 and/or with the plunger arm 244. Furthermore, any one or more of the engaging arm 238, the gripping arm 234 and the plunger arm 244 may extend from the manipulator 32.

Figure 3B:
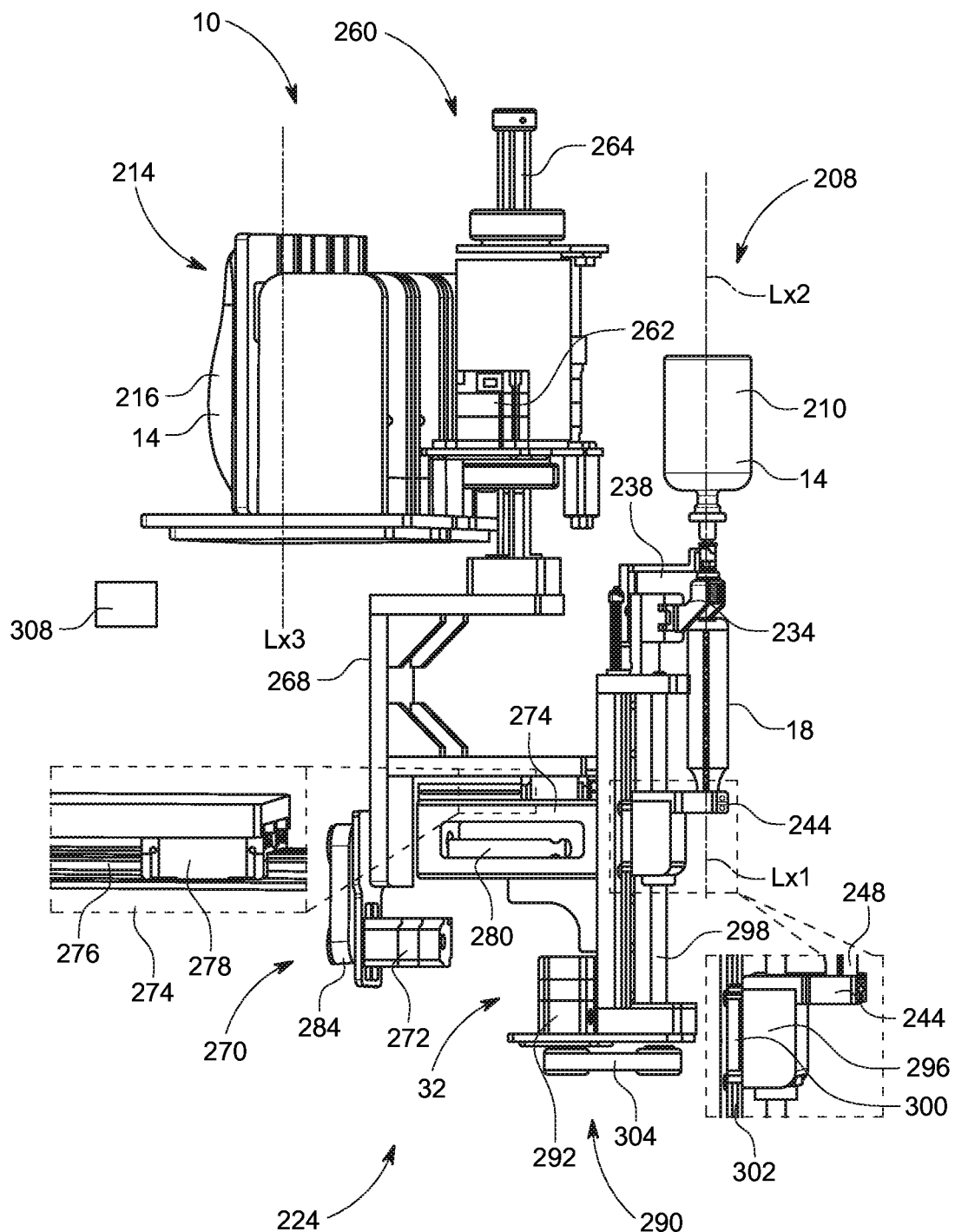
FIG. 3B is a front view, pictorial illustration of a manipulator of the fluid transfer system of FIG. 3A.

FIG. 3B shows a closer view of FIG. 3A. Some components are omitted for clarity, such as the table 220, carousel conveyor 228 and parts of the vial assembly holding module 208.

Turning to FIGS. 3B-5B it is seen that the manipulator 32 comprises the gripping arm 234 configured for gripping a grip portion 236 (3C) of the syringe assembly 18 and for moving and holding the syringe assembly 18 along vertical axis x1 (namely longitudinal axis Lx1 shown in FIG. 3B). Furthermore, the gripping arm 234 is configured to be controllably movable relative to the container holding module configured to hold the container 14 so that the gripping arm 234 can align the syringe-septum 20 and the container-septum 16 and bring the syringe-septum 20 in contact with the container-septum 16 when the gripping arm 234 holds the syringe assembly 18 (as shown in the insert in FIG. 3C).

The gripping arm 234 is configured to perform one or more of the following operations: (i) to selectively apply the radial or lateral force Fr (4B) for pressing upon the syringe-connector actuator 72 of the syringe assembly 18 thereby transitioning from a locked state to an unlocked state so as to position the syringe connector 50 in any one of the extended position, the intermediate position and the collapsed position, as described hereinabove in reference to FIGS. 2A-H; (ii) to grip the connector 50, (e.g. at body member 52 or at sleeve 58), align the syringe assembly 18 with the container 14 and bring the syringe-septum 20 in contact with the container-septum 16. The gripping arm 234 is configured to perform these operations simultaneously or successively.

The manipulator 32 further comprises the engaging arm 238 configured to engage the syringe assembly 18 at an engaging portion 240 (3C) and is configured for axial movement relative to the gripping arm 234.

Figure 9A:
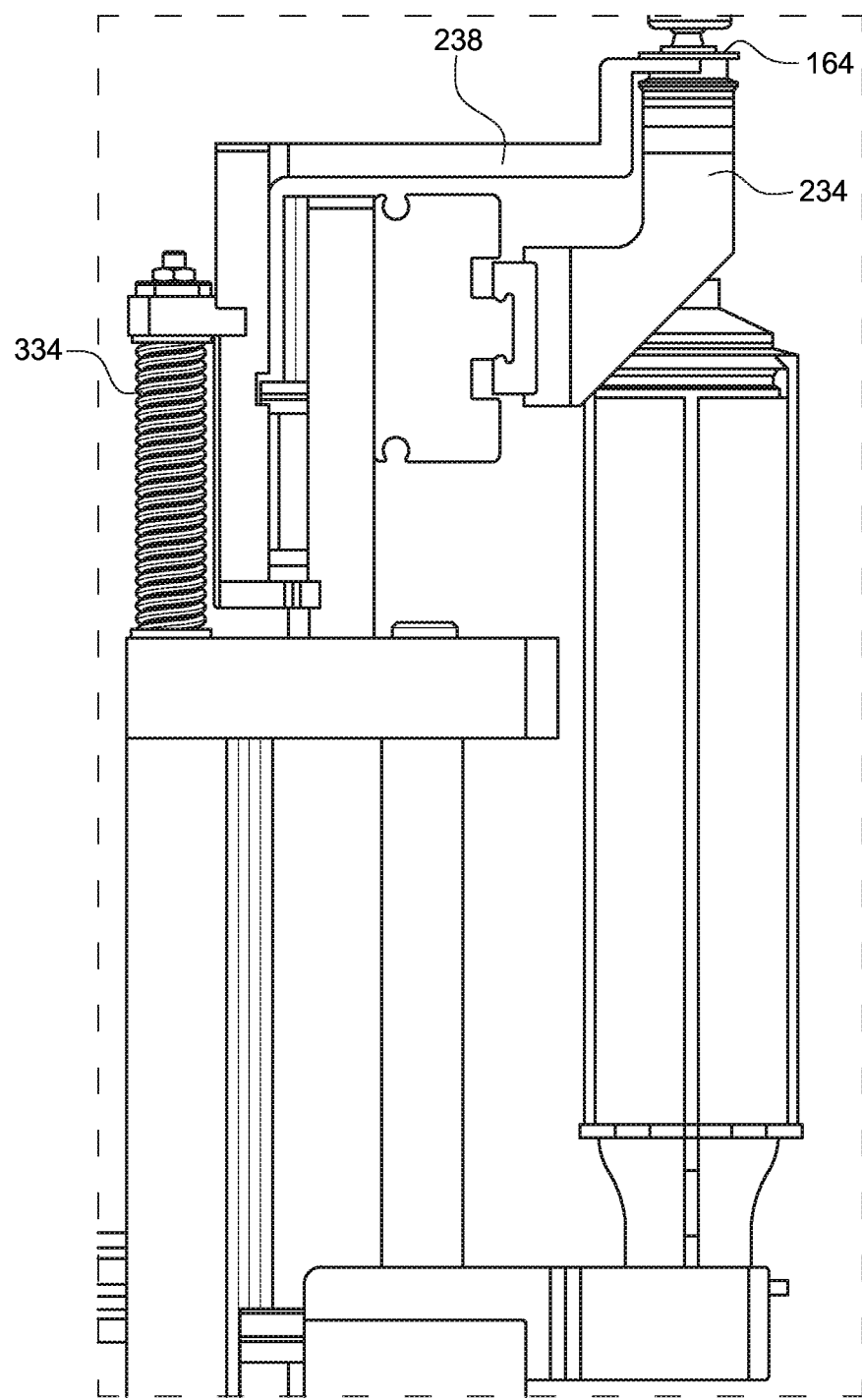
FIGS. 9A-C are illustrations of the fluid transfer station at a fourth operational stage shown at a front view (9A), a side view (9B) and a cross-sectional illustration of FIG. 9B (9C), according to an example of the presently disclosed subject matter.
Figure 9B:
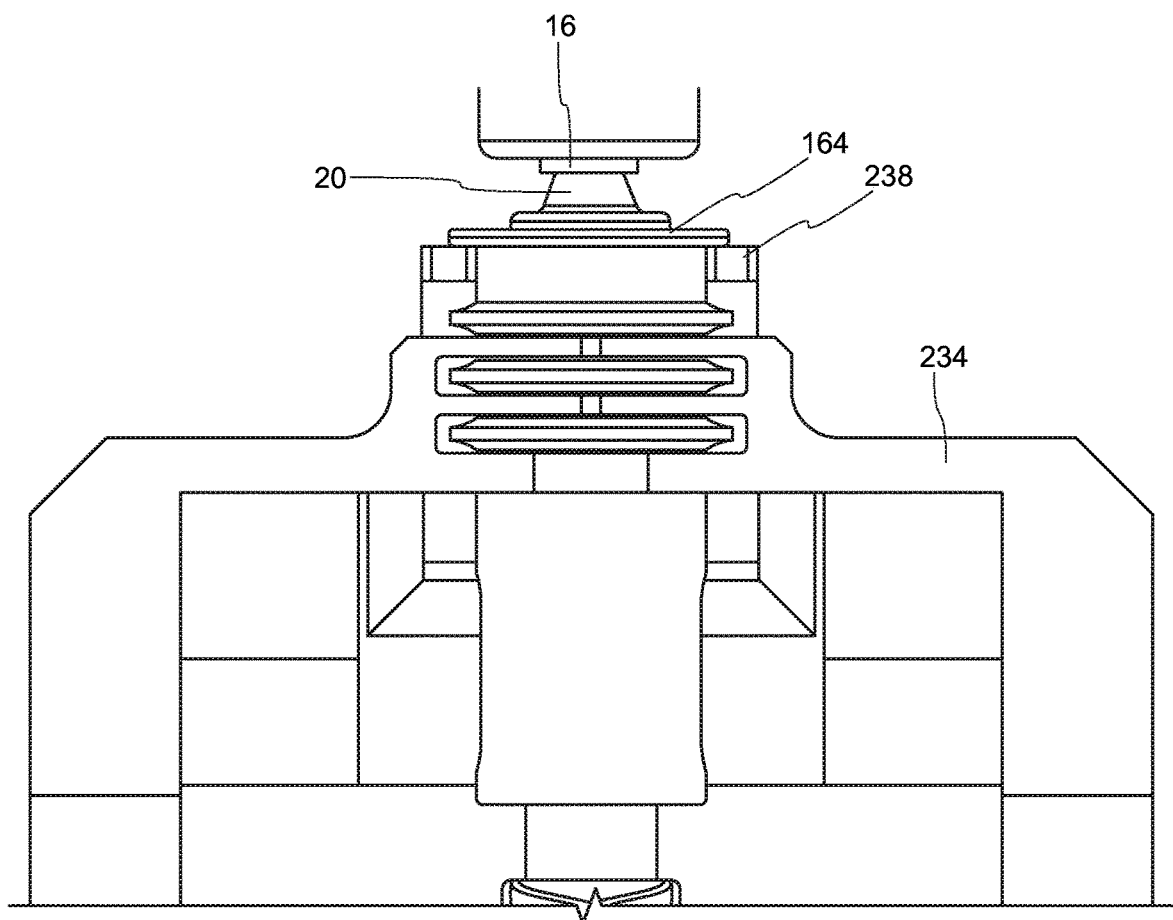
Figure 9C:
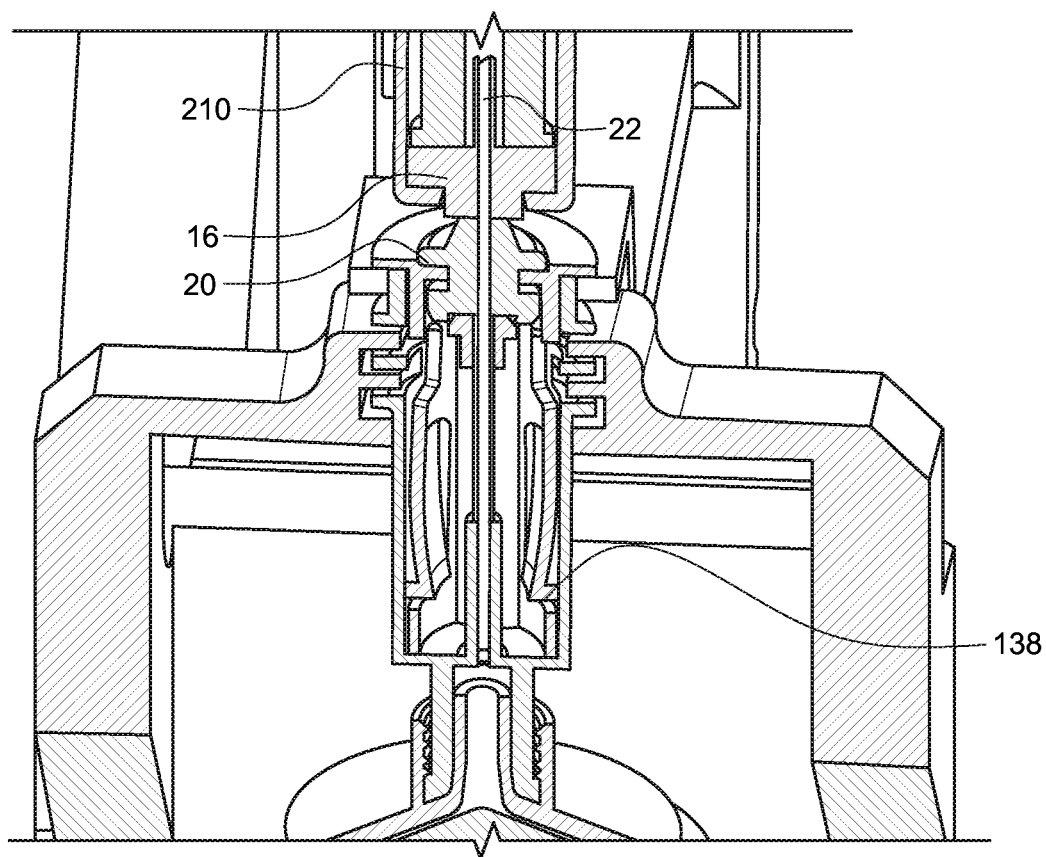

In some examples, the engaging arm 238 and the gripping arm 234 are coupled so that the engaging arm 238 and the gripping arm 234 are operable to be controllably displaced either axially together (e.g. at an operational stage described in reference to FIGS. 7A-C) or axially relatively to each other (e.g. at an operational stage described in reference to FIGS. 9A-C when the engaging arm 238 is stationary and the gripping arm 234 advances axially towards the engaging arm 238). It is appreciated that in some examples, the engaging arm 238 and the gripping arm 234 are operable to be controllably displaced either together or relatively to each other in any directions, such as axially, radially, laterally, rotatably, along any one of the longitudinal axis Lx1, the horizontal axis x2, the transverse axis x3, the rotation axis r1 and/or a combination thereof.

Figure 15A:
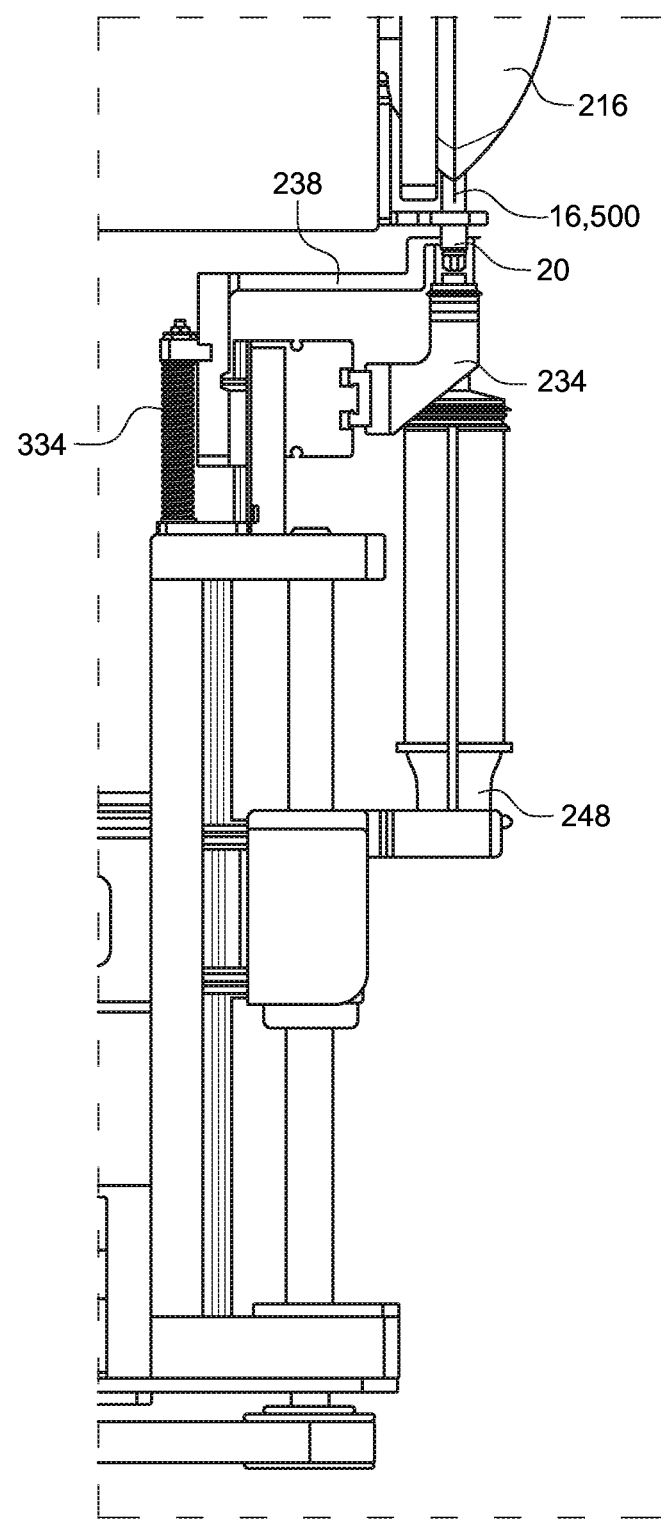
FIGS. 15A-C are illustrations of the fluid transfer station at a tenth operational stage shown at a front view (15A), a side view (15B) and a cross-sectional illustration of FIG. 15B (15C), according to an example of the presently disclosed subject matter.
Figure 15B:
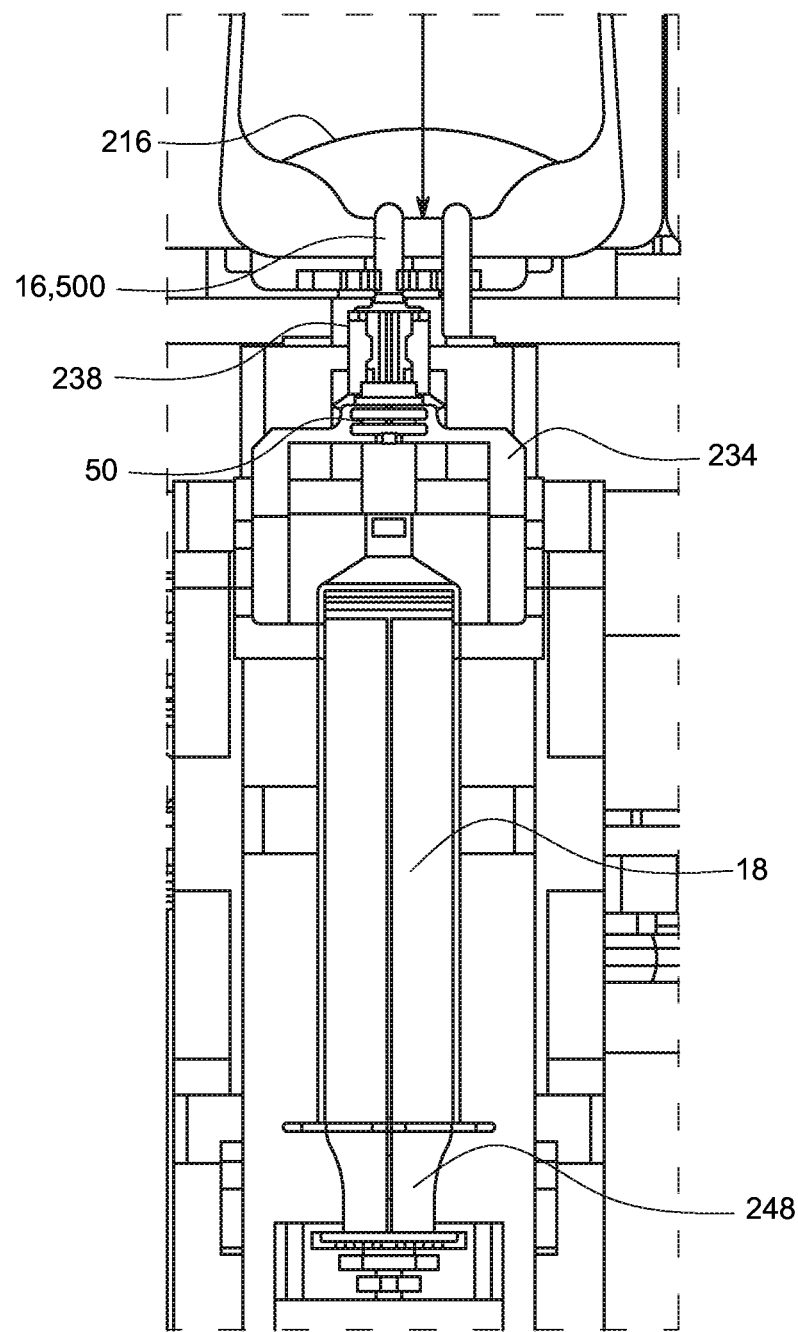
Figure 15C:
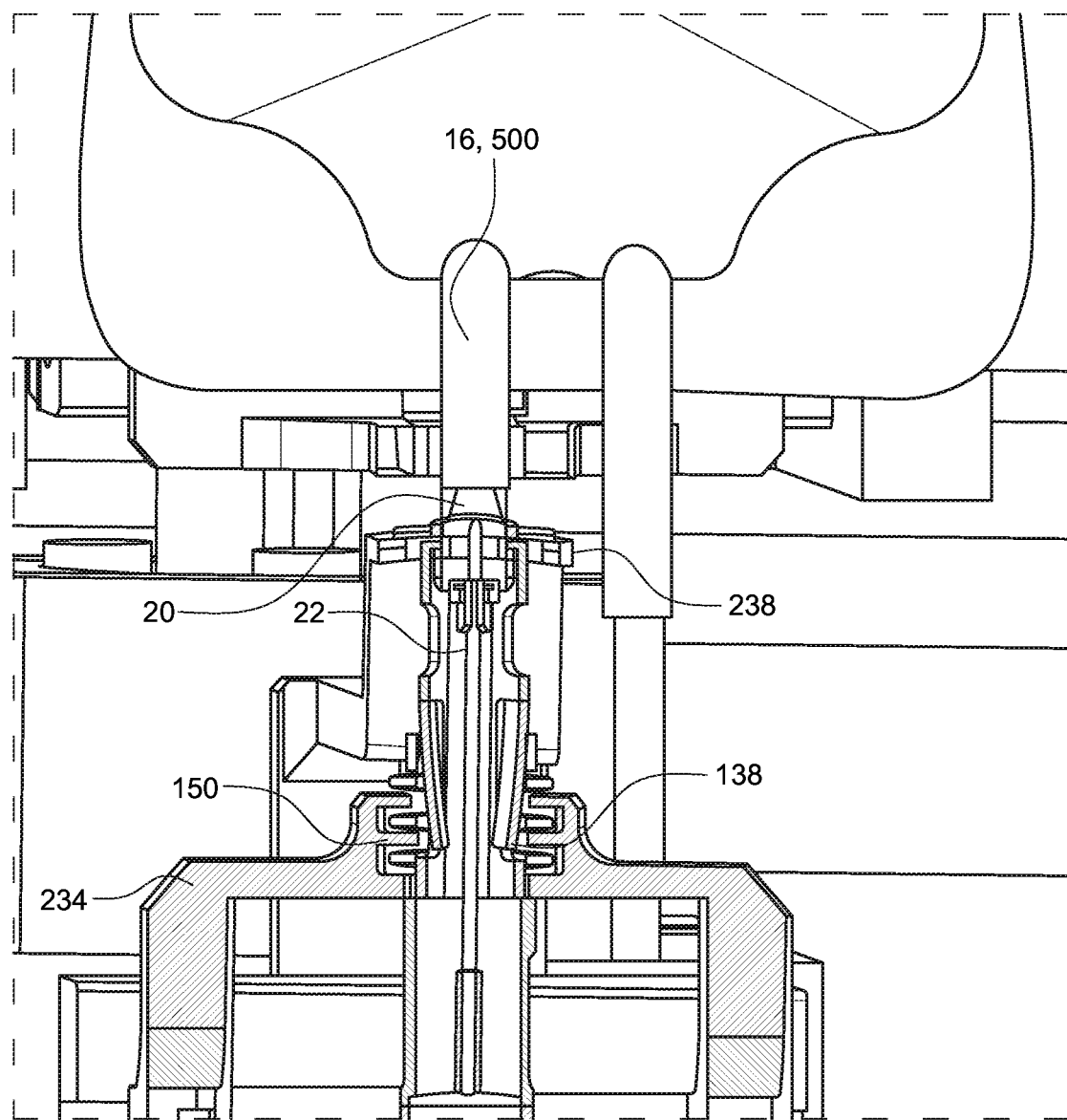
Figure 16A:
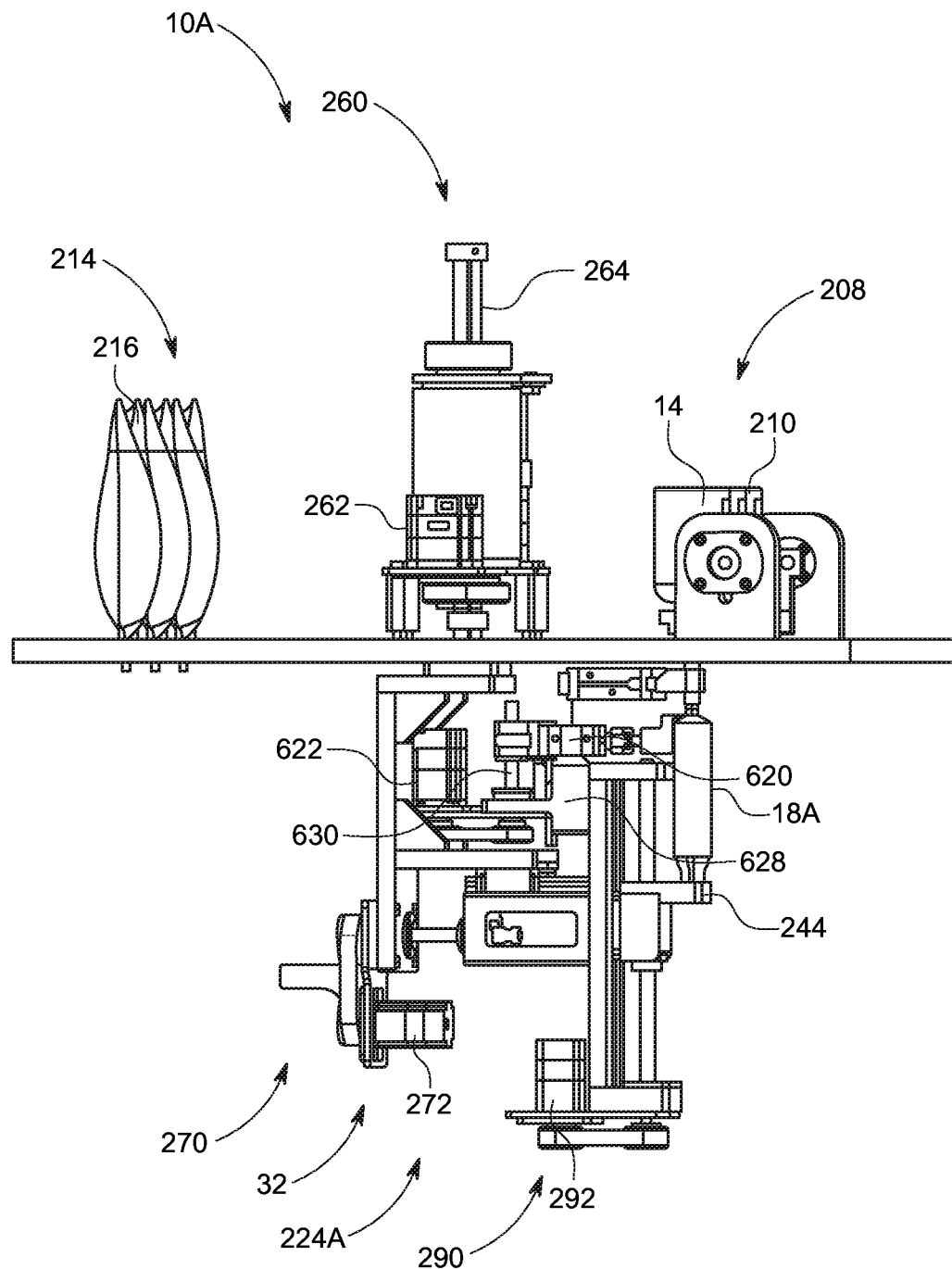
FIG. 16A is a front view, pictorial illustration of a fluid transfer station of a robotic pharmaceutical preparation system, constructed and operative according to another example of the presently disclosed subject matter.
Figure 16B:
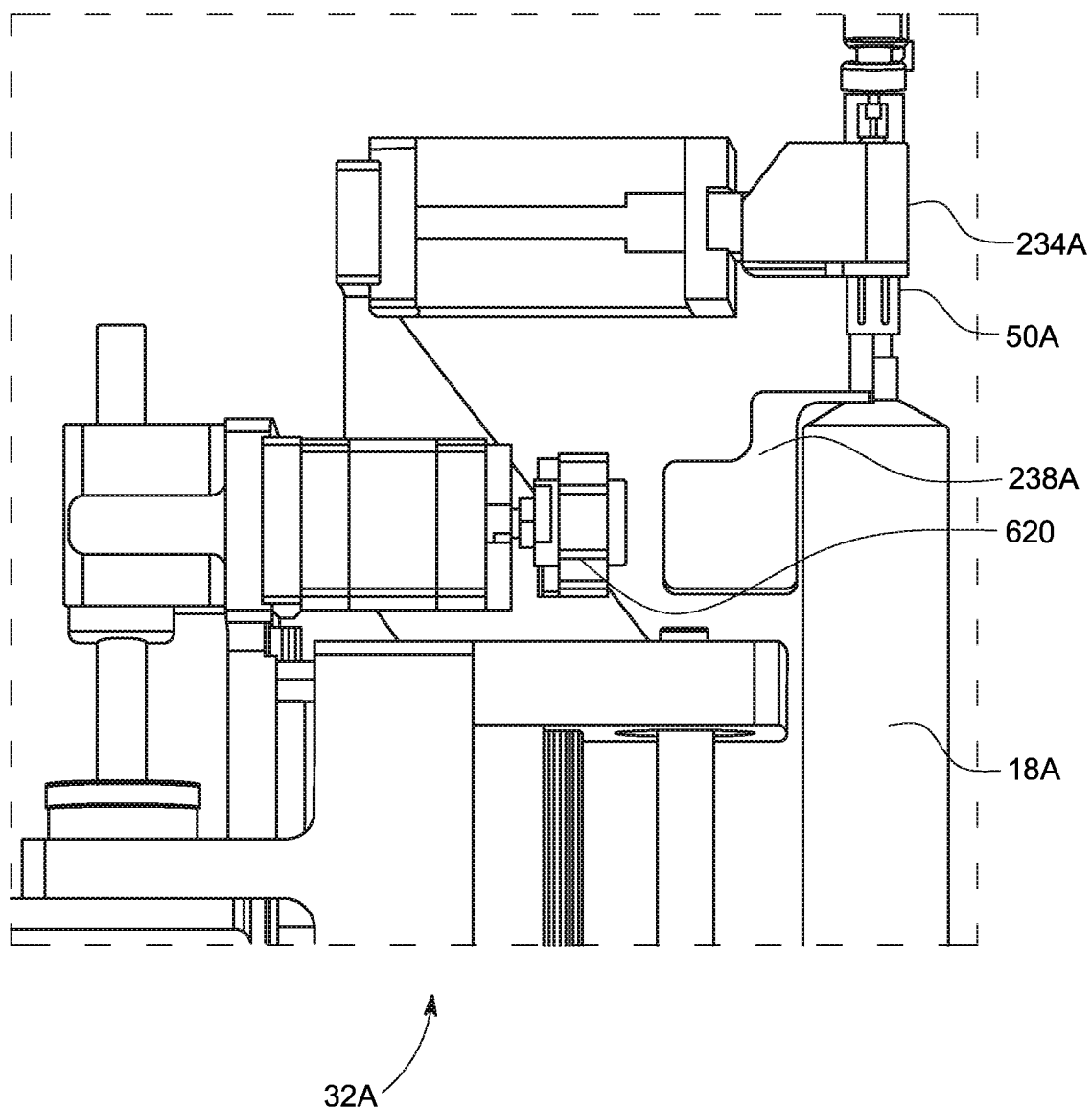
FIGS. 16B and 16C are a front view, pictorial illustration of an engaging arm and a gripping arm of a manipulator of the fluid transfer system of FIG. 16A (16B) and a slightly angled closer view of FIG. 16B (16C)
Figure 16C:
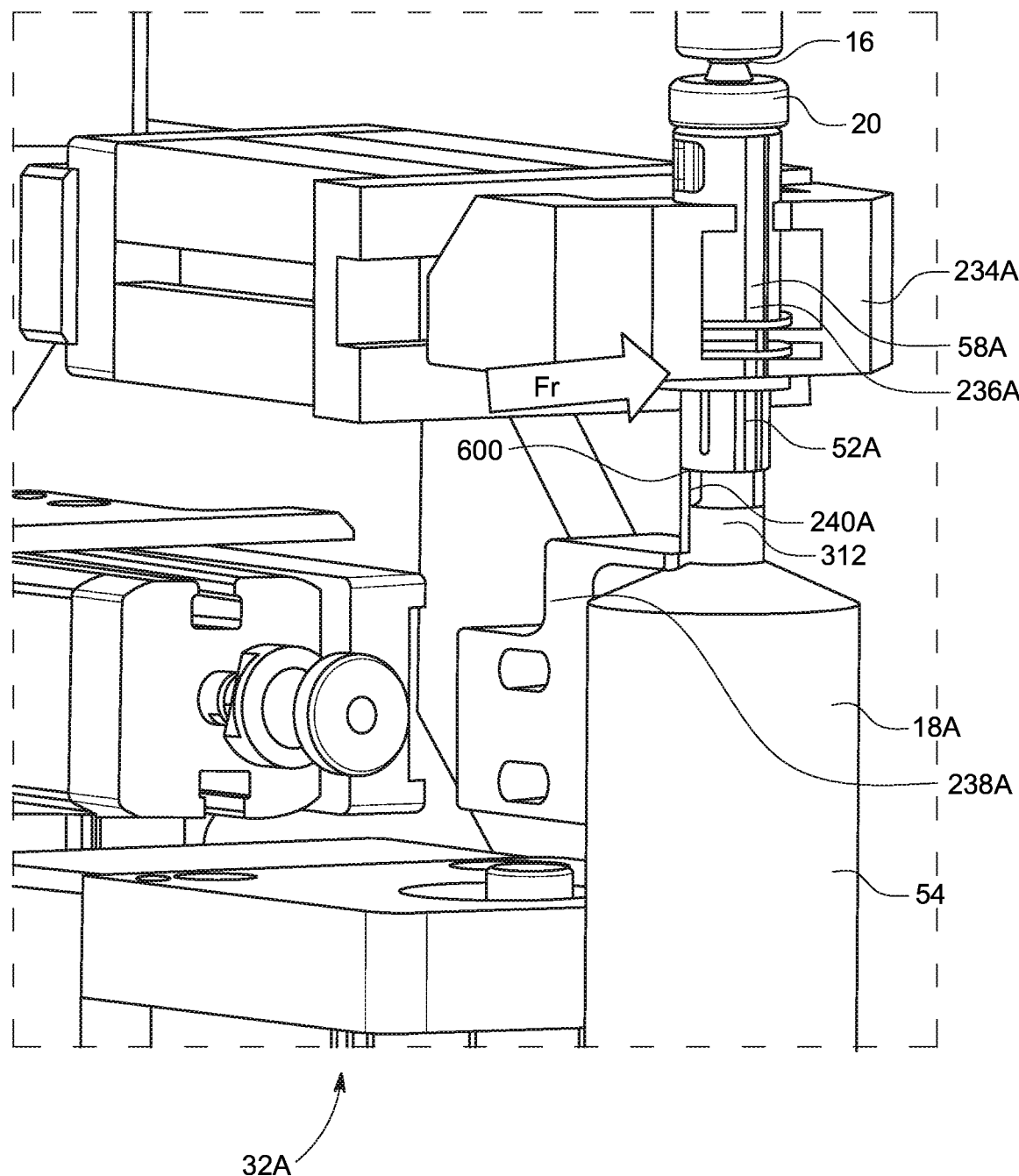

In the examples of FIGS. 3A-15C the engaging arm 238 is shown to be disposed axially above the gripping arm 234 yet it is appreciated that the engaging arm 238 and the gripping arm 234 may be arranged relative to each other in any suitable arrangement, e.g. such as shown in FIGS. 16A-C.

The gripping arm 234 is operable to align the syringe-septum 20 of the syringe assembly 18 and the container-septum 16 of the container 14, bring the syringe-septum 20 in contact with the container-septum 16, press the syringe-septum 20 against the container-septum 16 to secure contact therebetween, and to execute penetration of the syringe-septum 20 and the container-septum 14 by the needle 22 for enabling the transfer of the fluid, while the contact between the container-septum 16 and the syringe-septum 20 remains secured by the engaging arm 238.

It is noted that in an example, the engaging arm 238 and the gripping arm 234 are operable, separately or together, to align the syringe-septum 20 of the syringe assembly 18 and the container-septum 16 of the container 14, bring the syringe-septum 20 in contact with the container-septum 16, press the syringe-septum 20 against the container-septum 16 to secure contact therebetween, and to execute penetration of the syringe-septum 20 and the container-septum 14 by the needle 22 for enabling the transfer of the fluid, while the contact between the container-septum 16 and the syringe-septum 20 remains secured by any one of the engaging arm 238 and the gripping arm 234.

The manipulator 32 additionally comprises a plunger arm 244 (3E) configured to operate a plunger 248 of the syringe assembly 18 and grip a plunger flange portion 250 of the plunger 248. Transfer of the fluid in between the syringe assembly 18 and the container 14 (e.g. vial assembly 210 or IV bag 216) is facilitated by the axial displacement of the plunger flange portion 250 by the plunger arm 244. Axial displacement downwards away from the container 14 facilitates withdrawal of fluid therefrom and axial displacement upwards towards the container 14 facilitates injection of fluid therein. The axial displacement of the plunger arm 244 may be performed along the injection axis Lx1, (3B) and is positioned away from a central longitudinal axis (shown as axis x1 in FIG. 3A) of the manipulator 32.

It is noted that in an alternative example, the plunger arm 244 may replace any one of the gripping arm 234 and the engaging arm 238 and may be facilitated to perform one or more of aligning the syringe-septum 20 to the container-septum 16 and/or securing contact between the container-septum 16 and the syringe-septum 20 at least during the transfer of the fluid via the needle 22, while the needle 22 extends through the syringe-septum 20 and the container-septum 16 into the container 14.

In the example of FIGS. 3A-5B, the driving assembly comprises a primary driving assembly 260 (3B) operable by its servo-motor 262 to actuate axial displacement of the syringe manipulator module 224 along a movable shaft 264 in the orientation of vertical axis x1. The axial displacement facilitates simultaneous movement of the engaging arm 238, the gripping arm 234 and the plunger arm 244, towards the container 14 for transferring the fluid and away therefrom as will be further described in reference to the operational stages described in reference to FIGS. 7A-9C.

In other words, the primary driving assembly 260 is configured to simultaneously advance the engaging arm 238 and the gripping arm 234 towards the container 14 while bringing the engaging arm 238 towards the outer surface 126 (2A) of the syringe assembly 18 for pressing thereon. In the example of FIGS. 3A-15C the engaging arm 238 axially presses upon the engaging portion 240 (3C), which is disposed at the radial stop 164 of the sleeve 58, so as to contact and maintain the secured contact between the syringe-septum 20 and the container-septum 16.

Following the transfer of the fluid from the vial assembly 210, the primary driving assembly 260 is further operable for rotational displacement of the syringe manipulator module 224. The rotational displacement is performed by rotation of the shaft 264 about rotational axis r1 by rotating the shaft 264 in the orientation of arrow r2 from the vial assembly holding module 208 to the IV bag holding module 214 and vice versa, as will be further described in reference to the operational stage described in reference to FIGS. 11A-C. It is appreciated that the displacement of the manipulator module 224 form the vial assembly holding module 208 to the IV bag holding module 214 and vice versa may be linear (i.e. not rotational) or any other axial and/or lateral displacement.

Primary driving assembly 260 is mounted on a frame 268 which mechanically couples primary driving assembly 260 to a secondary driving assembly 270.

Secondary driving assembly 270 is operable by its servomotor 272 to actuate displacement of the manipulator 32 in the orientation of horizontal axis x2. The manipulator 32 is coupled to a carriage 274 configured with guiderails 276 mounted thereon and operable to horizontally slide along sliders 278. The carriage 274 is additionally fixed to a rotatable axle 280 actuated to rotate by the servo-motor 272 via a belt drive 284. Rotation of axle 280 causes guiderails 276 to slide along sliders 278 thereby horizontally advancing the carriage 274 in tandem with the manipulator 32 towards the carousel conveyor 228 (3A). Horizontal advancement of the manipulator 32 away from the vial assembly holding module 208 and towards the carousel conveyor 228 is generally performed at an initial stage of operation for allowing the gripping arm 234 to grab a selected syringe assembly 18 from the carousel conveyor 228. The gripping arm 234 horizontally retracts back towards the vial assembly holding module 208 so as to facilitate alignment of the syringe assembly 18 with the vial assembly 210 as will be further described in reference to the operational stage shown in FIGS. 6A-C, or in some examples, to facilitate alignment of the syringe assembly 18 with the IV bag 216.

A tertiary driving assembly 290 is operable by its servomotor 292 to actuate axial displacement of the plunger arm 244 mounted on a block 296 formed with a throughgoing bore for sliding along a rotatable shaft 298 in the orientation of vertical axis x1. Block 296 is fixed to a slider 300 configured to axially slide along guiderails 302. The rotatable shaft 298 is actuated to rotate by the servo-motor 292 via a belt drive 304 causing the slider 300 to slide along the guiderails 302 thereby axially displacing the plunger 248 mounted on the plunger arm 244 relative to the container 14 (e.g. the vial assembly 210 or the IV bag 216). Downward axial displacement away from the container 14 facilitates withdrawal of fluid from the container 14 into the syringe assembly 18, as will be further described in reference to an operational stage shown in FIGS. 10A-C. Axial displacement upwards towards the container 14 facilitates injection of fluid into the container 14, as will be further described in reference to an operational stage shown in FIG. 14.

In some examples, the robotic pharmaceutical preparation system 12 may further comprise a sensor 308, such as an optical sensor, e.g. a camera and/or an encoder (such as an encoder of any one of the servo-motors) or any other type of magnetic sensor, vibrational sensor, accelerometer, audio sensor, electrical sensor or any sensor configured for guiding the driving assemblies for executing the movement of the manipulator 32 so as to perform any one or more of: bringing the container-septum 16 into contact with the syringe-septum 20; extending the needle 22 through the container-septum 16 and the syringe-septum 20; transferring fluid via the needle 22 while the needle 22 extends through the container-septum 16 and the syringe-septum 20 and securing contact between the container-septum 16 and the syringe-septum 20 at least during the transfer of the fluid via the needle 22 while the needle extends through the syringe-septum 20 and the container-septum 16.

In some examples, the manipulator 32 is configured and arranged to accommodate a variety of syringes 54 dimensioned with different lengths and diameters, e.g. a diameter of its body, namely the syringe barrel 310, hub 312 (3C) and/or plunger flange portion 250 (3E). As seen in FIG. 3E, the plunger arm 244 comprises a plunger plate 320 formed with at least one recess 324 for supporting the plunger flange portion 250. A plurality of recesses 324 are formed, where each recess 324 is dimensioned with a different diameter to accommodate plunger flange portions 250 formed with different diameters. The plunger plate 320 constitutes a plunger support including a first plunger holding element 324A and a second plunger holding element 324B and a third plunger support element 324C, each comprising a respective recess formed with a respective receiving space having a corresponding recess dimension for receiving a plunger flange dimensioned accordingly. In some embodiments, the plunger plate 320 may comprise a single plunger holding element 324, two plunger holding elements, three plunger holding element or more.

As seen in FIGS. 3A-D, the gripping arm 234 is arranged to grip the gripping portion 236 away from the syringe 54 (or at least away from the syringe barrel), while gripping the syringe assembly 18 at the syringe connector 50, and the engaging arm 238 is arranged to engage the engaging portion 240 away or distally from the syringe 54 (or at least away from the syringe barrel), while gripping the syringe assembly 18 at the syringe connector 50. Gripping the syringe assembly by the gripping arm 234 at the gripping portion and/or engaging the syringe assembly by the engaging arm 238 away or distally from the syringe 54 (or at least away from the syringe barrel), such as by gripping the syringe assembly 18 at the syringe connector 50 facilitates accommodating any syringe, regardless of the syringe dimensions. Accordingly, the robotic pharmaceutical preparation system 12 is facilitated to prepare a large variety of pharmaceuticals which are typically contained in different types of syringes 54 dimensioned with different lengths and diameters.

Additionally, gripping the syringe assembly at the gripping portion, away or distally from the syringe 54, such as at least away from the syringe barrel, by gripping the syringe assembly 18 at the syringe connector 50, prevents obstructing any image information displayed on the syringe (e.g. on the body 310 namely barrel, hub 312 and/or plunger flange portion 250 of the syringe), such as images, indicia (e.g. scale marks, numbers or text) or a volume level of a liquid in the syringe. Accordingly, the syringe image information can be clearly viewed and thus image processing based on the image information may be performed thereon.

Moreover, holding at the syringe connector rather than at the barrel renders the securing of the contact more effective and safe. For instance, holding closer to the contact point makes it easier to align the septa and securing the contact therebetween. In some examples, the syringe barrel and/or any part of the syringe assembly 18 other than the syringe connector 50 is maintained free of contact by the manipulator during the transfer of drug.

It is noted that is some examples, a manipulator is structured with a single arm. Such as for example, a manipulator comprising a single arm which acts as a gripping arm, engaging arm as well as a plunger arm, or for example a manipulator comprising two arms including a gripping arm as well as a plunger arm. In such single or two arm manipulators, the manipulator arm is configured to grip the syringe assembly away or distally from the syringe 54, such as by gripping the syringe assembly 18 at the syringe connector, such as at least away from the syringe barrel. In such single or two arm manipulators, the syringe connector may be configured to attach to a container adapter/connector such as a vial adaptor or an IV bag spike adaptor.

It is noted that in some examples, the manipulator 32 is arranged to contact the syringe 54 and other adaptations may or may not be made to accommodate a variety of syringes 54 dimensioned with different lengths and diameters.

Figure 3C:
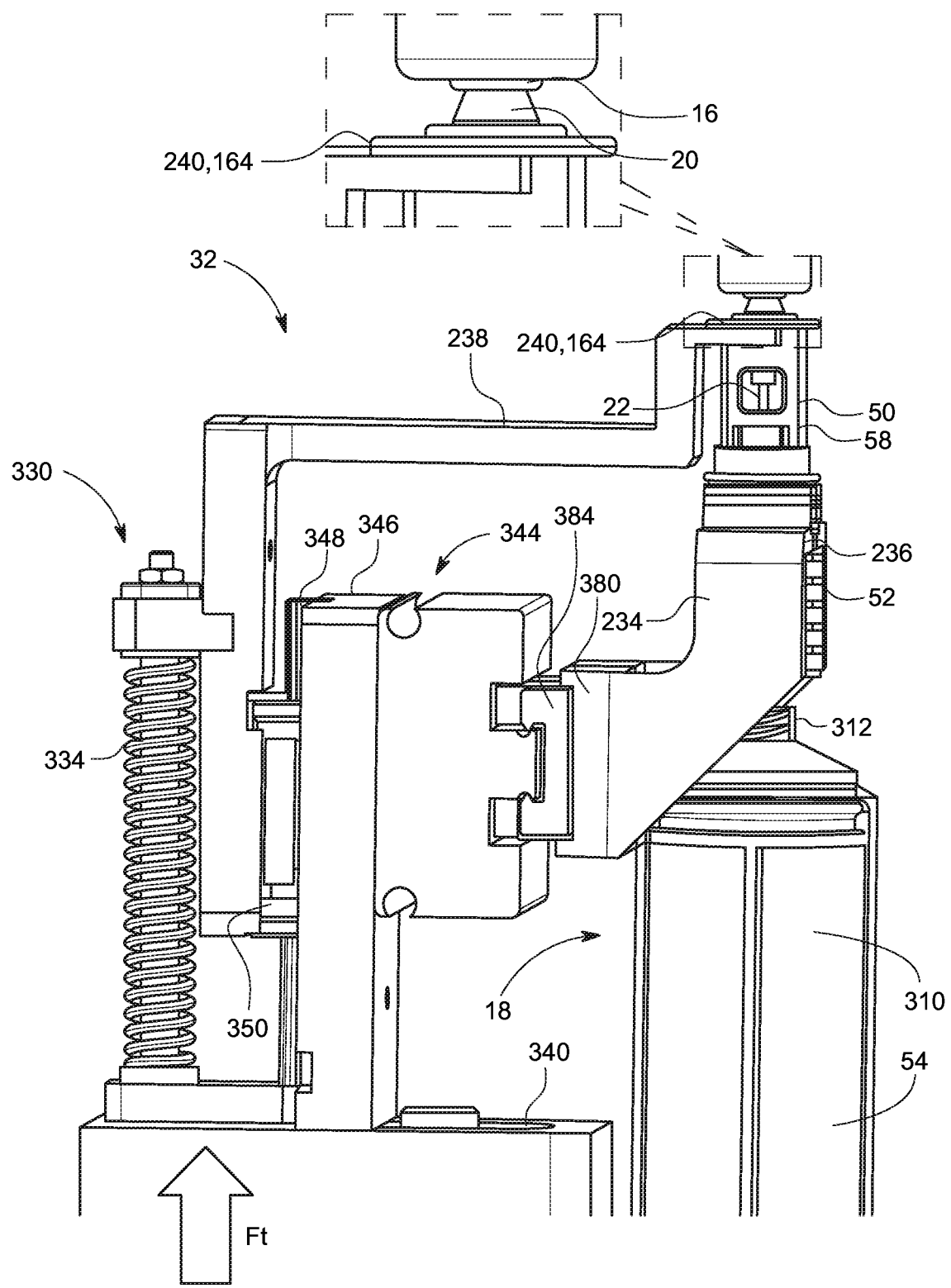
FIGS. 3C and 3D are front view, pictorial illustrations of a pressing mechanism of the manipulator of FIG. 3B at a first and second operational stage, respectively.

As seen in FIG. 3C, the engaging arm 238 and the gripping arm 234 are mounted on a support base 340 and are slidably coupled to each other via a sliding assembly 344. The sliding assembly 344 comprises a mounting wall 346 formed with guiderails 348 thereon. The guiderails 348 are operative to axially slide along a slider 350 (e.g. a bearing) fixed to the engaging arm 238 so as to axially move the gripping arm 234 towards the engaging arm 238. The advancement of the support base 340 towards the engaging arm 238 causes the engaging arm 238, when positioned to abut the radial stop 164 of the sleeve 58, to apply an axial compression force on the radial stop 164. In turn, the radial stop 164 presses the syringe septum 20 towards the container-septum 16.

As described hereinabove, the engaging arm 238 is arranged to engage the engaging portion 240 at the sleeve 58 and the gripping arm 234 is arranged to grip the grip portion 236 at the body member 52. Displacement of the grip portion 236 towards the engaging portion 240 causes the needle 22 to extend through the syringe-septum 20.

In some examples, the manipulator 32 may comprise a pressing mechanism 330, or which may be a pressing mechanism, which is configured to ensure a predetermined compression threshold between the syringe-septum 20 and the container-septum 16 is reached before the needle 22 extends through the syringe-septum 20 and the container-septum 16. In the examples without the needles or where the needle needs not penetrate the septa, the pressing mechanism is configured to ensure that a predetermined compression threshold between the syringe-septum 20 and the container-septum 16 is reached before the relative movement of the sleeve and the body member of the syringe connector, or the relative movement between the gripping arm and the engaging arm, begins. Furthermore, the pressing mechanism 330 is configured to ensure the predetermined compression threshold between the syringe-septum 20 and the container-septum 16 is maintained during fluid transfer via the needle 22, and in some examples, is maintained thereafter during withdrawal of the needle 22 from the container-septum 16.

In some embodiments, the syringe assembly 18 operated by the robotic system 12 may be such that the sleeve 58 is fixedly coupled relative to the syringe-septum 20 and the body member 52 is fixedly coupled relative to the needle 22. The robotic system 12 is configured so that the engaging portion 240 is on the sleeve 58 and the grip portion 236 is on the body member 52 so that displacement of the grip portion 236 towards the engaging portion 240 causes the needle 22 to extend through the syringe-septum 20. The controller unit 30 (1A) is configured to cause relative movement of the gripping arm 234 towards the engaging arm 238 to extend the needle 22 through the syringe-septum 20 and container-septum 16, when the predetermined compression threshold between the container-septum 16 and the syringe-septum 20 is reached.

The engaging arm 238 is coupled to the gripping arm 234 so that the gripping arm 234 resists axial movement towards the engaging arm 238 when an axial force below a predetermined pressing threshold is applied to the gripping arm 234, while the engaging arm 238 is maintained axially stationary.

The pressing mechanism 330 may comprise a resisting member 334, which in the illustrated example is a compression element or a spring 334, which is arranged to be compressible only when an axial compression force of the magnitude of the predetermined pressing threshold (Ft) is applied on the spring 334. Resisting member 334 is not limited to a spring per se, but may be any device or mechanism that provides a resistance force, a restorative force, or a compressible resistance force. In some examples, the moving support base 340 can apply the axial compression force of the magnitude of Ft on the spring 334. In some examples, the resisting member can be any other compression element. In some examples, the resisting member can be any element or can have any structure configured to elastically deform upon application of force thereon and to resist the relative movement between the sleeve and the body member of the syringe connector, or the relative movement between the gripping arm and the engaging arm.

This arrangement (namely of the spring 334 being compressible upon application of the axial compression force of the magnitude of Ft) may be achieved in any suitable manner.

In some examples, the spring 334 may be preloaded at the magnitude of the predetermined pressing threshold. The preloaded spring 334 is fixedly coupled to the engaging arm 238 and is mounted on the movable support base 340 on which the gripping arm is mounted. In order to allow the support base 340 to advance the gripping arm 234 towards the engaging arm 238, the spring 334 must be compressed. In order to further compress the spring 334 it is required to apply a greater force than the threshold force so as to resist and overcome the preload force. Thus, only when the moving support base 340 applies an axial compression force of the magnitude of the predetermined pressing threshold (Ft) on the spring 334 (while the engaging arm is maintained axially static (e.g. by abutting on the radial stop 164 of the sleeve 58 when the syringe-septum 20 and the container-septum 16 are in contact)), can the preloaded state be overcome so that the spring 334 is further compressed.

Figure 3D:
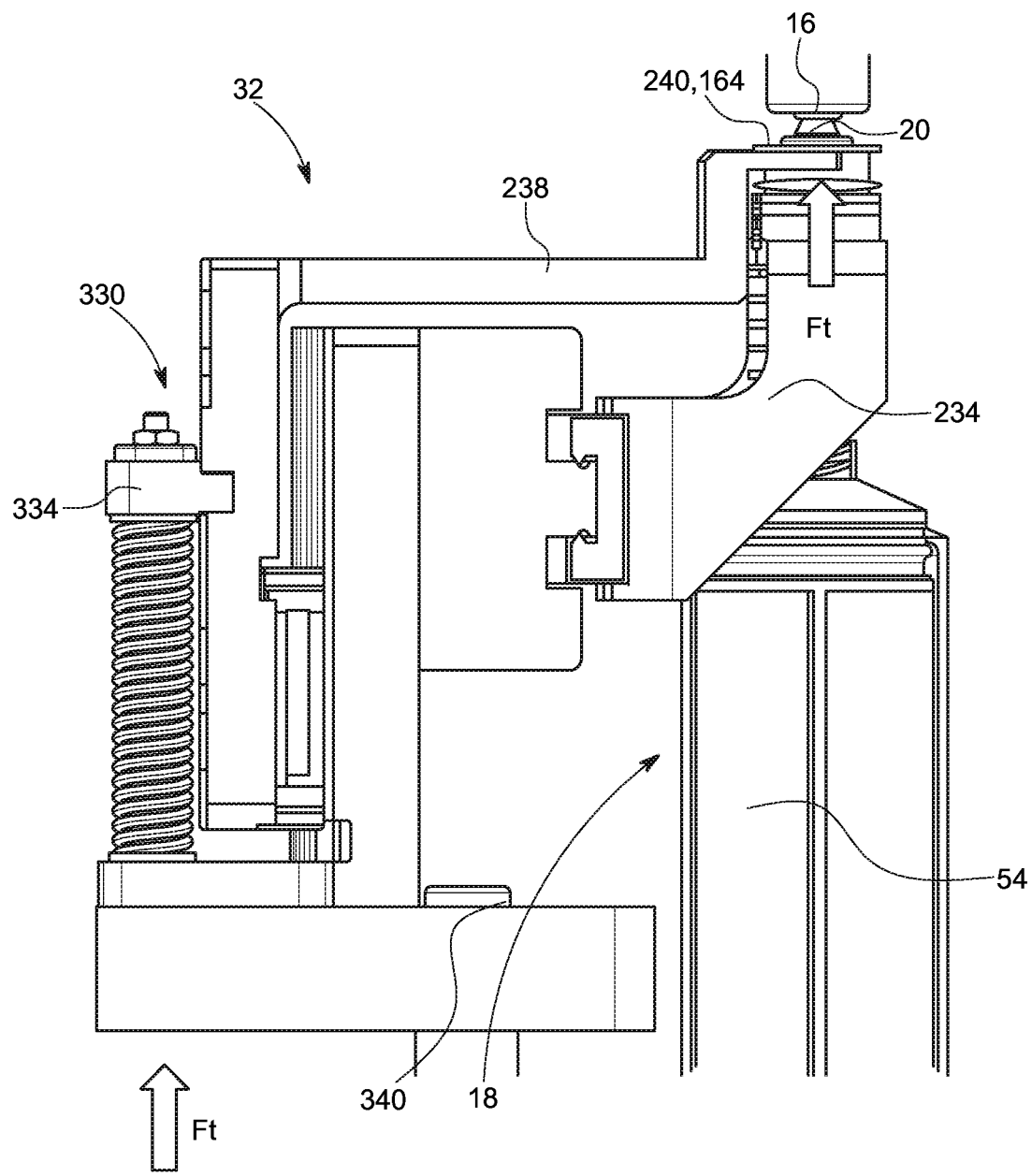
Figure 3E:
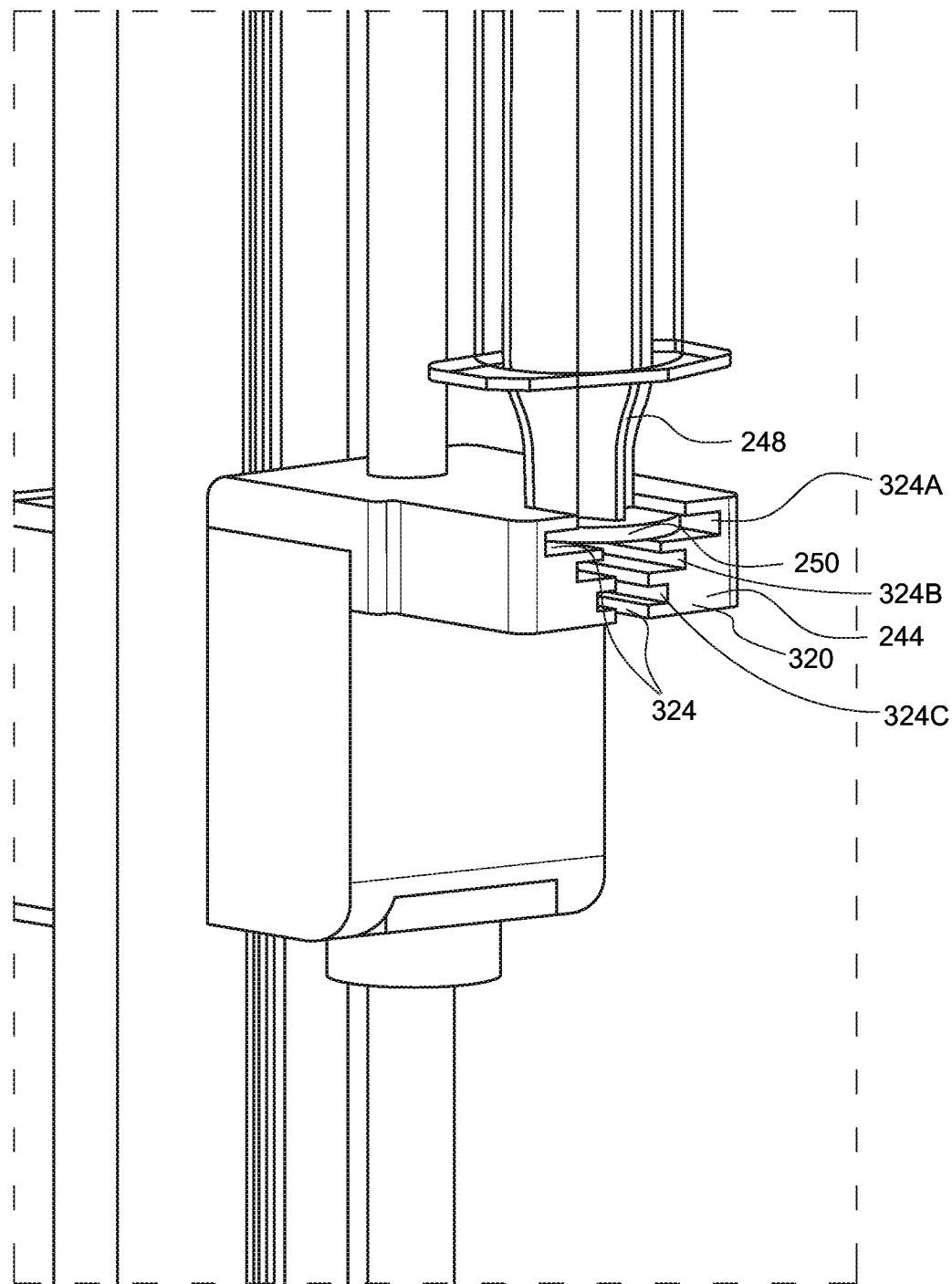
FIG. 3E is a pictorial illustration of a plunger arm of the manipulator of FIG. 3B.

As seen in FIG. 3D, when the axial force reaches the pressing threshold, the preloaded spring 334 may further compress, allowing support base 340 to advance the gripping arm 234 towards the engaging arm 238. The applied force Ft on the base 340 is transmitted to the engaging arm 238, coupled to the spring 334, which applies the force Ft on radial stop 164. In turn, the radial stop 164 presses the syringe septum 20 towards the container-septum 16 with the Force Ft.

When the axial force reaches the pressing threshold, the preloaded spring's further compression enables the base support 340 to advance the gripping arm 234 towards the engaging arm 238, causing the needle 22 to extend into the syringe-septum 20 while the syringe-septum 20 presses against the container-septum 16 at the force Ft and/or a force greater than Ft.

In some examples, the spring 334 may be formed of a structure, e.g. of a spring constant (k) designed to allow the spring to compress upon application of the axial compression force of the magnitude of Ft. The spring constant may be determined based on any one or more of: a measure of the stiffness of the spring material, the thickness of the wire from which the spring is wound, the diameter of the spring coils (in case of a coiled spring) of the turns of the coil, the pitch of the spring, and the overall length of the spring.

The compression element 334 may comprise any mechanical element resistive to a force which is arranged to be compressible only when the axial compression force of the magnitude of the predetermined pressing threshold (Ft) is applied on the mechanical element. In a non-limiting example, the mechanical element may comprise the spring 334.

Accordingly, it is recognized that due to the pressing mechanism 330, the needle is allowed to extend through the syringe-septum 20 only when the predetermined compression threshold between the syringe-septum 20 and the container-septum 16 is reached and maintained.

The compression element 334 may comprise any element configured to press upon the manipulator 32, e.g. a piston, a pneumatic actuator, a hydraulic actuator and the like.

It is appreciated that the pressing mechanism 330 may comprise any configuration for ensuring the predetermined compression threshold as described hereinabove, such as by way of example, a mechanical or electrical stopper configured to allow the extension of the needle 22 into the syringe-septum 20 only upon detection by a pressure sensor that the predetermined compression threshold was reached.

Figure 11A:
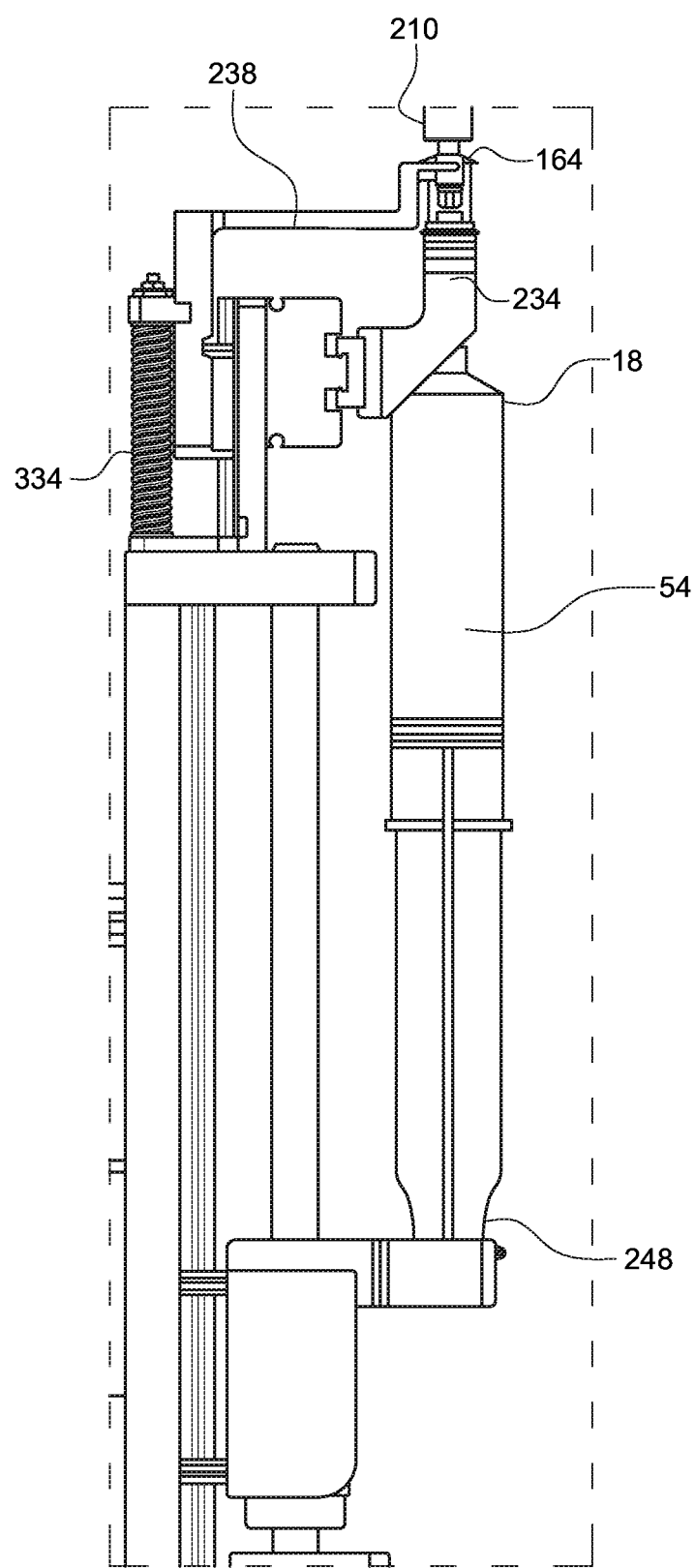
FIGS. 11A-C are illustrations of the fluid transfer station at a sixth operational stage shown at a front view (11A), a side view (11B) and a cross-sectional illustration of FIG. 11B (11C), according to an example of the presently disclosed subject matter.
Figure 11B:
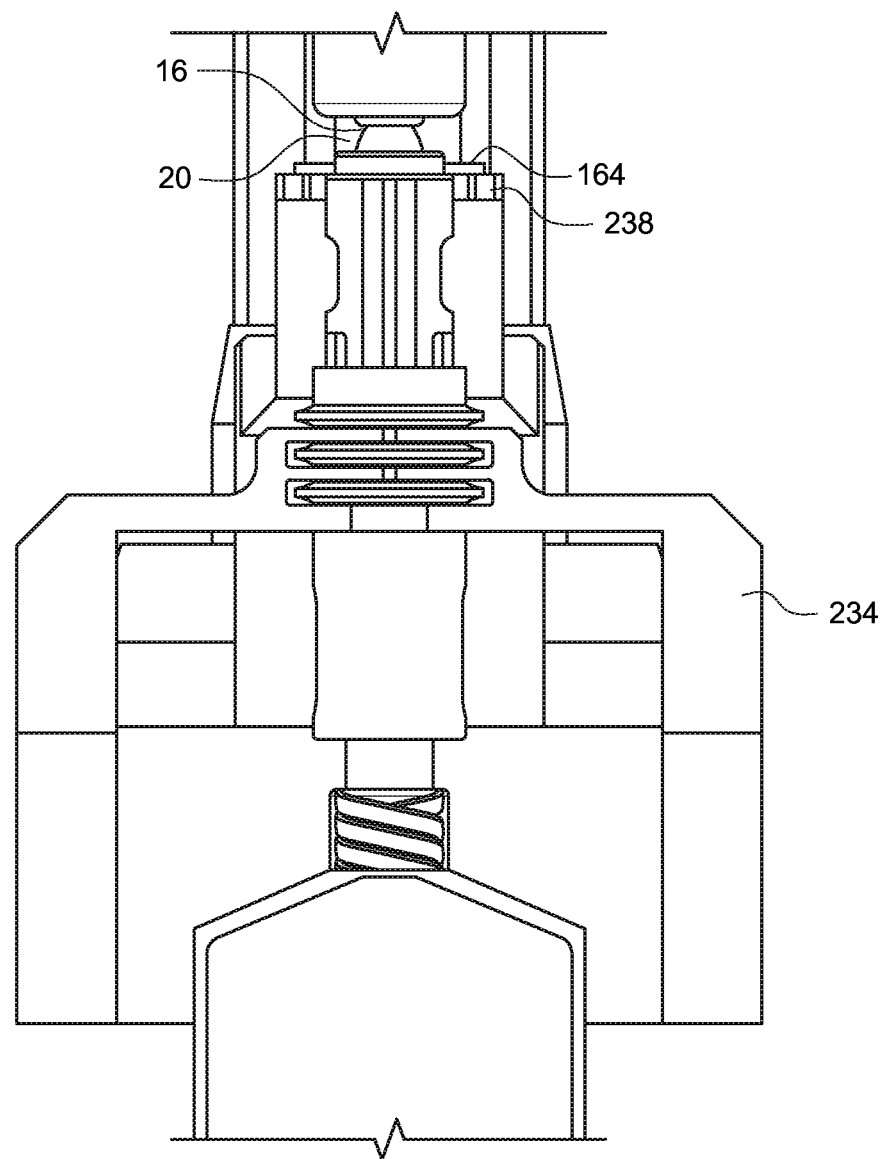
Figure 11C:
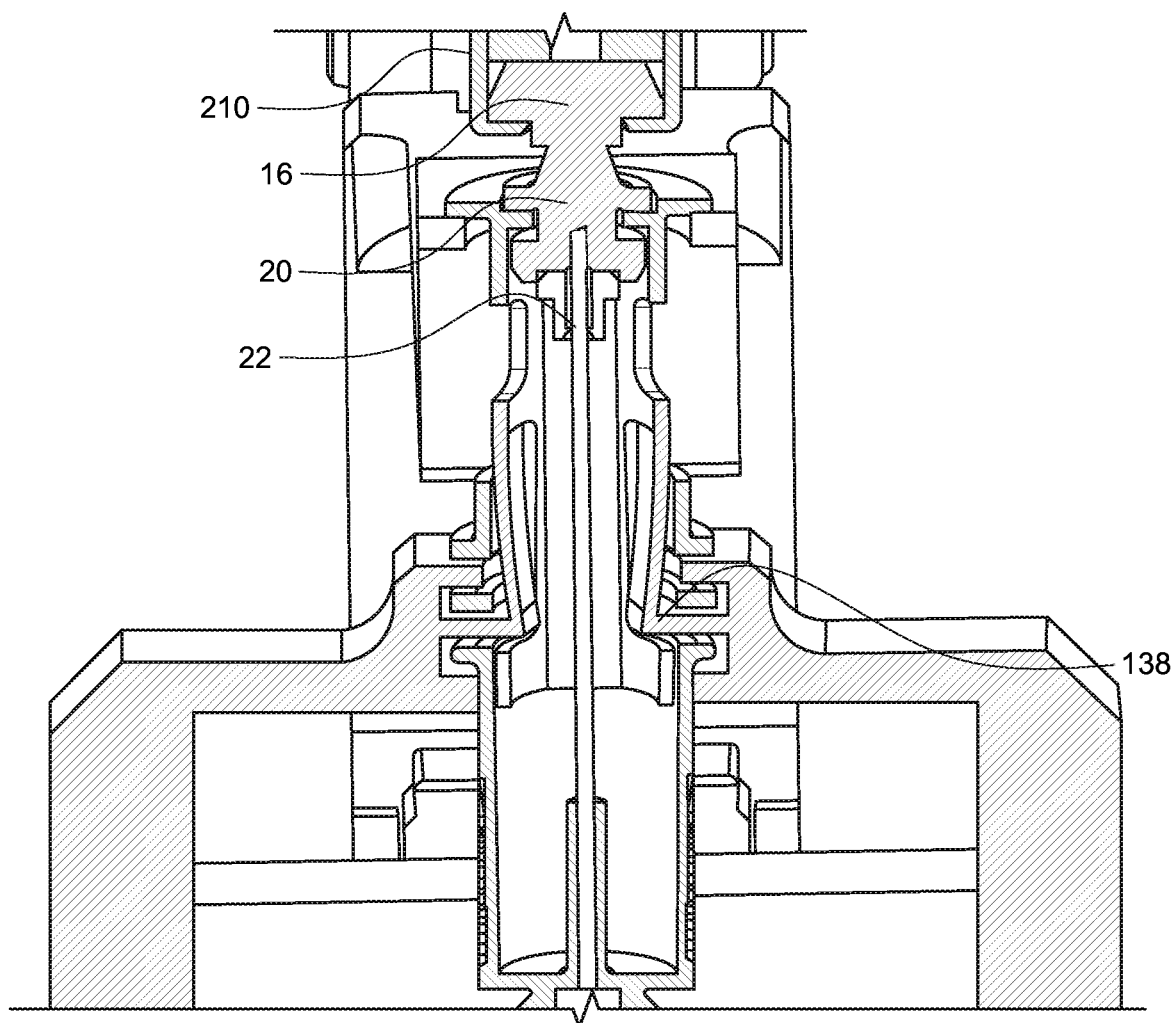

Furthermore, the compression element 334 is configured to maintain the predetermined compression threshold between the syringe-septum 20 and the container-septum 16 during withdrawal of the needle 22 from the container-septum 16, as will be further described in reference to the operational stage shown in FIGS. 11A-C.

Following withdrawal of the needle 22 from the container-septum 16, the base support 340 may be moved away from the container-septum 16 ceasing its application of force on the engaging arm 238. At this stage of operation, the spring 334 or any other compression element is configured to press the engaging arm 238 against the radial stop 164 thereby securing the engaging arm 238 to the radial stop 164.

In some examples the pressing mechanism 330 may constitute a contact securing mechanism configured for preventing the extension of the needle 22 at least until the predetermined compression threshold between the container-septum 16 and the syringe-septum 20 is reached. The manipulator is configured to apply a compression force with a magnitude less, equal or more than the predetermined compression threshold.

Accordingly, the contact securing mechanism is configured for preventing the extension of the needle 22 whereupon the manipulator 32 applies the compression force with a magnitude less than the predetermined compression threshold. Furthermore, the contact securing mechanism is configured for allowing the extension of the needle 22 whereupon the manipulator 32 applies the compression force with a magnitude equal or more than the predetermined compression threshold.

In some examples, the extension of the needle 22 is allowed following detection of an event. The event may be indicative that the compression force magnitude is equal or more than the predetermined compression threshold. In some examples, the event comprises the commencement of compression of the compression element. In some examples, the event comprises the commencement of compression of the spring. The spring (e.g. spring 334 in FIG. 3C) is configured to resist compression when the compression force magnitude is less than the predetermined compression threshold.

In some examples, the event is detected by a sensor (e.g. a sensor 358 shown in FIG. 3F) configured to detect that the compression force magnitude is equal or more than the predetermined compression threshold and to generate a signal indicative thereof. In some examples, the sensor comprises an optical sensor configured to detect the commencement of compression of the spring based on a change in light caused by the compression of the spring. In some examples, the sensor can be configured to monitor the relative movement of the engaging arm and the gripping arm. In some examples, the sensor can be configured to monitor relative position of at least one of the engaging arm 238 and the gripping arm with respect to the other one. In some examples, the sensor can be configured to monitor deformation (in the illustrated example, compression) of the spring and/or force acting on the spring. In some examples, the sensor can be configured to monitor a power consumption by the motor that is moving the manipulator for its operations. The controller unit is configured to determine an exact location of the fluid transfer conduit (needle, in the illustrated examples) with respect to the septa based on the above-described monitoring by the sensor. For instance, the controller unit is configured to use at least some of the knowledge of the length of the needle, the syringe connector, the spring, various dimensions of the engaging arm and gripping arm, the power consumption of the motor to determine whether a tip (or the port of the needle configured for transfer of fluid) of the needle is at a reference location which is most suited (predetermined location) for the transfer of fluid.

In some examples, following the transfer of the fluid, the gripping arm 234 may move the body member 52 away from the sleeve 58, which removes the needle 22 from the container-septum 16. The engaging arm 238 and the gripping arm 234 are distanced from the container 14 for disconnecting the syringe-septum 20 from the container-septum 16. The controller unit 30 is configured to operate the gripping arm 234 to distance the body member 52 from the sleeve 58 so that the needle 22 is moved into the syringe-septum 20 and the distal tip of the needle 22 is enclosed in the syringe-septum 20.

In some examples, a sensor 358 is provided and configured to detect the reaching of the predetermined compression threshold between the container-septum 16 and the syringe-septum 20 and to generate a signal indicative thereof. Upon receipt of the signal, the controller unit 30 causes the needle 22 to extend through the syringe-septum 20 and thereafter through the container-septum 16 and to the container.

The sensor 358 may be positioned at any suitable location and may comprise any suitable configuration facilitated for detecting the reaching of the predetermined compression threshold.

Figure 3F:
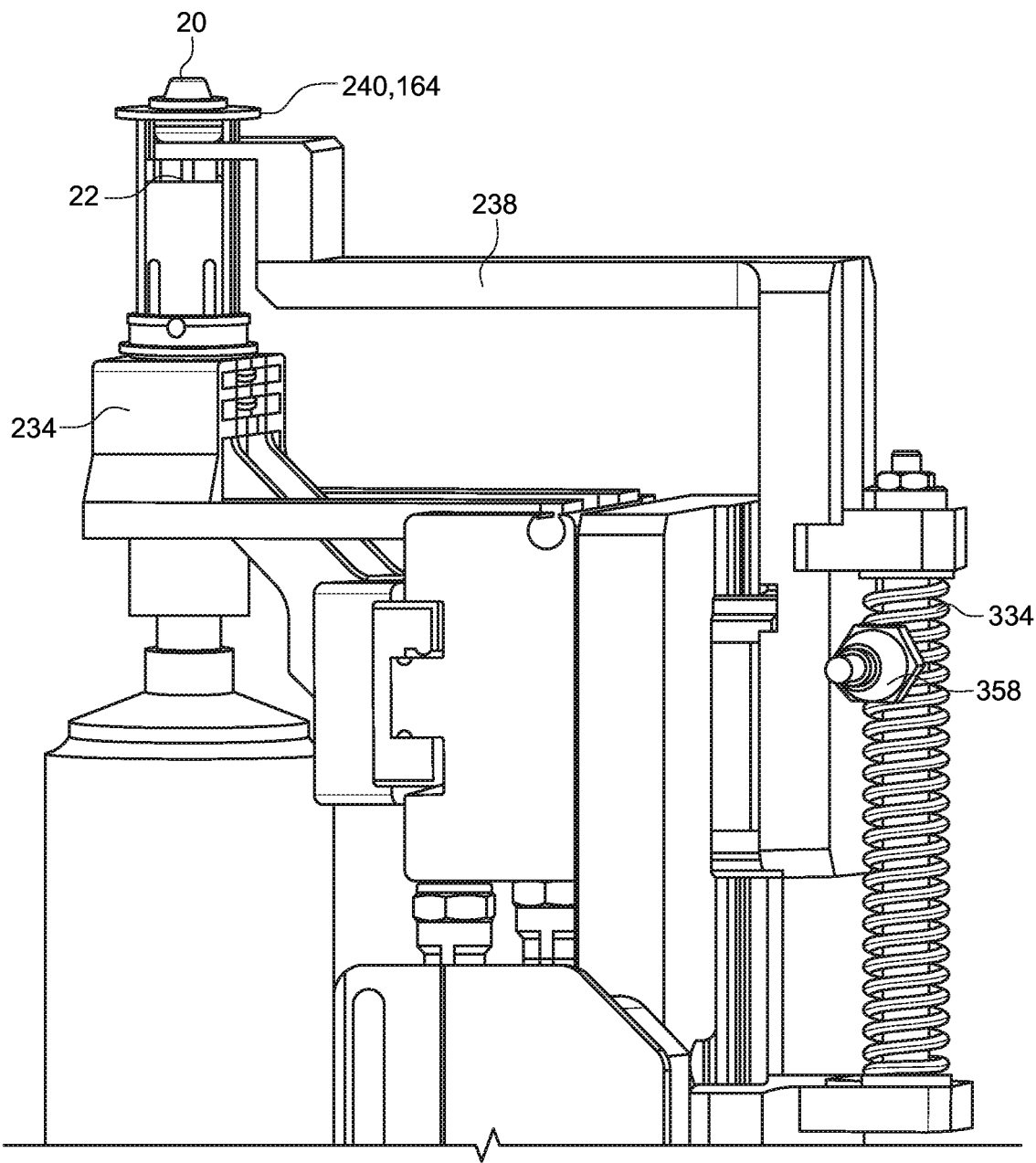
FIG. 3F is a pictorial illustration of the pressing mechanism of FIG. 3C and further comprising a sensor, constructed and operative according to an example of the presently disclosed subject matter.

In some examples, such as shown in FIG. 3F, the sensor 358 may be positioned proximally to the spring 334 and may be configured to detect the contraction of the spring 334. As the sensor 358 detects the commencement of the contraction of the spring 334, the sensor 358 transmits a signal indicative thereof, which causes the controller unit 30 to allow the support base 340 to advance the gripping arm 234 towards the engaging arm 238. As described herein above with reference to FIG. 3D, the applied force Ft on the base 340 is transmitted to the engaging arm 238, coupled to the spring 334, which applies the force Ft on radial stop 164. In turn, the radial stop 164 presses the syringe septum 20 towards the container-septum 16 with the Force Ft. When the axial force reaches the pressing threshold, the preloaded spring's further compression enables the base support 340 to advance the gripping arm 234 towards the engaging arm 238, causing the needle 22 to extend into the syringe-septum 20 while the syringe-septum 20 presses against the container-septum 16 at the force Ft and/or a force greater than Ft.

In some examples, the controller unit 30 may be configured to cause the needle 22 to extend within the container 14 to a predetermined extent, generally in conjunction with a length of the needle 22.

It is noted that sensor 358 or an additional sensor may be configured to detect the movement of the gripping arm 234 or the engaging arm 238.

Figure 4A:
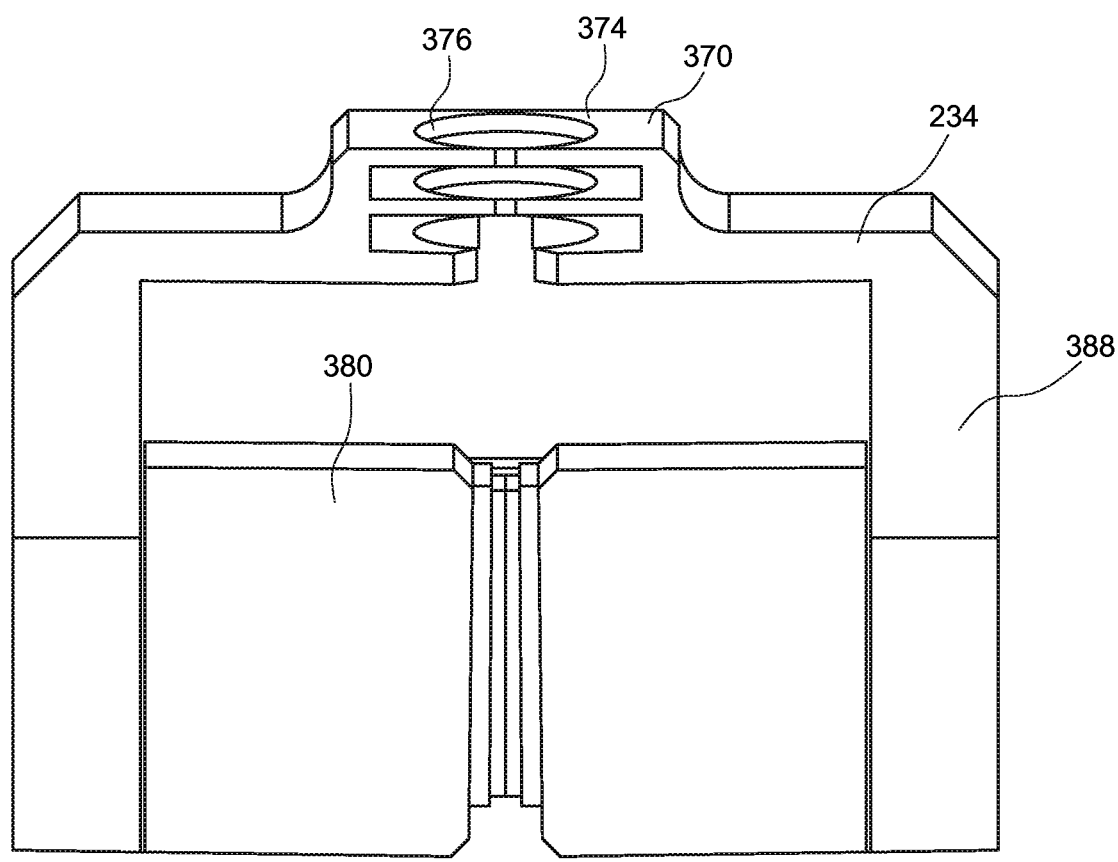
FIGS. 4A and 4B are side view, pictorial illustrations of a gripping arm of the manipulator of FIG. 3B, shown separately (4A) and during its operation in the robotic pharmaceutical preparation system (4B)
Figure 4B:
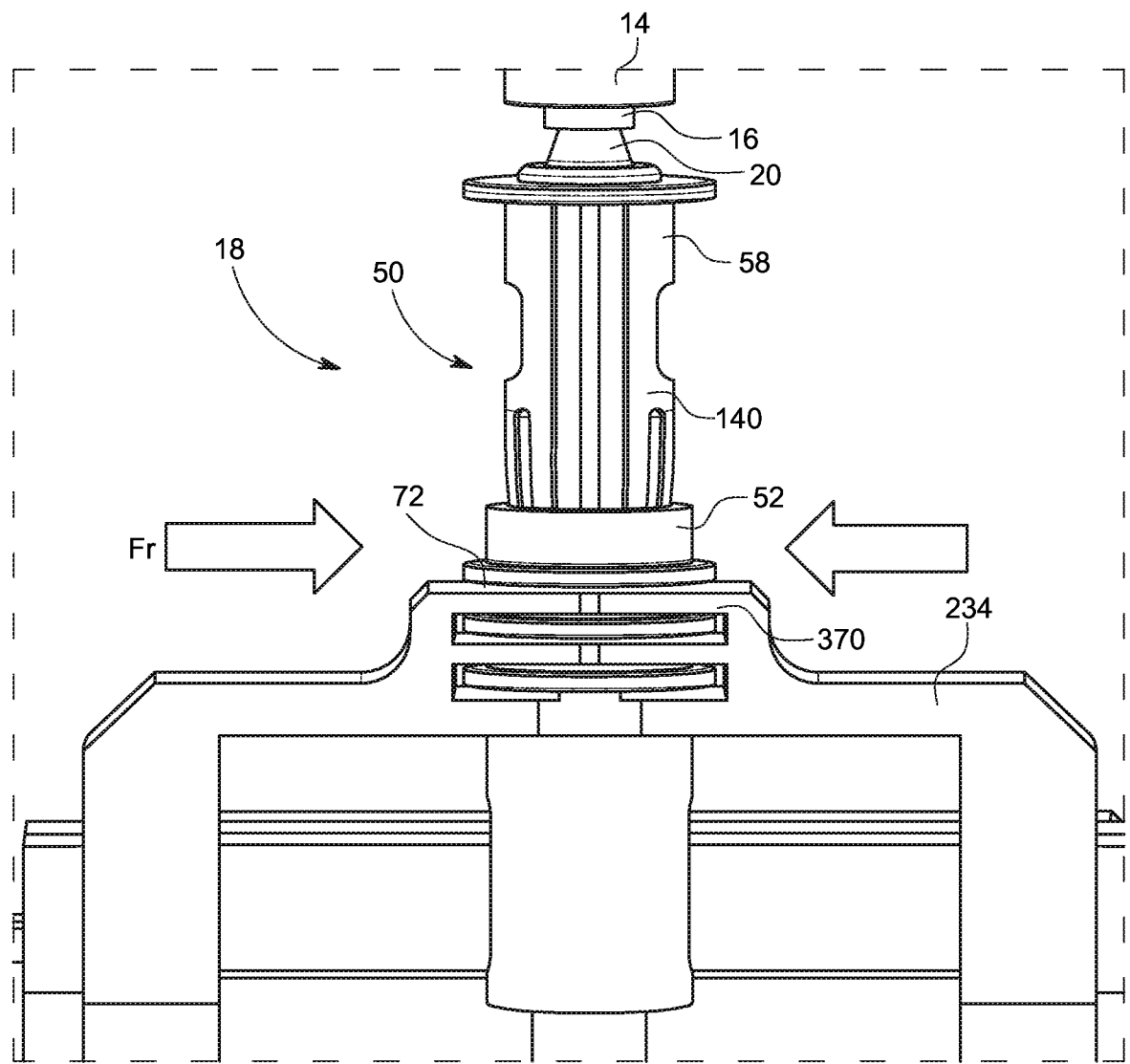

In some examples, the sensor 358 may comprise an inductive sensor operative to detect or measure objects by electromagnetic induction. In some examples, the sensor 358 may comprise an optical sensor configured to detect objects by sensing light or by any other suitable mechanism. FIGS. 4A and 4B are pictorial illustrations of the gripping arm 234 shown prior to its operation (4A) and during its operation (4B). As seen in FIGS. 4A and 4B, the gripping arm 234 comprises at least one projecting element 370 configured to apply a radial or lateral force Fr on the external wall 140 of the syringe connector 50 (4B). The controller unit 30 is configured for controlling the gripping arm 234 to selectively apply the radial or lateral force Fr so as to press upon the syringe-connector actuator 72 of the syringe assembly 18.

The projecting element 370 may be formed in any suitable manner, such as a plate 374 formed with an arcuate groove 376. In some examples, the gripping arm 234 comprises at least two (or more) oppositely facing plates 374 comprising a first and second pair (or more) of projecting elements 370, which are configured for accessing the first and second pairs of openings 148 and 150 (2G), respectively. The two oppositely facing plates are configured to be spaced apart from each other such that the arcuate grooves 376 form a gap therebetween. The gap is dimensioned for disposing the syringe assembly 18 therein.

The gripping arm 234 may comprise an additional pair of projecting elements 378 for securing its grip on the grip portion 236.

The gripping arm 234 may comprise two mutually movable sliders 380 operable to separate from each other in the orientation of transverse axis x3 or any other axis, for positioning the projecting elements 370 away from the pairs of openings 148 and 150 (2A), and operable to reconnect for positioning the projecting elements 370 proximal to the pairs of openings 148 and 150. The sliders 380 may be configured to laterally slide along a grooved support bar 384 mounted on the mounting wall 346 (3C) comprising a driving actuator, such as a pneumatic actuator configured to move the grooved support bars 384 towards and away from each other in the orientation of transverse axis x3.

The gripping arm 234 may comprise two oppositely facing frames 388 configured for mechanically connecting the projecting elements 370 to the sliders 380.

Figure 5A:
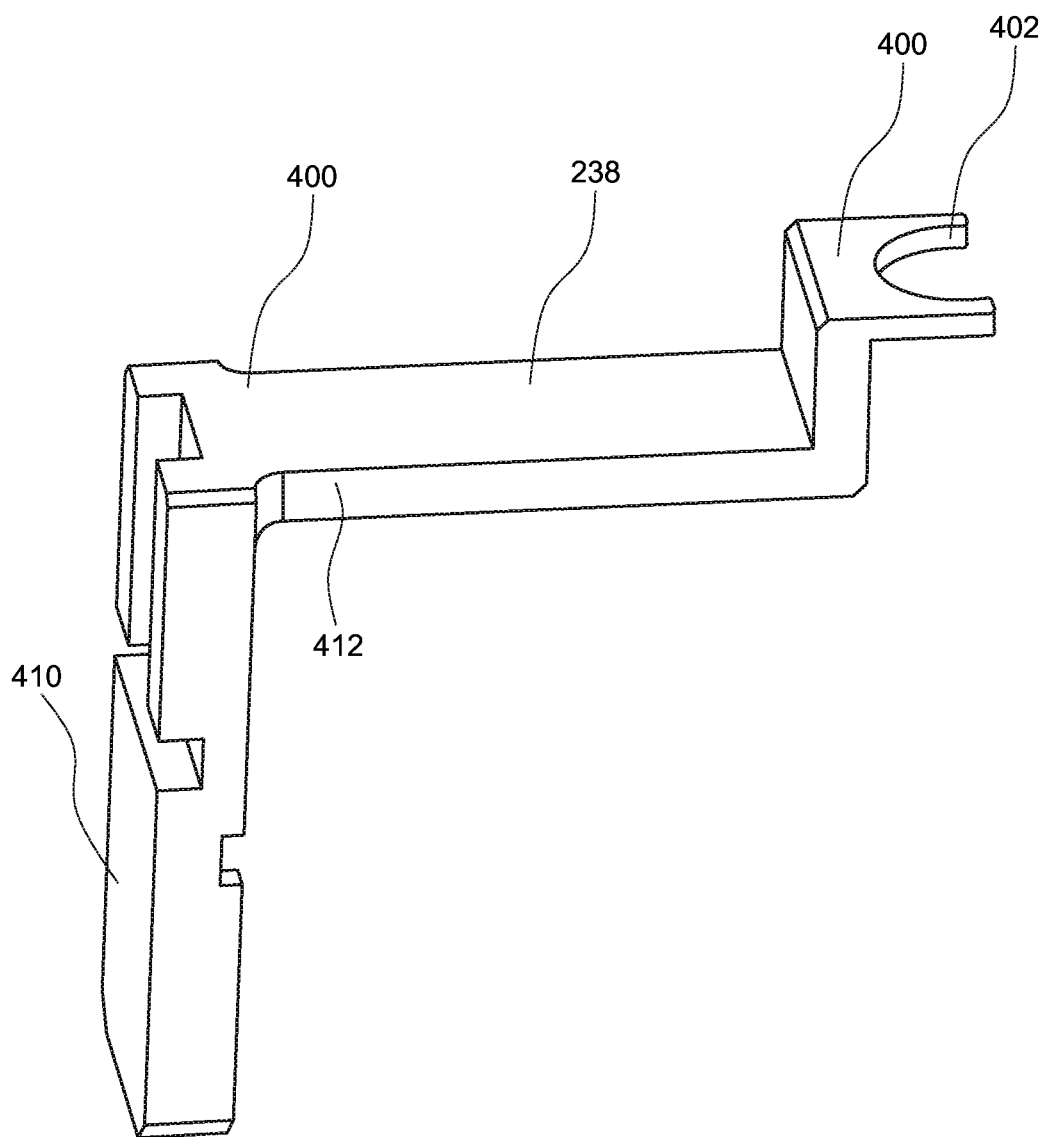
FIGS. 5A and 5B are front view, pictorial illustrations of an engaging arm of the manipulator of FIG. 3B, shown separately (5A) and during its operation in the robotic pharmaceutical preparation system (5B)
Figure 5B:
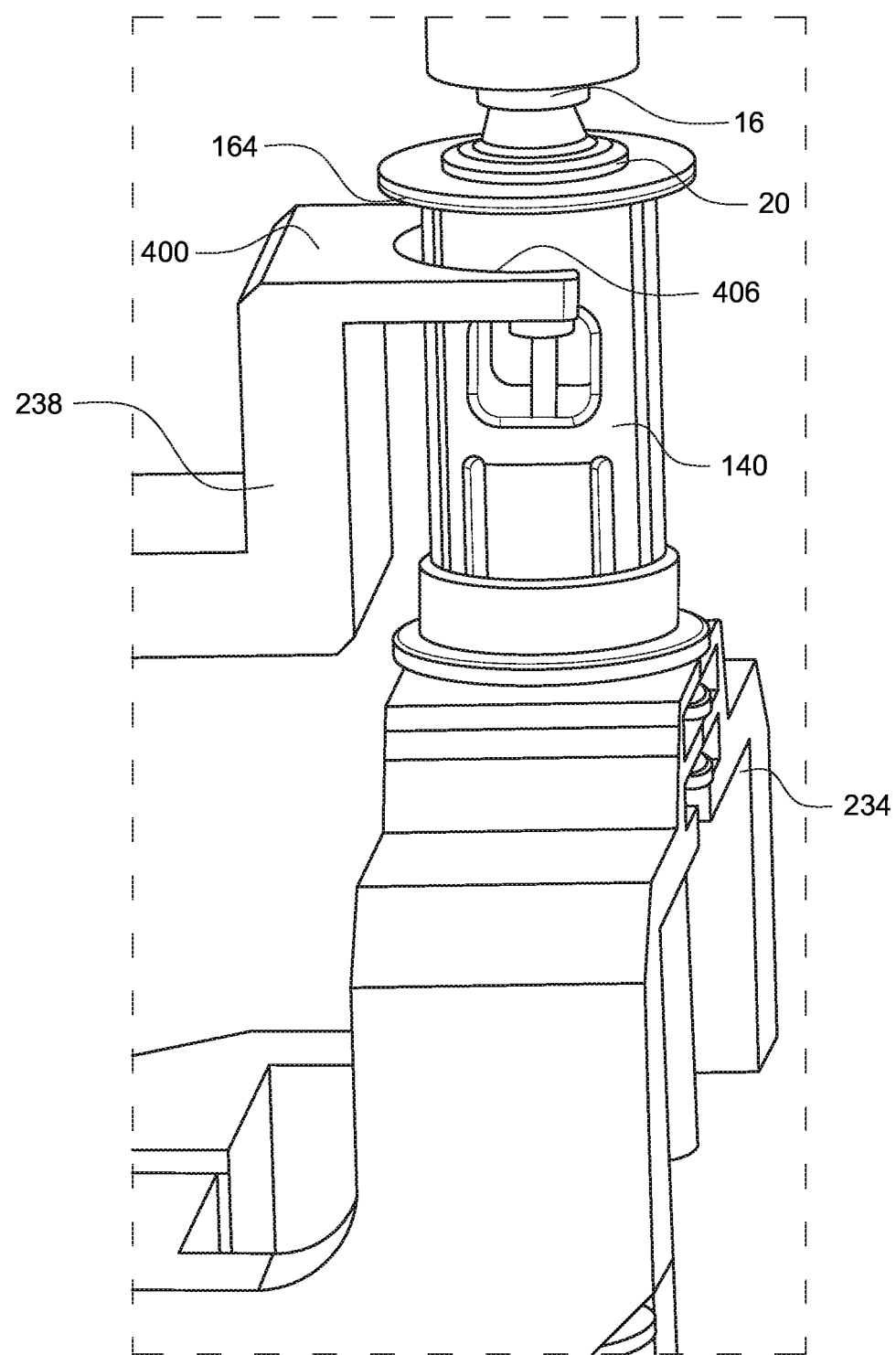

FIGS. 5A and 5B are pictorial illustrations of the engaging arm 238 shown prior to its operation (5A) and during its operation (5B). The engaging arm 238 is formed with a pressing surface 400 configured for pressing the engaging portion 240 of the syringe assembly 18 in any orientation (e.g. axial, radial, angular) and the engaging portion 240 may be disposed at any location of the syringe assembly 18. As seen in FIGS. 5A and 5B, the pressing surface 400 is configured for axially pressing the radial stop 164 of the syringe assembly 18 to secure the contact between the container-septum 16 and the syringe-septum 20, as shown in FIG. 5B.

In some examples, the pressing surface 400 comprises an arcuate portion 402 dimensioned to surround the syringe assembly 18 and to form a radial gap 406 with the external wall 140 of the syringe assembly 18. The gap may be dimensioned to allow the distal end of the body member 52 to abut with the radial stop 164 when the syringe connector 50 is positioned in the collapsed position (2H).

In an alternative example, the pressing surface 400 is configured to mate with external wall 140 of the syringe assembly 18 so that there is no radial gap between the external wall 140 the pressing surface 400.

The pressing surface 400 of engaging arm 238 generally extends perpendicularly to the longitudinal axis Lx1 and protrudes from an axially projecting portion 410 projecting from an inverted L-shaped bar 412.

It is appreciated that though it is described in reference to FIGS. 3A-5B that the engaging arm 238 engages the sleeve 58 and the gripping arm 234 grips the body member 52, the position may be interchanged and any one of the engaging arm 238 and the gripping arm 234 grips the body member 52, aligns the syringe assembly 18 with the container 14 and brings the syringe-septum 20 in contact with the container-septum 16. Any one of the engaging arm 238 and the gripping arm 234 presses the syringe-septum 20 against the container-septum 16 to secure contact therebetween. Any one of the engaging arm 238 and the gripping arm 234 causes the collapsible movement of the body member 52 towards the sleeve 58, which executes penetration of the container-septum 16 by the needle 22 for facilitating the transfer of the fluid.

It is noted that the fluid transfer station 10 or 10A may be configured in some examples with a relatively small footprint (namely comprising a relatively small area or floor space) due to the shifting of the manipulator 32 from a first to a second container holding module by rotation of the shaft 264 about rotation axis r1. For example the manipulator 32 rotates from the vial assembly holding module 208 to the IV bag holding module 214, which takes less space than linearly displacing the manipulator 32. Furthermore, the manipulator 32 may be formed as an integrated manifold comprising arms (e.g. the gripping arms, engaging arm and plunger arm) allowing the manipulator 32 to be controlled by relatively few driving actuators and less components than would have been required for discrete arms in a non-integrated manipulator.

Figure 5C:
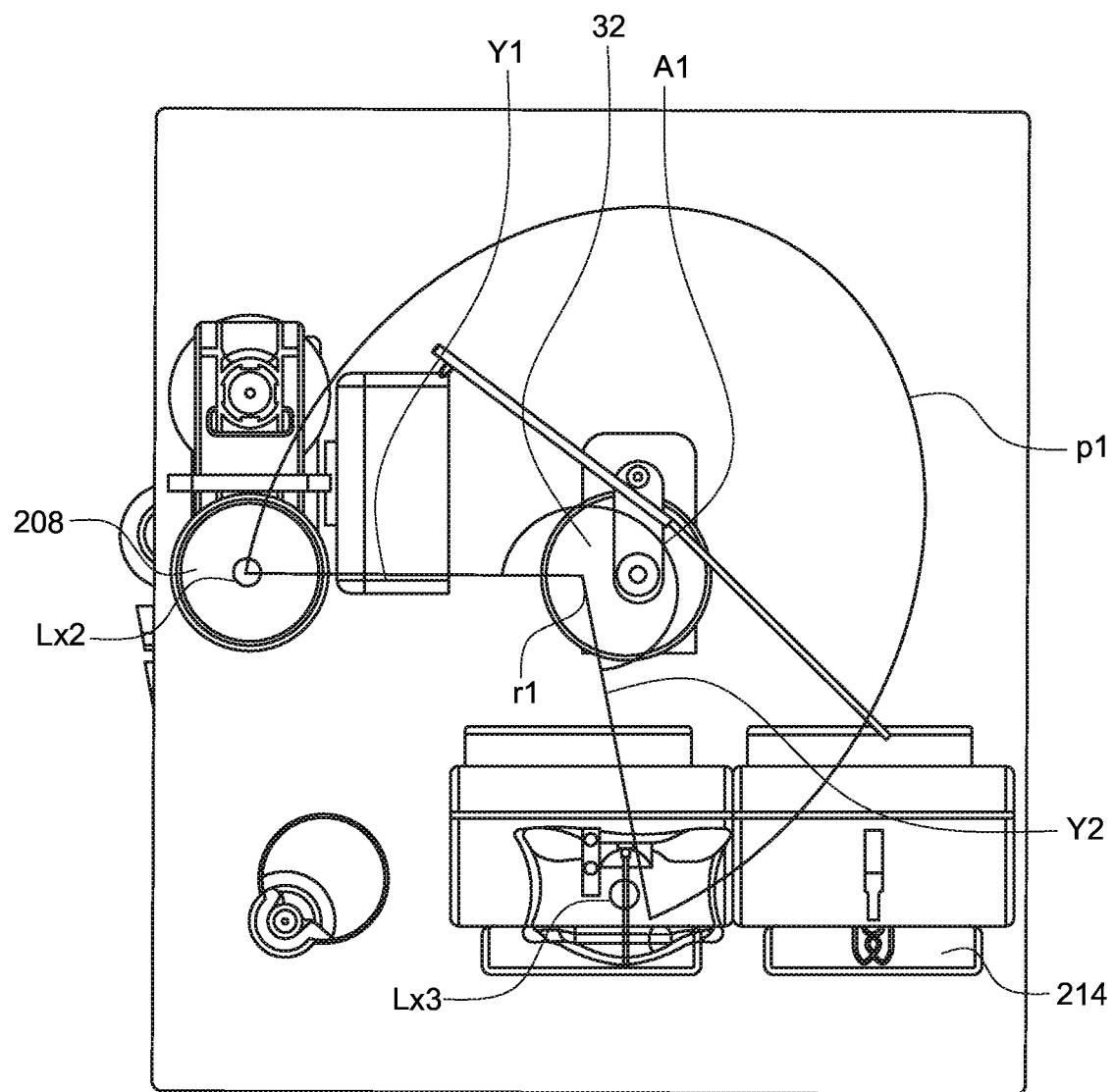
FIG. 5C shows a top view of a portion of FIG. 3A, constructed and operative according to an example of the presently disclosed subject matter.

As seen in FIG. 5C showing a top view of a portion of FIG. 3A, the manipulator 32 is configured to be a rotatable manipulator rotatable about its rotation axis r1 (3A). The rotation axis r1 may be the longitudinal axis of the manipulator 32, shown as vertical axis x1 in FIG. 3A.

The manipulator 32 is controllable by the controller unit 30 (FIG. 1A) to be rotated for moving the gripping arm 234 (FIG. 3A), while gripping the syringe assembly 18 between a first position, aligned with the first container holder, and a second position, aligned with the second container holder, along an arcuate path p1. The first and second container holders may comprise any one of the vial assembly holding module 208 and the IV bag holding module 214 and the first and second container holders spaced apart from each other by the arcuate path p1.

In some examples, the first and the second positions may be located at any suitable location. Such a location may comprise in a non-limiting example, one of the center of the vial, when positioned along axis Lx2 and the center of the IV bag, when positioned along axis Lx3. In another non-limiting example the location may comprise any location of the vial assembly holding module 208 and the IV bag assembly holding module 214.

In some examples, the gripping arm 234 is moved from the first position to the second position along the arcuate path p1 in a single and continuous motion. In some examples, the gripping arm 234 is moved from the first position to the second position only along the arcuate path p1 in a single and continuous motion.

The arcuate path p1 may be arranged around the rotation axis r1, such that the first container holder is configured to hold the first container (e.g. at the vial assembly holding module 208) at a first distance Y1 from the rotation axis taken in a first direction perpendicular thereto, and the second container holder (e.g. at the IV bag assembly holding module 214) is configured to hold the second container at a second distance Y2 from the rotation axis taken in a second direction perpendicular thereto. In some examples the first distance Y1 is equal to the second distance Y2. The first and second directions may define an arcuate path angle A1 of the first and second direction, which corresponds to an arc length of the arcuate path p1.

The manipulator 32 is configured to move at least a part of the syringe assembly 18 along a direction parallel to the rotation axis r1 when the syringe assembly 18 is at, at least one of the first and second positions. Furthermore, the manipulator 32 is configured to establish a first fluid communication between the syringe assembly 18 and the first container (e.g. the vial assembly 210) when the first container is held by the first container holder (e.g. the vial assembly holding module 208), and a second fluid communication between the syringe assembly 18 and the second container (e.g. the IV bag 216) when the second container is held by the second container holder (e.g. the IV bag assembly holding module 214). It is appreciated that the displacement of the manipulator 32 form the vial assembly holding module 208 to the IV bag holding module 214 and vice versa may be linear (i.e. not rotational) or any other axial and/or lateral displacement.

FIGS. 6A-15C illustrate ten subsequent operational stages for performing a method for fluid transfer within the fluid transfer station 10. It is appreciated that these stages are described by way of example and more or less operational stages may be performed. Additionally, it is appreciated that sequence of the stages may be interchangeable. Furthermore, the fluid transfer may be performed in other examples of the fluid transfer stations, such as for example the fluid transfer station 10A of FIGS. 16A-E.

In general, there is provided a method for using the robotic system 12 for transferring fluid between the container 14, which is accessible via the container-septum 16, and the syringe assembly 18 and is displaceable relative to the needle 22 to allow the needle 22 to extend therethrough. In some examples, the method may comprise one or more of the following operational steps: bringing the container-septum 16 into contact with the syringe-septum 20; extending the needle of the syringe assembly 18 through the container-septum 16 and the syringe-septum 20; transferring fluid via the needle 22 while the needle 22 extends through the container-septum 16 and the syringe-septum 20 and securing contact between the container-septum 16 and the syringe-septum 20 at least during the transfer of the fluid via the needle 22, while the needle 22 extends through the container-septum 16 and the syringe-septum 20. Securing contact between the container-septum 16 and the syringe-septum 20 is performed by the robotic system 12 pressing the container-septum 16 and syringe-septum 20 onto each other. It is to be understood herein that in examples without the needle or with needle not penetrating the septum, the step of penetrating the needle is replaced by a step of establishing fluid communication between the fluid transfer assembly and container.

In some examples, securing contact between the container-septum 16 and the syringe-septum 20 is performed by the robotic system 12 pressing the container-septum 16 and syringe-septum 20 onto each other additionally during needle extension through the container-septum 16 and the syringe-septum 20 and further during needle 22 withdrawal therefrom.

In some examples, securing the contact between the container-septum 16 and the syringe-septum 20 is performed when the container 14 and the syringe assembly 20 are free of securing means to secure the contact therebetween.

In some examples, securing the contact between the container-septum 16 and the syringe-septum 20 is performed when the engaging arm 238 is arranged to engage the syringe assembly portion (e.g. the engaging portion 240) away from the syringe-septum 20 and the container-septum 16.

In some examples, bringing the container-septum 16 into contact with the syringe-septum 20 comprises engaging the manipulator 32 with a portion of the syringe assembly 18 and coaxially positioning the manipulator 32 with the container-septum 16 at a predetermined axial distance from the container 14.

In some examples, extending the needle 22 through the container-septum 16 and the syringe-septum 20 comprises reducing the predetermined axial distance between the syringe assembly 18 and the container 14, thereby advancing the needle 22 towards the container 14.

In some examples, reducing the predetermined axial distance comprises advancing the manipulator 32 towards the container 14. In some examples, reducing the predetermined axial distance comprises advancing the container 14 towards the manipulator 32.

The contact between the container-septum 16 and the syringe-septum 20 may be a tightly sealed contact.

In some examples, the method additionally comprises providing the syringe connector 50 including the body member 52 connectable to the syringe 54 of the syringe assembly 20 at a syringe connecting portion. The body member 52 is shaped to define a body lumen. The method further comprises providing the sleeve 58 arranged coaxially movable relative to the body member 52. The syringe-septum 20 is mounted at a distal end 60 of the sleeve 58. The manipulator 32 comprises the engaging arm 238 and the gripping arm 234 controllable by the controller unit 30 for gripping another portion of the syringe assembly 18. The method yet further comprises coaxially positioning the gripping arm 234, while gripping the body member 52 (or in other examples, gripping the sleeve 58 and/or the syringe 54), at a predetermined axial distance from the container 14, and advancing the gripping arm 234 towards the container 14 for causing the collapsible movement of the body member 52 towards the sleeve 58 (or in some examples, causing the collapsible movement of the sleeve 58 towards the body member 52) for executing the penetration.

The following first to sixth operational stages shown in respective FIGS. 6A-11C illustrate the transfer of fluid at the vial assembly holding module 208 in between the vial assembly 210 and the syringe assembly 18 and particularly the withdrawal of the fluid from the vial assembly 210 into the syringe 54.

Figure 6A:
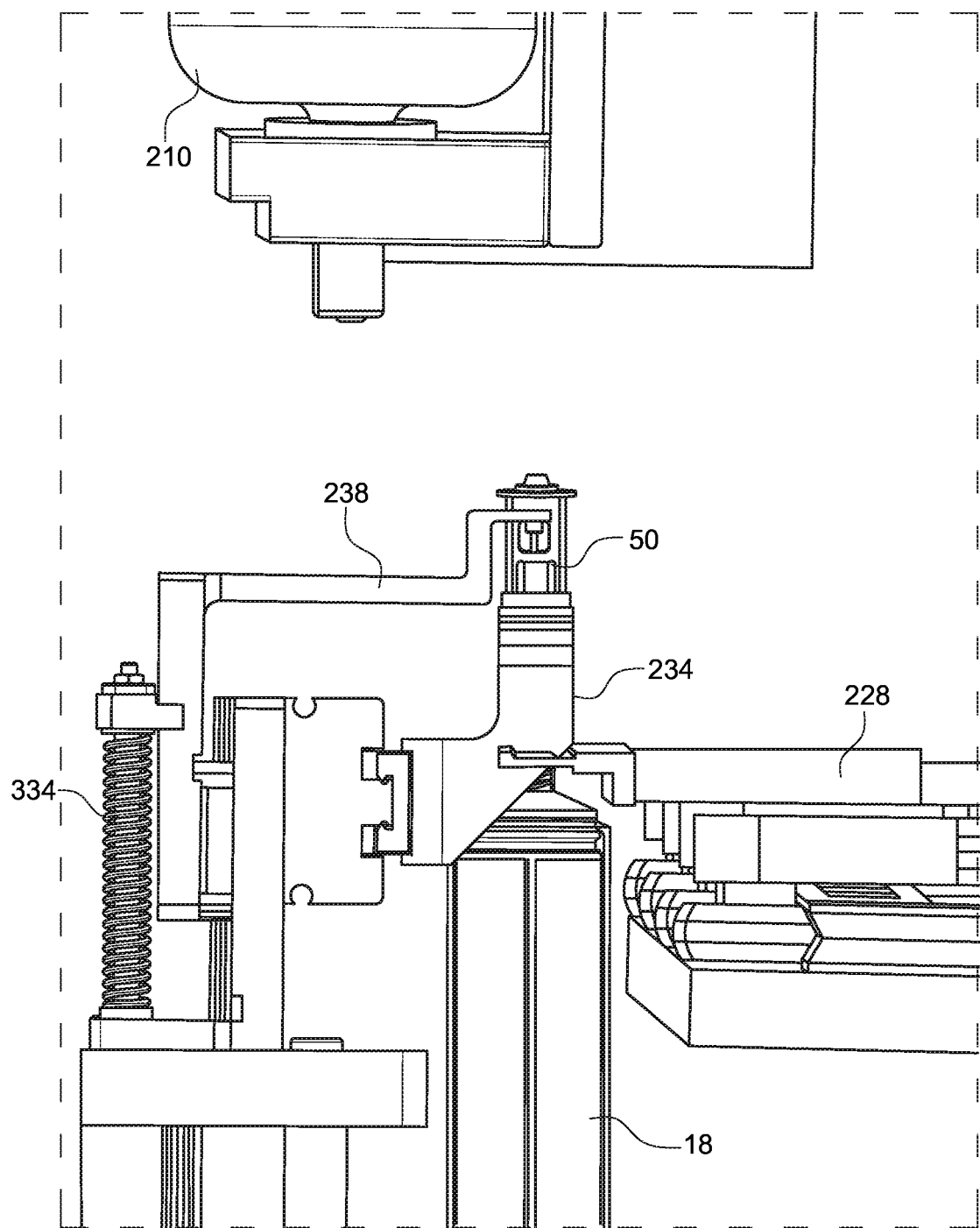
FIGS. 6A-C are illustrations of the fluid transfer station at a first operational stage shown at a front view (6A), a side view (6B) and a cross-sectional illustration of FIG. 6B (6C), according to an example of the presently disclosed subject matter.
Figure 6B:
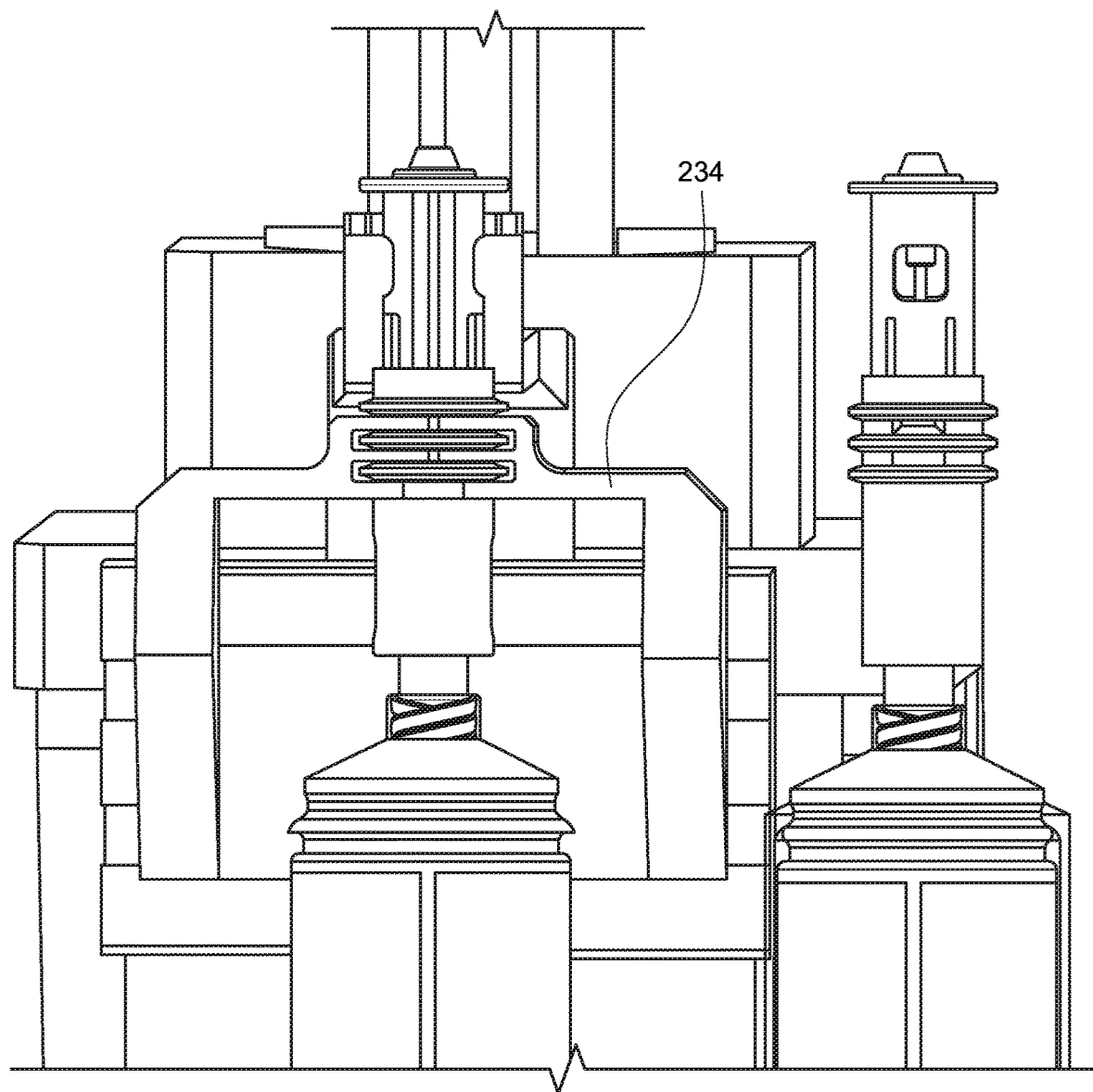
Figure 6C:
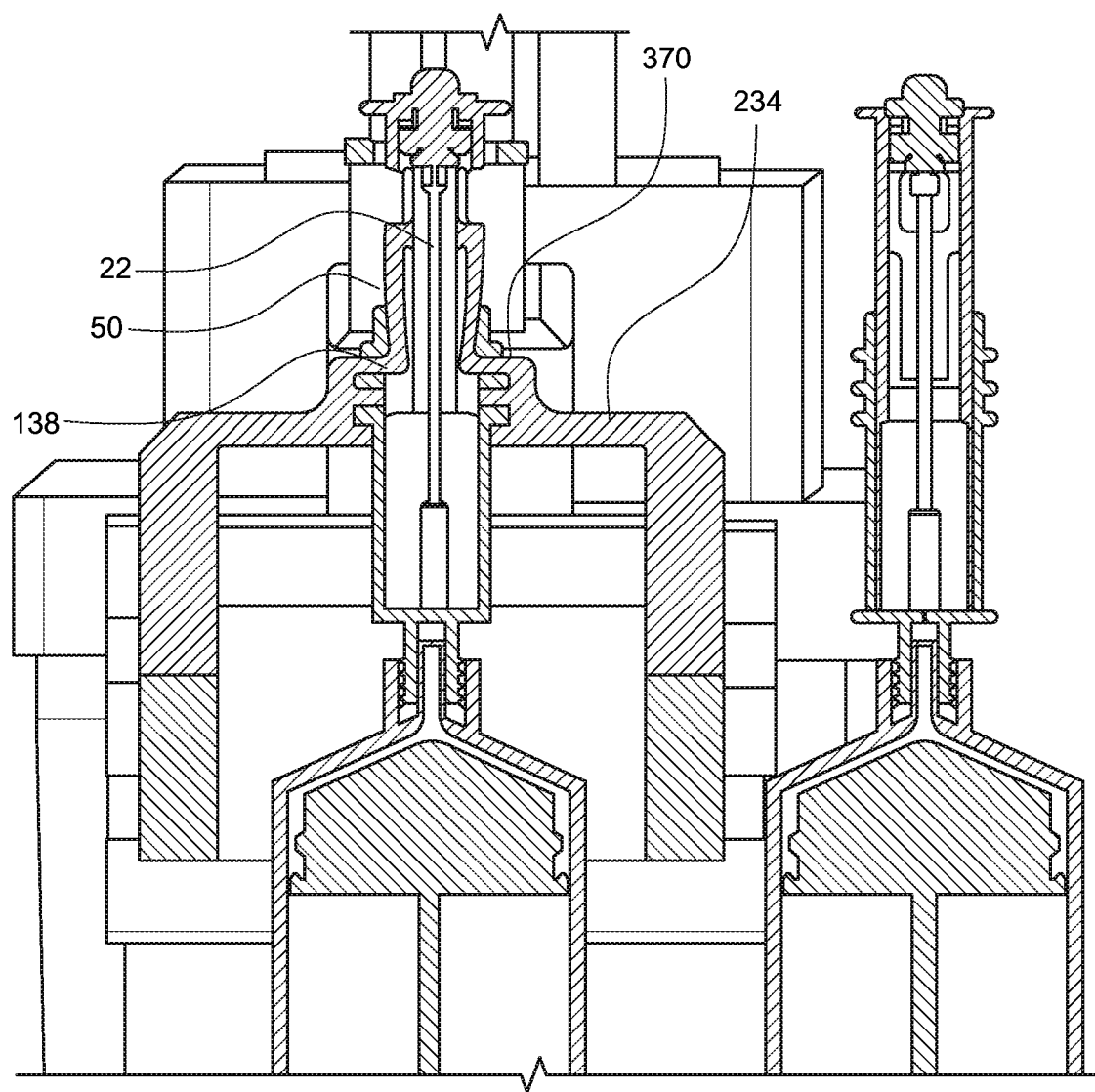

FIGS. 6A-C are pictorial illustrations of the fluid transfer station at a first operational stage. As seen in FIGS. 6A-C, at the first initial stage of operation the gripping arm 234 grabs a selected syringe assembly 18 from the carousel conveyor 228. To reach the carousel conveyor 228 the gripping arm 234 is horizontally advanced towards the carousel conveyor 228. The gripping arm 234 retracts back towards the vial assembly 210 along horizontal axis x2 (3A).

Prior to being grabbed by the gripping arm 234, the syringe connector 50 is locked at the extended position where the needle tip is proximal to the septum proximal surface 62. This extended position may be deployed for allowing sterilization of the needle including its needle tip, when positioned proximal to the septum proximal surface 62. Sterilization gasses penetrating the syringe connector 50 are thereby allowed to sterilize the needle 22 along with the needle tip. It is noted that in some embodiments the extended position may be obviated and the syringe connector 50 is placed within the syringe assembly 18 priorly set in the intermediate position where the needle is disposed in the syringe-septum.

Thereafter, as the gripping arm 234 grabs the syringe assembly 18, the projecting elements 370 (6C) of the gripping arm 234 apply a radial or lateral force Fr on the protruding portion 138 of the syringe connector 50. This induces actuation of the locking mechanism 70 (1B) for transitioning the syringe connector 50 from the locked state to the unlocked state.

The engaging arm 238 is positioned away from the engaging portion 240 (i.e. radial stop 164). The spring 334 of the pressing mechanism 330 is at its preloaded state.

Figure 7A:
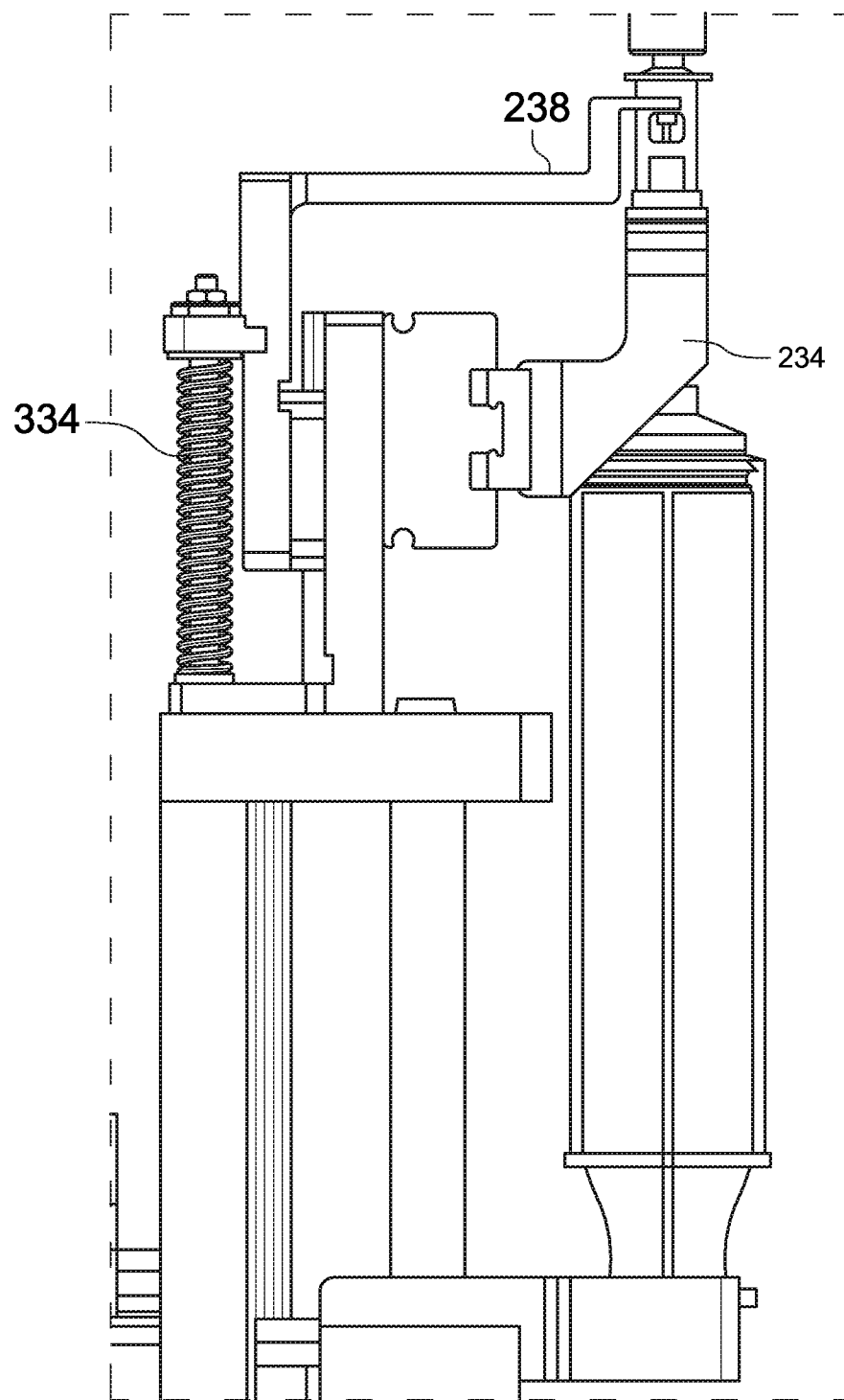
FIGS. 7A-C are illustrations of the fluid transfer station at a second operational stage shown at a front view (7A), a side view (7B) and a cross-sectional illustration of FIG. 7B (7C), according to an example of the presently disclosed subject matter.
Figure 7B:
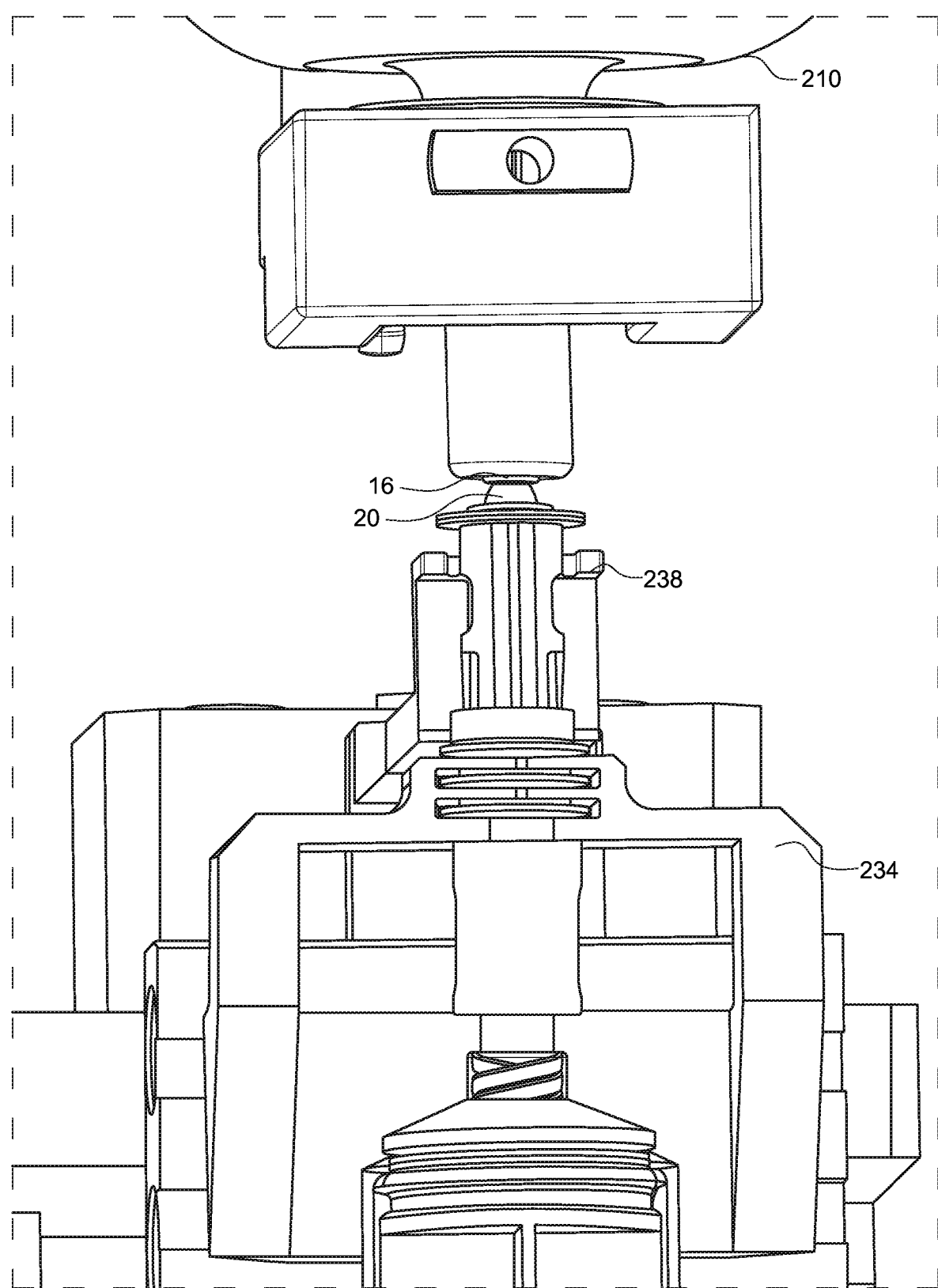
Figure 7C:
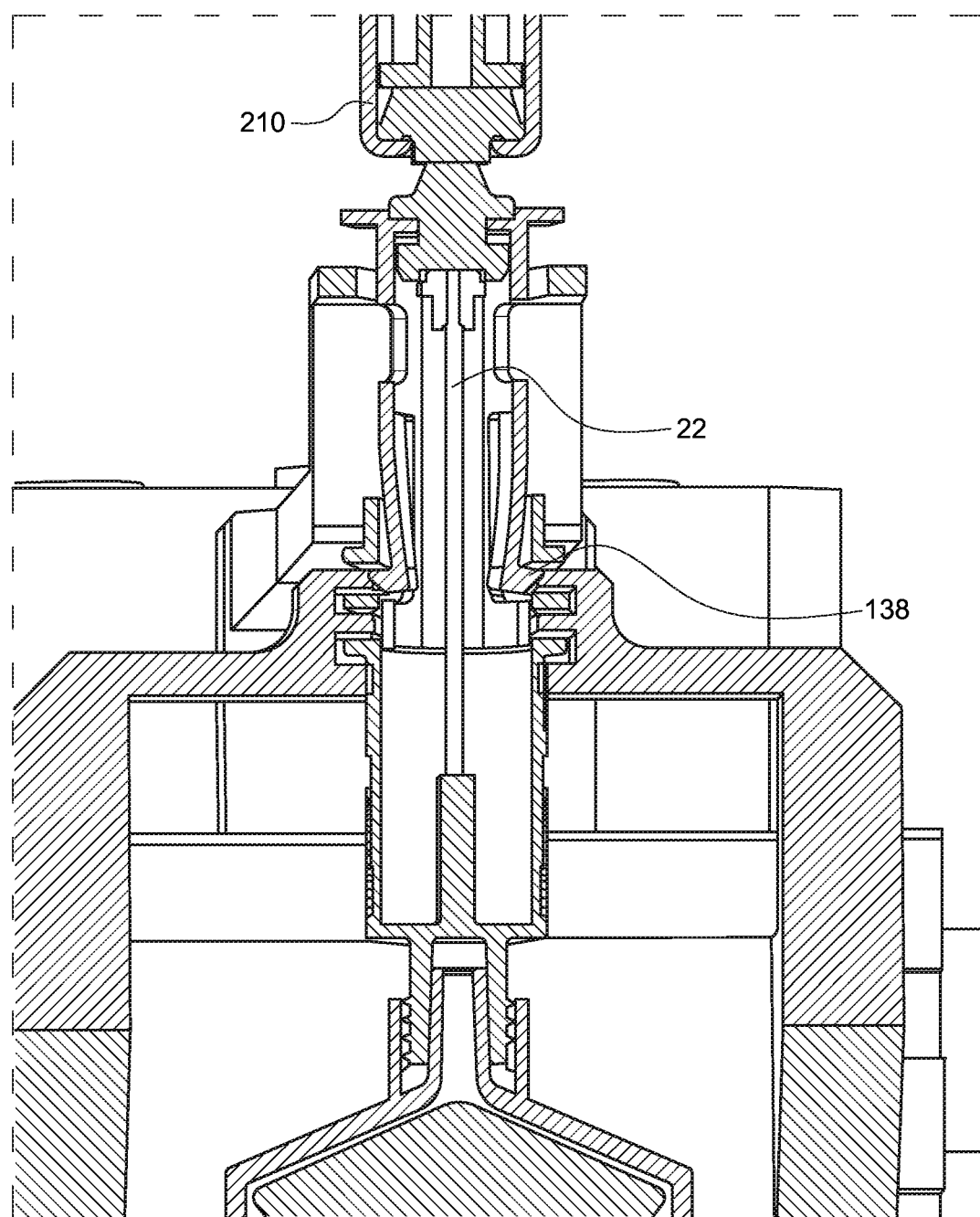

FIGS. 7A-C are pictorial illustrations of the fluid transfer station at a second operational stage. As seen in FIGS. 7A-C, at the second stage of operation the gripping arm 234 and the engaging arm 238 start advancing towards the vial assembly 210 along longitudinal axis Lx1 for bringing the syringe-septum 20 into contact with the container-septum 16.

The engaging arm 238 remains positioned away from the engaging portion 240 (e.g. radial stop 164). The spring 334 of the pressing mechanism 330 remains at its preloaded state.

The syringe connector 50 is at an unlocked state yet still at the extended position, where the needle tip is proximal to the septum proximal surface 62. In some embodiments, the syringe connector 50 is prepositioned in the intermediate (namely normal) position.

It is noted that in some embodiments the extended position can be referred to as the intermediate position, and the extended position and/or the intermediate position can each be referred to as the normal position.

Figure 8A:
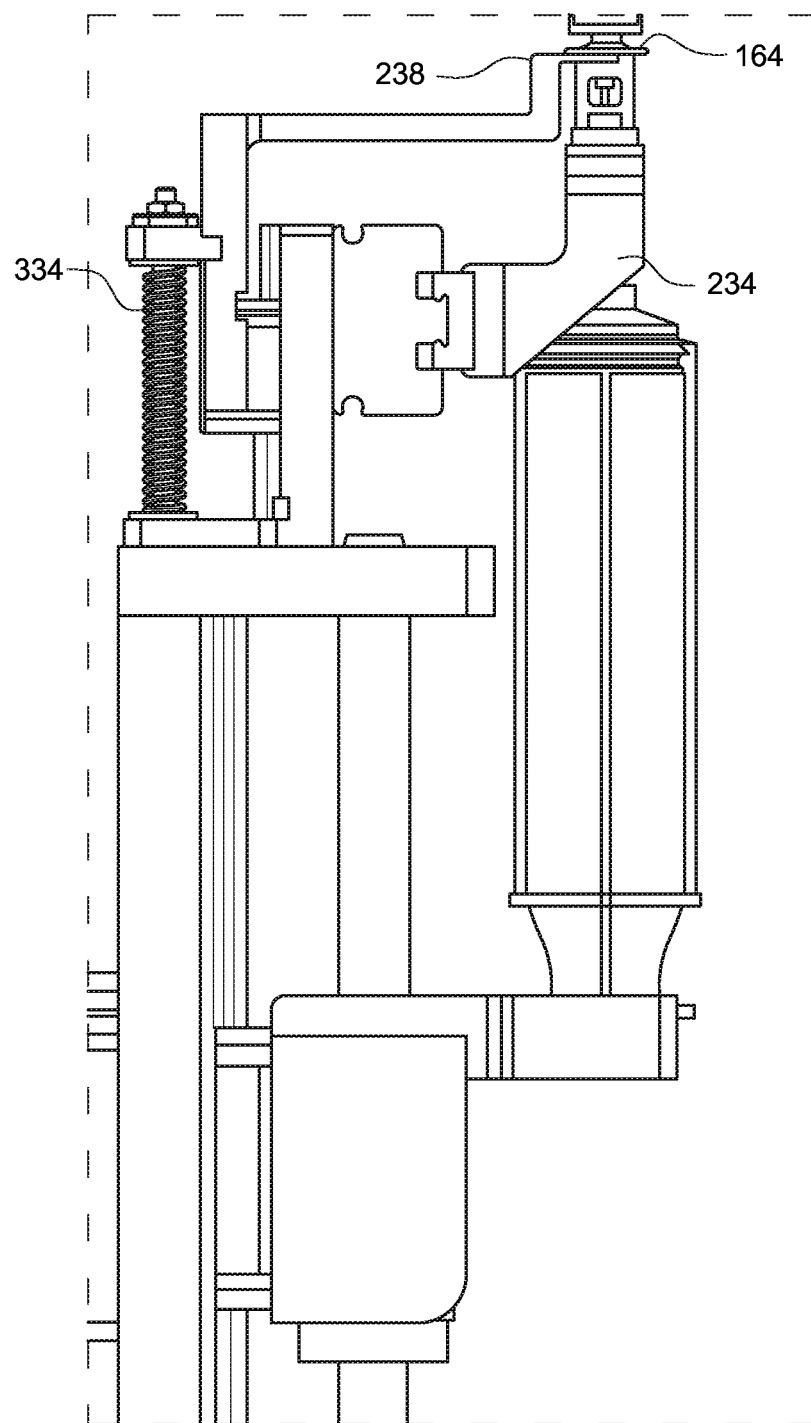
FIGS. 8A-C are illustrations of the fluid transfer station at a third operational stage shown at a front view (8A), a side view (8B) and a cross-sectional illustration of FIG. 8B (8C), according to an example of the presently disclosed subject matter.
Figure 8B:
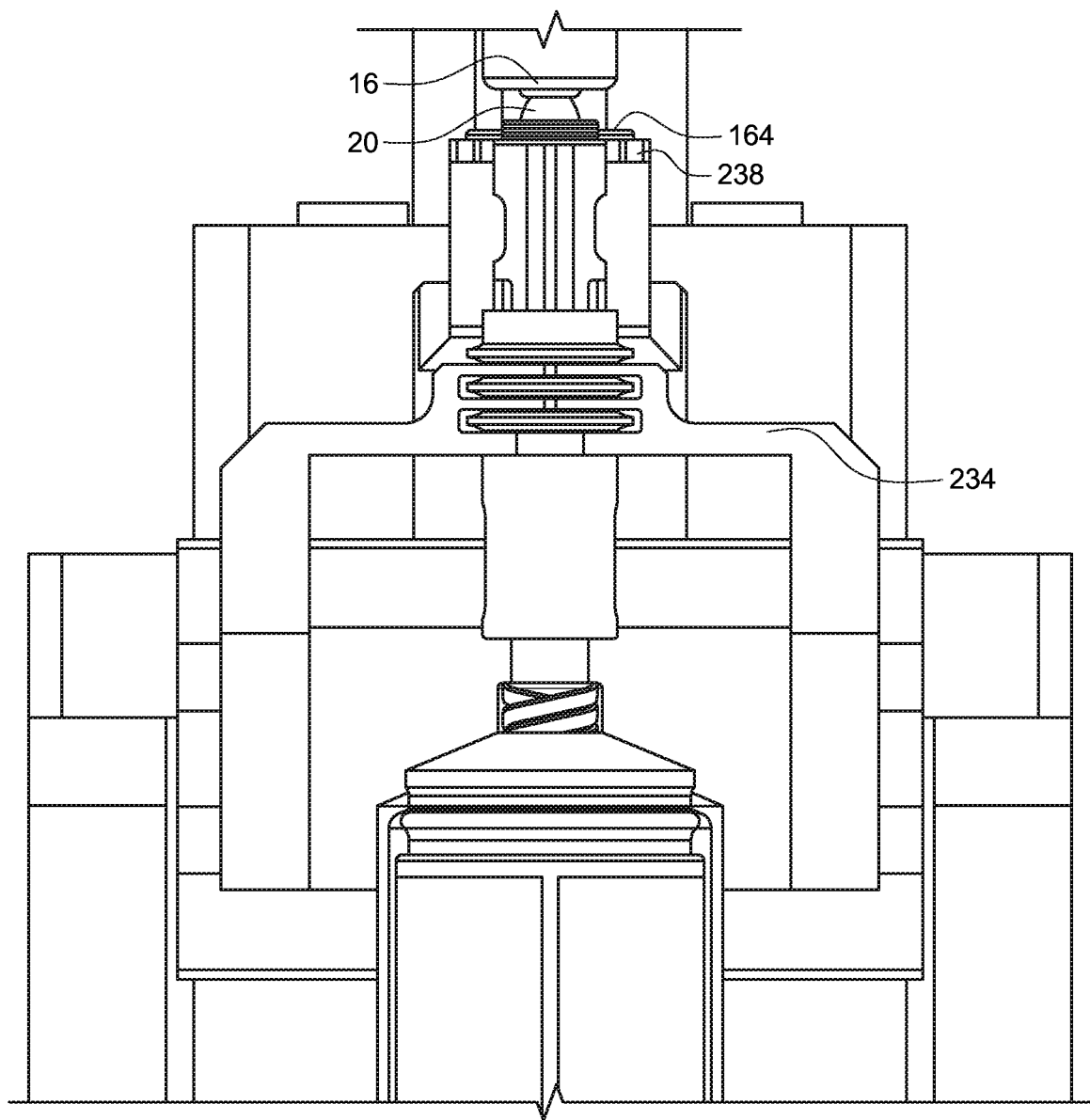
Figure 8C:
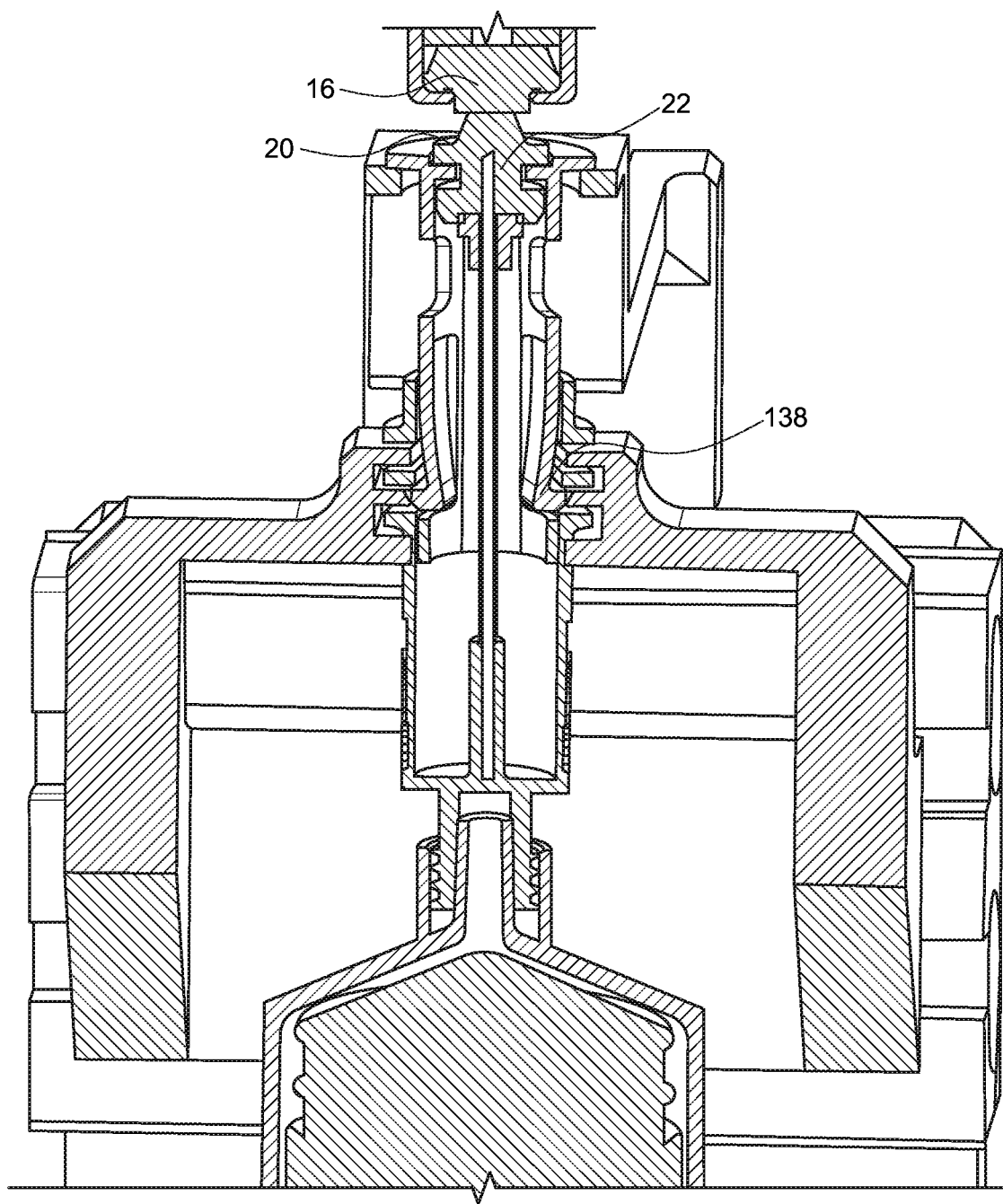

FIGS. 8A-C are pictorial illustrations of the fluid transfer station at a third operational stage. As seen in FIGS. 8A-C, at the third stage of operation the engaging arm 238 has advanced along with the gripping arm 234 towards the vial assembly 210. The engaging arm 238 abuts against the engaging portion 240 by pressing upon the radial stop 164, thereby applying the axial force on the syringe-septum 20 which presses against the container septum 16 of the vial assembly 210. The axial force is shown to be applied at a magnitude less than the predetermined compression threshold and thus the spring 334 remains at its preloaded state.

The syringe connector 50 is at an unlocked state at the intermediate position where the needle tip is enclosed in the syringe-septum 20.

FIGS. 9A-C are pictorial illustrations of the fluid transfer station at a fourth operational stage. As seen in FIGS. 9A-C, at the fourth stage of operation the engaging arm 238 continues to abut against the engaging portion 240 by pressing upon the radial stop 164, thereby applying the axial force on the syringe-septum 20. The axial force is shown to be applied at a magnitude equal or more than the predetermined compression threshold. Thus, the spring 334 is released from its preloaded state allowing it to compress. The gripping arm 234 is now allowed to advance towards the engaging arm 238 as the pressing mechanism 330 has ensured that the predetermined compression threshold between the syringe-septum 20 and the container-septum 16 has been reached before the needle 22 can extend through the syringe-septum 20 and the container-septum 16.

The syringe connector 50 is at an unlocked state at the collapsed position where the needle 22 is extended and the needle tip protrudes beyond the septum distal surface 66 and into the vial assembly 210.

In some examples, this fourth operational stage may further include detecting the contraction of the spring 334 in any suitable manner, such as by the sensor 358, described in reference to FIG. 3F.

Figure 10A:
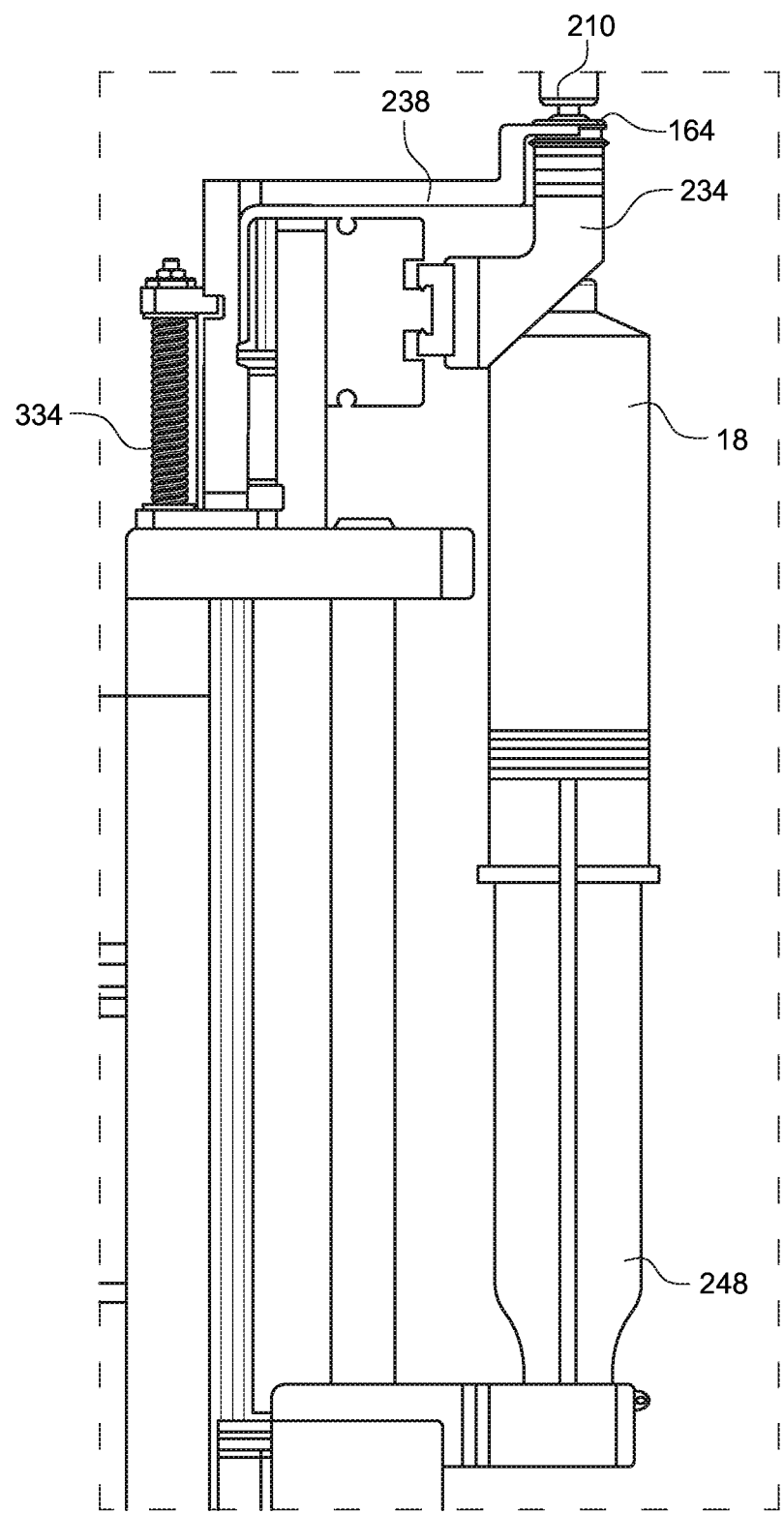
FIGS. 10A-C are illustrations of the fluid transfer station at a fifth operational stage shown at a front view (10A), a side view (10B) and a cross-sectional illustration of FIG. 10B (10C), according to an example of the presently disclosed subject matter.
Figure 10B:
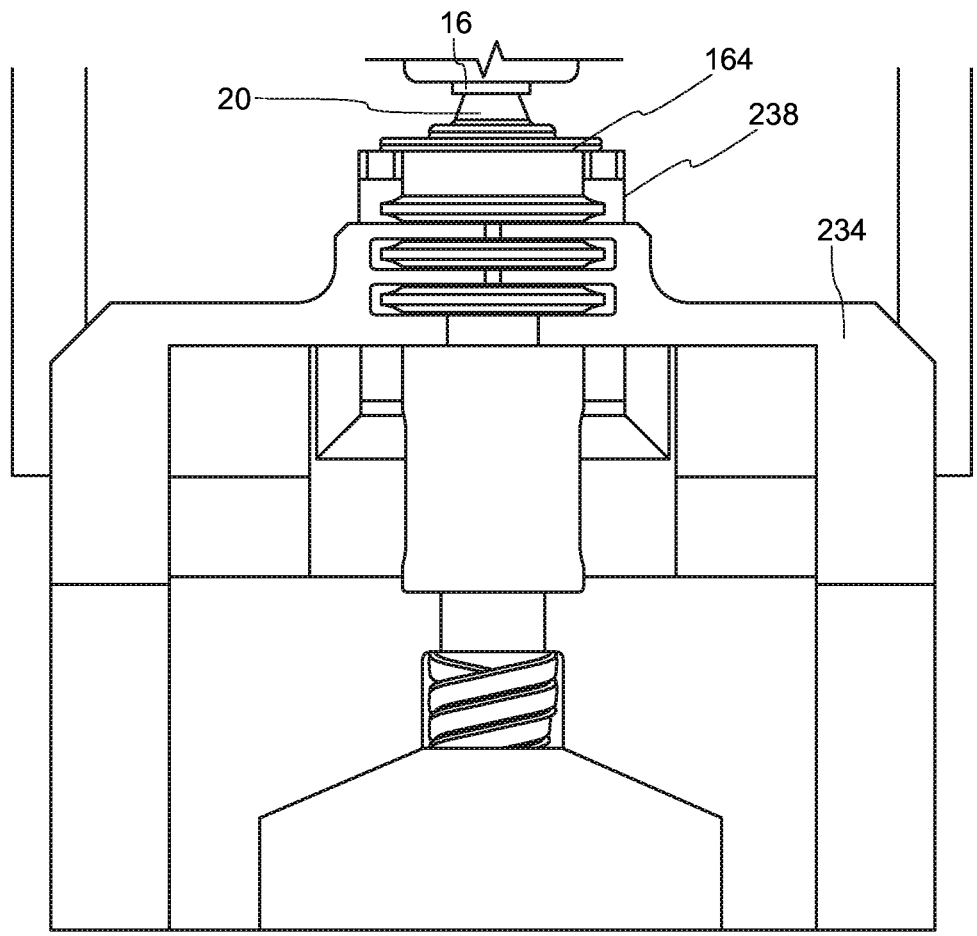
Figure 10C:
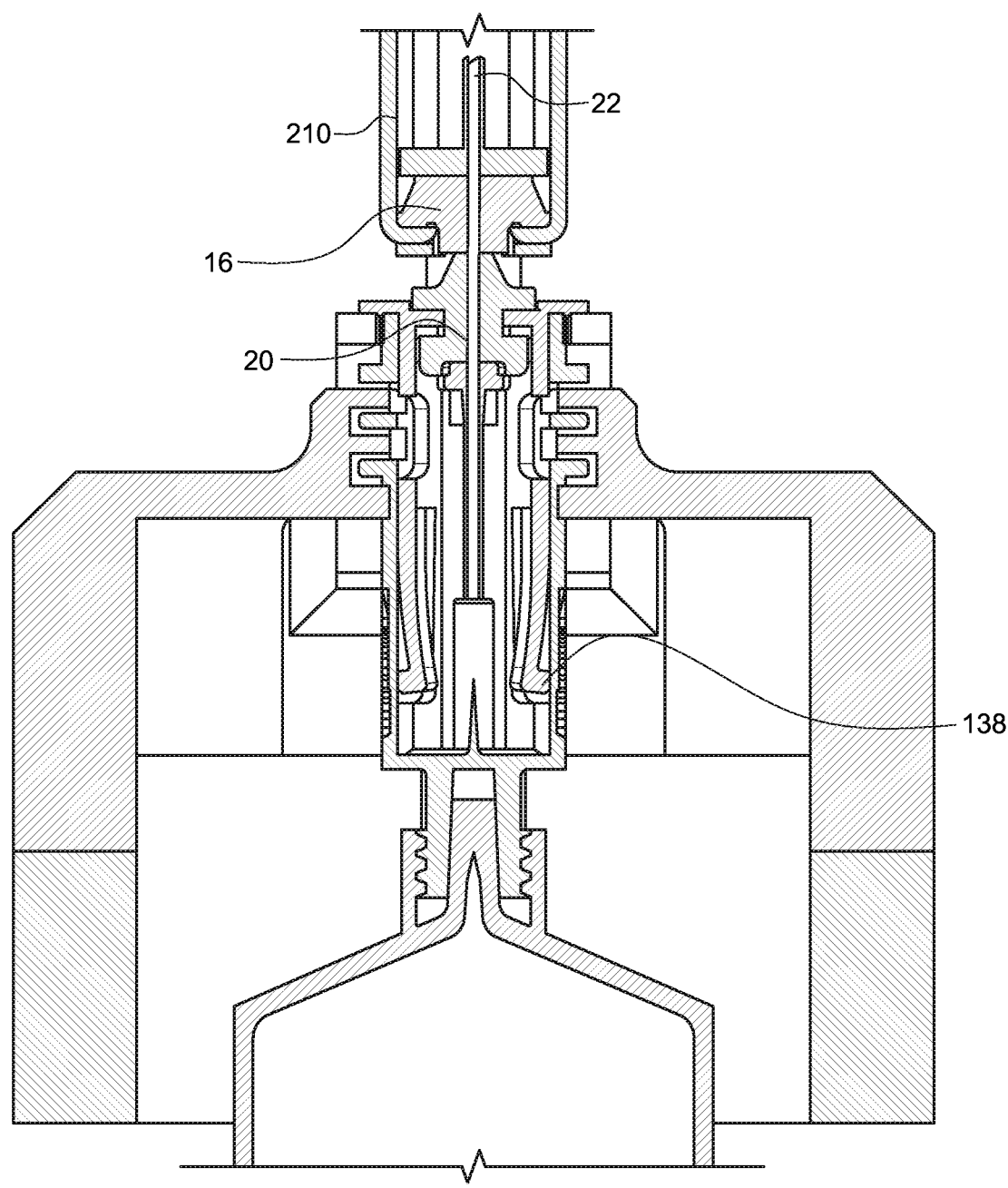

FIGS. 10A-C are pictorial illustrations of the fluid transfer station at a fifth operational stage. As seen in FIGS. 10A-C, at the fifth stage of operation the plunger 248 is displaced downwards away from the vial assembly 210 to facilitate withdrawal of fluid therefrom. Engaging arm 238 continues to abut against the engaging portion 240 by pressing upon the radial stop 164, thereby applying the axial force on the syringe-septum 20. Accordingly, the contact between the container-septum 16 and the syringe-septum 20 is secured and is maintained all during the transfer of the fluid from the vial assembly 210 into the syringe 54.

The syringe connector 50 is at the collapsed position where the needle tip protrudes beyond the septum distal surface 66 and into the vial assembly 210 for facilitating the transfer of fluid.

FIGS. 11A-C are pictorial illustrations of the fluid transfer station at a sixth operational stage. As seen in FIGS. 11A-C, at the sixth stage of operation the plunger 248 remains displaced downwards for containing the fluid in the syringe 54. The gripping arm 234 is axially distanced, e.g. moved away from the engaging arm 238, thereby the syringe connector 50 resumes to the intermediate position where the needle tip is withdrawn from the vial assembly 210 and is enclosed in the syringe-septum 20.

The compression in the spring 334 is reduced yet the spring 334 continues applying an axial force on the engaging arm 238 towards the radial stop 164. Therefore, the engaging arm 238 continues to abut against the engaging portion 240 by pressing upon the radial stop 164 and applies the axial force on the syringe-septum 20. Accordingly, the contact between the container-septum 16 and the syringe-septum 20 is secured and is maintained also during withdrawal of the needle 22 from the container-septum 16.

The syringe assembly 18 may now be removed from the vial assembly 210. In some examples the syringe assembly 18 may be removed from the fluid transfer station 10. The syringe connector 50 is positioned at the intermediate position to prevent contamination of the needle tip and microbial ingress through the needle tip into the syringe 54 and to prevent inadvertently injuring an operator upon removal of the syringe assembly 18 from the container 14.

In some examples, following the transfer of the fluid from the vial assembly 210, the syringe manipulator module 224 rotates about rotational axis r1 by rotating the shaft 264 of the primary driving assembly 260 in the orientation of arrow r2 (3A and 3B) from the vial assembly holding module 208 to the to the IV bag holding module 214. In some embodiments the vial assembly holding module 208 moves to the to the IV bag holding module 214 by linear displacement or any other displacement.

As the syringe manipulator module 224 is removed from the vial assembly 210 the spring 334 can resume back to its uncompressed state. The spring 334 is configured to cause the manipulator to displace the needle 22 into its extended position or intermediate position or normal position after completion of said transfer of fluid.

The spring 334 continues applying an axial force on the engaging arm 238 towards the radial stop 164. Therefore, the engaging arm 238 continues to abut against the engaging portion 240 by pressing upon the radial stop 164, applying the axial force on the syringe-septum 20.

The plunger 248 remains displaced downwards for containing the fluid in the syringe 54.

The following seventh to tenth operational stages shown in respective FIGS. 12A-15C illustrate the transfer of fluid at the IV bag holding module 214 in between the IV bag 216 and the syringe assembly 18 and particularly the injection of the fluid from the syringe 54 into the IV bag 216.

Figure 12A:
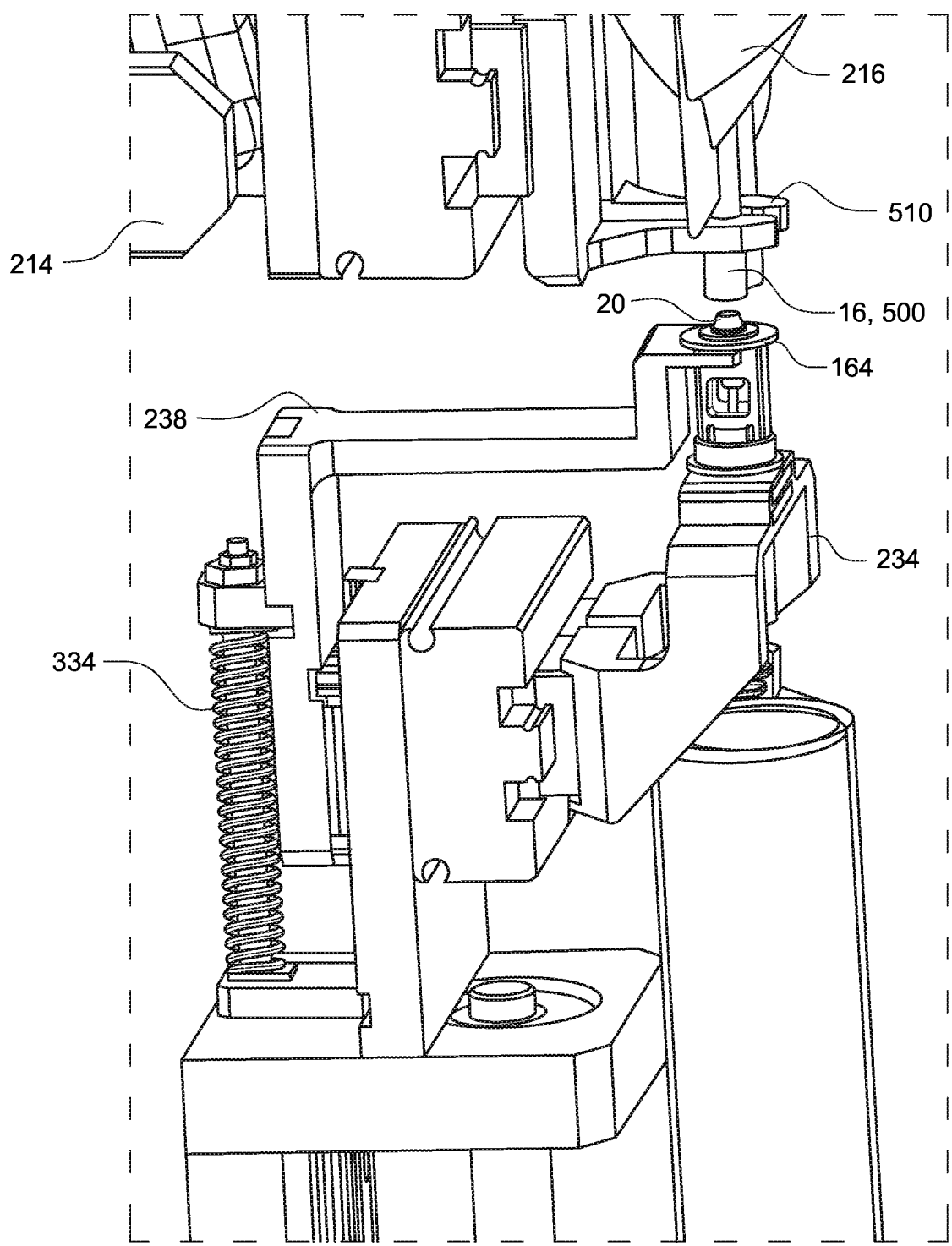
FIGS. 12A-C are illustrations of the fluid transfer station at a seventh operational stage shown at a front view (12A), a side view (12B) and a cross-sectional illustration of FIG. 12B (12C), according to an example of the presently disclosed subject matter.
Figure 12B:
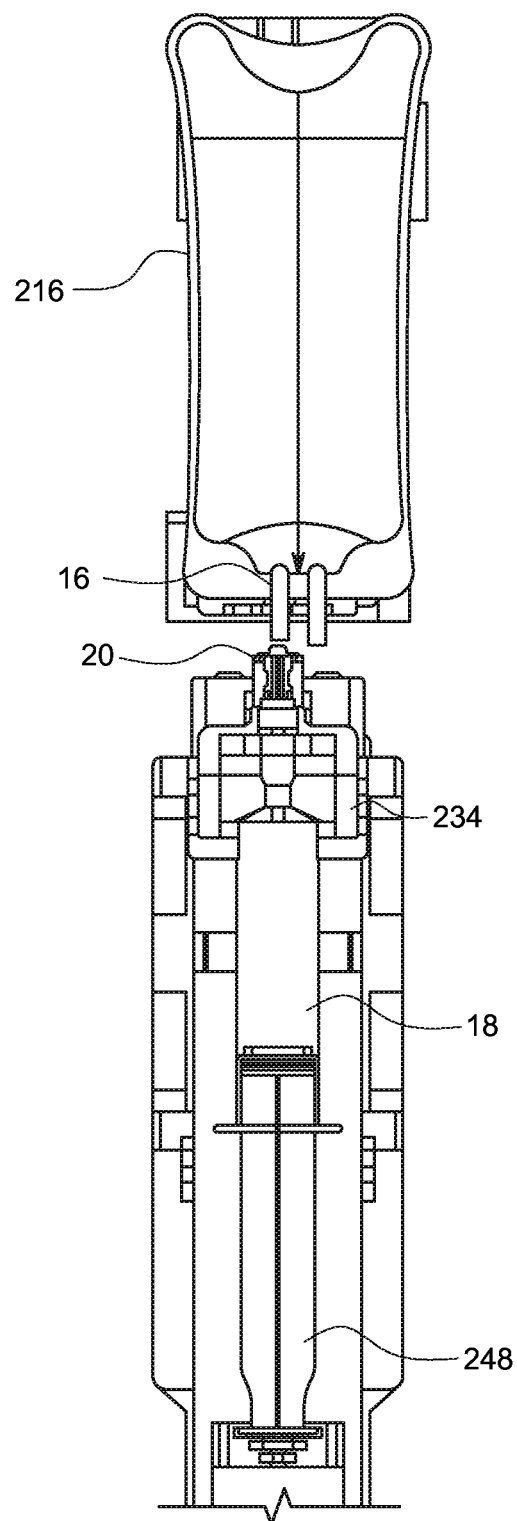
Figure 12C:
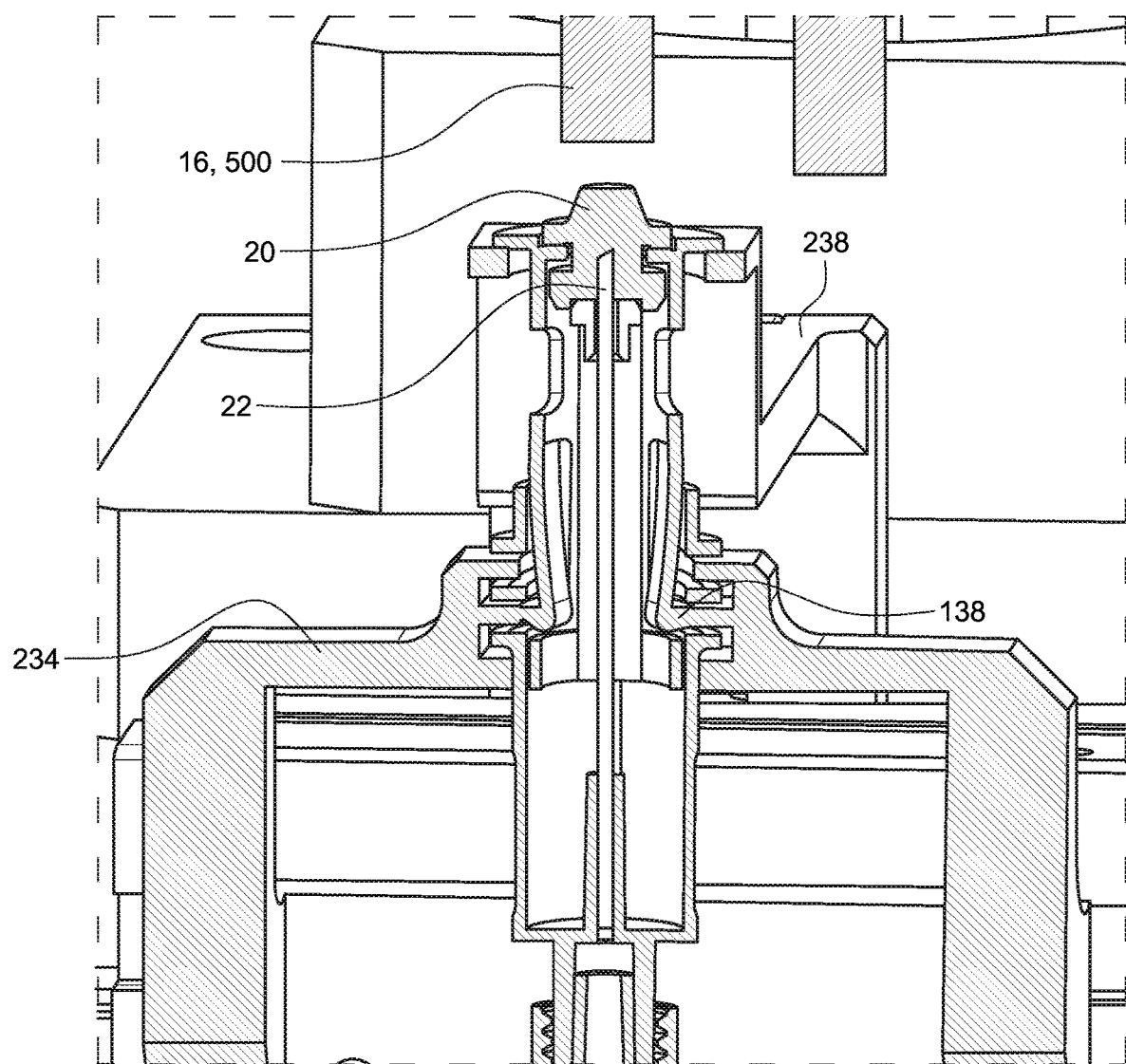

FIGS. 12A-C are pictorial illustrations of the fluid transfer station at a seventh operational stage. As seen in FIGS. 12A-C, at the seventh stage of operation the contact between the syringe-septum 20 and the IV bag septum 16 is yet to be established. It is seen that the IV bag septum 16 comprises the preexisting medicine port 500 of an IV bag. The IV bag holding module 214 may comprise supports, such as tongs 510 for supporting the IV bag port 500 and for preventing its misalignment.

The gripping arm 234 maintains its grip at the griping portion 236 of the syringe assembly 18. The projecting elements 370 (4A) of the gripping arm 234 continue applying the radial or lateral force Fr on the protruding portion 138 of the syringe connector 50. The syringe connector 50 remains at the intermediate position where the needle tip is enclosed in the syringe-septum 20.

The spring 334 continues applying an axial force on the engaging arm 238 towards the radial stop 164. Therefore, the engaging arm 238 continues to abut against the engaging portion 240 by pressing upon the radial stop 164, applying the axial force on the syringe-septum 20.

The plunger 248 remains displaced downwards for containing the fluid in the syringe 54.

Figure 13A:
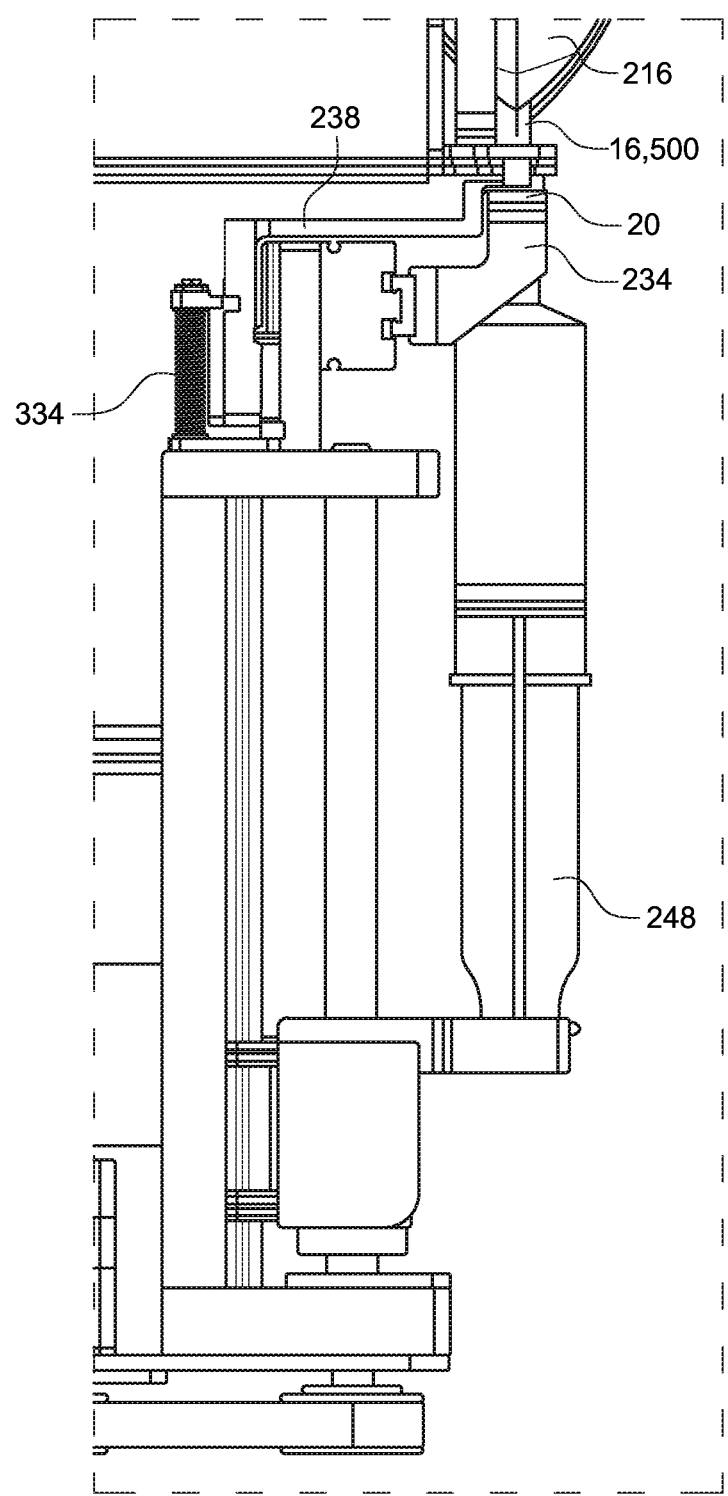
FIGS. 13A-C are illustrations of the fluid transfer station at an eighth operational stage shown at a front view (13A), a side view (13B) and a cross-sectional illustration of FIG. 13B (13C), according to an example of the presently disclosed subject matter.
Figure 13B:
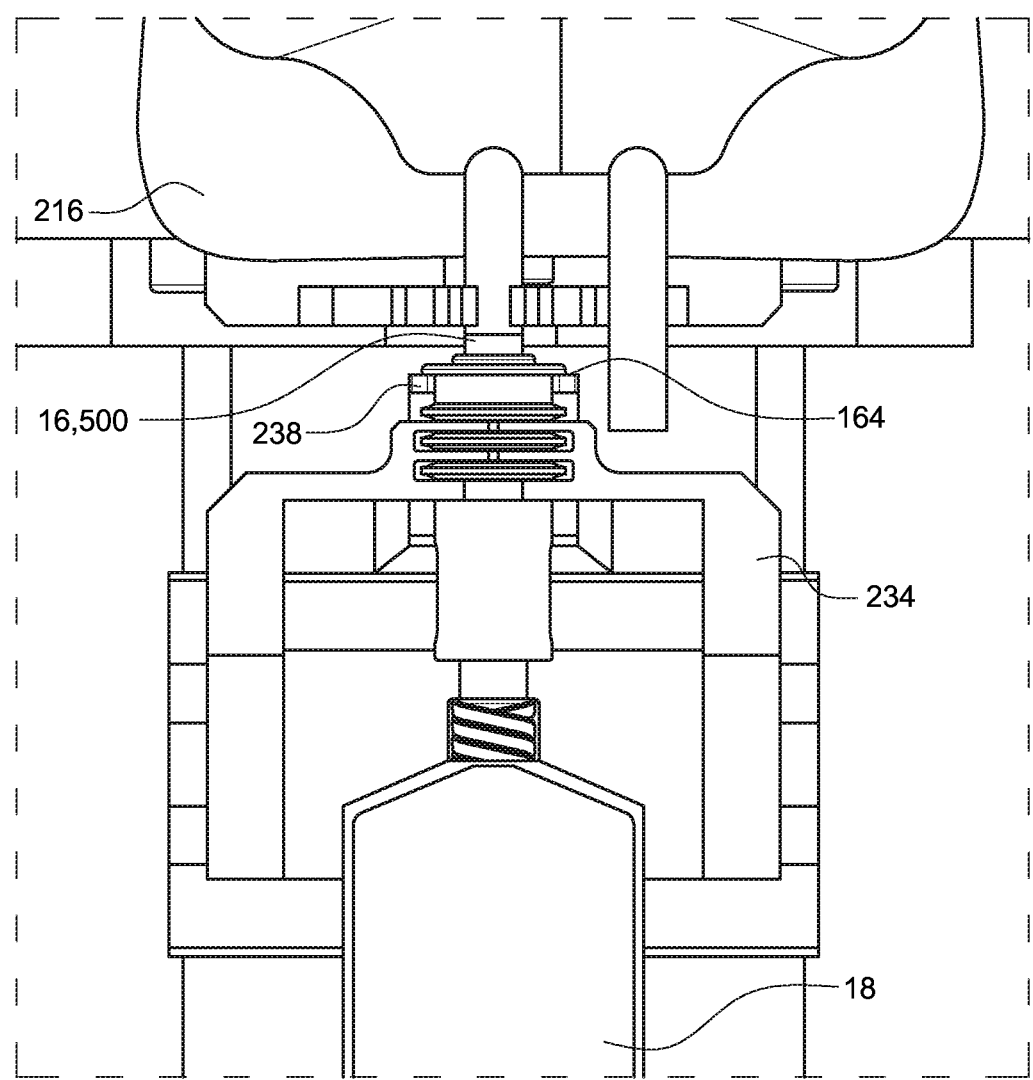
Figure 13C:
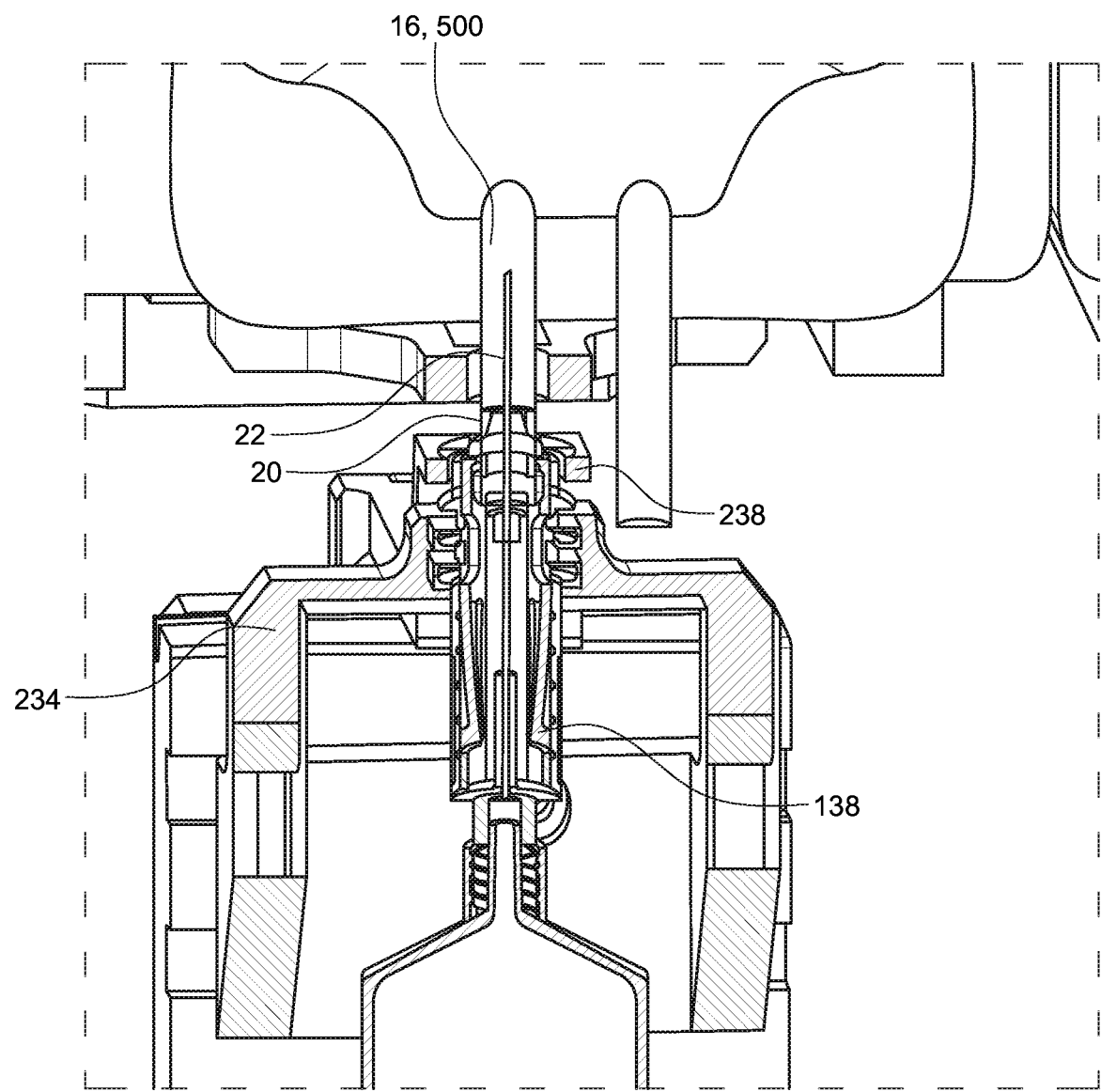

FIGS. 13A-C are pictorial illustrations of the fluid transfer station at an eighth operational stage. As seen in FIGS. 13A-C, at the eighth stage of operation the gripping arm 234 and the engaging arm 238 start advancing towards the IV bag 216 along longitudinal axis Lx1 (3B) for bringing the syringe-septum 20 into contact with the container-septum 16, e.g. the IV bag port 500.

The engaging arm 238 continues to abut against the engaging portion 240 by pressing upon the radial stop 164, thereby applying the axial force on the syringe-septum 20. As the gripping arm 234 further advances towards the engaging arm 238 the spring 334 is compressed.

The syringe connector 50 is at an unlocked state at the collapsed position where the needle 22 is extended and the needle tip protrudes beyond the septum distal surface and into the IV bag 216.

The plunger 248 remains displaced downwards for containing the fluid in the syringe 54.

Figure 14:
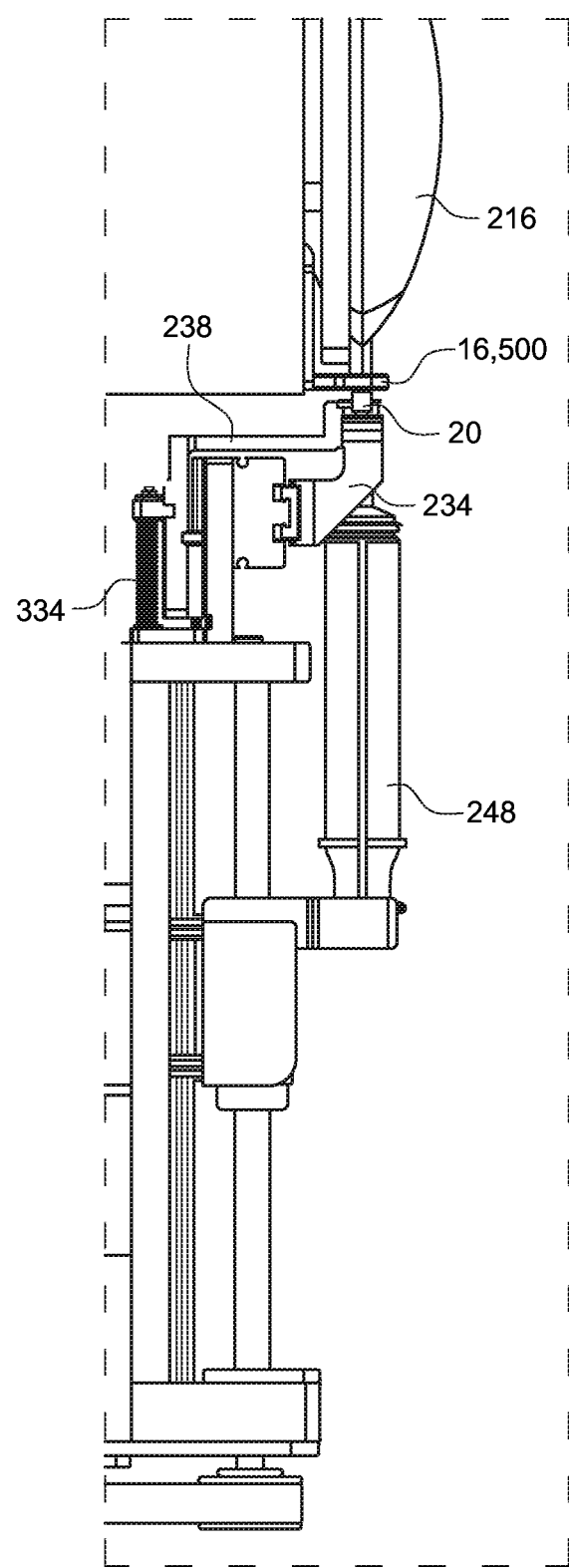
FIG. 14 is an illustration of the fluid transfer station at a ninth operational stage, according to an example of the presently disclosed subject matter.

FIG. 14 is a pictorial illustration of the fluid transfer station at a ninth operational stage. As seen in FIG. 14, the ninth operational stage is similar to the eighth operational stage (13A-C) with respect to the position of the engaging arm 238 and the gripping arm 234, the spring 334 remains compressed and the syringe connector 50 (hidden by the gripping arm 234) remains in the collapsed position where the needle 22 is extended and the needle tip protrudes beyond the septum distal surface 66 and into the IV bag 216.

In FIG. 14 the plunger 248 is displaced upwards towards the IV bag 216 for injecting the fluid of the syringe 54 into the IV bag 216.

FIGS. 15A-C are pictorial illustrations of the fluid transfer station at a tenth operational stage. As seen in FIGS. 15A-C, at the tenth stage of operation the contact between the syringe-septum 20 and the IV bag septum 16 (IV bag port 500) is maintained.

The gripping arm 234 releases its grip at the griping portion 236 of the syringe assembly 18. The projecting elements 370 of the gripping arm 234 cease applying the radial or lateral force Fr on the protruding portion 138 of the syringe connector 50, which now protrude from the openings 150. The syringe connector 50 is positioned at the intermediate position where the needle tip is enclosed in the syringe-septum 20, yet in a locked state.

Following the transfer of the fluid from the syringe assembly 18 into the IV bag 216, the operation of the fluid transfer has commenced.

FIGS. 16A-E illustrate another example of a fluid transfer station 10A of the robotic pharmaceutical preparation system 12 operable for transferring fluid from the syringe assembly 18 to the container 14. In a non-limiting example, the fluid transfer may be from the vial assembly 210 to a syringe assembly 18A and from the syringe assembly 18A to the IV bag 216.

It is appreciated that the syringe assembly 18A comprises a similar configuration to the syringe assembly 18 of FIGS. 2A-H yet with some adaptations which will be further described in reference to FIGS. 17A and 17B. It is noted that any one of the syringe assemblies described herein, such as syringe assembly 18 and syringe assembly 18A can be deployed in any one of the fluid transfer stations described herein.

A syringe manipulator module 224A is disposed in proximity to the carousel conveyor 228 as described in reference to syringe manipulator module 224 in FIG. 3A.

The syringe manipulator module 224A comprises a manipulator 32A configured with at least one arm operable to contact a portion of the syringe assembly 18A and move the syringe assembly 18A along any one of the vertical axis x1, the horizontal axis x2 transverse axis x3, and/or about the rotation axis r1 (3A).

Any one of the arms is displaced by a driving assembly comprising a driving actuator. The driving actuator is configured for actuating the movement of the arm and may comprise in a non-limiting example any one of a motor, a servo motor, a hydraulic motor, a pneumatic motor, an electric motor, a magnetic motor, a mechanical actuator such as a spring, a piston and a combination thereof.

The driving actuator actualizes the displacement of the arms by at least one motion transmission member such as a shaft, a guiderail, a belt, a pulley, a gear and a combination thereof or any other suitable motion transmission member.

As seen in FIGS. 16A-E, the manipulator 32A comprises a gripping arm 234A. The gripping arm 234A is configured for gripping a grip portion 236A (16C) of the syringe assembly 18A and for moving and holding the syringe assembly 18A along vertical axis x1 (3A). Furthermore, the gripping arm 234A is configured to be controllably movable relative to the container holding module 208 configured to hold the container 14 so that the gripping arm 234A can align the syringe-septum 20 and the container-septum 16 and bring the syringe-septum 20 in contact with the container-septum 16 when the gripping arm 234A holds the syringe assembly 18A.

In the example of FIGS. 16A-E the griping arm 234A is positioned at grip portion 236A (16C) which is disposed at the sleeve 58A.

The gripping arm 234A is configured to perform the following operations: (i) to selectively apply the radial or lateral force Fr so as to press upon the syringe-connector actuator 72 (17B) of the syringe assembly 18A for transitioning from a locked state to an unlocked state so as to position the syringe connector 50A in any one of the extended position, the intermediate position and the collapsed position; (ii) to grip the sleeve 58A, align the syringe assembly 18A with the container 14 and bring the syringe-septum 20 in contact with the container-septum 16. The gripping arm 234A is configured to perform these operations either simultaneously or successively.

The manipulator 32A further comprises an engaging arm 238A configured to engage the syringe assembly 18A at an engaging portion 240A and is configured for axial movement relative to the gripping arm 234A.

In some examples, the engaging arm 238A and the gripping arm 234A are mechanically coupled so that the engaging arm 238A and the gripping arm 234A are operable to be controllably displaced either axially together or axially relatively to each other.

In the example of FIGS. 16A-E the gripping arm 234A is shown to be disposed axially above the engaging arm 238A.

The engaging arm 238A and the gripping arm 234A are operable, separately or together, to align the syringe-septum 20 of the syringe assembly 18A and the container-septum 16 of the container 14, bring the syringe-septum 20 in contact with the container-septum 16, press the syringe-septum 20 against the container-septum 16 to secure contact therebetween, and to execute penetration of the syringe-septum 20 and the container-septum 16 by the needle 22 for enabling the transfer of the fluid, while the contact between the container-septum 16 and the syringe-septum 20 remains secured by any one of the engaging arm 238A and the gripping arm 234A.

The manipulator 32A additionally comprises the plunger arm 244 (16A).

In the example of FIGS. 16A-E, the driving assembly comprises the primary driving assembly 260 operable by its servo-motor 262 to actuate axial displacement of the syringe manipulator module 224A along the movable shaft 264 in the orientation of vertical axis x1 (3A). The axial displacement facilitates simultaneous movement of the engaging arm 238A, the gripping arm 234A and the plunger arm 244, towards the container 14 and away therefrom for transferring the fluid, similar to the description of the operational stage which was described in reference to FIGS. 7A-C. In other words, the primary driving assembly 260 is configured to simultaneously advance the engaging arm 238A and the gripping arm 234A towards the container 14 while bringing the engaging arm 238A to the syringe assembly 18A for pressing thereon.

In the example of FIGS. 16A-E the engaging arm 238A axially presses upon the engaging portion 240A, which is disposed at a proximal edge 600 (16C) of the body member 52A, so as to contact and maintain the secured contact between the syringe-septum 20 and the container-septum 16.

As described hereinabove in reference to FIGS. 3A-E, following the transfer of the fluid from the vial assembly 210, the primary driving assembly 260 is further operable for rotational, and/or axial or linear or lateral displacement of the syringe manipulator module 224 from the vial assembly holding module 208 to the IV bag holding module 214 and vice versa, similar to the description in reference to FIGS. 11A-C.

As described hereinabove in reference to FIGS. 3A-E, secondary driving assembly 270 is operable by its servo-motor 272 to actuate displacement of the manipulator 32A in the orientation of horizontal axis x2 (3A) for allowing the gripping arm 234A to grab a selected syringe assembly 18A from the carousel conveyor 228. The gripping arm 234A horizontally retracts back towards the vial assembly holding module 208 so as to facilitate alignment of the syringe assembly 18A with the vial assembly 210, similar to the description of the operational stage, which was described in reference to FIGS. 6A-C.

As described hereinabove in reference to FIGS. 3A-E, the tertiary driving assembly 290 is operable by its servo-motor 292 to actuate axial displacement of the plunger arm 244. Downward axial displacement away from the container 14 facilitates withdrawal of fluid from the container 14 into the syringe assembly 18A, as described in reference to the operational stage shown in FIGS. 10A-C, and axial displacement upwards towards the container 14 facilitates injection of fluid into the container 14, similar to the description in reference to the operational stage shown in FIG. 14.

As seen in FIGS. 16B and 16C, the engaging arm 238A is horizontally displaced along horizontal axis x2 (3A) by a displacement actuator formed in any suitable manner, such as a pneumatic actuator 620 actuated by a motor 622 or by any other suitable means. The displacement actuator is configured for causing the engaging arm 238A to horizontally advance towards the engaging portion 240A on the syringe assembly 18A. The engaging portion 240A is shown here to be disposed at the proximal edge 600 (17B) of the body member 52A, which is axially pressed upon by the engaging arm 238A, as will be further described in reference to FIG. 16E. The engaging arm 238A may be configured to mate with the hub 312 of the syringe 54 for securely engaging with the syringe assembly 18A.

Subsequent to the gripping arm 234A aligning the syringe assembly 18A with the container 14 and bringing the syringe-septum 20 in contact with the container-septum 14, the gripping arm 234A remains generally stationary. The engaging arm 238A is configured to axially advance towards the gripping arm 234A to cause the needle 22 to extend through the syringe-septum 20, while axially pressing on the engaging portion 240A. This is for maintaining the secured contact between the syringe-septum 20 and the container-septum 16 during fluid transfer.

The axial displacement of the engaging arm 238A may be performed in any suitable manner, such as by the axial displacement of the tertiary driving assembly 290 which causes the movement of the syringe 54 and the body member 52A relative to the sleeve 58A. The pneumatic actuator 620 is coupled to the tertiary driving assembly 290 via a flange 628 and a shaft 630. Accordingly, the engaging arm 238A while engaging the body member 52A is axially displaced along with the axial displacement of tertiary driving assembly 290.

In the example of FIGS. 16A-E, the manipulator 32A may or may not comprise the pressing mechanism 330. In some examples, ensuring the predetermined compression threshold between the syringe-septum 20 and the container-septum 16 is reached before the needle 22 extends through the syringe-septum 20 and the container-septum 16, may be performed by the controller unit 30 (1A) operable to cause the engaging member 238A to axially press upon the engaging portion 240A at least with a compression magnitude of the predetermined compression threshold.

Additionally, or alternatively a pressure sensor or any other suitable means may be provided to detect when that the predetermined compression threshold was reached.

In some examples, the manipulator 32A may operate without ensuring the predetermined compression threshold between the syringe-septum 20 and the container-septum 16 is reached before the needle extends through the syringe-septum 20 and the container-septum 16.

Figure 16D:
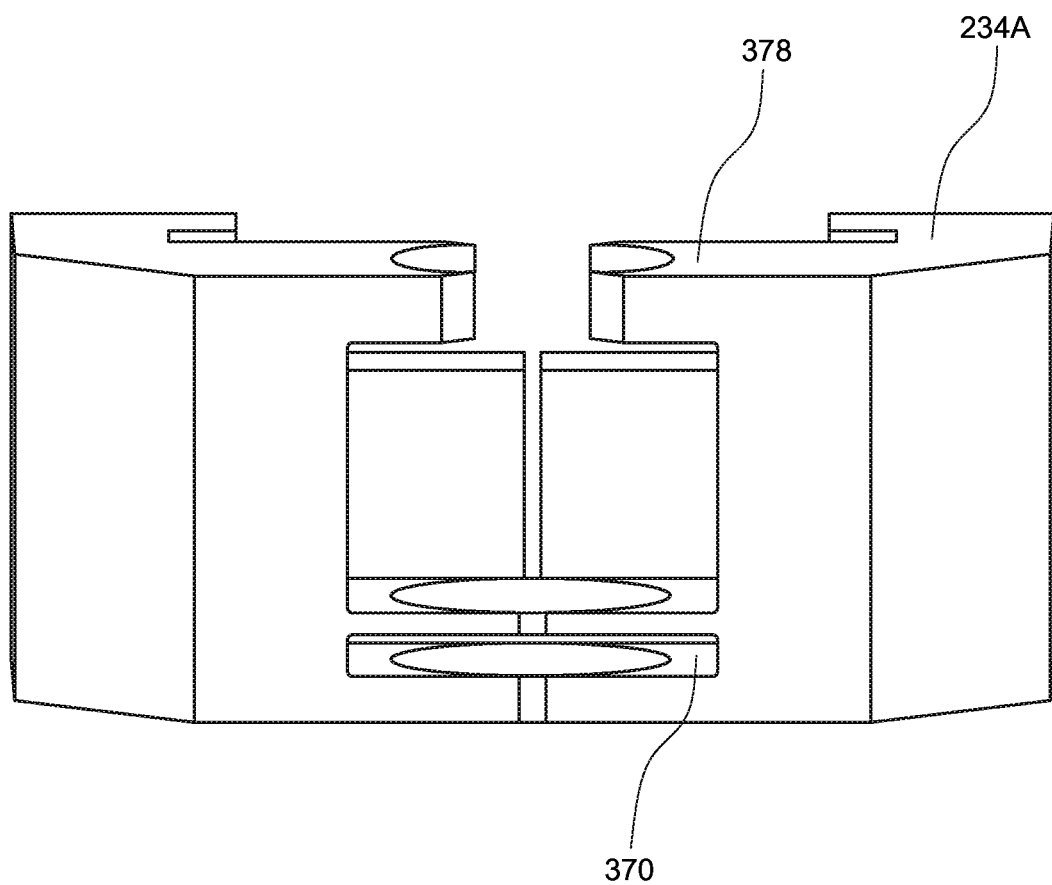
FIG. 16D is a side view, pictorial illustration of a gripping arm of the manipulator of FIGS. 16A-C.

FIG. 16D is an illustration of the gripping arm 234A. The gripping arm 234A is similar to the gripping arm 234 of FIGS. 4A and 4B, comprising the projecting elements 370 configured to apply the radial or lateral force Fr (e.g. in the orientation of transverse axis x3) on the external wall 140 of the syringe connector 50A and the additional pair of projecting elements 378 for securing its grip on the grip portion 236A. Yet the additional projecting elements 378 of gripping arm 234A are arranged to be positioned distally with respect to the syringe 54 while the additional projecting elements 378 of gripping arm 234 (FIGS. 4A and 4B) are arranged to be positioned proximally with respect to the syringe 54.

Figure 16E:
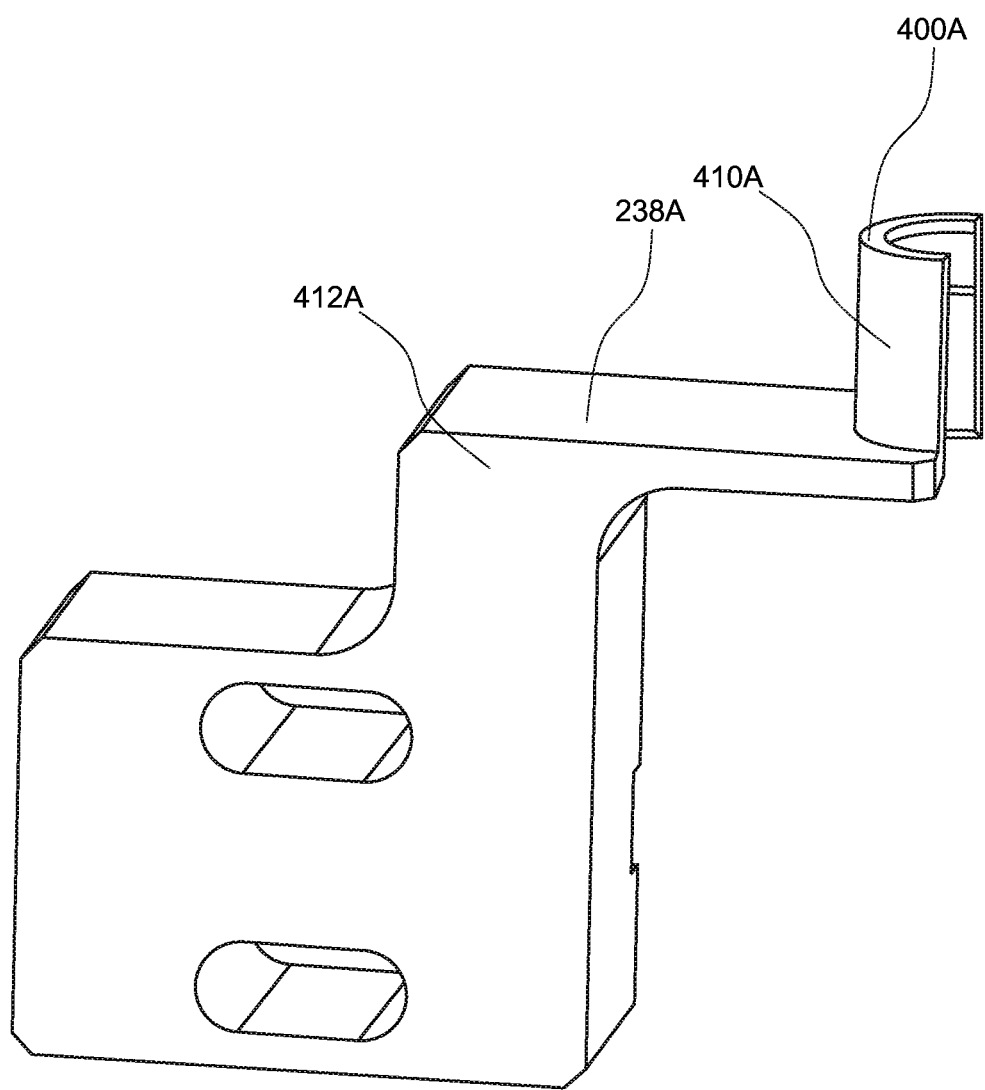
FIG. 16E is a front view, pictorial illustration of an engaging arm of the manipulator of FIGS. 16A-C.

FIG. 16E is an illustration of the engaging arm 238A formed with the pressing surface 400A and configured for axially pressing the engaging portion 240A of the syringe assembly 18A. The engaging portion 240A is shown to comprise the proximal edge 600 of the body member 52A (16C-17B). The pressing surface 400A may be formed on an upper surface of an axially projecting portion 410A projecting from an inverted L-shaped bar 412A. The projecting portion 410A may be formed with a hemicylindrical configuration sized to mate with the hub 312 of the syringe 54, it being appreciated that the axially projecting portion 410A may be formed in any suitable shape for engaging the syringe assembly 18A.

FIGS. 17A and 17B are pictorial illustrations of the syringe connector 50A configured to be deployed with a syringe 54 used for transferring a fluid in the robotic pharmaceutical preparation system 12. The syringe connector 50A is another example of the syringe connector 50 shown in FIGS. 2A-15C. The syringe connector 50A may be identical to syringe connector 50 yet may comprise some adaptations for deployment of the syringe connector 50A in the fluid transfer station 10A of FIGS. 16A-E or any other fluid transfer station. In the syringe connector 50 shown in FIGS. 2A-15C the sleeve 58 is configured to be inserted into the body member 52 in the collapsing position, while in the syringe connector 50A shown in FIGS. 16A-E the body member 52A is configured to be inserted into the sleeve 58A. Additionally, the syringe connector 50A does not comprise the rim radially protruding from the outer surface 126 of the sleeve 58, rather the engaging portion 240A (e.g. the radial stop) comprises the proximal edge 600 of the body member 52B.

Figure 18:
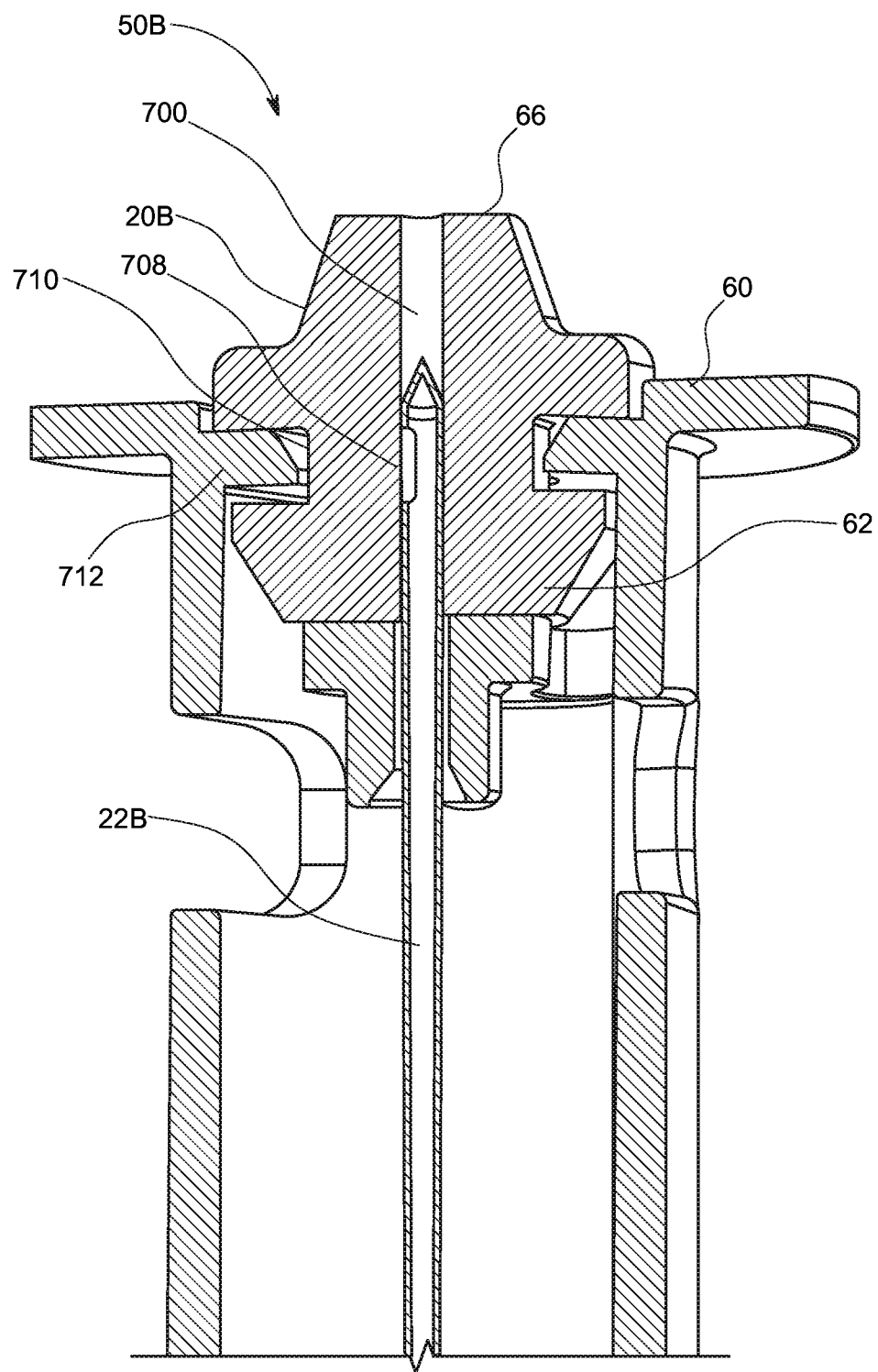
FIG. 18 is a side view, cross-sectional illustration of a syringe connector, constructed and operative according to another example of the presently disclosed subject matter.

FIG. 18 is a side view cross, sectional illustration of a syringe connector 50B, which is another example of the syringe connector 50 shown in FIGS. 2A-15C and syringe connector 50A shown in FIGS. 16A-E. The syringe connector 50B may be identical to syringe connector 50 yet may comprise other examples of the syringe-septum 20B and/or needle 22B. In the syringe connector 50 shown in FIGS. 2A-15C, the syringe-septum 20 is formed as a monolith without recesses or bores and is configured to be repeatedly pierceable by the needle 22 or needle 22B, such as by being formed by a resilient material or by any other means. As seen in FIG. 18, the syringe-septum 20B may be formed with an axially extending throughgoing (partially or fully) bore 700 extending from the septum proximal surface 62 to the septum distal surface 66 and dimensioned for receiving the needle 22 or needle 22B to allow it to extend beyond the septum distal surface 66. It is noted that the syringe-septum 20B formed with bore 700 may be implemented in the syringe connector 50 shown in FIGS. 2A-15C.

Needles are formed with openings at their distal end for transfer of fluid therethrough. The needle 22 shown in FIGS. 2C-D is beveled at its tip which is formed with an opening 704. In some examples, the opening may be formed at the tip at a plane extending parallel to the horizontal axis x2 and the transverse axis x3 (3A). In some examples, as seen in FIG. 18, a needle 22B is enclosed at its tip, which may be flat, triangled or any other shape. An opening 708 is formed at a side of the needle 22B. When the needle 22B is inserted into bore 700, the opening 708 at the side is positioned to face the bore 700, thereby further enclosing and possibly insolating the needle 22B by the syringe-septum 20B. It is noted that needle 22B may be used with the syringe-septum 20 of FIG. 2C.

In some embodiments, the syringe-septum 20B may be formed with a partial or full circumferential recess 710 within the body of the syringe-septum 20B. Recess 710 is dimensioned and configured to be supported by lateral protrusions 714 projecting medially from the connector 50C.

Figure 19A:
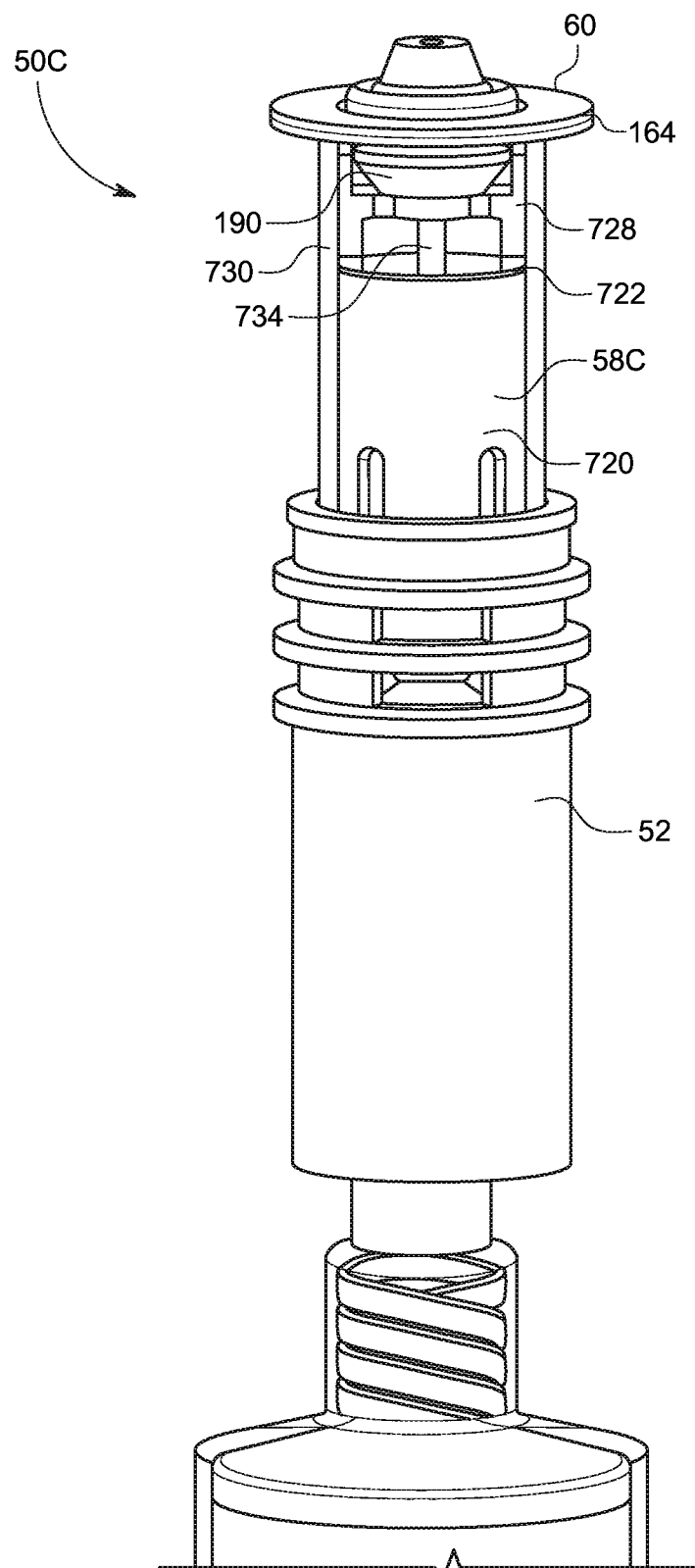
FIGS. 19A-C are a front view, pictorial illustration of a syringe connector (19A), a side view, pictorial illustration of the syringe connector (19B) and a cross-sectional illustration of FIG. 19B (19C), constructed and operative according to another example of the presently disclosed subject matter.
Figure 19B:
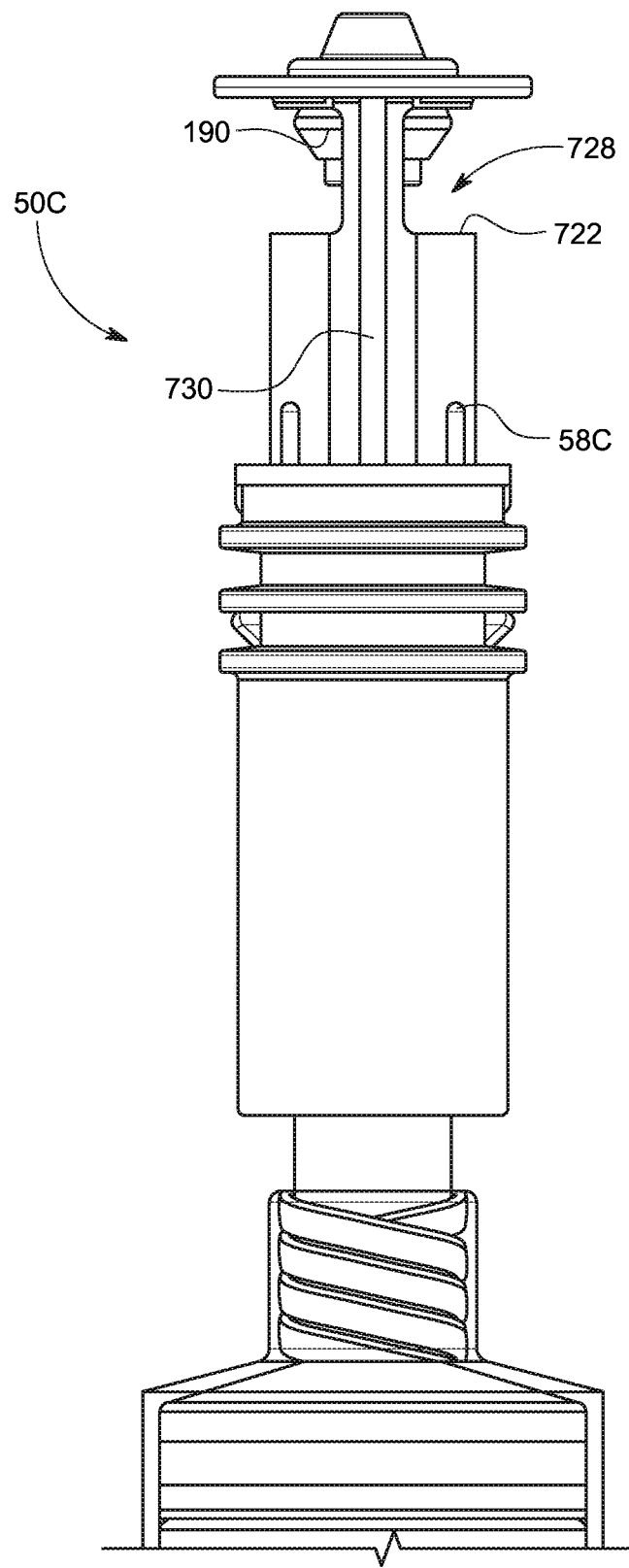
Figure 19C:
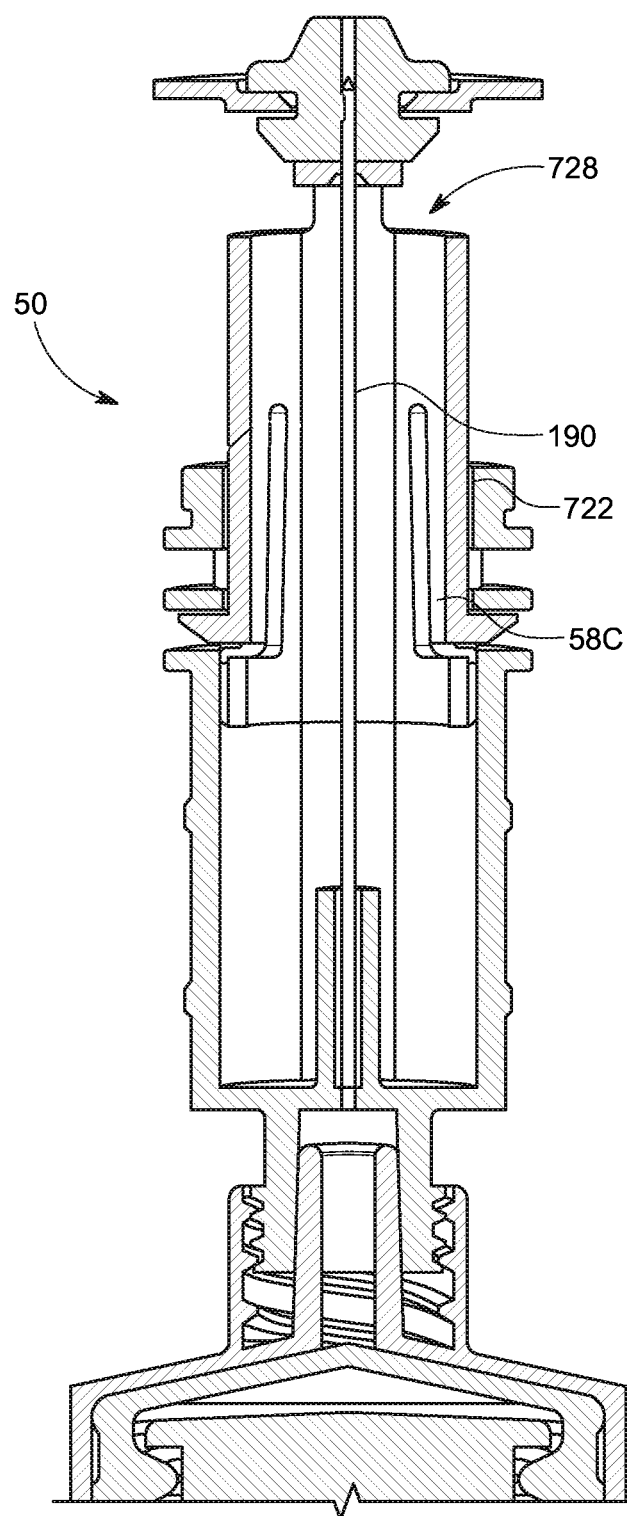

FIGS. 19A-C are illustrations of a syringe connector 50C, which is another example of the syringe connector 50 shown in FIGS. 2A-15C. The syringe connector 50C may be identical to syringe connector 50 yet may comprise another example of the sleeve. In the syringe connector 50 shown in FIGS. 2A-15C the sleeve 58 has a peripheral wall (i.e. the external wall 140 of the syringe connector 50) which extends to the radial stop 164 or to the distal end 60 of the sleeve 58, thereby enclosing the syringe-septum subsurface portion 190 (2C) in the lumen of the sleeve 58. As seen in FIGS. 19A-C, a peripheral wall 720 of a sleeve 58C extends from the body member 52 and terminates at a distal edge 722 of the peripheral wall 720. The peripheral wall distal edge 722 is axially spaced away from the septum subsurface portion 190 and a gap 728 is formed therebetween, such that the septum subsurface portion 190 is unenclosed by the syringe connector 50.

The radial stop 164 may be supported by any suitable means, such as via one or one or more beams 730 connecting the peripheral wall 720 to a mounting portion 734 formed on sleeve 58C, configured for mounting the septum subsurface portion 190 thereon. The beams 730 may comprise two oppositely facing beams 730 such that the mounting portion 734 extends along a plane perpendicular to the longitudinal axis Lx1 in between the two oppositely facing beams 730. The mounting portion 734 may be formed with a recess for allowing a needle 22 or 22C to extend therethrough.

Figure 20A:
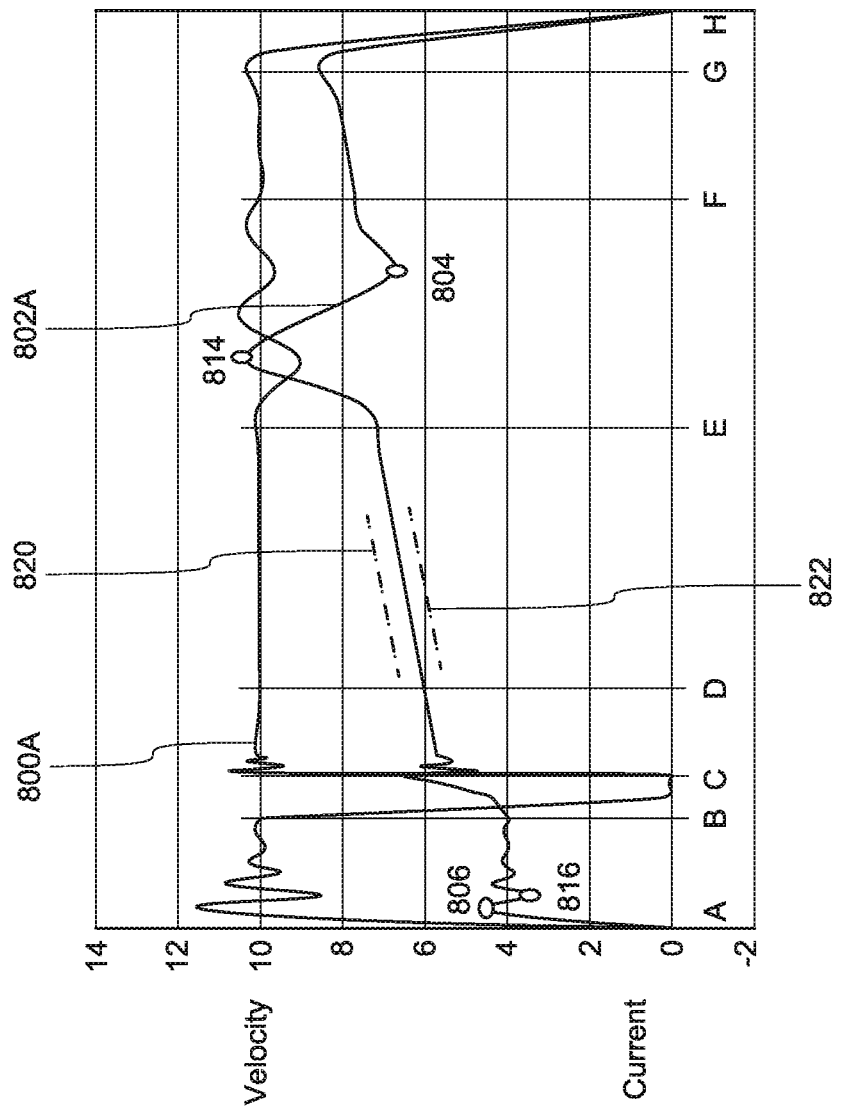
FIG. 20A is a graph showing the velocity and current of one or more arms of a first manipulator in a first robotic pharmaceutical preparation system, constructed and operative according to an example of the presently disclosed subject.
Figure 20B:
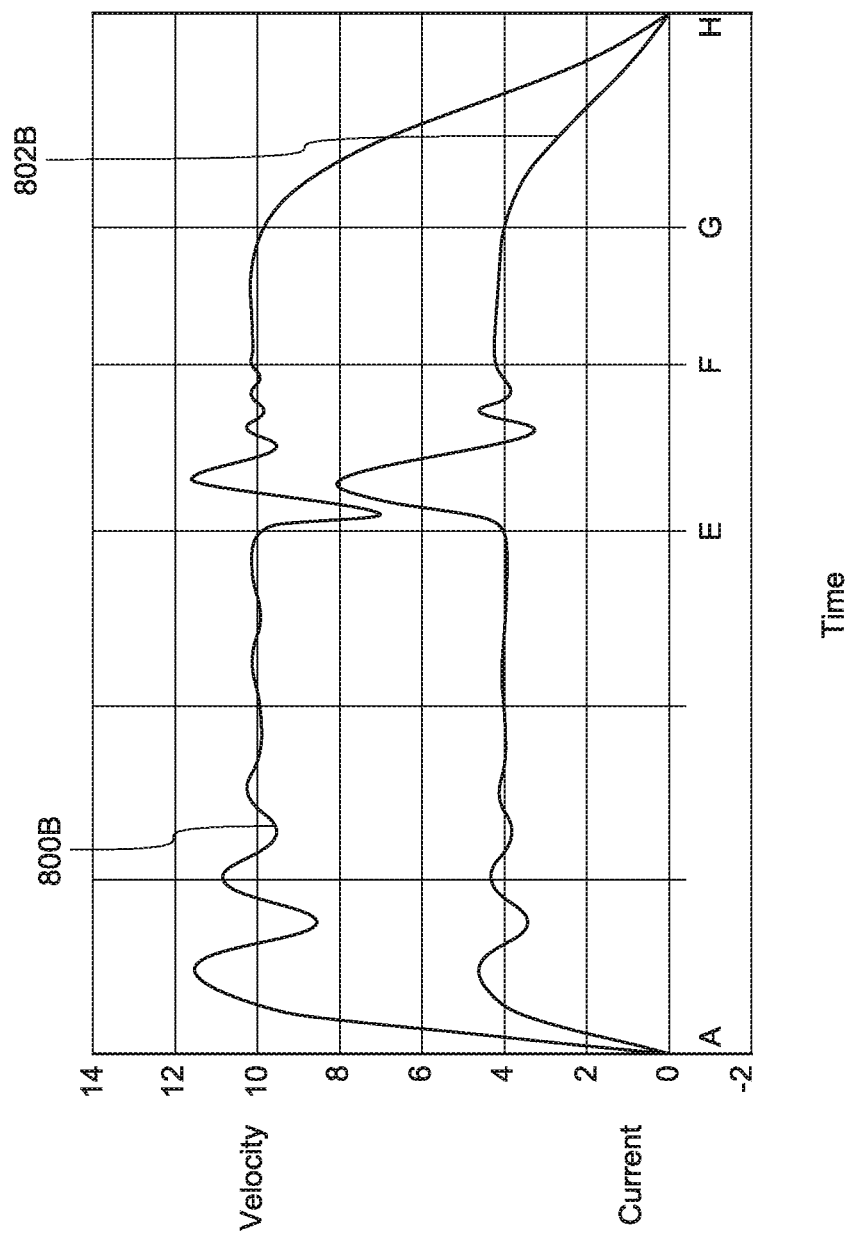
FIG. 20B is graph showing the velocity and current of one or more arms of a second manipulator in a second, conventional robotic pharmaceutical preparation system.

FIGS. 20A and 20B are each a graph showing the velocity and current of a first manipulator in a first robotic pharmaceutical preparation system, constructed and operative according to an example of the presently disclosed subject matter (20A) and a second manipulator in a second, conventional robotic pharmaceutical preparation system (20B), during some operational stages for transferring the fluid between a syringe assembly and a container.

As seen in FIGS. 20A and 20B, upper graphs 800A and 800B show the velocity Vs. time of the respective first and second manipulator. The lower graphs 802A and 802B show the current Vs. time of the respective first and second manipulator.

It is to be understood herein that manipulator is operated by a motor that consumes power for operating the manipulator. The current in the graphs signifies the power consumption of the motor, which in turn signifies the force applied by the manipulator on the fluid transfer assembly. The velocity in the graphs signifies the effective velocity of the manipulator and/or the fluid transfer assembly. For instance, the manipulator includes the gripping arm and the engaging arm that moves together as well as independently and relative to each other. The velocity of the manipulator is intended to signify the velocity of the moving part. In other words, the velocity at a particular time signifies the velocity of the component of the fluid transfer assembly that is moving at that particular time or the part of the manipulator that is moving at that particular time. Therefore, it is to be understood that the velocity is zero only when no part of the manipulator is effectively moving. Similarly, the force applied by the manipulator on the fluid transfer assembly signifies the effective force applied by the manipulator. For instance, the manipulator includes the gripping arm and the engaging arm that applies force on the fluid transfer assembly. The force signifies the net force applied by the manipulator.

FIG. 20A shows the velocity and current related to the first manipulator, which may comprise any type of manipulator, such as a manipulator described herein in reference to FIGS. 1A-19C or a manipulator falling within the scope of the present subject matter in view of the general description of various examples of the manipulator provided herein.

As described hereinabove in reference to FIGS. 1A-19C, the first manipulator may comprise two or more arms, such as the gripping arm and the engaging arm. During transferring of the fluid there are operational stages when both the griping arm and the engaging arm move. At such operational stages the velocity depicted in the graph 800A shows the velocity of both arms (e.g. from Point A to B where both the engaging arm and the gripping arm move together, herein referred to as positioning stage).

There are other operational stages when only one arm is in movement and the other arm is stationary. At such operational stages the velocity depicted in graph 800A shows the velocity of the moving arm (e.g. after Point C until the engaging is moved again to move the syringe assembly away from the container). Accordingly, it is appreciated that though the description of the velocity in graph 800A generally refers to the velocity of the first manipulator, only one of the arms may be in actual movement.

In a non-limiting example, introducing the needle into the container by the first manipulator may include some of the operational stages described in reference to FIGS. 6A-10C, where the container comprises a vial and FIGS. 12A-14, where the container comprises an IV bag.

At Point A of FIG. 20A, the graphs 800A and 802A show the velocity and current, respectively, as the first manipulator grabs the first syringe assembly (as described for example as the first initial stage of operation and shown for example at FIGS. 6A-C). In between Points A and B, the first manipulator, while gripping the first syringe assembly, starts advancing towards the container for bringing the syringe-septum into contact with the container-septum (as described for example as the second stage of operation and shown at FIGS. 7A-C) thereby positioning the syringe assembly by manipulating it through a positioning stage.

From points A to B, the velocity and the current initially oscillate, yet nearing point B when the first manipulator reaches a steady state, they assume a generally constant degree of velocity and current.

The force applied on the first syringe assembly intermediate Points A to B may be referred to as the variable positioning force (also referred to as a variable positioning force), and its measure is depicted by graph 802A of the current.

In a non-limiting example, the magnitude of the current at Point A is zero and at Point B it rises to about 4 Amperes. The magnitude of the velocity at Point A is zero and at Point B it rises to about 10 millimeters per second. It is appreciated that the actual numerical value of the magnitude of current is shown by way of example and can vary in different fluid transfer systems, yet the trend of graph 802A is substantially the same in the different types of fluid transfer systems comprising the first manipulator.

At Point B the graphs 800A and 802A show the velocity and current, respectively, at the initial contact of the syringe-septum with the container-septum, causing the first manipulator to cease its movement and the velocity to drop to zero immediately after point B. In some examples, as described herein, the first manipulator comprises a pressing mechanism configured to ensure a predetermined compression threshold between the container-septum and the syringe-septum is reached before needle extension through the syringe-septum and the container-septum. It is noted that the pressing mechanism may include the pressing mechanism 330 described hereinabove, which may comprise the contact securing mechanism.

Thus, the first manipulator remains substantially stationary, as seen in graph 800A between Points B and C, where the velocity is shown to initially drop to zero value and then generally is maintained at the zero value.

Between points B and C, the velocity first falls to and then remains at zero even though the current increases. This portion signifies that the contact between the septum is secured by the manipulator after bringing the septa in contact at point B. Thus, the portion of the graph after point B signifies a contact securing stage where the manipulator secures the contact between the septa. It can be seen from the graph that the force continuously increases through almost whole of the contact securing stage until the completion of the transfer of fluid.

At point C, a predetermined threshold force required to deform the resisting member (for example compress the spring 334) is reached and thus the gripping arm starts moving towards the engaging arm thereby increasing the velocity. Point D is a variable point where according to an example the contact between the septa can be said to have been secured, or in other words, the compression threshold has been met. Point D can vary in different examples based on the compression threshold intended. Thus, the stage between point B and D is referred to as contact-securing stage and the force applied therethrough is referred to as variable securing force. Although the compression threshold is met at point D, the force keeps on increasing to continue further securing the contact throughout the fluid transfer process. In some examples, the force can be made constant after point D.

It is to be noted herein that although the force (signified by the current) keeps on increasing after B, however it is only at point C, the gripping arm starts moving towards the engaging arm thereby causing the collapsing of the syringe connector. Thus, the portion of the graph starting from point C and until the connector is fully collapsed is referred to as the collapsing stage and the force applied therethrough is referred to as the variable collapsing force. The contact securing stage and the collapsing stage overlap with each other at least between points C and D.

In a non-limiting example, the magnitude of the current at around Point C oscillates around 5 Amperes, e.g. in the range of 4.5-6.5 Amperes. The magnitude of the velocity at Point C oscillates around 10 millimeters per second e.g. in the range of 9.5-11 millimeters per second.

Following Point C, the magnitude of the compression force may be equal to the predetermined compression threshold or may further increase. The current is shown to increase passing Point D, indicating that the compression force is increased.

In a non-limiting example, the magnitude of the current at around Point D is about 6 Amperes. The magnitude of the velocity at Point D is about 10 millimeters per second.

From Points D to E the current and hence the force further increases, causing the spring to continue to compress and the first manipulator to continue the collapsing of the connector. In the examples without the needle or with needle not penetrating, the compression force keeps on uniformly increasing until the collapsing is complete. In the illustrated examples (with the needle penetrating into the container), at point E, the tip of the needle arrives at the contact point of the septa. In order to penetrate the tip into the container septum, the manipulator increases the force rapidly after point E until point 804 where the tip penetrates into the container through the container septum. The portion of the graph between point E and point 804 is referred to as the penetration stage and the force applied therethrough as the variable penetration force.

In some examples, as described in reference to FIG. 3F, a sensor (e.g. sensor 358) may be provided to detect the reaching of the predetermined compression threshold. The sensor is configured to generate a signal indicative thereof. The signal from the sensor may be detected and transmitted at the time of Point C whereupon the spring commenced its compression.

Turning again to Points B to E at the time when the compression force is applied, the current and hence the compression force, generally continuously increase, while the velocity remains at a generally constant level. In some examples, as shown in FIG. 20A, the compression force, or at least a portion thereof, generally gradually increase forming a graph with a substantially linear upward incline.

In a non-limiting example, the magnitude of the current at around Point E is about 7 Amperes. The magnitude of the velocity at Point E is about 10 millimeters per second.

As the needle penetrates the container-septum, following Point E, the first manipulator may experience perturbance to its movement from the container-septum, causing the velocity to oscillate around the constant velocity level. To return the velocity to its constant level, the current and hence the operational force are increased. Eventually, towards Point F the velocity returns to its constant level.

Between Point F to G, the needle is further extended to protrude out of the container-septum into the container for performing the fluid transfer.

In a non-limiting example, the magnitude of the current at around Point F is a bit less than 8 Amperes. The magnitude of the velocity at Point F is about 10 millimeters per second.

At Point G, the first manipulator is configured to terminate its advancement and thus the needle is not extended further-more into the container. It can be seen that the force keeps on increasing during the penetration stage thereby continuing securing of the contact as well as causing collapsing of the connector. Thus, the penetration stage overlaps with the contact securing stage and the collapsing stage.

In some examples, such as where a sensor is provided, the controller unit may be operative to terminate the advancement of the first manipulator once the needle is extended to a predetermined length. Measuring the predetermined length may commence when the signal provided by the sensor (for example at point C) is received by the controller unit.

In a non-limiting example, the magnitude of the current at around Point G is a bit more than 8 Amperes. The magnitude of the velocity at Point G is about 10 Millimeters per second.

In between Points G and H, the velocity and current levels drop to zero, as seen at Point H.

By comparing the magnitude of the force depicted by the current graph from Points A to G, it is seen that:
- a minimum value of the variable penetration force (804) is greater than a maximum value of the variable positioning force (806),
- the variable collapsing force increases continuously at least during a portion of the collapsing stage,
- the variable collapsing force increases continuously at least during a portion of the collapsing stage prior to commencement of the penetration stage,
- an initial value of the variable collapsing force (point C) is greater than the maximum value of the variable positioning force (806),
- the variable securing force increases at least prior to the commencement of the collapsing stage,
- an initial value of the variable collapsing force (point C) is greater than an initial value of the variable securing force (point B),
- the variable collapsing force increases continuously at least during a majority of the collapsing stage,
- an initial value of the variable penetration force (point E) is greater than an initial value of the variable collapsing force (point C),
- a minimum value of the variable collapsing force is greater than a maximum value of the variable positioning force,
- a maximal magnitude of the penetration force, e.g. shown at location 814, is greater than a minimal magnitude of the positioning force, e.g. shown at location 816.

Now turning to FIG. 20B, the velocity and current related to the second manipulator is shown. The second manipulator may comprise a conventional manipulator typically operative to extend the second syringe assembly, which may comprise a syringe without a syringe-septum. The needle of the second syringe assembly is extended into a container through the container-septum. The container may include a vial and the container-septum may comprise the conventional septum of a commercially available container, such as the preexisting rubber closure of the vial. It is noted that by way of comparison the operational stages occurring at Points A-H in FIG. 20A are shown in FIG. 20B, mutatis mutandis.

At Point A of FIG. 20B, the graphs 800B and 802B show the velocity and current, respectively, as the second manipulator grabs the second syringe assembly. In between Points A and E, the second manipulator, while gripping the second syringe assembly, starts advancing towards the container for bringing the needle into contact with the container-septum. The force applied on the second syringe assembly intermediate Points A to E may be referred to as the conventional initial force.

From Points A to E, the velocity and the current initially oscillate, yet nearing Point E when the second manipulator reaches a steady state, they assume a generally constant degree of velocity and current.

In a non-limiting example, the magnitude of the current at Point A is zero rising to a generally constant current of 4 Amperes and remaining so until reaching Point E. The magnitude of the velocity at Point A is zero rising to a generally constant velocity of 10 millimeters per second and remaining so until reaching Point E.

The conventional robotic pharmaceutical preparation system is not controlled by the controller unit for allowing the needle to extend through the syringe-septum to the container-septum only after the predetermined compression threshold force is applied. Accordingly, Points B, C and D in graphs 800A and 802A of FIG. 20A do not appear in graphs 800B and 802B of FIG. 20B and the second manipulator is not configured to apply a compression force on the second syringe assembly.

Between Points E and G, a conventional operational force is applied on the second syringe assembly for extending the needle, i.e. by pushing the needle for penetrating the container-septum and extending thereout into the container.

As the needle penetrates the container-septum, following Point E, the second manipulator may experience perturbance to its movement from the container-septum, causing the velocity to oscillate around the constant velocity level. To return the velocity to its constant level, the current and hence the conventional operational force are increased. Eventually, towards Point F the velocity returns to its constant level. As seen in FIG. 20B, the current and hence the conventional operational force returns to its constant level, as well.

Between Points F to G, the needle is further extended to protrude out of the container-septum into the container for performing the fluid transfer.

In a non-limiting example, the magnitude of the current at around Point F is about 4 Amperes. The magnitude of the velocity at Point F is about 10 millimeters per second.

At Point G, the second manipulator is configured to terminate its advancement and thus the needle is not extended furthermore into the container.

In a non-limiting example, the magnitude of the current at around Point G is about 4 Amperes. The magnitude of the velocity at Point G is about 10 Millimeters per second.

In between Points G and H, the velocity and current levels drop to zero, as seen at Point H.

By comparing the magnitude of the conventional initial force, depicted by the current graph from Points A to E, with the magnitude of the conventional operational force, depicted by the current graph from Points E to G, it is seen that at least a portion of the conventional operational force is the same as at least a portion of the conventional initial force.

Furthermore, by comparing the trend of the current graph 802A with the current graph 802B it is evident that the trend of current graph 802A increases and may increase gradually and linearly and the trend of graph 802B is generally constant. Accordingly, it is evident that the operational force applied by the first manipulator on the first syringe assembly is greater than the initial force and the compression force. The conventional operational force applied by the second manipulator on the second syringe assembly is generally the same and generally remains at a constant level. Further in reference to FIGS. 20A and 20B it is noted that the current is applied on the respective first and second manipulator by its respective first and second motor.

In the second conventional robotic pharmaceutical preparation system, and in some examples in the first robotic pharmaceutical preparation system as well, the first and second motors each comprise a motor shaft operable to cause the movement of the respective first and second manipulator. The first and second motors each comprise an encoder operable to detect the position of the motor shaft and to transmit a signal indicative thereof. The controller unit of each of the first and second robotic pharmaceutical preparation systems is configured to receive the position signal from the encoder and control the respective first and second motor based on the position signal. The spatial position of the needle tip can be derived based on the position signal from the encoder indicating the position of the motor shaft.

The movement of the first and second manipulator is facilitated by the respective first and second motor configured to variably consume power for operating the respective first and second manipulator. The power consumption may be measured by the current applied by the motor on the manipulator, as shown for example at graph 802A in FIG. 20A depicting the current applied by the first motor on the first manipulator.

In some examples, the controller unit of the first robotic pharmaceutical preparation system is configured to control the operation of the first manipulator by monitoring the power consumption of the first motor, which in turn facilitates the movement of the first manipulator. Optionally, the controller unit is configured to control the first manipulator based on the encoder position signal combined with the control based on the power consumption of the first motor.

In some examples, monitoring the power consumption of the first motor comprises predetermining at least one of an upper and lower range of power consumption, as shown by respective upper and lower lines 820 and 822 in FIG. 20A. During operation, the controller unit is configured to detect if the actual (namely measured in real-time) power consumption has deviated from the predetermined range 820 and/or 822. The controller unit may be configured to generate an alert indicating that the actual power consumption has deviated from the predetermined range. The response to the alert may comprise any suitable response to remedy the deviation from the predetermined power consumption, such as the controller unit being configured to cease the operation of the first motor, or such as the controller unit may be configured to adjust the power consumption so as to return the actual power consumption to the predetermined range.

Monitoring and/or controlling the first manipulator based on the encoder position signal is a conventional method. Yet at times may suffer from inaccuracies since the motor shaft or other parts of the first manipulator may be unstable, and accordingly may cause the position signal to be inaccurate. Monitoring and/or controlling the first manipulator based on the power consumption, alternatively or in combination with monitoring and/or controlling based on the encoder position signal, enhances the accuracy of the signals provided to the controller unit. Accordingly, the controller unit is enabled to operate the first manipulator with increased accuracy.

Accordingly, the operation of the first manipulator and any one or more of its arms (e.g. the gripping arm 234, the engaging arm 238 and/or the plunger arm 244) and the syringe assembly 18 may be monitored and verified based on a combination of the encoder position signal (namely the position of the motor shaft) and the power consumption, thereby providing a method for highly accurately closing a control loop on the first manipulator.

In some examples, the controller unit 30 may be configured to cause the needle 22 (at its tip) to extend within the container 14 to a predetermined extent. The predetermined extent may be determined in any suitable manner:

In a non-limiting example, the predetermined needle extent may be determined by detection of an event, such as an event described hereinabove in reference to FIGS. 3C-F. Upon detection of the event, the controller unit 30 is operative to cause the needle 22 to advance to the predetermined extent, an extent which may be stored in the memory associated with the controller unit and may be subject to the needle length.

Monitoring and verifying that the needle 22 has extended to its predetermined length may be performed in any suitable manner. In some examples, the needle extent (namely the spatial position of the needle tip) may be verified by the encoder, which is operable to indicate the position of the motor shaft. The position of the motor shaft is an indication of the position of the needle 22 (since the arms of the manipulator, moved by the motor shaft, grip the syringe assembly, which comprises the needle 22).

In another example, the needle extent may be monitored and verified based on the power consumption, performed by comparing a detected actual power consumption with a predetermined range or value of the power consumption, typically stored in the memory, associated with the controller unit 30.

In another example, the needle extent may be monitored and verified based on a combination of the encoder position signal (namely the position of the motor shaft) and the power consumption, thereby providing a method for highly accurately closing a control loop on the needle extent.

Figure 21A:
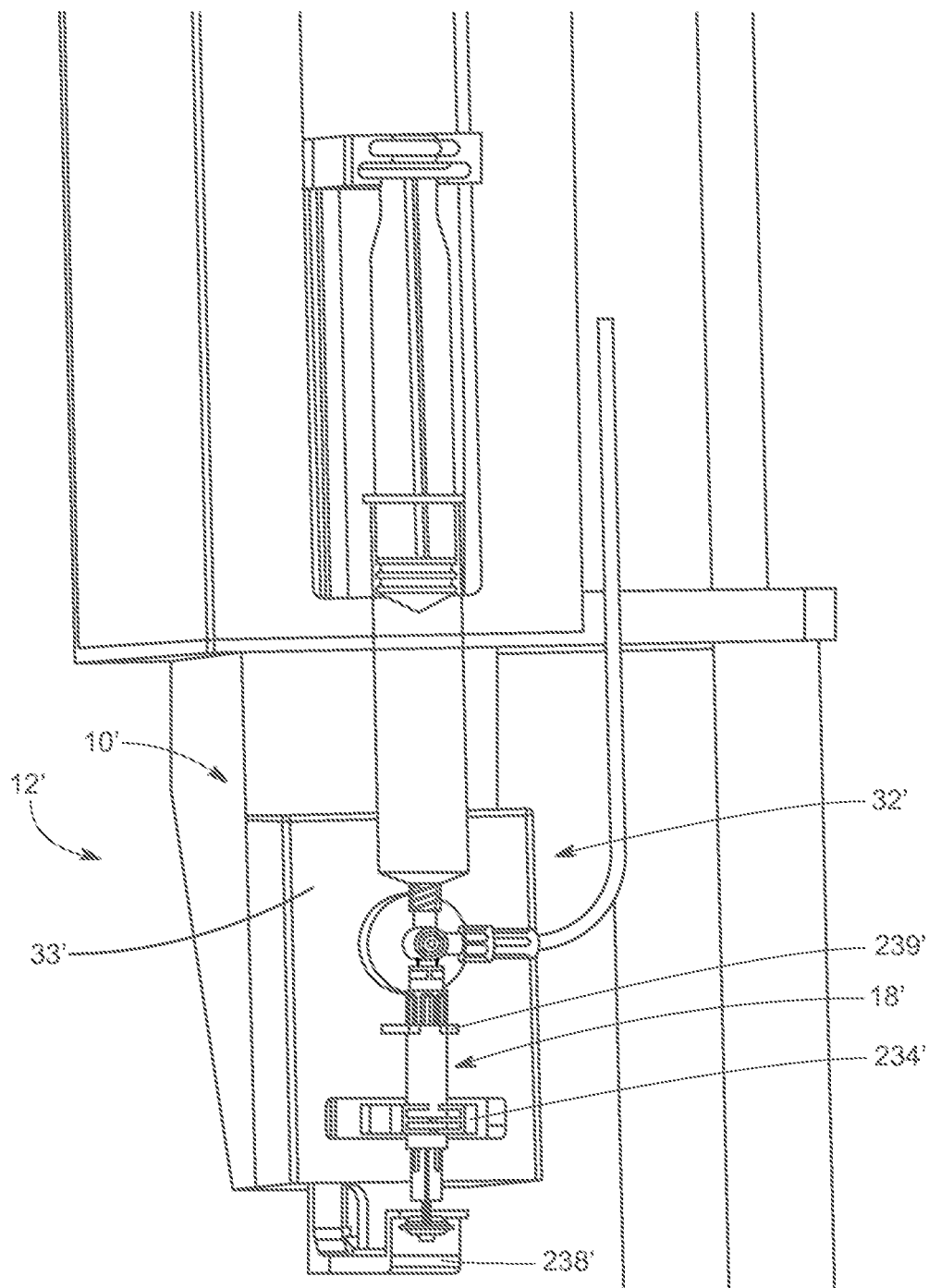
FIG. 21A is a perspective view, pictorial illustration of a fluid transfer station of a robotic pharmaceutical preparation system, constructed and operative according to an example of the presently disclosed subject matter.
Figure 21B:
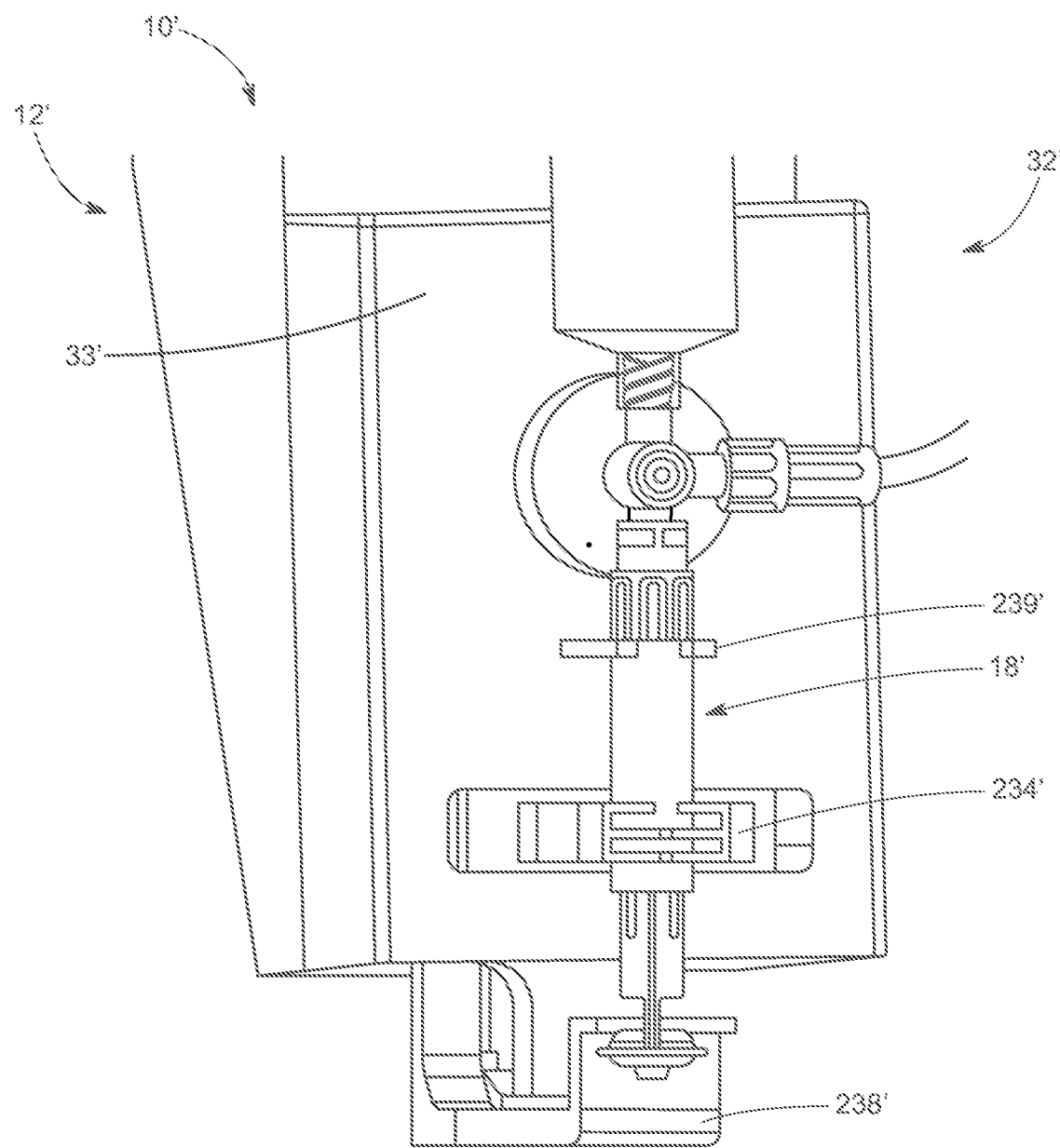
FIG. 21B is a close up view of the fluid transfer station of FIG. 21A.

Reference is now made to FIGS. 21A and 21B illustrating a fluid transfer station 10' of a robotic pharmaceutical preparation system 12', constructed and operative according to an example of the presently disclosed subject matter. The robotic system 12' is configured to be operable transfer of fluid between a container and a fluid transfer assembly in a similar manner as described above for the robotic system 12, and includes a controller unit (not shown) and a manipulator controllable by the controller unit corresponding to those of the robotic system 12. Also, the robotic system 12' includes a gripping arm and engaging arm corresponding to those of the robotic system 12. The manipulator has been generally designated as 32', the gripping arm as 234', and the engaging arm as 238'. Additionally, the manipulator 32' includes a supporting arm 239' for supporting a supporting portion of the fluid transfer assembly at least prior to the gripping arm gripping the gripping portion of the fluid transfer assembly.

In the illustrated example, the fluid transfer assembly has been shown to be syringe assembly 18', and it is to be understood herein that the fluid transfer assembly can according to any example thereof described herein.

The gripping arm 234' and the engaging arm 238' can be configured to perform all or some of the operations of the gripping arm 234 and engaging arm 238 of the robotic system 12 described above. The supporting arm 239' is configured for hanging the syringe assembly 18' thereon before the gripping arm 234' and/or the engaging arm 238' holds the syringe assembly 18'. For instance, prior to initiation of the operation of the manipulator, the syringe assembly 18' can be hanged on the supporting arm 239' and therefrom the gripping arm 234' and/or the engaging arm 238' can grab the syringe assembly 18'. The manipulator 32' comprises a body 33' and the supporting arm 239' projects outwardly from the body 33'. The supporting arm 239' is stationary with respect to the body member 33', and the gripping arm 234' and/or the engaging arm 238' are movable with respect to the supporting arm 239'. The supporting arm 239' is stationary with respect to an injection axis along which the transfer of fluid takes place.

While various inventive examples have been described and illustrated herein, those of ordinary skill in the art will readily envision a variety of other means, materials, or structure for performing the function, obtaining the results, or one or more of the advantages described herein, and each of such variations or modifications is deemed to be within the scope of the inventive examples described herein. More generally, those skilled in the art will readily appreciate that all parameters, dimensions, materials, and configurations described herein are meant to be for example only and that the actual parameters, dimensions, materials, and configurations will depend upon the specific application or applications for which the inventive teachings is/are used. Those skilled in the art will recognize or be able to ascertain using no more than routine experimentation, many equivalents to the specific inventive examples described herein. It is, therefore, to be understood that the foregoing examples are presented by way of example only and that, within the scope of the appended claims, equivalents thereto, and any claims supported by the present disclosure, inventive examples may be practiced otherwise than as specifically described and claimed. Inventive examples of the present disclosure are directed to each individual feature, system, article, material, composition, kit, method, and step, described herein. In addition, any combination of two or more such features, systems, articles, materials, compositions, kits, methods, and steps, if such features, systems, articles, materials, compositions, kits, methods, and steps, are not mutually inconsistent, is included within the inventive scope of the present disclosure.

Examples disclosed herein may also be combined with one or more features, functionality, or materials, as well as complete systems, devices or methods, to yield yet other examples and inventions. Moreover, some examples, may be distinguishable from the prior art by specifically lacking one and/or another feature disclosed in the particular prior art reference(s); i.e., claims to some examples may be distinguishable from the prior art by including one or more negative limitations.

Also, as noted, various inventive concepts may be embodied as one or more methods, of which an example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one example, to A only (optionally including elements other than B); in another example, to B only (optionally including elements other than A); in yet another example, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one example, to at least one, optionally including more than one, A, with no B present (and optionally including elements other than B); in another example, to at least one, optionally including more than one, B, with no A present (and optionally including elements other than A); in yet another example, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Although various example embodiments have been described in detail herein, however, in view of the present disclosure many modifications are possible in the example embodiments without materially departing from the concepts of present disclosure. Accordingly, any such modifications are intended to be included in the scope of this disclosure. Likewise, while the disclosure herein contains many specific combinations, these specific combinations should not be construed as limiting the scope of the disclosure or of any of the appended claims, but are provided as a description pertinent to one or more specific embodiments that may fall within the scope of the disclosure and the appended claims. Any described features from the various embodiments disclosed may be employed in combination with other disclosed embodiments. In addition, other embodiments of the present disclosure may also be devised which lie within the scopes of the disclosure and the appended claims.

This disclosure provides various examples, embodiments, and features which, unless expressly stated or which would be mutually exclusive, should be understood to be combinable with other examples, embodiments, or features described herein.

The invention claimed is:

1. A robotic system operable for transfer of fluid between a container accessible via a container-septum and a fluid transfer assembly accessible via a fluid transfer connector septum, the robotic system comprising:
   a controller; and
   a manipulator controllable by the controller and configured to manipulate at least one of the containers and the fluid transfer assembly,
   the controller being configured to operate the manipulator to ensure a predetermined compression threshold between the container-septum and the fluid transfer connector septum is reached, for securing contact therebetween for said transfer of fluid.

2. The robotic system according to claim 1, wherein the controller is further configured to control the manipulator to:
   bring the container-septum and the fluid transfer connector septum into contact; and
   perform said securing of the contact between the container-septum and the fluid transfer connector septum by pressing at least one of the container-septum and the fluid transfer connector septum onto the other one of the container-septum and the fluid transfer connector septum during at least a portion of the transfer of the fluid.

3. The robotic system according to claim 1, wherein the manipulator comprises a pressing mechanism configured to ensure the predetermined compression threshold between the container-septum and the fluid transfer connector septum is reached before initiation of the transfer of the fluid, said reaching of the predetermined compression threshold being associated with said securing the contact.

4. The robotic system according to claim 3, wherein the controller is configured to operate the manipulator to:
   align the fluid transfer connector septum of the fluid transfer assembly and the container-septum of the container;
   bring the fluid transfer connector septum and the container-septum in contact with each other;
   press at least one of the fluid transfer connector septum and the container-septum against the other one of the fluid transfer connector septum and the container-septum to perform said securing of the contact therebetween; and/or
   execute at least partial penetration of at least one of the fluid transfer connector septum and the container-septum by a fluid transfer conduit associated with a fluid transfer connector of the fluid transfer assembly to enable the transfer of the fluid, wherein the pressing mechanism is configured to ensure that the predetermined compression threshold between the container-septum and the fluid transfer connector septum is reached before said at least partial penetration.

5. The robotic system according to claim 3, wherein the pressing mechanism is further configured to ensure that the predetermined compression threshold between the container-septum and the fluid transfer connector septum is maintained during at least a portion of the transfer of fluid.

6. The robotic system according to claim 3, wherein the pressing mechanism is further configured to ensure that the predetermined compression threshold between the container-septum and the fluid transfer connector septum is maintained after the transfer of fluid is complete at least until the fluid transfer conduit is moved away from the fluid transfer connector septum.

7. The robotic system according to claim 1, wherein the manipulator comprises a gripping arm configured to grip a gripping portion of at least one of the fluid transfer assembly and the container.

8. The robotic system according to claim 7, wherein the manipulator comprises an engaging arm configured to engage the fluid transfer assembly at an engaging portion when the gripping arm grips the fluid transfer assembly, said engaging arm being configured to be axially movable relative to said gripping arm.

9. The robotic system according to claim 8, wherein the engaging arm and the gripping arm are coupled such that the engaging arm and the gripping arm are operable to be controllably displaced either axially together or axially relatively to each other.

10. The robotic system according to claim 8, wherein the controller is configured to control the engaging arm and the gripping arm such that:
the gripping arm grips a body member of the fluid transfer connector being fixedly coupled relative to a fluid transfer conduit of the fluid transfer connector, aligns the fluid transfer assembly with the container, and brings the fluid transfer connector septum in contact with the container-septum;
the engaging arm engages a sleeve of the fluid transfer connector of the fluid transfer assembly, the sleeve being fixedly coupled relative to the fluid transfer connector septum, presses the fluid transfer connector septum against the container-septum to perform said securing of the contact therebetween; and
the gripping arm causes a collapsible movement of the body member and the sleeve towards each other, which executes at least partial movement of the fluid transfer conduit and the fluid transfer connector septum towards each other for facilitating the transfer of the fluid.

11. The robotic system according to claim 10, wherein the gripping arm is further configured to apply a radial force on an external wall of the fluid transfer assembly and the controller is configured to control the gripping arm to selectively apply said radial force to press upon a fluid transfer connector actuator of the fluid transfer assembly.

12. The robotic system according to claim 8, wherein the engaging arm is configured to engage a sleeve of a fluid transfer connector of the fluid transfer assembly, the sleeve being fixedly coupled relative to the fluid transfer connector septum and the gripping arm is configured to grip a body member of the fluid transfer connector being fixedly coupled relative to a fluid transfer conduit of the fluid transfer connector, the controller being configured to cause relative movement between the gripping arm and the engaging arm to cause the fluid transfer conduit and the fluid transfer connector septum to at least partially move towards each other upon the predetermined compression threshold between the container-septum and the fluid transfer connector septum is reached.

13. The robotic system according to claim 12, wherein the manipulator is configured to resist relative movement between the gripping arm and the engaging arm when an axial force below a predetermined pressing threshold is applied to cause said relative movement, said predetermined pressing threshold being associated with the predetermined compression threshold.

14. The robotic system according to claim 8, wherein the controller is configured to control the engaging arm and the gripping arm such that:
following the transfer of the fluid, the gripping arm moves the body member away from the sleeve; and
the engaging arm and the gripping arm are distanced from the container for disconnecting the fluid transfer connector septum from the container-septum.

15. The robotic system according to claim 8, wherein the controller is configured to control the engaging arm and the gripping arm such that:
any one of the engaging arm and the gripping arm grips the fluid transfer assembly, aligns the fluid transfer assembly with the container and brings the fluid transfer connector septum in contact with the container-septum; and
any one of the engaging arm and the gripping arm presses the fluid transfer connector septum against the container-septum to secure contact therebetween.

16. The robotic system according to claim 8, wherein the engaging arm is formed with a pressing surface configured to being pressed onto a radial stop of the fluid transfer assembly to perform said securing of the contact between the container-septum and the fluid transfer connector septum.

17. The robotic system according to claim 1, further comprising a fluid transfer connector extending between a connector proximal end configured to be connected to a fluid transfer unit of the fluid transfer assembly and a connector distal end comprising the fluid transfer connector septum, said fluid transfer connector being configured to establish fluid communication between the fluid transfer unit and the container for said transfer of fluid.

18. The robotic system according to claim 17, wherein the fluid transfer connector comprises:
a connector body extending from the connector proximal end towards a body distal end; and
said fluid transfer connector septum comprising a septum protruding portion extending from the body distal end towards the connector distal end.

19. The robotic system according to claim 17, wherein the fluid transfer connector comprises a body member and a sleeve displaceable relative to each other between an extended position, which is a normal position, and a collapsed position, at which the fluid transfer connector establishes said fluid communication and wherein the manipulator is configured to displace the fluid transfer connector into the collapsed position after securing the contact between the fluid transfer connector septum and the container septum.

20. A method for transferring fluid between a container accessible via a container-septum and a fluid transfer assembly accessible via a fluid transfer connector septum, the method, by operation of a robotic system, comprising:
bringing the container-septum of the container into contact with the fluid transfer connector septum of the fluid transfer assembly;
pressing at least one of the container-septum and the fluid transfer connector septum onto the other one of the container-septum and the fluid transfer connector septum and securing the contact therebetween by ensuring a predetermined compression threshold between the container-septum and the fluid transfer connector septum is reached;

transferring fluid through the container-septum and the fluid transfer connector septum; and maintaining the secured contact between the container-septum and the fluid transfer connector septum during at least a portion of the transfer of the fluid.

21. A robotic system operable for transfer of fluid between a container accessible via a container-septum and a fluid transfer assembly accessible via a fluid transfer connector configured to establish fluid communication between the container and the fluid transfer assembly for said transfer of fluid, said fluid transfer connector comprising a body member and a sleeve displaceable relative to each other between an extended position, which is a normal position, and a collapsed position, at which the fluid transfer connector establishes said fluid communication, said fluid transfer connector comprising a fluid transfer connector septum positioned at the sleeve, the robotic system comprising:
 a controller;
 a manipulator controllable by the controller and configured to manipulate at least one of the containers and the fluid transfer assembly to bring the fluid transfer connector septum and the container-septum into contact with each other and to ensure a predetermined compression threshold between the container-septum and the fluid transfer connector septum is reached, for securing said contact therebetween, and to selectively displace the fluid transfer connector into its collapsed position from the extended position; and
 a contact securing mechanism configured to prevent the manipulator from displacing the fluid transfer connector into its collapsed position from the extended position until the predetermined compression threshold between the container-septum and the fluid transfer connector septum is reached.

22. The robotic system according to claim 21, wherein the manipulator is configured to push at least one of the fluid transfer connector septum and the container-septum against the other one of the fluid transfer connector septum and the container-septum by a compression force with a variable magnitude.

23. The robotic system according to claim 22, wherein the contact securing mechanism is configured to prevent the manipulator from displacing the fluid transfer connector into its collapsed position from the extended position at least until the compression force is less than the predetermined compression threshold.

24. The robotic system according to claim 22, wherein the contact securing mechanism is configured to allow the manipulator to displace the fluid transfer connector into its collapsed position from the extended position at least when the compression force is equal to or more than the predetermined compression threshold.

25. The robotic system according to claim 22, wherein the contact securing mechanism is configured to allow the manipulator to displace the fluid transfer connector into its collapsed position following detection of an event indicative that the compression force is equal to or more than the predetermined compression threshold.

26. The robotic system according to claim 21 wherein the contact securing mechanism comprises a mechanical element.

27. The robotic system according to claim 21, wherein the contact securing mechanism comprises a resisting member configured to resist the manipulator displacing the fluid transfer connector into its collapsed position.

28. The robotic system according to claim 27, wherein the manipulator comprises an engaging arm configured to engage the sleeve and a gripping arm configured to grip the body member, the engaging arm and gripping arm being configured to move relative to each other to displace the fluid transfer connector between the extend and collapsed position, wherein the engaging arm and the gripping arm are coupled to each other via the resisting member; and
 wherein the engaging arm and the gripping arm are configured to move towards each other to displace the fluid transfer connector into the collapsed position upon commencement of deformation of the resisting member.

29. The robotic system according to claim 21, further comprising a fluid transfer connector configured to establish fluid communication between the container and the fluid transfer assembly, said fluid transfer connector having a body member and a sleeve including a fluid transfer connector septum, the sleeve and the body member being displaceable relative to each other between an extended position, which is a normal position, and a collapsed position, at which the fluid transfer connector establishes said fluid communication.

30. A method for transferring fluid between a container accessible via a container-septum and a fluid transfer assembly accessible via a fluid transfer connector comprising a fluid transfer connector septum, the method, by operation of a robotic system, comprising at least one of:
 operating a manipulator of the robotic system for manipulating at least one of the containers and the fluid transfer assembly to bring the fluid transfer connector septum and the container-septum into contact with each other;
 operating the manipulator for manipulating the fluid transfer assembly to press the fluid transfer connector septum onto the container-septum at least until a predetermined compression threshold between the container-septum and the fluid transfer connector septum is reached;
 operating the manipulator to displace, after the predetermined compression threshold is reached, the fluid transfer connector into its collapsed position, at which fluid communication between the container and the fluid transfer assembly is established, from its extended position, which is a normal position; and
 performing said transfer of fluid between the fluid transfer assembly and the container.

* * * * *